(12) United States Patent
Shibutani et al.

(10) Patent No.: US 10,205,589 B2
(45) Date of Patent: Feb. 12, 2019

(54) ENCRYPTION PROCESSING DEVICE AND ENCRYPTION PROCESSING METHOD

(71) Applicant: SONY CORPORATION, Tokyo (JP)

(72) Inventors: Kyoji Shibutani, Tokyo (JP); Takanori Isobe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 140 days.

(21) Appl. No.: 15/127,072

(22) PCT Filed: Feb. 23, 2015

(86) PCT No.: PCT/JP2015/000888
§ 371 (c)(1),
(2) Date: Sep. 19, 2016

(87) PCT Pub. No.: WO2015/145964
PCT Pub. Date: Oct. 1, 2015

(65) Prior Publication Data
US 2017/0118011 A1    Apr. 27, 2017

(30) Foreign Application Priority Data
Mar. 28, 2014   (JP) .................................. 2014-068290

(51) Int. Cl.
*H04L 9/06*    (2006.01)
*H04L 9/14*    (2006.01)
*G06F 17/16*   (2006.01)

(52) U.S. Cl.
CPC .......... *H04L 9/0625* (2013.01); *H04L 9/0631* (2013.01); *H04L 9/14* (2013.01);
(Continued)

(58) Field of Classification Search
CPC . H04L 9/0625; H04L 9/0631; H04L 2209/12; H04L 2209/24
See application file for complete search history.

(56) References Cited

U.S. PATENT DOCUMENTS

2005/0111659 A1   5/2005   Shirai et al.
2006/0002548 A1   1/2006   Chu
(Continued)

FOREIGN PATENT DOCUMENTS

| EP | 1862991 A1 | 12/2007 |
|---|---|---|
| EP | 1975908 A1 | 10/2008 |
| WO | 2005/025124 A1 | 3/2005 |

OTHER PUBLICATIONS

Sony Corporation. "The 128-bit Blockcipher CLEFIA: Design Rationale." Revision 1.0, Jun. 1, 2007. 19 pages. (Year: 2007).*
(Continued)

*Primary Examiner* — Robert B Leung
(74) *Attorney, Agent, or Firm* — Chip Law Group

(57) ABSTRACT

An encryption processing system includes an encryption processing circuit that executes a round calculation on input data and generates output data, and a key schedule circuit that outputs key data used in the encryption processing circuit to the encryption processing circuit. Each round calculation executed by the encryption processing circuit includes a linear conversion process executed by a linear conversion circuit, and the linear conversion circuit changes a linear conversion mode of the linear conversion process according to a round transition.

20 Claims, 81 Drawing Sheets

(52) U.S. Cl.
CPC .......... *G06F 17/16* (2013.01); *H04L 2209/12* (2013.01); *H04L 2209/24* (2013.01)

(56) References Cited

U.S. PATENT DOCUMENTS

| | | | | |
|---|---|---|---|---|
| 2010/0014659 A1* | 1/2010 | Shibutani | ................ | H04L 9/002 380/28 |
| 2010/0061548 A1* | 3/2010 | Shirai | .................... | H04L 9/002 380/28 |
| 2010/0091991 A1* | 4/2010 | Shibutani | ................ | H04L 9/002 380/259 |
| 2010/0226493 A1* | 9/2010 | Shirai | .................... | H04L 9/002 380/28 |

OTHER PUBLICATIONS

International Search Report and Written Opinion of PCT Application No. PCT/JP2015/000888, dated May 19, 2015, 10 pages of ISRWO.

\* cited by examiner

PRIOR ART

FIG. 24A

EXAMPLES OF 4 KINDS OF MATRIXES APPLIED TO LINEAR CONVERSION PROCESS $$M_0 = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \quad M_1 = \begin{pmatrix} 1 & 1 & 0 & 1 \\ 1 & 1 & 1 & 0 \\ 0 & 1 & 1 & 1 \\ 1 & 0 & 1 & 1 \end{pmatrix} \quad M_2 = \begin{pmatrix} 1 & 1 & 1 & 0 \\ 1 & 1 & 0 & 1 \\ 1 & 0 & 1 & 1 \\ 0 & 1 & 1 & 1 \end{pmatrix} \quad M_3 = \begin{pmatrix} 1 & 0 & 1 & 1 \\ 0 & 1 & 1 & 1 \\ 1 & 1 & 1 & 0 \\ 1 & 1 & 0 & 1 \end{pmatrix}$$

FIG. 24B
EXAMPLES OF 3 KINDS OF MATRIX CALCULATIONS APPLIED TO LINEAR CONVERSION PROCESS
P1: COLUMN DIFFUSION CALCULATION (MixColumn)
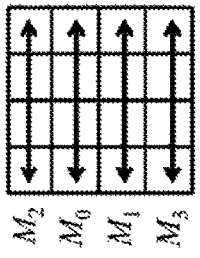
$MC[M_0]$
$(= MC[M_0, M_0, M_0, M_0])$
P2: ROW DIFFUSION CALCULATION TYPE 1 (MixRow1)
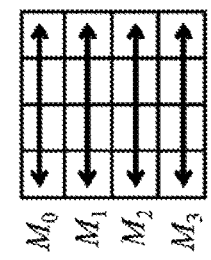
$MR[M_0, M_1, M_2, M_3]$
P3: ROW DIFFUSION CALCULATION TYPE 2 (MixRow2)
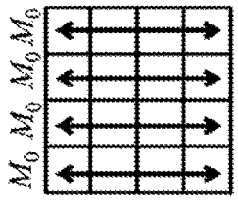
$MR[M_2, M_0, M_1, M_3]$

FIG. 25A

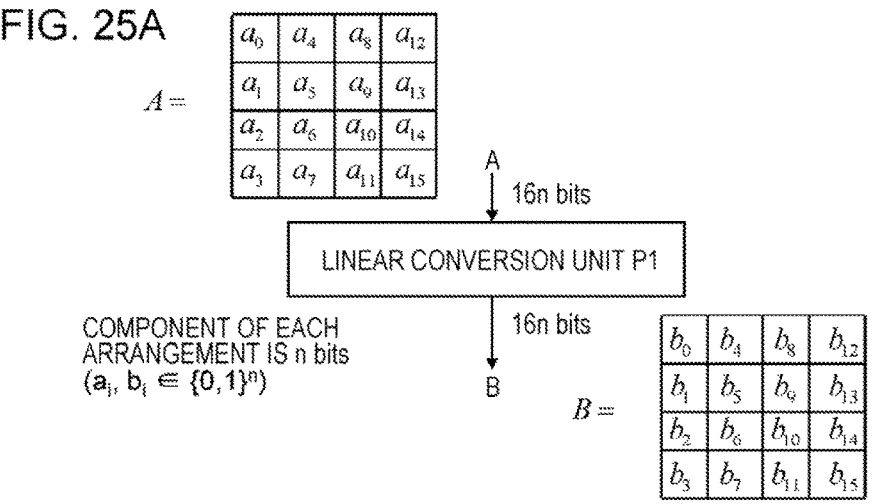

COMPONENT OF EACH
ARRANGEMENT IS n bits
($a_i, b_i \in \{0,1\}^n$)

FIG. 25B $$\begin{pmatrix} b_0 \\ b_1 \\ b_2 \\ b_3 \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \begin{pmatrix} a_0 \\ a_1 \\ a_2 \\ a_3 \end{pmatrix}, \begin{pmatrix} b_4 \\ b_5 \\ b_6 \\ b_7 \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \begin{pmatrix} a_4 \\ a_5 \\ a_6 \\ a_7 \end{pmatrix}$$

$$\begin{pmatrix} b_8 \\ b_9 \\ b_{10} \\ b_{11} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \begin{pmatrix} a_8 \\ a_9 \\ a_{10} \\ a_{11} \end{pmatrix}, \begin{pmatrix} b_{12} \\ b_{13} \\ b_{14} \\ b_{15} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \begin{pmatrix} a_{12} \\ a_{13} \\ a_{14} \\ a_{15} \end{pmatrix}$$

$b_0 = a_1 + a_2 + a_3,$   $b_8 = a_9 + a_{10} + a_{11},$
$b_1 = a_0 + a_2 + a_3,$   $b_9 = a_8 + a_{10} + a_{11},$
$b_2 = a_0 + a_1 + a_3,$   $b_{10} = a_8 + a_9 + a_{11},$
$b_3 = a_0 + a_1 + a_2,$   $b_{11} = a_8 + a_9 + a_{10},$ $b_4 = a_5 + a_6 + a_7,$   $b_{12} = a_{13} + a_{14} + a_{15},$
$b_5 = a_4 + a_6 + a_7,$   $b_{13} = a_{12} + a_{14} + a_{15},$
$b_6 = a_4 + a_5 + a_7,$   $b_{14} = a_{12} + a_{13} + a_{15},$
$b_7 = a_4 + a_5 + a_6,$   $b_{15} = a_{12} + a_{13} + a_{14}$ (HERE, + INDICATES XOR (EXCLUSIVE OR))

FIG. 26A

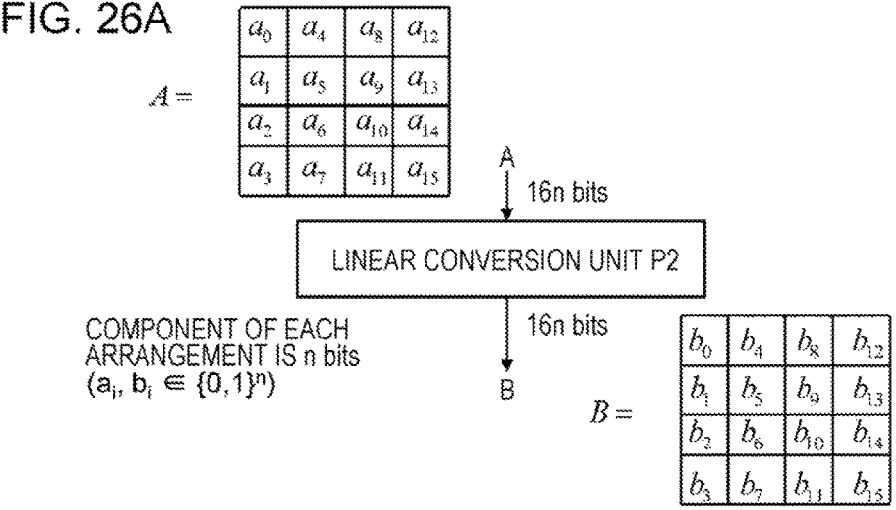

COMPONENT OF EACH
ARRANGEMENT IS n bits
($a_i$, $b_i \in \{0,1\}^n$)

FIG. 26B $$\begin{pmatrix} b_0 \\ b_4 \\ b_8 \\ b_{12} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_0 \\ a_4 \\ a_8 \\ a_{12} \end{pmatrix} \begin{pmatrix} b_1 \\ b_5 \\ b_9 \\ b_{13} \end{pmatrix} = \begin{pmatrix} 1 & 1 & 0 & 1 \\ 1 & 1 & 1 & 0 \\ 0 & 1 & 1 & 1 \\ 1 & 0 & 1 & 1 \end{pmatrix} \cdot \begin{pmatrix} a_1 \\ a_5 \\ a_9 \\ a_{13} \end{pmatrix}$$

$$\begin{pmatrix} b_2 \\ b_6 \\ b_{10} \\ b_{14} \end{pmatrix} = \begin{pmatrix} 1 & 1 & 1 & 0 \\ 1 & 1 & 0 & 1 \\ 1 & 0 & 1 & 1 \\ 0 & 1 & 1 & 1 \end{pmatrix} \cdot \begin{pmatrix} a_2 \\ a_6 \\ a_{10} \\ a_{14} \end{pmatrix} \begin{pmatrix} b_3 \\ b_7 \\ b_{11} \\ b_{15} \end{pmatrix} = \begin{pmatrix} 1 & 0 & 1 & 1 \\ 0 & 1 & 1 & 1 \\ 1 & 1 & 1 & 0 \\ 1 & 1 & 0 & 1 \end{pmatrix} \cdot \begin{pmatrix} a_3 \\ a_7 \\ a_{11} \\ a_{15} \end{pmatrix}$$

$b_0 = a_4 + a_8 + a_{12}$,    $b_8 = a_0 + a_4 + a_{12}$,
$b_1 = a_1 + a_5 + a_{13}$,    $b_9 = a_5 + a_9 + a_{13}$,
$b_2 = a_2 + a_6 + a_{10}$,    $b_{10} = a_2 + a_{10} + a_{14}$,
$b_3 = a_3 + a_{11} + a_{15}$,    $b_{11} = a_3 + a_7 + a_{11}$, $b_4 = a_0 + a_8 + a_{12}$,    $b_{12} = a_0 + a_4 + a_8$,
$b_5 = a_1 + a_5 + a_9$,    $b_{13} = a_1 + a_9 + a_{13}$,
$b_6 = a_2 + a_6 + a_{14}$,    $b_{14} = a_6 + a_{10} + a_{14}$,
$b_7 = a_7 + a_{11} + a_{15}$,    $b_{15} = a_3 + a_7 + a_{15}$, (HERE, + INDICATES XOR (EXCLUSIVE OR))

FIG. 27A

$$A = \begin{pmatrix} a_0 & a_4 & a_8 & a_{12} \\ a_1 & a_5 & a_9 & a_{13} \\ a_2 & a_6 & a_{10} & a_{14} \\ a_3 & a_7 & a_{11} & a_{15} \end{pmatrix}$$

A ↓ 16n bits

LINEAR CONVERSION UNIT P3

COMPONENT OF EACH ARRANGEMENT IS n bits ($a_i$, $b_i \in \{0,1\}^n$)

↓ 16n bits
B $$B = \begin{pmatrix} b_0 & b_4 & b_8 & b_{12} \\ b_1 & b_5 & b_9 & b_{13} \\ b_2 & b_6 & b_{10} & b_{14} \\ b_3 & b_7 & b_{11} & b_{15} \end{pmatrix}$$

FIG. 27B

$$\begin{pmatrix} b_0 \\ b_4 \\ b_8 \\ b_{12} \end{pmatrix} = \begin{pmatrix} 1 & 1 & 1 & 0 \\ 1 & 1 & 0 & 1 \\ 1 & 0 & 1 & 1 \\ 0 & 1 & 1 & 1 \end{pmatrix} \cdot \begin{pmatrix} a_0 \\ a_4 \\ a_8 \\ a_{12} \end{pmatrix} \quad \begin{pmatrix} b_1 \\ b_5 \\ b_9 \\ b_{13} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_1 \\ a_5 \\ a_9 \\ a_{13} \end{pmatrix}$$

$$\begin{pmatrix} b_2 \\ b_6 \\ b_{10} \\ b_{14} \end{pmatrix} = \begin{pmatrix} 1 & 1 & 0 & 1 \\ 1 & 1 & 1 & 0 \\ 0 & 1 & 1 & 1 \\ 1 & 0 & 1 & 1 \end{pmatrix} \cdot \begin{pmatrix} a_2 \\ a_6 \\ a_{10} \\ a_{14} \end{pmatrix} \quad \begin{pmatrix} b_3 \\ b_7 \\ b_{11} \\ b_{15} \end{pmatrix} = \begin{pmatrix} 1 & 0 & 1 & 1 \\ 0 & 1 & 1 & 1 \\ 1 & 1 & 1 & 0 \\ 1 & 1 & 0 & 1 \end{pmatrix} \cdot \begin{pmatrix} a_3 \\ a_7 \\ a_{11} \\ a_{15} \end{pmatrix}$$

$b_0 = a_0 + a_4 + a_8,$       $b_8 = a_0 + a_8 + a_{12},$
$b_1 = a_5 + a_9 + a_{13},$    $b_9 = a_1 + a_5 + a_{13},$
$b_2 = a_2 + a_6 + a_{14},$    $b_{10} = a_6 + a_{10} + a_{14},$
$b_3 = a_3 + a_{11} + a_{15},$ $b_{11} = a_3 + a_7 + a_{11},$ $b_4 = a_0 + a_4 + a_{12},$    $b_{12} = a_4 + a_8 + a_{12},$
$b_5 = a_1 + a_9 + a_{13},$    $b_{13} = a_1 + a_5 + a_9,$
$b_6 = a_2 + a_6 + a_{10},$    $b_{14} = a_2 + a_{10} + a_{14},$
$b_7 = a_7 + a_{11} + a_{15},$ $b_{15} = a_3 + a_7 + a_{15}$ (HERE, + INDICATES XOR (EXCLUSIVE OR))

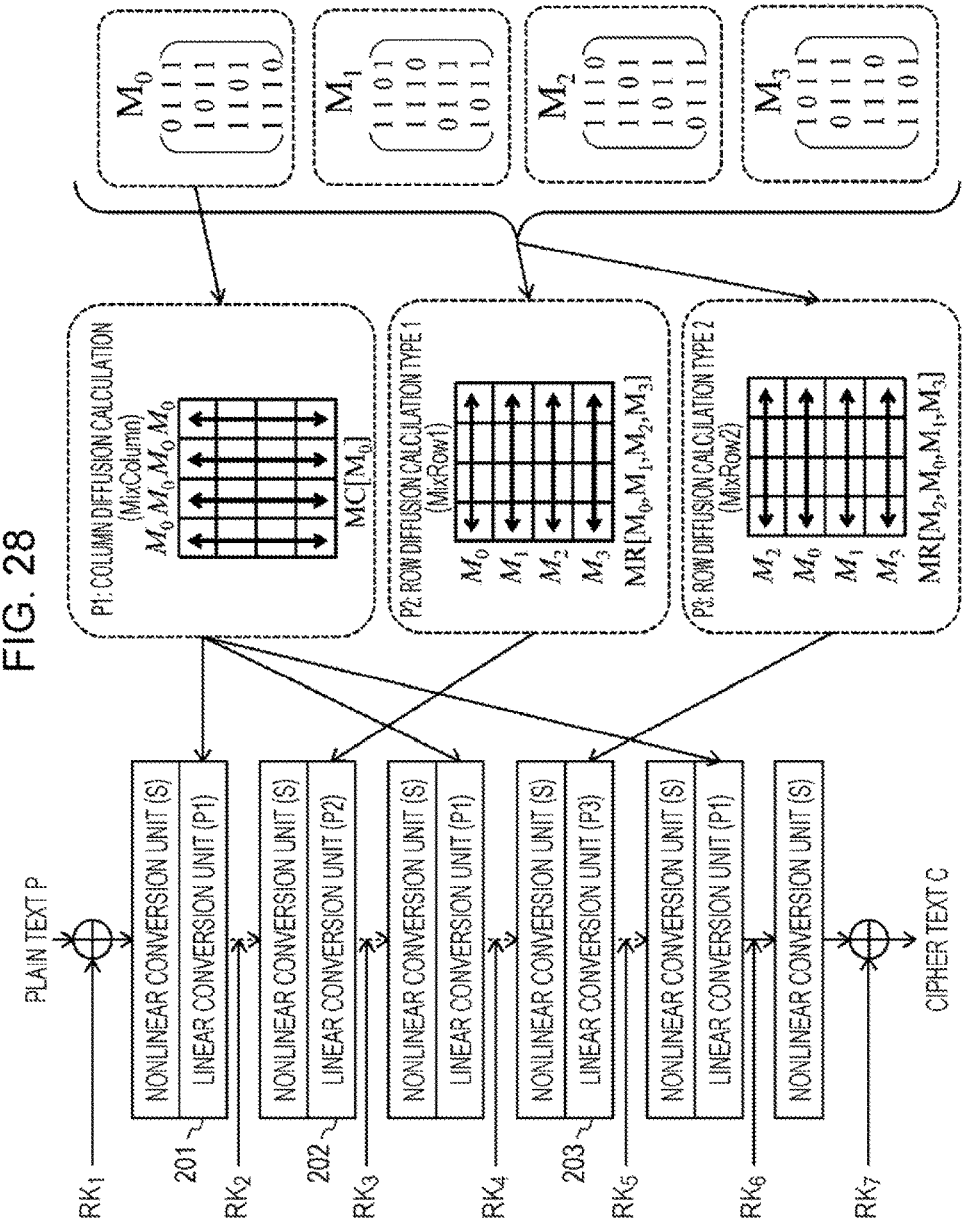

FIG. 30

| NUMBER OF ROUNDS | NUMBER OF MINIMUM DIFFERENTIAL/LINEAR ACTIVE S-boxes IN ENCRYPTION PROCESS CONFIGURATION IN WHICH SAME LINEAR CONVERSION OF RELATED ART TYPE IS EXECUTED | NUMBER OF MINIMUM DIFFERENTIAL/LINEAR ACTIVE S-boxes IN ENCRYPTION PROCESS CONFIGURATION IN WHICH PLURALITY OF DIFFERENT LINEAR CONVERSIONS ARE EXECUTED |
|---|---|---|
| 4 | 16 | 16 |
| 6 | 20 | 28 |
| 8 | 32 | 32 |
| 10 | 36 | 44 |
| 12 | 48 | 56 |
| 14 | 52 | 60 |
| 16 | 64 | 72 |
| 18 | 68 | 84 |
| 20 | 80 | 88 |
| 22 | 84 | 100 |
| 24 | 96 | 112 |

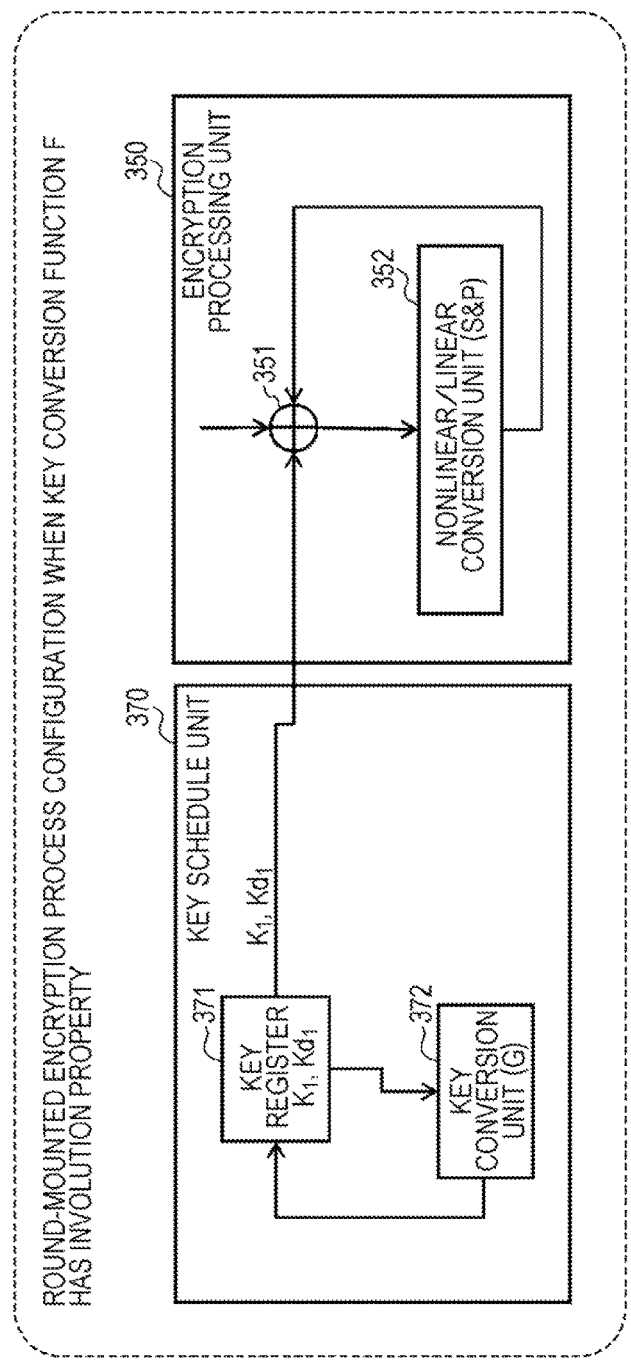

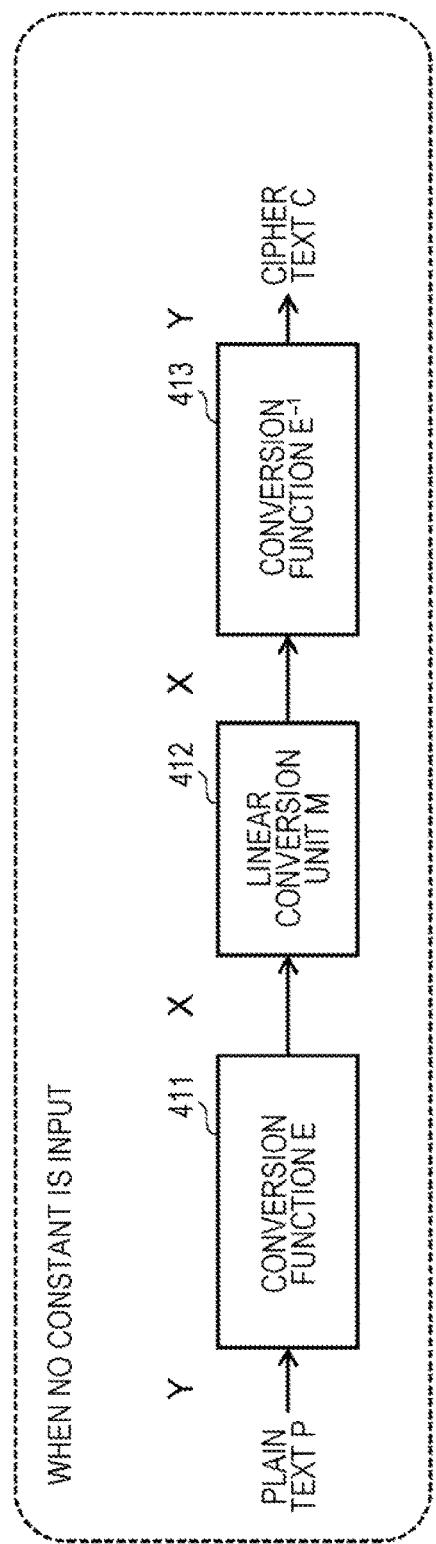

ENCRYPTION PROCESSING DEVICE AND ENCRYPTION PROCESSING METHOD

CROSS REFERENCE TO RELATED APPLICATIONS

This application is a U.S. National Phase of International Patent Application No. PCT/JP2015/000888 filed on Feb. 23, 2015, which claims priority benefit of Japanese Patent Application No. 2014-068290 filed in the Japan Patent Office on Mar. 28, 2014. Each of the above-referenced applications is hereby incorporated herein by reference in its entirety.

TECHNICAL FIELD

The present disclosure relates to an encryption processing device, an encryption processing method, and a program, and more particularly, to an encryption processing device, an encryption processing method, and a program executing a common key system encryption.

BACKGROUND ART

With advance in information society, information security technologies for protecting information to be processed safely have become important. As one of the constituent elements of the information security technologies, there is an encryption technology. At present, the encryption technology has been sued in various products or systems.

There are various encryption processing algorithms. As one of the basic technologies, there is a technology called a common key block encryption. In the common key block encryption, a common key is used as a key for an encryption and a key for decryption. In both of an encryption process and a decryption process, a plurality of keys are generated from the common key. A data conversion process is repeatedly executed in certain units of blocks, e.g., units of block data of 64 bits, 128 bits, 256 bits, and the like.

As representative algorithms of common key block encryptions, there are known the previous American national standard, Data Encryption Standard (DES), and the present American national standard, Advanced Encryption Standard (AES). Other various common key block encryptions have been continuously suggested at present. CLEFIA which the Sony Corporation suggested in 2007 is also one of the common key block encryptions.

As a technology of the related art which discloses the common key block encryption, for example, there is PTL 1 (Japanese Unexamined Patent Application Publication No. 2012-215813).

Such an algorithm of a common key block encryption mainly includes: an encryption processing unit that has a round function execution unit repeatedly executing input data conversion; and a key schedule unit that generates a round key to be applied at each round of the round function unit. The key schedule unit first generates an expanded key which increases the number of bits based on a master key (main key) which is a secret key and generates a round key (sub-key) to be applied to each round function unit of the encryption processing unit based on the generated expanded key.

As a specific structure executing such an algorithm, there is an existing a structure repeatedly executing the round function which includes a linear conversion unit and a nonlinear conversion unit. For example, as representative structures, there are a Substitution-Permutation Network (SPN) structure, a Feistel structure, an expanded Feistel structure, and the like.

Such algorithms all have structures that repeatedly execute the round functions including the linear conversion unit and the nonlinear conversion unit and convert plain text into cipher text.

CITATION LIST

Patent Literature

[PTL 1]
Japanese Unexamined Patent Application Publication No. 2012-215813

SUMMARY

Technical Problem

For examples, as attacks attempting to decrypt an encryption algorithm or a secret key, there are a difference attack, a linear attack, and the like. For encryption processing devices, resistance against such various attacks, high-speed processing, miniaturization, and the like are necessary.

It is desirable to provide an encryption processing device, an encryption processing method, and a program realizing an improvement in various factors necessary in the encryption processing device, such as safety, high speed, and miniaturization.

Solution to Problem

According to a first embodiment of the present disclosure, there is provided an encryption processing system includes an encryption processing circuit that executes a round calculation on input data and generates output data, and a key schedule circuit that outputs key data used in the encryption processing circuit to the encryption processing circuit. Each round calculation executed by the encryption processing circuit includes a linear conversion process executed by a linear conversion circuit, and the linear conversion circuit changes a linear conversion mode of the linear conversion process according to a round transition.

According to a second embodiment of the present disclosure, there is provided an encryption processing method executed in an encryption processing system, where the processing method includes executing, with an encryption processing circuit, round calculation on input data and generating output data, and outputting, with a key schedule circuit, key data used in the encryption processing circuit to the encryption processing circuit. In the executing step, the method includes causing the encryption processing circuit to execute a linear conversion process by a linear conversion circuit in the round calculation; and in the executing step, the method includes causing the linear conversion circuit to execute a linear conversion mode according to round transition.

According to a third embodiment of the present disclosure, there is provided a non-transitory computer-readable medium encoded with computer-readable instructions that, when executed by a processor, cause the processor to perform a method that includes executing, in an encryption processing circuit, round calculation on input data and generating output data, and outputting, in a key schedule circuit, key data used in the encryption processing circuit to the encryption processing circuit. In the executing step, the method includes causing the encryption processing circuit to execute a linear conversion process by a linear conversion circuit in the round calculation, and in the executing step, the method includes causing the linear conversion circuit to execute a linear conversion mode according to round transition.

The program according to the embodiment of the present disclosure is a program provided to, for example, an information processing device or a computer system capable of executing various program codes by, for example, a storage medium. When a program execution unit in the information processing device or the computer system executes the program, a process according to the program is realized.

The other purposes, characteristics, and advantages of an embodiment of the present disclosure will be apparent from the more detailed description based on embodiments of the present disclosure to be described and the appended drawings. A system in the present specification refers to a logical collection of a plurality of devices and is not limited to a configuration in which devices are present in the same casing.

Advantageous Effects of Invention

According to the embodiments of the present disclosure, an encryption process configuration in which resistance against various attacks is improved and safety is high is realized.

Specifically, the encryption processing unit configured to repeatedly execute the round calculation on the input data and generate the output data is included. The key schedule unit configured to output the key data used in the encryption processing unit to the encryption processing unit is included. The linear conversion process by a linear conversion unit in the round calculation executed by the encryption processing unit is changed according to the round transition. For example, column diffusion calculation in which linear conversion is executed applying a matrix to each column in units of components of each column of a state and row diffusion calculation in which linear conversion is executed applying a matrix in units of component units of each row of the state are switched to be executed according to round transition.

A diffusion property is improved by this configuration, and thus the encryption process configuration is realized in which resistance against various attacks is improved and safety is high.

The advantageous effects described in the present specification are merely exemplary and are not limited, and additional advantageous effects may be obtained.

BRIEF DESCRIPTION OF DRAWINGS

FIG. 24A is an explanatory diagram illustrating a matrix applied to a linear conversion process.

FIG. 24B is an explanatory diagram illustrating a matrix applied to a linear conversion process.

FIG. 25A is an explanatory diagram illustrating the column diffusion calculation executed by a linear conversion unit P1.

FIG. 25B is an explanatory diagram illustrating the column diffusion calculation executed by a linear conversion unit P1.

FIG. 26A is an explanatory diagram illustrating the row diffusion calculation executed by a linear conversion unit P2.

FIG. 26B is an explanatory diagram illustrating the row diffusion calculation executed by a linear conversion unit P2.

FIG. 27A is an explanatory diagram illustrating the row diffusion calculation executed by a linear conversion unit P3.

FIG. 27B is an explanatory diagram illustrating the row diffusion calculation executed by a linear conversion unit P3.

FIG. 28 is an explanatory diagram illustrating the configuration and the process of the linear conversion units of the encryption processing unit.

FIG. 30 is an explanatory diagram illustrating comparison data of the number of active S-boxes when different linear conversion processes are configured to be executed in the linear conversion units of the encryption processing unit and when the same linear conversion process is configured to be executed.

FIG. 41B is an explanatory diagram illustrating a configuration and a process of the key schedule unit when the key conversion function has the involution property.

FIG. 55A is an explanatory diagram illustrating problems of the encryption processing unit that has an involution property.

DESCRIPTION OF EMBODIMENTS

Hereinafter, an encryption processing device, an encryption processing method, and a program according to an embodiment of the present disclosure will be described in detail with reference to the drawings. The description will be made in the following sections.
1. Overview of Common Key Block Encryption
2. Index of Safety in Common Key Block Encryption
3. Overview of Entire Configuration of Common Key Encryption Process in Which Safety Is Improved
4. Configuration and Process of Linear Conversion unit of Encryption Processing Unit
5. Configuration and Process of Key Schedule Unit
5-1. Description of Configuration and Process of Key Schedule Unit
5-2. Advantageous Effects Based on Full Diffusion Property of Key Schedule Unit
5-3. Advantageous Effects Based on Involution Property of Key Conversion Unit
5-3-a. Advantageous Effects in Unrolled Mounting
5-3-b. Advantageous Effects in Round Mounting
5-4. Conclusion of Configuration of Key Schedule Unit and Advantageous Effects in Embodiment of the Present Disclosure
5-5. Examples of Other Configuration of Key Schedule Unit
5-6. Example of Configuration in Which Key Schedule Unit with Full Diffusion Property Is Included
6. Configuration in Which Improvement in Safety for Constant Input Is Realized
6-1. Configuration and Problems of Related Art in Which Improvement in Safety for Constant Input Is Realized
6-2. Configuration of Encryption Processing Device Having Constant Input Configuration in Which Safety Is High
6-3. Variation in Constant Insertion Position
7. Specific Configuration Example of S-Box Applied to Nonlinear Conversion Unit
8. Specific Example of Encryption Processing Device
9. Mounting Example of Encryption Processing Device
10. Conclusion of Configuration in Embodiment of the Present Disclosure <1. Overview of Common Key Block Encryption>

First, an overview of a common key block encryption will be described.

(1-1. Common Key Block Encryption)

Here, the common key block encryption (hereinafter also referred to as a block encryption) is intended to refer to the following definition.

The block encryption receives plain text P and a key K as inputs and outputs cipher text C. The bit length of each of the plain text and the cipher text is referred to as a block size and is indicated by, for example, a "block size=n." Here, n can take any integer value, but is generally one value determined in advance for each block encryption algorithm. A block encryption in which the block length is n is also referred to as an n-bit block encryption.

The bit length of a key is indicated by k. The key can take any integer value. A common key block encryption algorithm corresponds to one key size or a plurality of key sizes. For example, a certain block encryption algorithm A is assumed to have a configuration corresponding to the block size "n=128" and the key sizes "k=128," "k=192," or "k=256."

Plain text P: n bits
Cipher text C: n bits
Key K: k bits

Figure 1:
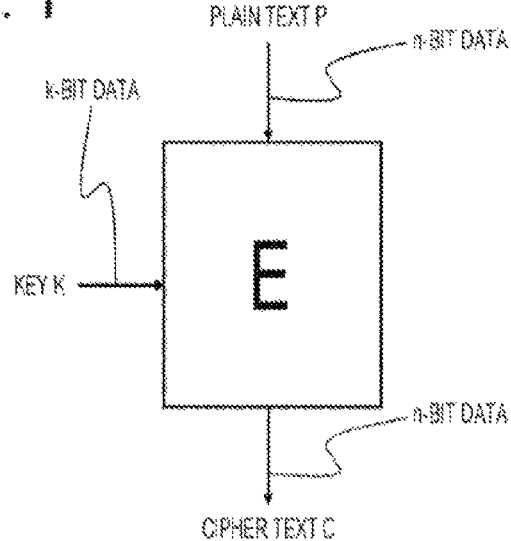
FIG. 1 is an explanatory diagram illustrating an n-bit common key block encryption algorithm corresponding to a key length of k bits.
Figure 2:
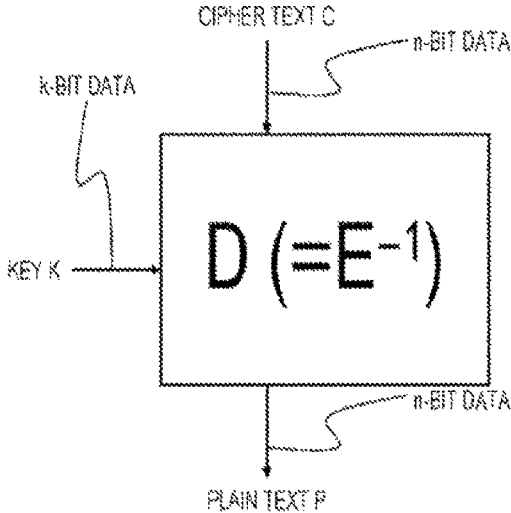
FIG. 2 is an explanatory diagram illustrating a decryption algorithm corresponding to the n-bit common key block encryption algorithm corresponding to the k-bit key length illustrated in FIG. 1.

FIG. 1 is a diagram illustrating an n-bit common key block encryption algorithm E corresponding to a key length of k bits. A decryption algorithm D corresponding to the encryption algorithm E can be defined as an inverse function $E^{-1}$ of the encryption algorithm E, and receives the cipher text c and the key k as inputs and outputs the plain text P. FIG. 2 is a diagram illustrating the decryption algorithm D corresponding to the encryption algorithm E illustrated in FIG. 1.

(1-2. Internal Configuration)

The block encryption can be considered to be divided into two parts. One part is a "key schedule unit" that receives a secret key K as an input and outputs a round key to be applied to each round of an encryption processing unit in a certain determined step and the other part is an "encryption processing unit" that inputs plain text P and the round key from the key schedule unit, executes data conversion, and outputs cipher text C.

Figure 3:
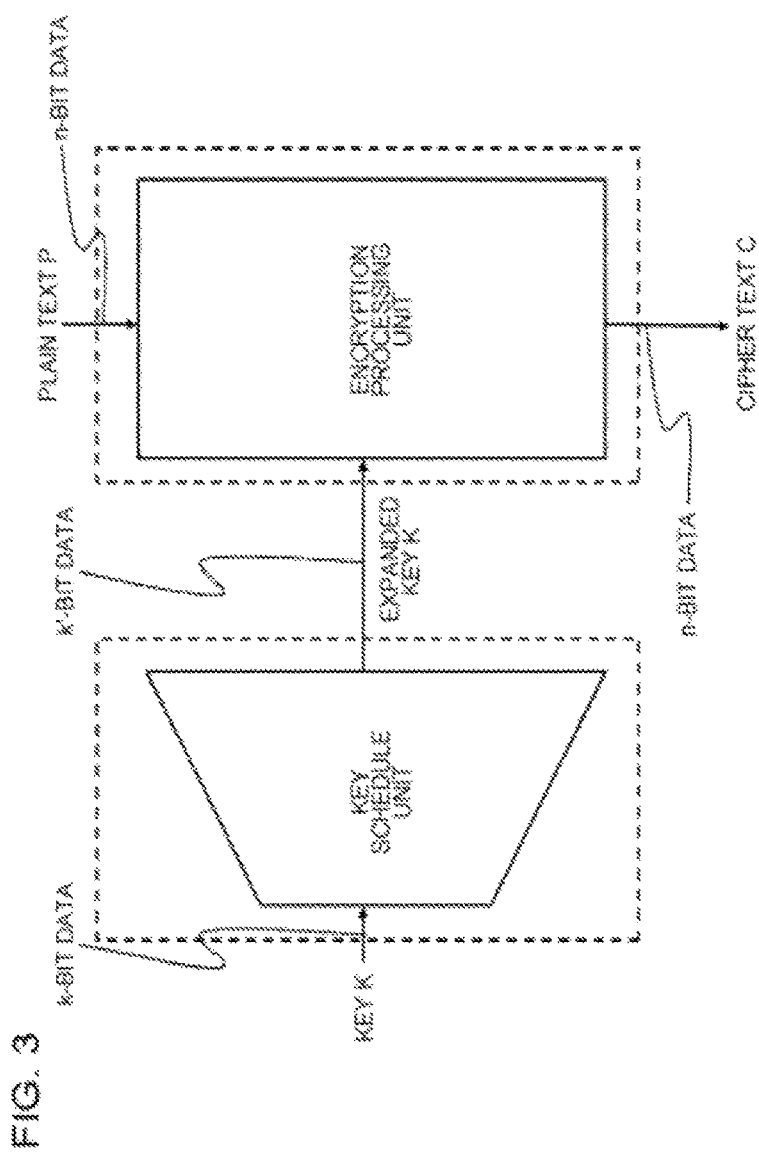
FIG. 3 is an explanatory diagram illustrating a relation between a key schedule unit and an encryption processing unit.

A relation between the two parts is illustrated in FIG. 3.

The encryption processing unit is configured such that a decryption process of inputting the cipher text C and outputting the plain text P is also executed in many cases. In this case, the encryption processing unit also executes the decryption process to which the round key supplied from the key schedule unit is applied.

A relation between the two parts is illustrated in FIG. 3.

(1-3. Encryption Processing Unit)

The encryption processing unit used in the following embodiment is assumed to be divided into processing units called round functions. The round function executes predetermined data conversion on input data and outputs converted data. The input data input to the round function is, for example, n-bit data during encryption. An output of the round function at a certain round is configured to be supplied as an input at the subsequent round. As one configuration of the round function, a configuration of calculation with a round key generated based on a key output from the key schedule unit is included. Specifically, exclusive OR calculation of the n-bit data during encryption and the round key is executed.

The total number of round functions is referred to as a total round number and is a value which is determined in advance for each encryption algorithm.

Figure 4:
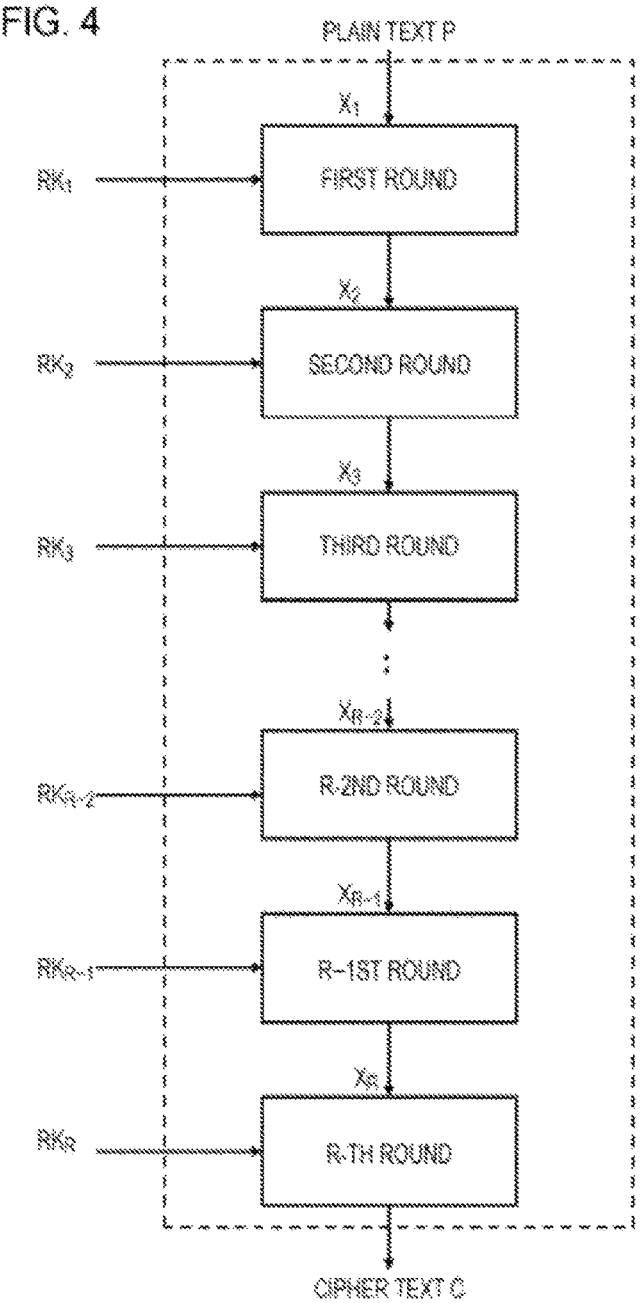
FIG. 4 is an explanatory diagram illustrating an example of the configuration of the encryption processing unit.

When $X_1$ is assumed to be input data at the first round in terms of an input side of the encryption processing unit, $X_i$ is data input to an i-th round function, and $RK_i$ is assumed to be a round key, the entire encryption processing unit is illustrated as in FIG. 4.

(1-4. Round Function)

The round functions can take various forms according to block encryption algorithms. The round functions can be classified according to a structure adopted by the encryption algorithms. As representative structures, a Substitution-Permutation Network (SPN) structure, a Feistel structure, and an expanded Feistel structure are exemplified herein.

(A) Round Function of Substitution-Permutation Network (SPN) Structure

Figure 5:
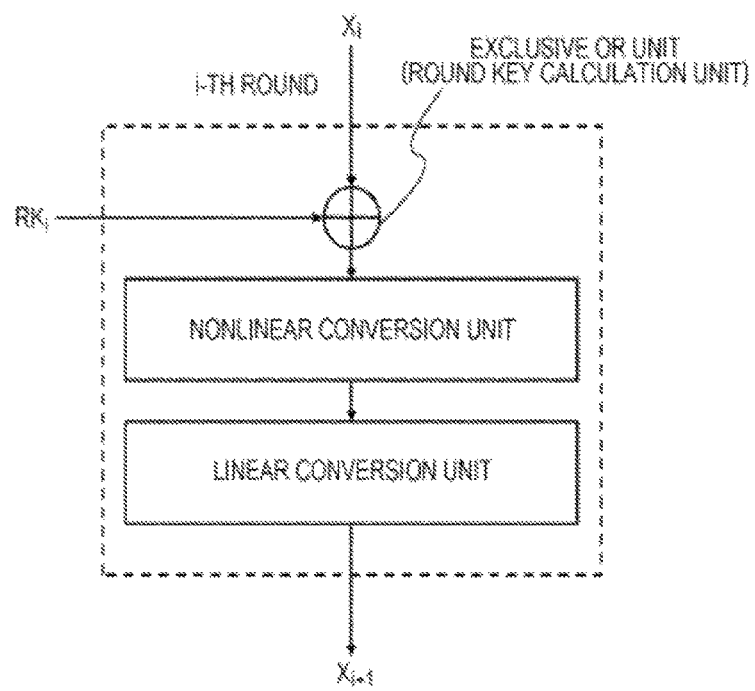
FIG. 5 is an explanatory diagram illustrating an example of a round function with an SPN structure.

This structure is a structure in which exclusive OR calculation, nonlinear conversion, linear conversion, and the like are applied to all of the n-bit input data. The order of the calculations is not particularly determined. FIG. 5 illustrates an example of the round function of the SPN structure. The linear conversion unit is also referred to as a permutation layer (P layer).

(B) Feistel Structure

Figure 6:
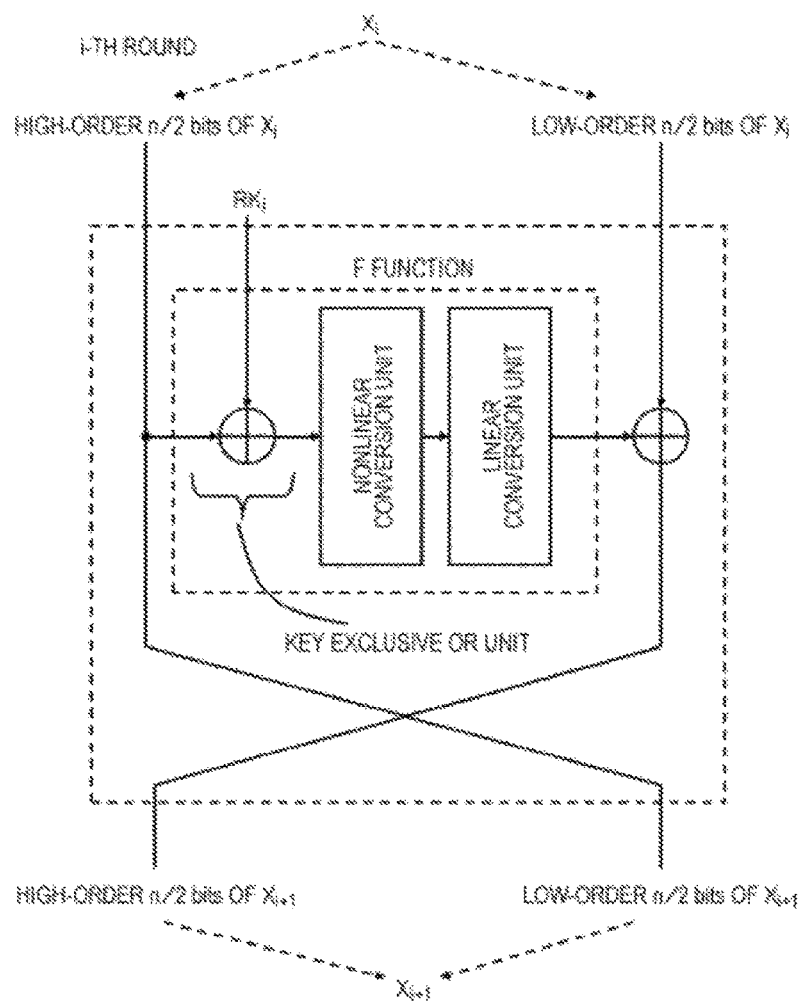
FIG. 6 is an explanatory diagram illustrating an example of a round function with a Feistel structure.

The n-bit input data is divided into two pieces of n/2-bit data. A function (F function) having one piece of data and a round key as inputs is applied, and an output and the other piece of data are subjected to exclusive OR. Thereafter, data obtained by permutating the right and left of the data is set as output data. There are various types of internal configurations of the F function. Basically, as in the SPN structure, the internal configuration is realized in a combination of exclusive OR calculation, nonlinear conversion, and linear conversion with round key data. FIG. 6 illustrates an example of a round function of the Feistel structure.

(C) Expanded Feistel Structure

Figure 7:
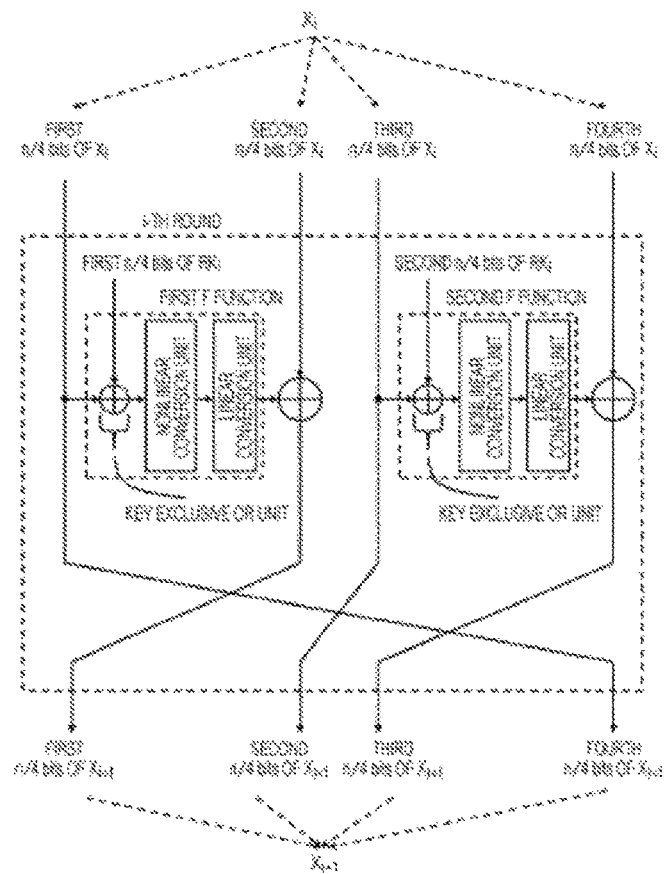
FIG. 7 is an explanatory diagram illustrating an example of an expanded Feistel structure.
Figure 8:
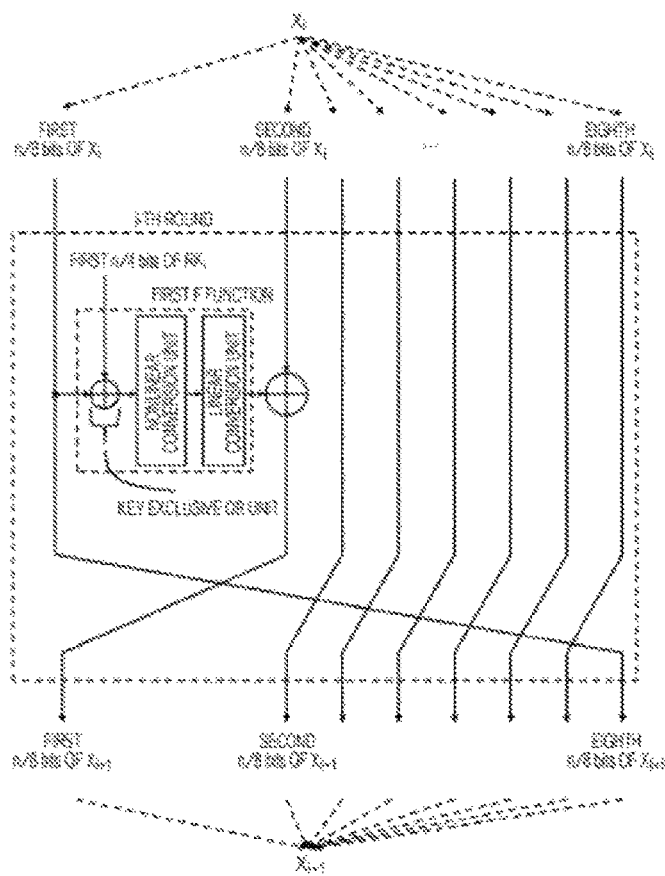
FIG. 8 is an explanatory diagram illustrating the example of the expanded Feistel structure.

The expanded Feistel structure is a structure expanded from the Feistel structure in which the number of data divisions is 2 to a structure in which the number of data divisions is 3 or more. When d is assumed to be the number of divisions, various expanded Feistel structures can be defined by d. Since the size of input/output of the F function relatively decreases, the F function is considered to be suited for compact mounting. FIG. 7 illustrates an example of the expanded Feistel structure when d=4 and two F functions are applied in parallel in one round. FIG. 8 illustrates an example of the expanded Feistel structure when d=8 and one F function is applied in one round.

(1-5. Nonlinear Conversion Unit)

When the size of data to be input increases, a mounting cost tends to increase in the nonlinear conversion unit. In order to avoid the increase in the mounting cost, a configuration in which target data is divided into a plurality of units and nonlinear conversion is executed on each of the units is realized in many cases. For example, a configuration can be realized in which data has an input size of ms bits and is divided into m pieces of data with s bits and nonlinear conversion with input/output of s bits is executed. A nonlinear conversion execution unit in units of s bits is referred to as an S-box. An example of the S-box is illustrated in FIG. 9.

Figure 9:
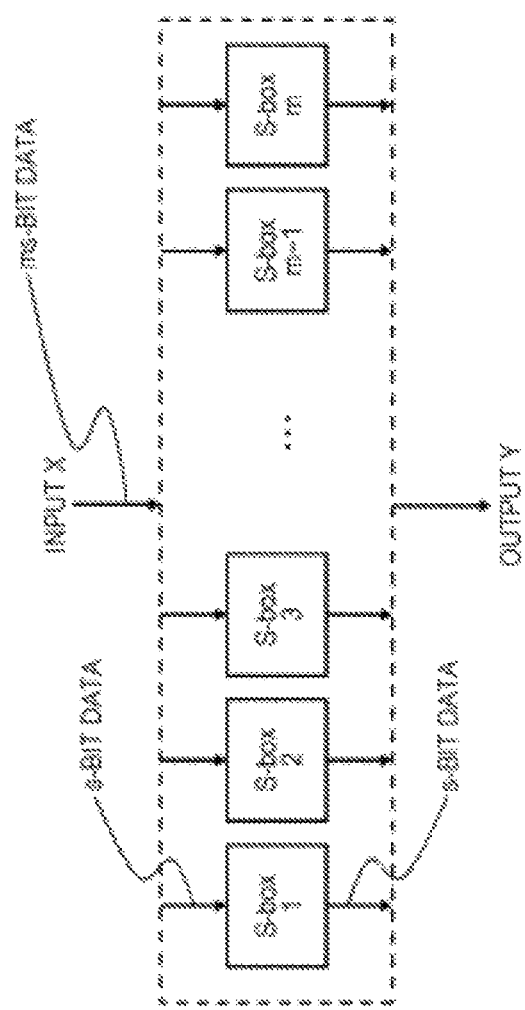
FIG. 9 is an explanatory diagram illustrating an example of the configuration of a nonlinear conversion unit.

The example illustrated in FIG. 9 illustrates a configuration in which input data with ms bits is divided into m pieces of s-bit data, the pieces of the divided data are input to m S-boxes executing a nonlinear conversion process of the s bits, a nonlinear conversion result of ms bits is obtained by connecting outputs of the S-boxes.

(1-6. Linear Conversion Unit)

Figure 10:
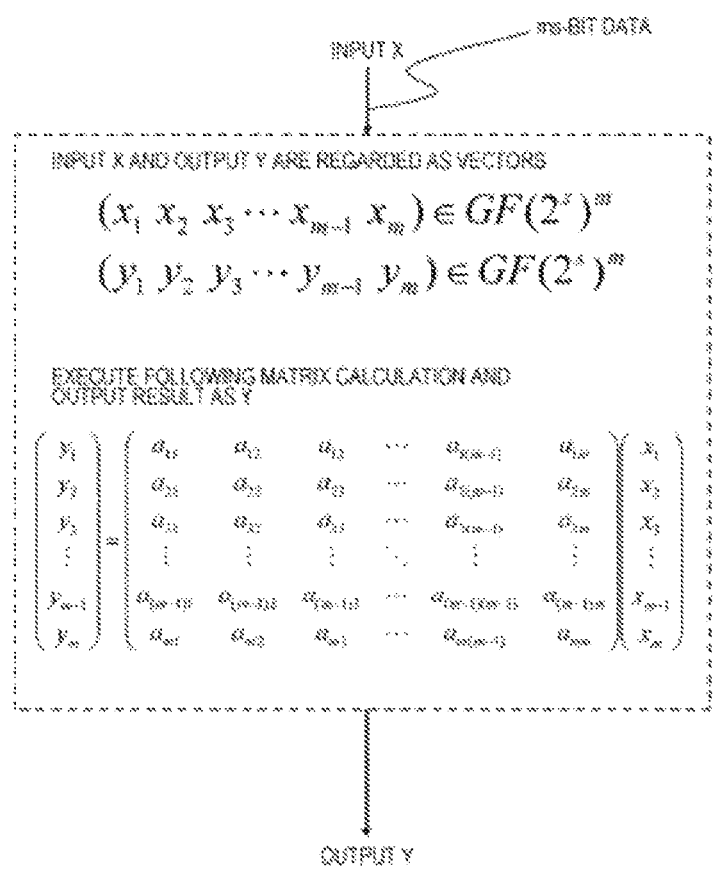
FIG. 10 is an explanatory diagram illustrating an example of the configuration of a linear conversion unit.

A linear conversion unit can be defined as a matrix from its nature. Components of a matrix can be generally expressed as various components such as field components of extension fields GF ($2^8$) or components of GF (2). FIG. 10 illustrates an example of a linear conversion unit which has ms-bit input and output and is defined by an m*m matrix defined on GF ($2^s$).

(1-7. Data Expression Using State)

When each piece of data (plain text, cipher text, a key, or the like) is expressed, the data is expressed as m*n arrangement data in which data which has a matrix type of m rows and n columns in some cases. The data expressed by m*n arrangement is referred to as a state or state expression data.

Figure 11:
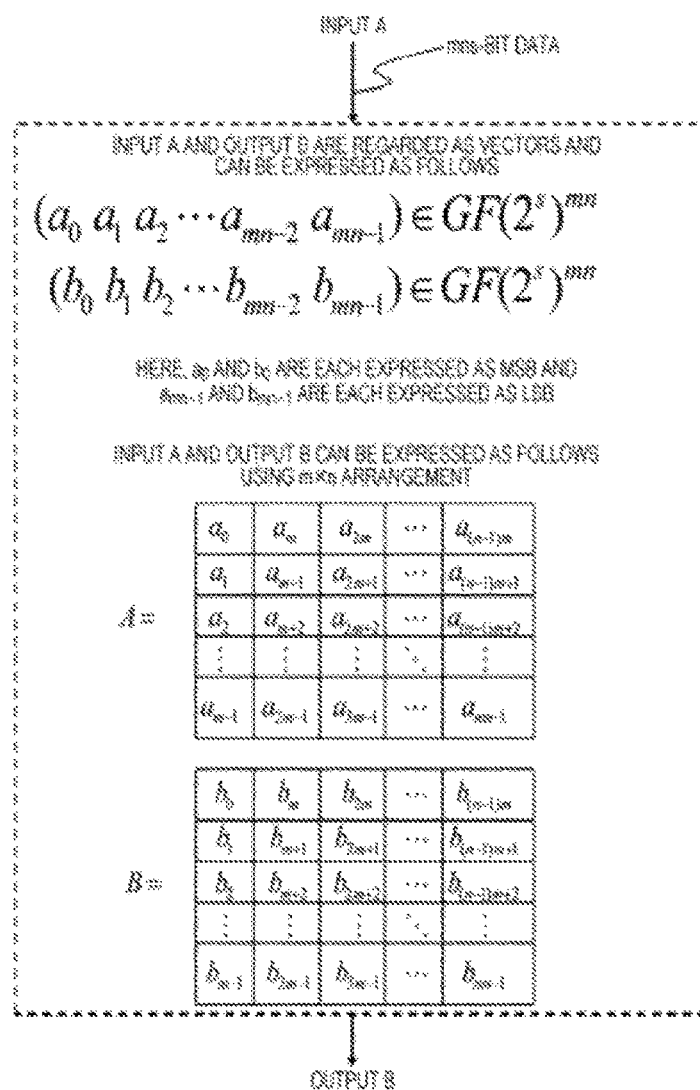
FIG. 11 is an explanatory diagram illustrating an example of a data conversion process on a state (state representation data)

FIG. 11 illustrates an example in which when A is assumed to be input data and B is output data after data conversion on the input data A, the input data A and the output data B are each expressed as states with m*n arrangement.

The input data A is components of the extension fields GF $(2^s)^{mn}$ and the input data $A=(a_0 a_1 a_2 \ldots a_{mn-2} a_{mn-1})$.

Further, $a_0$ is the MSB and $a_{mn-1}$ is bit data on an LSB side.

Likewise, the output data B is components of the extension fields GF $(2^s)^{mn}$ and the output data $B=(b_0 b_1 b_2 \ldots b_{mn-2} b_{mn-1})$.

Further, $b_0$ is the MSB and $b_{mn-1}$ is bit data on an LSB side.

As illustrated, the state of the m*n arrangement includes m*n components.

For example, a state A illustrated in FIG. 11 includes mn components of $a_0$ to $a_{mn-1}$. The components of a state B is mn components of $b_0$ to $b_{nm-1}$.

Each of the mn components is formed from data with s (where s=1 or more) bits. Specifically, each component is, for example, bit data such as 4-bit data or 8-bit (1-byte) data.

The following embodiment will be described as an embodiment in which each component is set as 4-bit data. However, a process according to an embodiment of the present disclosure is applicable to a configuration other than 4-bit component data.

Figure 12:
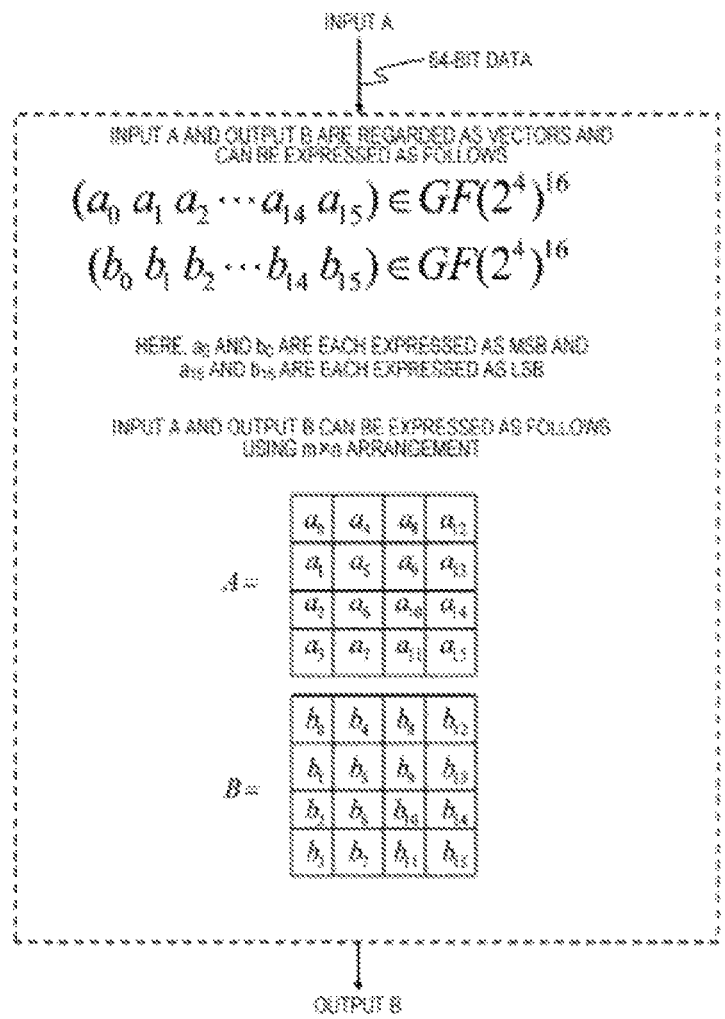
FIG. 12 is an explanatory diagram illustrating an example of a data conversion process on the state.

FIG. 12 illustrates an example of a 4*4 state when each component of the sixteen components included in the 4*4 state is set as 4-bit data.

As in FIG. 11, A is assumed to be input data and B is assumed to be output data after certain data conversion in the example illustrated in FIG. 12.

The input data A is components of the extension fields GF $(2^4)^{4*4}$ and the input data $A=(a_0 a_1 a_2 \ldots a_{14} a_{15})$.

Further, $a_0$ is the MSB and $a_{15}$ is bit data on an LSB side.

Likewise, the output data B is components of the extension fields GF $(2^4)^{4*4}$ and the output data $B=(b_0 b_1 b_2 \ldots b_{14} b_{15})$.

Further, $b_0$ is the MSB and $b_{15}$ is bit data on an LSB side.

The example illustrated in FIG. 12 is an example in which the input data A and the output data B are expressed as states with 4*4 arrangement formed by components, each of which is 4-bit data.

For example, the state A illustrated in FIG. 12 includes sixteen components, $a_0$ to $a_{15}$, and each of the components is the 4-bit data.

That is, when the input data A of 64 bits is indicated as a state, the input data a can be expressed as a state A with 4*4 arrangement formed by components illustrated in FIG. 12, each of which is 4-bit data.

Likewise, the state B illustrated in FIG. 12 includes sixteen components, $b_0$ to $b_{15}$, and each of the components is 4-bit data.

That is, when the output data B of 64 bits is indicated as a state, the output data B can be expressed as a state B with 4*4 arrangement formed by components illustrated in FIG. 12, each of which is 4-bit data.

(1-8. Basic Calculation on State Expression Data)

Next, a calculation process on the state (state expression data) will be described.

(1) Nonlinear Conversion Process (S)

For example, a nonlinear conversion process is executed applying a plurality of S-boxes executing nonlinear conversion in units of 4 bits of each component of the state.

Figure 13A:
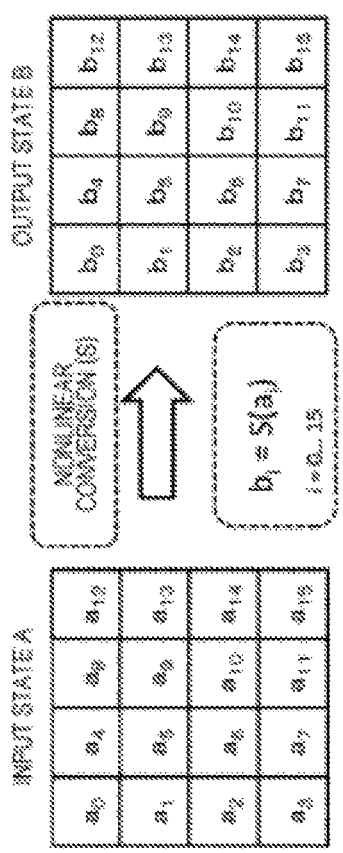
FIG. 13A is an explanatory diagram illustrating an example of the data conversion process on the state.

As illustrated in FIG. 13A, a state B is assumed to be generated through the nonlinear conversion process on input state A.

In this case, a relation between an output $b_1$ and an input $a_1$ in units of 4 bits of each component is as follows:

$$b_i = S(a_i),$$

where i=0, 1, . . . , 15.

(2) Linear Conversion Process (P)

Figure 13B:
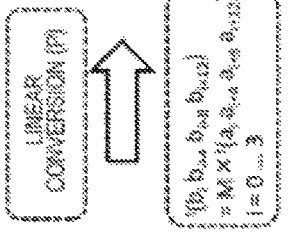
FIG. 13B is an explanatory diagram illustrating an example of the data conversion process on the state.

As illustrated in FIG. 13B, a state B is assumed to be generated through the linear conversion process on input state A.

The linear conversion process on the 4*4 state is executed as, for example, calculation of regarding 4 pieces of data at each row of the 4*4 state as a vector, executing calculation by a 4*4 matrix [M], and updating values. This process is referred to as row diffusion calculation.

A relation between an output $b_1$ and an input $a_1$ in units of 4 bits of each component of the state after the conversion process is as follows:

$$^t(b_i, b_{i+4}, b_{i+8}, b_{i+12}) = M *^t (a_i, a_{i+4}, a_{i+8}, a_{i+12}),$$

where i=0, 1, 2, and 3.

Further, $^tX$ indicates a transposed matrix of X. As the linear conversion process, there are various processing methods such as column diffusion calculation and bit substitution in addition to such row diffusion calculation.

(3) Exclusive OR Calculation (Key Application Calculation Process (K))

Figure 14:
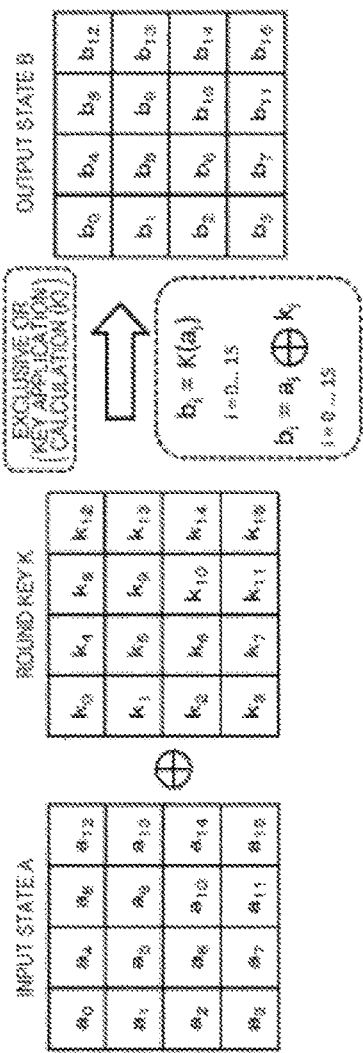
FIG. 14 is an explanatory diagram illustrating an example of the data conversion process on the state.

As illustrated in FIG. 14, the state B is assumed to be generated through an exclusive OR process on the input state A.

For example, the calculation is executed to calculate the output data B through the exclusive OR calculation of the round key K output from the key schedule unit and the input data A. All of the input data A, the round key K, and the output data B are 64-bit data expressed as a state formed by sixteen 4-bit components.

A relation among an output $b_1$, an input $a_1$, and a round key $k_1$ in units of 4 bits of each component of the state after the conversion process is as follows:

$$b_i = a_i (\text{XOR}) k_i,$$

where i=0, 1, . . . , and 15.

The (XOR) in the above expression indicates exclusive OR calculation.

One round calculation is set in combination of calculations executed sequentially in predetermined sequence of the foregoing calculations (1) to (3). The output data, e.g., encrypted data, is generated and output by repeatedly executing the round calculation on the input data.

The basic round calculation is set by executing each of the exclusive OR calculation with the round key, the linear conversion process, and the nonlinear conversion process once. However, in the round calculation executed in the encryption process sequence, an irregular round calculation configuration can also be set. For example, a round calculation different from the other round calculation can also be set, for example, in a configuration in which round calculation including the exclusive OR calculation with the round key a plurality of times or the linear conversion process is omitted.

A configuration in which only calculation with the round key is executed in the first or final of the encryption process sequence is used in many cases. This process is referred to as a key whitening process and is generally not counted as the number of rounds.

(1-9. Column Diffusion Calculation on State Expression Data)

Next, a column diffusion calculation process on the state expression data indicated as m*n matrix arrangement will be described with reference to FIGS. 15 and 16.

Each of $X_0$, $X_1$, . . . , and $X_{n-1}$ is set as an m*m matrix in which each component is a component on GF (2s).

Figure 15:
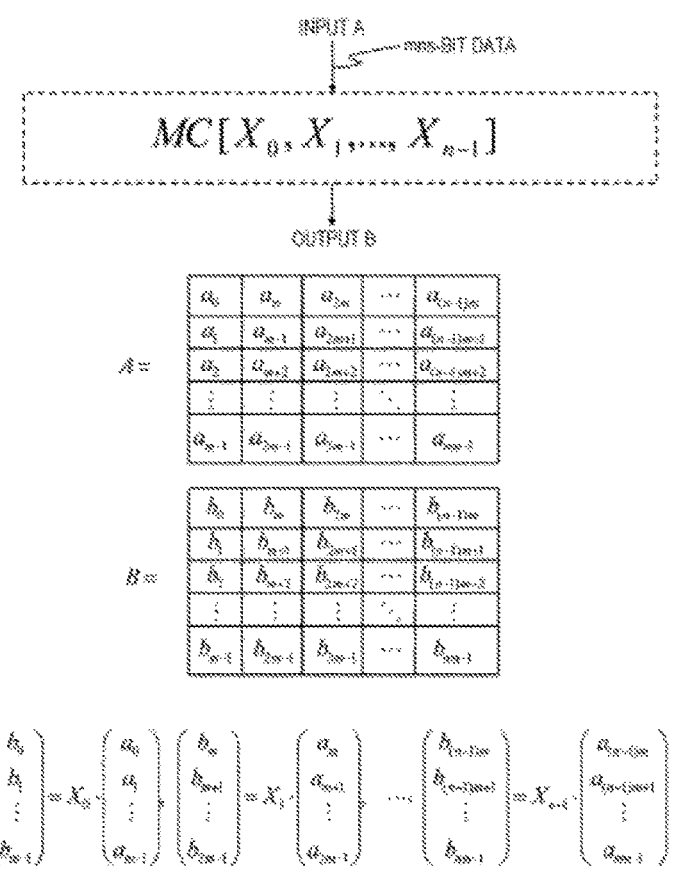
FIG. 15 is an explanatory diagram illustrating a column diffusion calculation process on the state.

As illustrated in FIG. 15, the following calculation, i.e., matrix calculation of applying the components of each column (0 to n−1) of the state and the matrixes $X_0$, $X_1$, . . . , and $X_{n-1}$ corresponding to each column to the components of the state expression data, is defined as column diffusion calculation:

$$MC[X_0, X_1, \ldots, X_{n-1}]$$

MC means diffusion (Mix) in units of columns, i.e., (MixColumn).

In the column diffusion calculation, matrix calculation of applying one matrix $X_k$ to components of one column of the state is executed.

The matrix $X_k$ applied to each of a plurality of columns included in the state may be set as the same matrix or may be set as different matrixes.

For example, a calculation expression of calculating the state B which is output data by executing the column diffusion calculation on the state A which is input data can be expressed as follows:

$$B = MC[X_0, X_1, \ldots, X_{n-1}](A)$$

As illustrated in the lower part of FIG. 15, the column diffusion calculation process is a process expressed by the following expression.

That is, components of the state B calculated by the above calculation expression are as follows:

$$^t(b_0 b_1 \ldots b_{m-1}) = X_0 *^t (a_0 a_1 \ldots a_{m-1})$$

$$^t(b_m b_{m+1} \ldots b_{2m-1}) = X_1 *^t (a_m a_{m+1} \ldots a_{2m-1}), \ldots,$$
and $$^t(b_{(n-1)m} b_{(n-1)m+1} \ldots b_{nm-1}) = X_{n-1} *^t (a_{(n-1)m} a_{(n-1)m+1} \ldots a_{nm-1})$$

In the above expression, $^t(b_1 b_2 \ldots b_k)$ indicates a transposed matrix of $(b_1 b_2 \ldots b_k)$.

When the above calculation expression is indicated according to the component arrangement of the actual states A and B, the following calculation expression is obtained, as illustrated in the lower part of FIG. 15.

$$\begin{pmatrix} b_0 \\ b_1 \\ \vdots \\ b_{m-1} \end{pmatrix} = X_0 \cdot \begin{pmatrix} a_0 \\ a_1 \\ \vdots \\ a_{m-1} \end{pmatrix}, \quad \text{[Math. 1]}$$

-continued $$\begin{pmatrix} b_m \\ b_{m+1} \\ \vdots \\ b_{2m-1} \end{pmatrix} = X_1 \cdot \begin{pmatrix} a_m \\ a_{m+1} \\ \vdots \\ a_{2m-1} \end{pmatrix}, \ldots, \ldots,$$

$$\begin{pmatrix} b_{(n-1)m} \\ b_{(n-1)m+1} \\ \vdots \\ b_{nm-1} \end{pmatrix} = X_{n-1} \cdot \begin{pmatrix} a_{(n-1)m} \\ a_{(n-1)m+1} \\ \vdots \\ a_{nm-1} \end{pmatrix}$$

Figure 16:
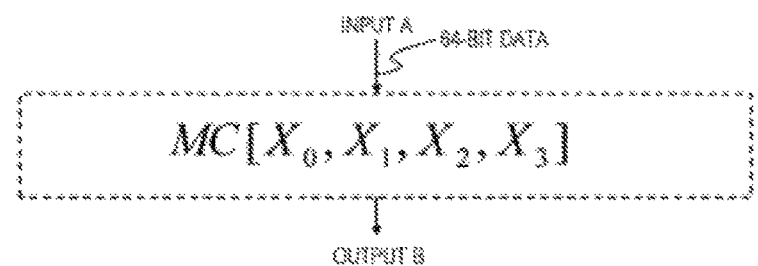
FIG. 16 is an explanatory diagram illustrating the column diffusion calculation process on the state.

FIG. 16 is a diagram illustrating an example of an application process of the following column diffusion calculation when the input data A is set as 64-bit data the state A is set as the state A formed by sixteen 4-bit data components and when the output data B is also set as 64-bit data the state B is set as the state B formed by sixteen 4-bit data components:

column diffusion calculation: MC $[X_0,X_1,X_2,X_3]$.

That is, as described with reference to FIG. 15, an example of the process of calculating each component of the state B through the following each diffusion calculation process is illustrated:

B=MC$[X_0,X_1,X_2,X_3]$(A)

That is, the components of the state B calculated through the above calculation expression are as follows:

$^t(b_0 b_1 b_2 b_3) = X_0 *^t(a_0 a_1 a_2 a_3)$, $^t(b_4 b_5 b_6 b_7) = X_1 *^t(a_4 a_5 a_6 a_7)$, $^t(b_8 b_9 b_{10} b_{11}) = X_2 *^t(a_8 a_9 a_{10} a_{11})$, and $^t(b_{12} b_{13} b_{14} b_{15}) = X_3 *^t(a_{12} a_{13} a_{14} a_{15})$.

When the above calculation expression is indicated according to the component arrangement of the actual states A and B, the following calculation expression is obtained, as illustrated in the lower part of FIG. 16.

$$\begin{pmatrix} b_0 \\ b_1 \\ b_2 \\ b_3 \end{pmatrix} = X_0 \cdot \begin{pmatrix} a_0 \\ a_1 \\ a_2 \\ a_3 \end{pmatrix}, \begin{pmatrix} b_4 \\ b_5 \\ b_6 \\ b_7 \end{pmatrix} = X_1 \cdot \begin{pmatrix} a_4 \\ a_5 \\ a_6 \\ a_7 \end{pmatrix},$$

[Math. 2]

$$\begin{pmatrix} b_8 \\ b_9 \\ b_{10} \\ b_{11} \end{pmatrix} = X_2 \cdot \begin{pmatrix} a_8 \\ a_9 \\ a_{10} \\ a_{11} \end{pmatrix}, \begin{pmatrix} b_{12} \\ b_{13} \\ b_{14} \\ b_{15} \end{pmatrix} = X_3 \cdot \begin{pmatrix} a_{12} \\ a_{13} \\ a_{14} \\ a_{15} \end{pmatrix}$$

When the matrix calculation of applying the same matrix X to the components of each column of the state is executed, the following calculation can be expressed in some cases:

MC [X].

That is, MC [X] and MC [X, X, . . . , X] are the same calculation.

(1-10. Row Diffusion Calculation on State Expression Data)

Next, a row diffusion calculation process on the state expression data indicated as m*n matrix arrangement will be described with reference to FIGS. 17 and 18.

Each of $X_0, X_1, \ldots,$ and $X_{m-1}$ is set as an n*n matrix in which each component is a component on GF (2s).

Figure 17:
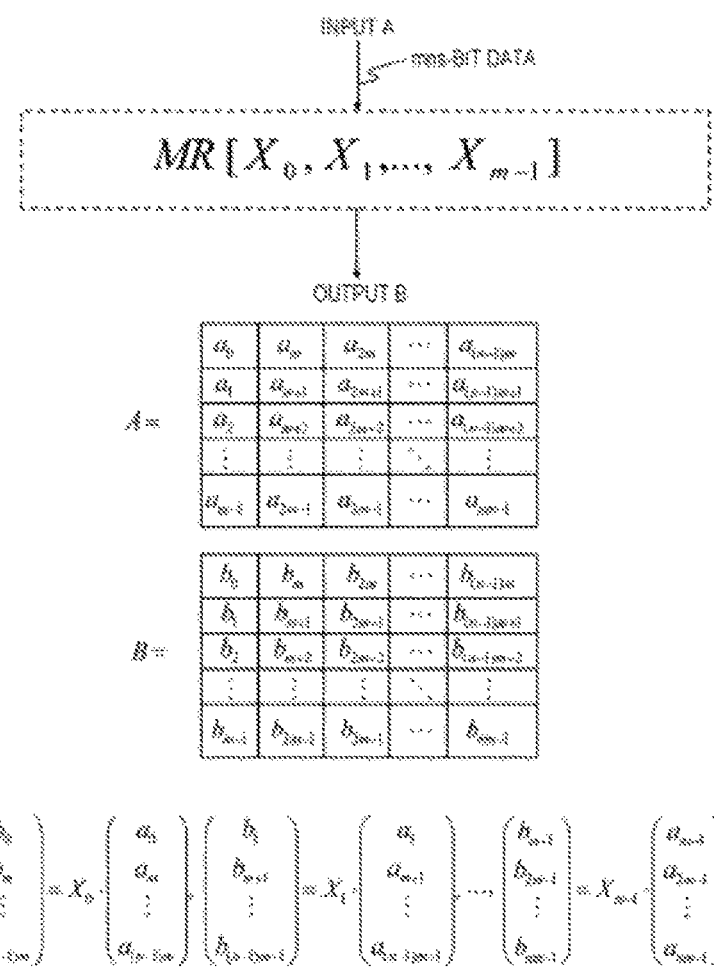
FIG. 17 is an explanatory diagram illustrating a row diffusion calculation process on the state.

As illustrated in FIG. 17, the following calculation, i.e., matrix calculation of applying the components of each row (0 to n−1) of the state and the matrixes $X_0, X_1, \ldots,$ and $X_{m-1}$ corresponding to each row to the components of the state expression data, is defined as row diffusion calculation:

MR$[X_0,X_1,\ldots,X_{m-1}]$.

MR means diffusion (Mix) in units of rows, i.e., (MixRow).

In the row diffusion calculation, matrix calculation of applying one matrix $X_k$ to components of one row of the state is executed.

The matrix $X_k$ applied to each of a plurality of rows included in the state may be set as the same matrix or may be set as different matrixes.

For example, a calculation expression of calculating the state B which is output data by executing the row diffusion calculation on the state A which is input data can be expressed as follows:

B=MR$[X_0,X_1,\ldots,X_{m-1}]$  (A).

The row diffusion calculation process is a process illustrated in the lower part of FIG. 17.

That is, components of the state B calculated by the above calculation expression are as follows:

$^t(b_0 b_m \ldots b_{(n-1)m}) = X_0 *^t(a_0 a_m \cdots a_{(n-1)m})$, $^t(b_1 b_{m+1} \ldots b_{(n-1)m+1}) = X_1 *^t(a_1 a_{m+1} \cdots a_{(n-1)m+1}), \ldots,$ and $^t(b_{m-1} b_{2m-1} \ldots b_{nm-1}) = X_{m-1} *^t(a_{m-1} a_{2m-1} \cdots a_{nm-1})$.

In the above expression, $^t(b_1 b_2 \ldots b_k)$ indicates a transposed matrix of $(b_1 b_2 \ldots b_k)$.

When the above calculation expression is indicated according to the component arrangement of the actual states A and B, the following calculation expression is obtained, as illustrated in the lower part of FIG. 17.

$$\begin{pmatrix} b_0 \\ b_m \\ \vdots \\ b_{(n-1)m} \end{pmatrix} = X_0 \cdot \begin{pmatrix} a_0 \\ a_m \\ \vdots \\ a_{(n-1)m} \end{pmatrix},$$

[Math. 3]

$$\begin{pmatrix} b_1 \\ b_{m+1} \\ \vdots \\ b_{(n-1)m+1} \end{pmatrix} = X_1 \cdot \begin{pmatrix} a_1 \\ a_{m+1} \\ \vdots \\ a_{(n-1)m+1} \end{pmatrix}, \ldots, \ldots,$$

$$\begin{pmatrix} b_{m-1} \\ b_{2m-1} \\ \vdots \\ b_{nm-1} \end{pmatrix} = X_{m-1} \cdot \begin{pmatrix} a_{m-1} \\ a_{2m-1} \\ \vdots \\ a_{nm-1} \end{pmatrix}$$

Figure 18:
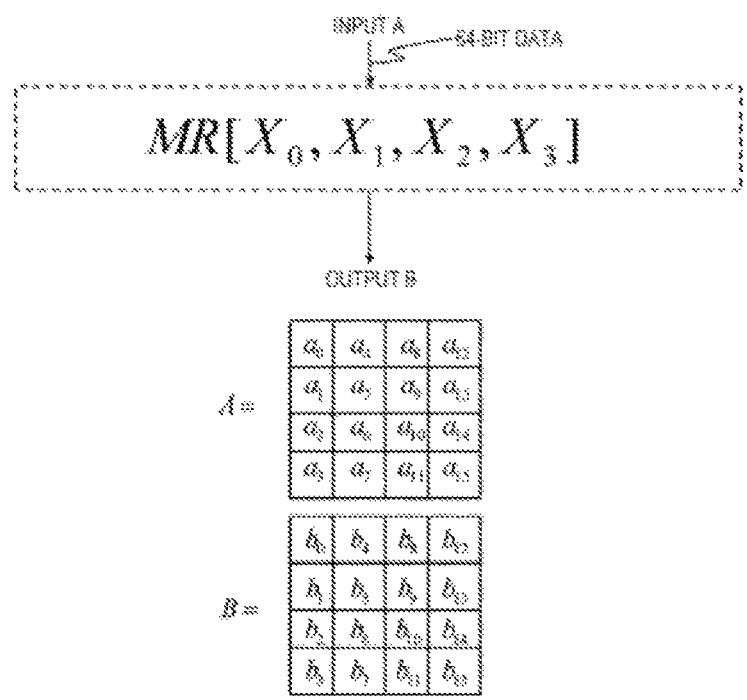
FIG. 18 is an explanatory diagram illustrating the row diffusion calculation process on the state.

FIG. 18 is a diagram illustrating an example of an application process of the following row diffusion calculation when the input data A is set as 64-bit data the state A is set as the state A formed by sixteen 4-bit data components and when the output data B is also set as 64-bit data the state B is set as the state B formed by sixteen 4-bit data components:

row diffusion calculation: MR$[X_0,X_1,X_2,X_3]$.

That is, as described with reference to FIG. 17, an example of the process of calculating each component of the state B through the following row diffusion calculation process is illustrated:

$$B=MR[X_0,X_1,X_2,X_3](A).$$

That is, the components of the state B calculated through the above calculation expression are as follows:

$${}^t(b_0b_4b_8b_{12})=X_0\cdot{}^t(a_0a_4a_8a_{12});$$

$${}^t(b_1b_5b_9b_{13})=X_1\cdot{}^t(a_1a_5a_9a_{13});$$

$${}^t(b_2b_6b_{10}b_{14})=X_2\cdot{}^t(a_2a_6a_{10}a_{14});\text{ and}$$

$${}^t(b_3b_7b_{11}b_{15})=X_3\cdot{}^t(a_3a_7a_{11}a_{15}).$$

When the above calculation expression is indicated according to the component arrangement of the actual states A and B, the following calculation expression is obtained, as illustrated in the lower part of FIG. 18.

$$\begin{pmatrix}b_0\\b_4\\b_8\\b_{12}\end{pmatrix}=X_0\cdot\begin{pmatrix}a_0\\a_4\\a_8\\a_{12}\end{pmatrix},\begin{pmatrix}b_1\\b_5\\b_9\\b_{13}\end{pmatrix}=X_1\cdot\begin{pmatrix}a_1\\a_5\\a_9\\a_{13}\end{pmatrix},$$ [Math. 4]

$$\begin{pmatrix}b_2\\b_6\\b_{10}\\b_{14}\end{pmatrix}=X_2\cdot\begin{pmatrix}a_2\\a_6\\a_{10}\\a_{14}\end{pmatrix},\begin{pmatrix}b_3\\b_7\\b_{11}\\b_{15}\end{pmatrix}=X_3\cdot\begin{pmatrix}a_3\\a_7\\a_{11}\\a_{15}\end{pmatrix}.$$

When the matrix calculation of applying the same matrix X to the components of each row of the state is executed, the following calculation can be expressed in some cases: MR [X].

That is, MR [X] and MR [X, X, . . . , X] are the same calculation.

(1-11. Involution)

When the round keys applied to each round are k1, k2, . . . , and KR in the common key block encryption generating the cipher text C from the plain text P, an encryption function E of calculating the cipher text C from the plain text P can be indicated as follows:

$$C=E(P,K1,K2,\ldots,KR).$$

At this time, a decryption function D of calculating the plain text P from the cipher text C is expressed as follows:

$$P=D(C,k1,k2,\ldots,kr).$$

Here, the common key block encryption is assumed to have an involution property, when the decryption function D satisfies the following expression, i.e. when the decryption function D has a configuration in which the remains of the same function are used except that an application order of the round keys in the encryption function E is an inverse order:

$$D(C,k1,k2,\ldots,kr)=E(C,KR,\ldots,K2,K1).$$

Thus, the common key block encryption in which the decryption function D can be configured except that an input order of the round keys is changed using the encryption function E can be said to have the involution property. For example, a Feistel type common key block encryption can be generally said to have the involution property since the encryption function and the decryption function can be executed with the same circuit merely reversing a use order of the round keys to be used.

The common key block encryption having the involution property can basically realize an encryption function and a decryption function merely by mounting the encryption function. Therefore, a necessary circuit can become small and lightweight (miniaturized) and mounting efficiency is improved.

<2. Index of Safety in Common Key Block Encryption>

Attacks on the common key block encryption, e.g., various attacks for the purpose of decrypting a secret key, are known. Specifically, there are a difference attack, a linear attack, and the like.

The difference attack is an attack attempting to estimate a key by inputting data with a specific difference to an encryption device and detecting data to which the input difference is reflected from an output. A propagation probability of the difference value is referred to as a difference probability.

The linear attack is an attack attempting to estimate a key by observing a correlation between an exclusive OR of specific bits of an input and an exclusive OR of specific bits of an output and searching for a strong correlation. A correlation coefficient of the specific bits of the input and the output is referred to as a linear probability.

High safety encryption refers to encryption with high resistance against the above-mentioned various attacks, i.e., secret information applied to an encryption process, e.g., encryption in which difficulty of decryption of a key or the like is high.

Hereinafter, a plurality of pieces of data serving as safety indexes of an encryption algorithm will be described.

(2-1. Number of Branches)

In the common key block encryption, various data conversion, e.g., the linear conversion, the nonlinear conversion, and the exclusive OR calculation described above, are executed.

As the safety index regarding the difficulty of the decryption of the data conversion, there is the number of branches.

For example, a mapping theta from n*a-bit data to n*b-bit data is set as follows:

$$\text{Theta: }\{0,1\}^{na}->\{0,1\}^{nb}.$$

The number of branches (Branch$_n$ (theta)) for the above mapping theta is defined as follows.

$$\text{Branch}_n(\text{theta})=\min_{alpha\text{ unequal to }0}\{hw_n(\text{alpha})+hw_n(\text{theta}(\text{alpha}))\}$$

Here, $\min_{alpha\text{ unequal to }0}$ {Xalpha} means the minimum value among all X$_{alpha}$ satisfying alpha unequal to 0 and hw$_n$ (Y) is a function that returns the number of components for which all pieces of the n-bit data are not 0 (non-zero) when a bit string Y is expressed as being partitioned at intervals of n bits.

In general, the higher the number of branches is, the higher the difficulty of decryption is, and thus the resistance against the difference attack or the linear attack is said to be improved.

A mapping theta in which the number of branches Branch$_n$ (theta) is "b+1" is referred to as optimal diffusion conversion (Optimal Diffusion Mappings).

As a linear conversion matrix with a high number of branches, for example, there is a maximum distance separable (MDS) matrix that executes the optimal diffusion conversion. The MDS matrix is a matrix in which any small matrix forming the matrix is a regular matrix. The regular matrix is a matrix which has an inverse matrix. When A is assumed to be a matrix and $A^{-1}$ is assumed to be an inverse matrix, the matrix A which has the inverse matrix $A^{-1}$ satisfying the following expression is a regular matrix:

$$AA^{-1}=A^{-1}A=E,$$

where E is a unit matrix.

(2-2. Minimum Difference Active S-box Number)

As described above, an S-box that executes nonlinear conversion in units of s bits is used in the nonlinear conversion unit set with the common key block encryption.

As an index indicating the resistance against a difference attack, there are a minimum number of difference active S-boxes included in a difference path expressing a difference connection relation, i.e., the minimum difference active S-box number.

The difference path designates a specific difference value for all of the data portions excluding key data in an encryption function. The difference value is not determined freely and the difference values before and after a conversion process are mutually related. Before and after a linear conversion process, a relation between an input difference and an output difference is determined as one pair. Before and after a nonlinear conversion process, a relation between an input difference and an output difference is not determined as one pair, but the concept of a probability is introduced. A probability of a certain input difference to an output difference is assumed to be calculated in advance. When all of the probabilities with respect to all of the outputs are added, 1 is obtained.

In general encryption (block encryption or the like), the nonlinear conversion is only a portion of a process by the S-box. Accordingly, in this case, a difference path with a probability other than 0 is a set of the difference data from a difference value for plain text (input) to a difference value of cipher text (output), and the difference values given before and after all of the S-boxes have probabilities other than 0. An S-box for which the difference value input into the S-box of the difference path with a probability other than 0 is not 0 is assumed to be referred to as a difference active S-box. The smallest number among the numbers of difference active S-boxes of all of the difference paths with probabilities other than 0 is referred to as the minimum difference active S-box number and its numerical value is well known as a safety index against the difference attack.

In general, safety from the difference attack can be indicated by ensuring that the minimum difference active S-box number is sufficiently large, and encryption ensuring that the minimum difference active S-box number is more by a lesser number of repetitions of the round function can be considered to be encryption with higher performance. A difference path for which all of the difference values are 0 makes no sense as an attack since the probability is 1.

(2-3. Minimum Linear Active S-box Number)

As one of the indexes indicating the resistance against a linear attack, a minimum linear active S-box number included in a linear path expressing a linear mask connection relation can be exemplified.

The linear path is also often referred to as linear approximation, but the term path is used herein to correspond to the difference.

The linear path designates a specific linear mask value for all of the data portions excluding key data in an encryption function. The linear mask value is not determined freely and the linear mask values before and after a conversion process are mutually related. Before and after a linear conversion process, a relation between an input linear mask value and an output linear mask value is determined as one pair. Before and after a nonlinear conversion process, a relation between an input linear mask value and an output linear mask value is not determined as one pair, but the concept of a probability is introduced. For the input linear mask values, there is a set of one or more linear mask values which can be output, and a probability at which each linear mask value is output can be calculated in advance. When all of the probabilities with respect to all of the outputs are added, 1 is obtained.

In general encryption (block encryption or the like), the nonlinear conversion is only a portion of a process by the S-box. Accordingly, in this case, a linear path with a probability other than 0 is a set of the linear mask value data from a linear mask value for plain text (input) to a linear mask value of cipher text (output), and the linear mask values given before and after all of the S-boxes have probabilities other than 0. An S-box for which the linear mask value input into the S-box of the linear path with a probability other than 0 is not 0 is assumed to be referred to as a linear active S-box. The smallest number among the numbers of linear active S-boxes of all of the linear paths with probabilities other than 0 is referred to as the minimum linear active S-box number and its numerical value is well known as a safety index against the linear attack.

In general, safety from the linear attack can be indicated by ensuring that the minimum linear active S-box number is sufficiently large, and encryption ensuring that the minimum linear active S-box number is more by a less number of repetitions of the round function can be considered to be encryption with higher performance. A linear path for which all the linear mask values are 0 makes no sense as an attack since the probability is 1.

<3. Overview of Entire Configuration of Common Key Encryption Process in which Safety is Improved>

Next, the configuration and a process of the common key encryption device in which safety is improved according to an embodiment of the present disclosure will be described.

The encryption processing device according to an embodiment of the present disclosure to be described below is a device that executes common key block encryption (block encryption) and is a device that has a substitution-permutation network (SPN) structure round function.

A configuration is realized such that the exclusive OR calculation with the round key, the nonlinear conversion, and the linear conversion are executed repeatedly on all of the n-bit input data for a plurality of rounds.

Figure 19:
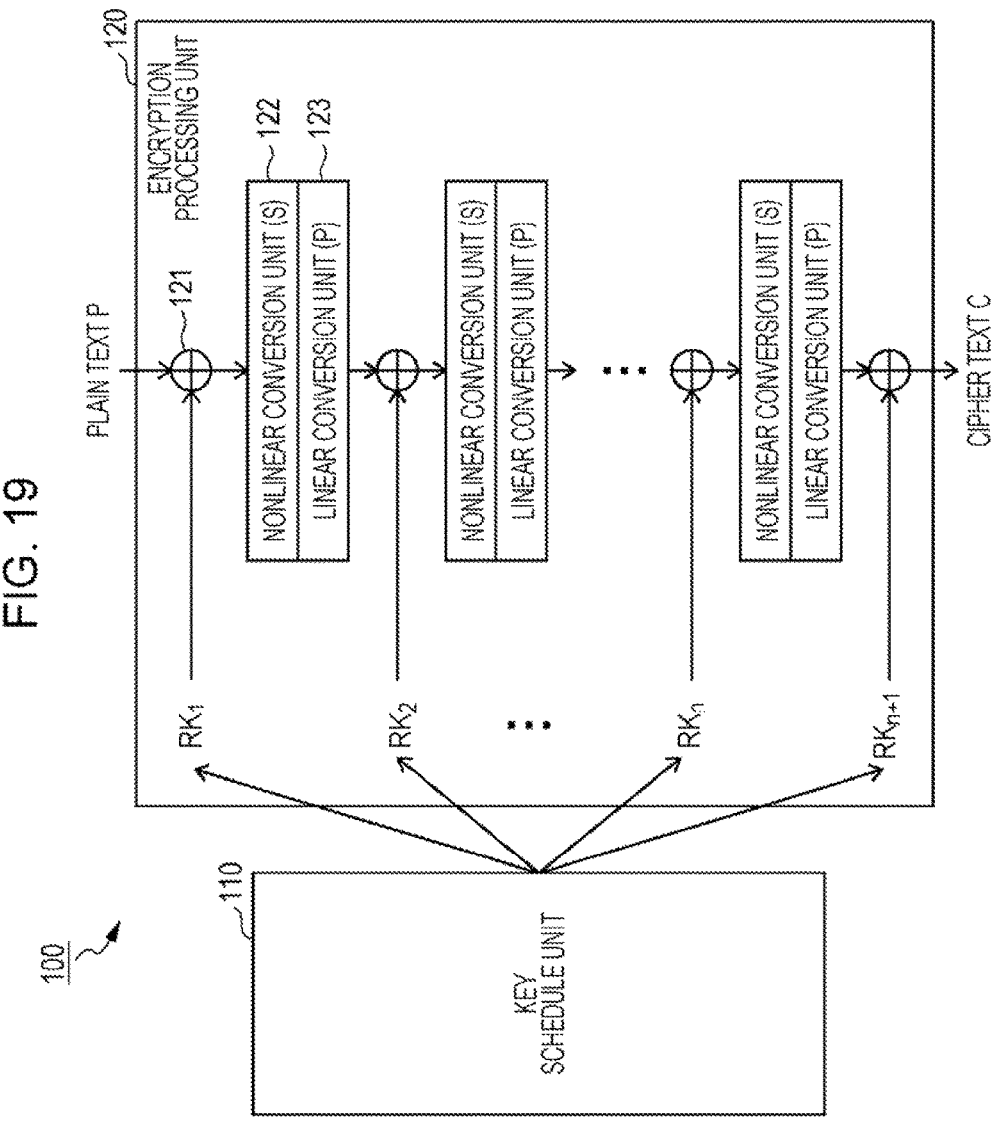
FIG. 19 is an explanatory diagram illustrating an example of the configuration of an encryption processing device according to an embodiment of the present disclosure.

A specific example of the configuration of the common key encryption processing device according to an embodiment of the present disclosure is illustrated in FIG. 19.

As illustrated in FIG. 19, an encryption processing device 100 includes a key schedule unit 110 and an encryption processing unit 120.

The key schedule unit 110 receives a secret key K as an input and outputs a round key applied to each round of the encryption processing unit 120 according to a predetermined key generation algorithm. The encryption processing unit 120 receives the round keys as inputs from the key schedule unit 110, executes data conversion on plain text P, and outputs cipher text C.

The encryption processing unit 120 can also execute a decryption process of receiving the cipher text C as an input and outputting the plain text P. When the decryption process is executed, a process of applying the round keys supplied from the key schedule unit 110 in an inverse order to the order of the encryption process is executed.

The encryption processing unit 120 includes an exclusive OR unit 121 that executes exclusive OR calculation of input data and the round key, a nonlinear conversion unit 122 that executes a nonlinear conversion process on the input data, and a linear conversion unit 123 that executes a linear conversion process on the input data.

As illustrated, the encryption processing unit 120 of the encryption processing device 100 according to an embodiment of the present disclosure has a configuration in which 3 different data conversion processes of the exclusive OR unit 121, the nonlinear conversion unit 122, and the linear conversion unit 123 are repeatedly executed.

Figure 20:
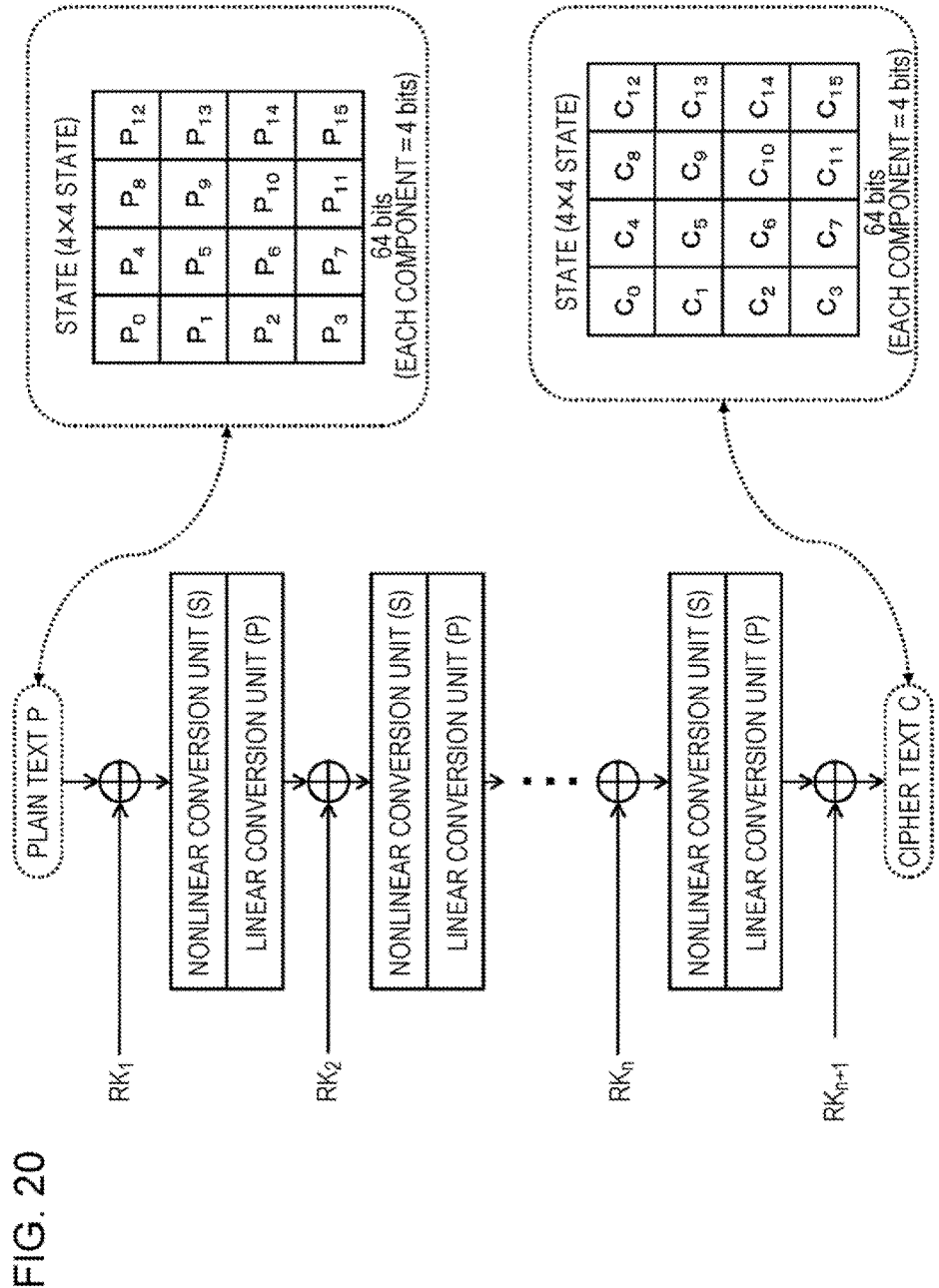
FIG. 20 is an explanatory diagram illustrating an example of the configuration of the encryption processing device according to the embodiment of the present disclosure.

As illustrated in FIG. 20, the plain text P which is input data and the cipher text C which is output data are the above-described state expression data and are 64-bit data formed by sixteen components of 4*4 in which each of the components is 4-bit data.

The round key input from the key schedule unit 110 is also 64-bit data which is the state expression data and is formed by sixteen 4-bit data components.

Figure 21:
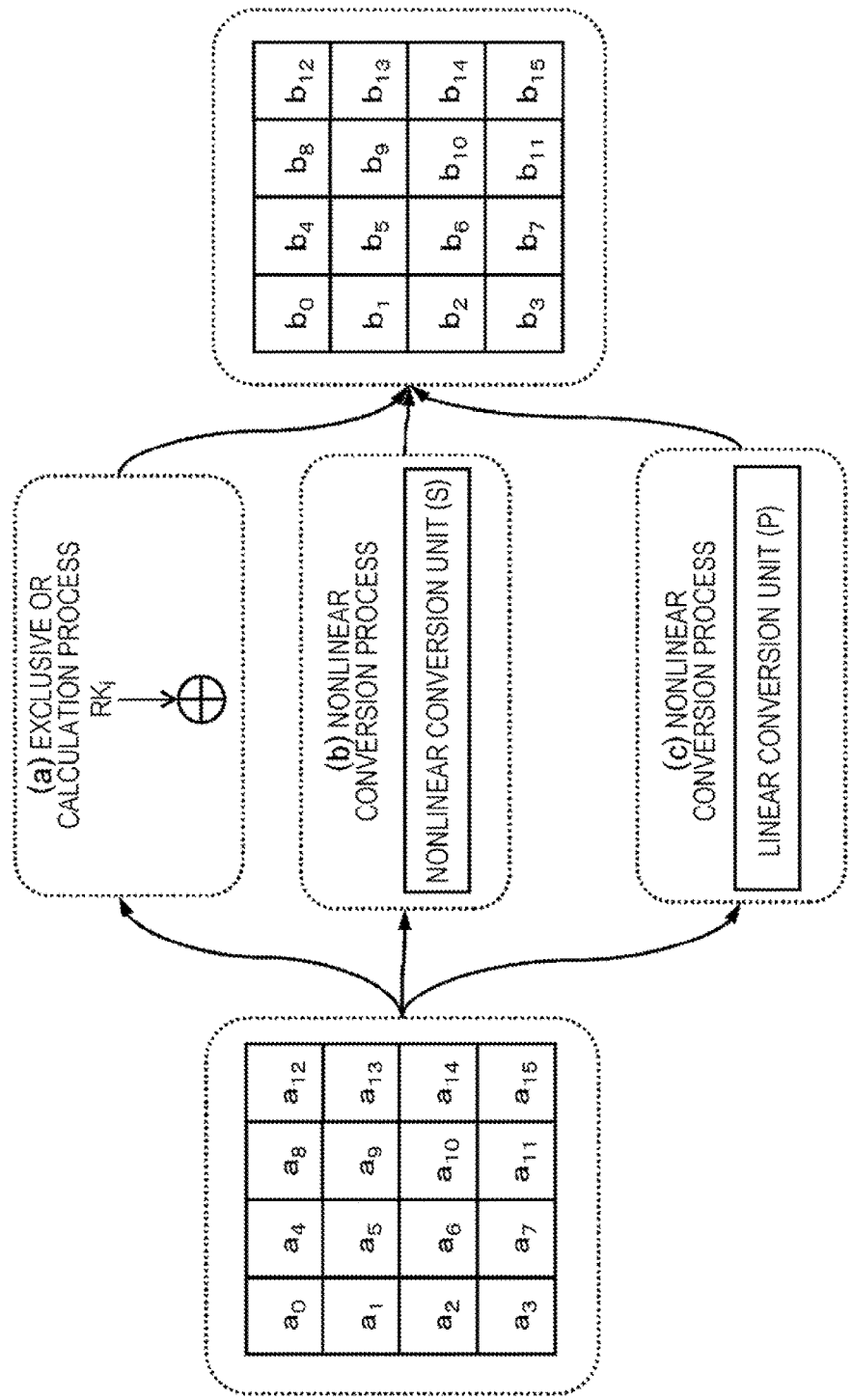
FIG. 21 is an explanatory diagram illustrating an example of a data conversion process executed by the encryption processing unit.

As illustrated in FIG. 21, the encryption processing unit 120 repeatedly executes the following three kinds of data conversion processes:
(a) an exclusive OR calculation process;
(b) a nonlinear conversion process; and
(c) a linear conversion process.

Each of the processes is executed as a process on a state. The process on the state has been described above with reference to FIGS. 13A, 13B, and 14.

Figure 22A:
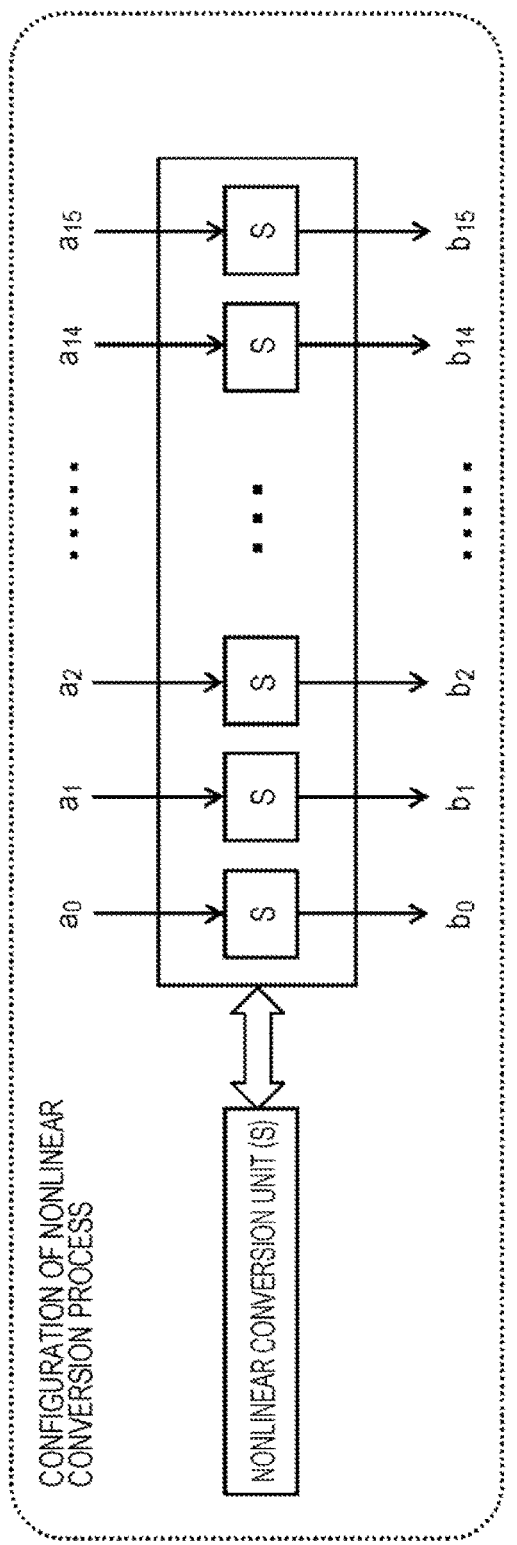
FIG. 22A is an explanatory diagram illustrating the configurations and processes of a nonlinear conversion unit and a linear conversion unit of the encryption processing unit.

The nonlinear conversion process executed in the nonlinear conversion unit of the encryption processing unit 120 is executed using a plurality of S-boxes, for example, as illustrated in FIG. 22A.

Each S-box is, for example, a nonlinear conversion unit that has a 4-bit input/output configuration and executes a nonlinear conversion process of "4*16=64" bits through a parallel process on sixteen S-boxes.

Figure 22B:
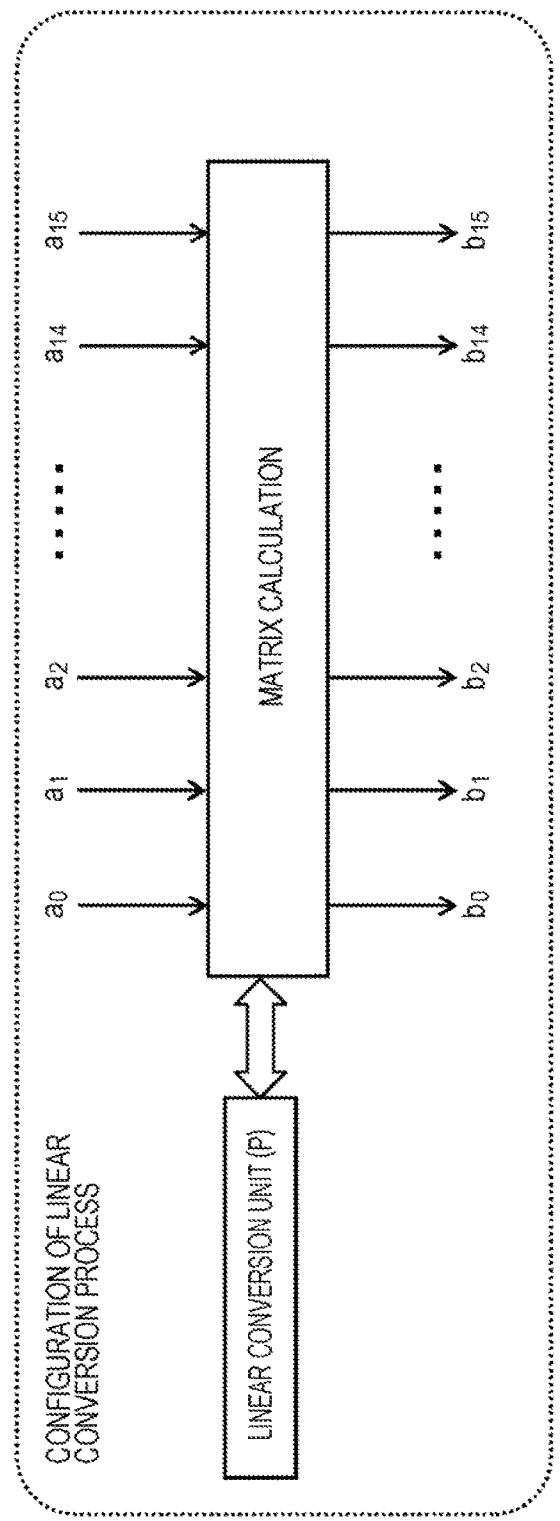
FIG. 22B is an explanatory diagram illustrating the configurations and processes of a nonlinear conversion unit and a linear conversion unit of the encryption processing unit.

The linear conversion process executed in the linear conversion unit of the encryption processing unit 120 is executed as a matrix calculation process, for example, as illustrated in FIG. 22B.

<4. Configuration and Process of Linear Conversion Unit of Encryption Processing Unit>

As described with reference to FIG. 19, the encryption processing unit 120 of the encryption processing device 100 according to an embodiment of the present disclosure has the configuration in which the exclusive OR calculation with the round key, the nonlinear conversion, and the linear conversion are executed repeatedly for a plurality of rounds.

One of the characteristics of the encryption processing device according to an embodiment of the present disclosure is that the linear conversion process executed at each round is configured to be executed as a process different at each round.

Hereinafter, the details of the linear conversion process executed by the encryption processing device according to an embodiment of the present disclosure will be described.

Figure 23:
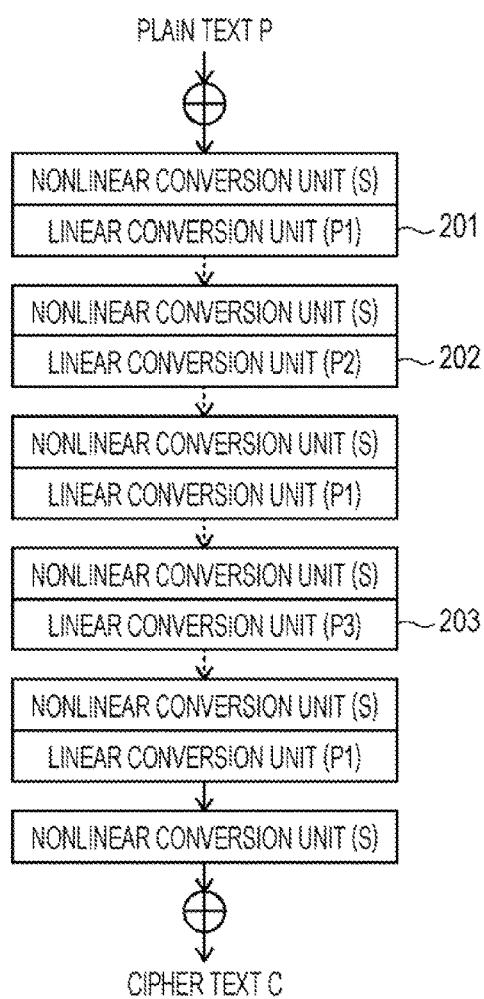
FIG. 23 is an explanatory diagram illustrating the configurations and the processes of the linear conversion units of the encryption processing unit.

FIG. 23 is an explanatory diagram illustrating an example of the configuration of different linear conversion units included in the encryption processing unit of the encryption processing device according to an embodiment of the present disclosure.

The configuration diagram of FIG. 23 is a configuration diagram in which the exclusive OR unit is omitted.

In the example illustrated in FIG. 23, the encryption processing unit is configured to include the linear conversion units executing three different linear conversion processes. That is, the encryption processing unit includes three different linear conversion units below:
a linear conversion unit P1, 201;
a linear conversion unit P2, 202; and
a linear conversion unit P3, 203.

The encryption processing unit is configured to execute one of the three kinds of linear conversion processes at each round and is set to execute a different linear conversion process without continuity of the same linear conversion process at continuous rounds.

In the example illustrated in FIG. 23, the encryption processing unit executes the linear conversion process five times in the following sequence in order from the input side of the plain text P: the linear conversion unit P1;
the linear conversion unit P2;
the linear conversion unit P1;
the linear conversion unit P3; and
the linear conversion unit P1.

In the linear conversion process executed five times, the different linear conversion processes are executed according to round conversion without continuity of the same linear conversion process at continuous rounds.

In the above example, the same linear conversion process is set not to be executed at continuous rounds by combining and executing the three kinds of different linear conversion processes P1, P2, and P3.

Thus, by changing a linear conversion mode according to the round transition in the encryption process, it is possible to increase the minimum difference active S-box number and the minimum linear active S-box number. Thus, it is possible to improve the resistance against a difference attack or a linear attack.

Specific processes of the three kinds of linear conversion processes will be described with reference to FIGS. 24A and 24B and the subsequent drawings.

In the linear conversion processes P1 to P3, four different matrixes $M_0$ to $M_3$ illustrated in FIG. 24A are combined and used. That is, 4*4 matrixes $M_0$ to $M_3$ shown below are configured to be combined.

$$M_0 = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \quad M_1 = \begin{pmatrix} 0 & 1 & 0 & 1 \\ 1 & 1 & 1 & 0 \\ 0 & 1 & 1 & 1 \\ 1 & 0 & 1 & 1 \end{pmatrix} \quad \text{[Math. 5]}$$

$$M_2 = \begin{pmatrix} 1 & 1 & 1 & 0 \\ 1 & 1 & 0 & 1 \\ 1 & 0 & 1 & 1 \\ 0 & 1 & 1 & 1 \end{pmatrix} \quad M_3 = \begin{pmatrix} 1 & 0 & 1 & 1 \\ 0 & 1 & 1 & 1 \\ 1 & 1 & 1 & 0 \\ 1 & 1 & 0 & 1 \end{pmatrix}$$

In the linear conversion processes P1 to P3, the foregoing four different matrixes $M_0$ to $M_3$ are combined and used.

The foregoing four matrixes are not the above-described maximum distance separable (MDS) matrixes but are non-MDS matrixes.

In an embodiment to be described below, an example of the linear conversion process using the non-MDS matrixes will be described, but the MDS matrixes may be configured to be applied.

FIG. 24B is a diagram illustrating a form of specific matrix calculation of the linear conversion processes P1 to P3.

A 4*4 rectangle illustrated in FIG. 24B indicates a state formed by sixteen components in which each of the components to be subjected to the linear conversion process has 4 bits. That is, the 4*4 state of 64 bits is illustrated.

The matrix calculation in which the matrixes $M_0$ to $M_3$ are combined and used is executed on the input data of the 4*4 state.

In the linear conversion process P1, the matrix calculation in which one matrix $M_0$ is applied is executed on the components of each column of the input data of the 4*4 state in units of columns.

This calculation is the column diffusion calculation (MixColumn) described above with reference to FIGS. 15 and 16.

That is, the linear conversion process P1 is the column diffusion calculation (MC) expressed by the following expression:

$$MC[M_0].$$

MC $[M_0]$ is an expression indicating matrix calculation in which the same matrix $M_0$ is applied to each column of the state and has the same meaning as the following expression, i.e., an expression separately indicating the matrixes applied to each column of the state:

$$MC[M_0,M_0,M_0,M_0].$$

Next, the linear conversion process P2 will be described.

In the linear conversion process P2, as illustrated in FIG. 24B, matrix calculation in which the different matrixes are applied in units of rows is executed on the components of each row of the input data of the 4*4 state. The matrix calculation in which the following matrixes are applied is executed at the upper first row to the fourth row: the first row: application matrix $M_0$;
the second row: application matrix $M_1$;
the third row: application matrix $M_2$; and
the fourth row: application matrix $M_3$.

This calculation is the row diffusion calculation (MixRow) described above with reference to FIGS. 17 and 18.

That is, the linear conversion process P2 is the row diffusion calculation (MixRow) expressed by an expression below:

$$MR[M_0,M_1,M_2,M_3]$$

Next, the linear conversion process P3 will be described.

In the linear conversion process P3, as in the linear conversion process P2, as illustrated in FIG. 24B, matrix calculation in which the different matrixes are applied in units of rows is executed on the components of each row of the input data of the 4*4 state. In the linear conversion process P3, unlike the linear conversion process P2, the matrix calculation in which the following matrixes are applied is executed in the upper first row to the fourth row:
the first row: application matrix $M_2$;
the second row: application matrix $M_0$;
the third row: application matrix $M_1$; and
the fourth row: application matrix $M_3$.

This calculation is the row diffusion calculation (MixRow) described above with reference to FIGS. 17 and 18.

That is, the linear conversion process P3 is the row diffusion calculation (MixRow) expressed by an expression below:

$$MR[M_2,M_0,M_1,M_3]$$

In order to distinguish the linear conversion processes P2 and P3 from each other, the linear conversion process P2 is referred to as row diffusion calculation type 1 (MixRow1) and the linear conversion process P3 is referred to as row diffusion calculation type 2 (MixRow2) below.

The linear conversion process P1 is the column diffusion calculation (MixColumn).

Calculation process examples of the specific matrix calculation of the three linear conversion processes P1 to P3 will be described with reference to FIGS. 25A and 25B and the subsequent drawings.

FIGS. 25A and 25B are explanatory diagrams illustrating a specific calculation process example of the linear conversion process P1, i.e., the column diffusion calculation (MixColumn).

FIG. 25A illustrates an example of input and output data in the linear conversion unit P1.

An input A is a state formed by sixteen components $a_0$ to $a_{15}$ of n-bit data.

An output B is also a state formed by sixteen components $b_0$ to $b_{15}$ of n-bit data.

Each of the components $a_i$ and $b_i$ (where i=0 to 15) of the input and output data is n-bit data configured with one of the values 0 and 1.

In the embodiment, n=4, each component is 4-bit data, and the input A and the output B have 64 bits.

FIG. 25B illustrates a specific calculation process example of the linear conversion process P1, i.e., the column diffusion calculation (MixColumn).

The column diffusion calculation (MixColumn) executed as the linear conversion process P1 is matrix calculation executed according to the following expression.

$$\begin{pmatrix} b_0 \\ b_1 \\ b_2 \\ b_3 \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_0 \\ a_1 \\ a_2 \\ a_3 \end{pmatrix}, \quad [\text{Math. 6}]$$

$$\begin{pmatrix} b_4 \\ b_5 \\ b_6 \\ b_7 \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_4 \\ a_5 \\ a_6 \\ a_7 \end{pmatrix},$$

$$\begin{pmatrix} b_8 \\ b_9 \\ b_{10} \\ b_{11} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_8 \\ a_9 \\ a_{10} \\ a_{11} \end{pmatrix},$$

$$\begin{pmatrix} b_{12} \\ b_{13} \\ b_{14} \\ b_{15} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_{12} \\ a_{13} \\ a_{14} \\ a_{15} \end{pmatrix}$$

The sixteen components $b_0$ to $b_{15}$ of the output B are calculated through the following calculation based on the matrix $M_0$ and the sixteen components $a_0$ to $a_{15}$ of the input A:

$b_0=a_1(+)a_2(+)a_3;$ $b_1=a_0(+)a_2(+)a_3;$ $b_2=a_0(+)a_1(+)a_3;$ $b_3=a_0(+)a_1(+)a_2;$ $b_4=a_5(+)a_6(+)a_7;$ $b_5=a_4(+)a_6(+)a_7;$ $b_6=a_4(+)a_5(+)a_7;$ $b_7=a_4(+)a_5(+)a_6;$ $b_8=a_9(+)a_{10}(+)a_{11}$;

$b_9=a_8(+)a_{10}(+)a_{11}$;

$b_{10}=a_8(+)a_9(+)a_{11}$;

$b_{11}=a_8(+)a_9(+)a_{10}$;

$b_{12}=a_{13}(+)a_{14}(+)a_{15}$;

$b_{13}=a_{12}(+)a_{14}(+)a_{15}$;

$b_{14}=a_{12}(+)a_{13}(+)a_{15}$; and $b_{15}=a_{12}(+)a_{13}(+)a_{14}$.

In the above expression, an operator (+) means exclusive OR calculation.

In the column diffusion calculation (MixColumn) executed as the linear conversion process P1, the sixteen components $b_0$ to $b_{15}$ of the output B are calculated based on the matrix $M_0$ and the sixteen components $a_0$ to $a_{15}$ of the input A through the above calculation process.

FIGS. 26A and 26B are explanatory diagrams illustrating a specific calculation process example of the linear conversion process P2, i.e., the row diffusion calculation type 1 (MixRow1).

FIG. 26A illustrates an example of input and output data in the linear conversion unit P2.

An input A is a state formed by sixteen components $a_0$ to $a_{15}$ of n-bit data.

An output B is also a state formed by sixteen components $b_0$ to $b_{15}$ of n-bit data.

Each of the components $a_i$ and $b_i$ (where i=0 to 15) of the input and output data is n-bit data configured with one of the values 0 and 1.

In the embodiment, n=4, each component is 4-bit data, and the input A and the output B have 64 bits.

FIG. 26B illustrates a specific calculation process example of the linear conversion process P2, i.e., the row diffusion calculation type 1 (MixRow1).

The row diffusion calculation type 1 (MixRow1) executed as the linear conversion process P2 is matrix calculation executed according to the following expression.

$$\begin{pmatrix} b_0 \\ b_4 \\ b_8 \\ b_{12} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_0 \\ a_4 \\ a_8 \\ a_{12} \end{pmatrix},$$ [Math. 7]

$$\begin{pmatrix} b_1 \\ b_5 \\ b_9 \\ b_{13} \end{pmatrix} = \begin{pmatrix} 1 & 1 & 0 & 1 \\ 1 & 1 & 1 & 0 \\ 0 & 1 & 1 & 1 \\ 1 & 0 & 1 & 1 \end{pmatrix} \cdot \begin{pmatrix} a_1 \\ a_5 \\ a_9 \\ a_{13} \end{pmatrix},$$

$$\begin{pmatrix} b_2 \\ b_6 \\ b_{10} \\ b_{14} \end{pmatrix} = \begin{pmatrix} 1 & 1 & 1 & 0 \\ 1 & 1 & 0 & 1 \\ 1 & 0 & 1 & 1 \\ 0 & 1 & 1 & 1 \end{pmatrix} \cdot \begin{pmatrix} a_2 \\ a_6 \\ a_{10} \\ a_{14} \end{pmatrix},$$

$$\begin{pmatrix} b_3 \\ b_7 \\ b_{11} \\ b_{15} \end{pmatrix} = \begin{pmatrix} 1 & 0 & 1 & 1 \\ 0 & 1 & 1 & 1 \\ 1 & 1 & 1 & 0 \\ 1 & 1 & 0 & 1 \end{pmatrix} \cdot \begin{pmatrix} a_3 \\ a_7 \\ a_{11} \\ a_{15} \end{pmatrix}.$$

The sixteen components $b_0$ to $b_{15}$ of the output B are calculated through the following calculation based on the matrixes $M_0$, $M_1$, $M_2$, and $M_3$ and the sixteen components $a_0$ to $a_{15}$ of the input A:

$b_0=a_4(+)a_8(+)a_{12}$;

$b_1=a_1(+)a_5(+)a_{13}$;

$b_2=a_2(+)a_6(+)a_{10}$;

$b_3=a_3(+)a_{11}(+)a_{15}$;

$b_4=a_0(+)a_8(+)a_{12}$;

$b_5=a_1(+)a_5(+)a_9$;

$b_6=a_2(+)a_6(+)a_{14}$;

$b_7=a_7(+)a_{11}(+)a_{15}$;

$b_8=a_0(+)a_4(+)a_{12}$;

$b_9=a_5(+)a_9(+)a_{13}$;

$b_{10}=a_2(+)a_{10}(+)a_{14}$;

$b_{11}=a_3(+)a_7(+)a_{11}$;

$b_{12}=a_0(+)a_4(+)a_8$;

$b_{13}=a_1(+)a_9(+)a_{13}$;

$b_{14}=a_6(+)a_{10}(+)a_{14}$; and $b_{15}=a_3(+)a_7(+)a_{15}$.

In the above expression, an operator (+) means exclusive OR calculation.

In the row diffusion calculation type 1 (MixRow1) executed as the linear conversion process P2, the sixteen components $b_0$ to $b_{15}$ of the output B are calculated based on the matrixes $M_0$, $M_1$, $M_2$, and $M_3$ the sixteen components $a_0$ to $a_{15}$ of the input A through the above calculation process.

FIGS. 27A and 27B are explanatory diagrams illustrating a specific calculation process example of the linear conversion process P3, i.e., the row diffusion calculation type 2 (MixRow2).

FIG. 27A illustrates an example of input and output data in the linear conversion unit P2.

An input A is a state formed by sixteen components $a_0$ to $a_{15}$ of n-bit data.

An output B is also a state formed by sixteen components $b_0$ to $b_{15}$ of n-bit data.

Each of the components $a_1$ and $b_1$ (where i=0 to 15) of the input and output data is n-bit data configured with one of the values 0 and 1.

In the embodiment, n=4, each component is 4-bit data, and the input A and the output B have 64 bits.

FIG. 27B illustrates a specific calculation process example of the linear conversion process P3, i.e., the row diffusion calculation type 2 (MixRow2).

The row diffusion calculation type 2 (MixRow2) executed as the linear conversion process P3 is matrix calculation executed according to the following expression.

$$\begin{pmatrix} b_0 \\ b_4 \\ b_8 \\ b_{12} \end{pmatrix} = \begin{pmatrix} 1 & 1 & 1 & 0 \\ 1 & 1 & 0 & 1 \\ 1 & 0 & 1 & 1 \\ 0 & 1 & 1 & 1 \end{pmatrix} \cdot \begin{pmatrix} a_0 \\ a_4 \\ a_8 \\ a_{12} \end{pmatrix},$$ [Math. 8]

-continued $$\begin{pmatrix} b_1 \\ b_5 \\ b_9 \\ b_{13} \end{pmatrix} = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \cdot \begin{pmatrix} a_1 \\ a_5 \\ a_9 \\ a_{13} \end{pmatrix}$$

$$\begin{pmatrix} b_2 \\ b_6 \\ b_{10} \\ b_{14} \end{pmatrix} = \begin{pmatrix} 1 & 1 & 0 & 1 \\ 1 & 1 & 1 & 0 \\ 0 & 1 & 1 & 1 \\ 1 & 0 & 1 & 1 \end{pmatrix} \cdot \begin{pmatrix} a_2 \\ a_6 \\ a_{10} \\ a_{14} \end{pmatrix},$$

$$\begin{pmatrix} b_3 \\ b_7 \\ b_{11} \\ b_{15} \end{pmatrix} = \begin{pmatrix} 1 & 0 & 1 & 1 \\ 0 & 1 & 1 & 1 \\ 1 & 1 & 1 & 0 \\ 1 & 1 & 0 & 1 \end{pmatrix} \cdot \begin{pmatrix} a_3 \\ a_7 \\ a_{11} \\ a_{15} \end{pmatrix}$$

The sixteen components $b_0$ to $b_{15}$ of the output B are calculated through the following calculation based on the matrixes $M_0$, $M_1$, $M_2$, and $M_3$ and the sixteen components $a_0$ to $a_{15}$ of the input A:

$b_0 = a_0(+)a_4(+)a_8$;

$b_1 = a_5(+)a_9(+)a_{13}$;

$b_2 = a_2(+)a_6(+)a_{14}$;

$b_3 = a_3(+)a_{11}(+)a_{15}$;

$b_4 = a_0(+)a_4(+)a_{12}$;

$b_5 = a_1(+)a_9(+)a_{13}$;

$b_6 = a_2(+)a_6(+)a_{10}$;

$b_7 = a_7(+)a_{11}(+)a_{15}$;

$b_8 = a_0(+)a_8(+)a_{12}$;

$b_9 = a_1(+)a_5(+)a_{13}$;

$b_{10} = a_6(+)a_{10}(+)a_{14}$;

$b_{11} = a_3(+)a_7(+)a_{11}$;

$b_{12} = a_4(+)a_8(+)a_{12}$;

$b_{13} = a_1(+)a_5(+)a_9$;

$b_{14} = a_2(+)a_{10}(+)a_{14}$; and $b_{15} = a_3(+)a_7(+)a_{15}$.

In the above expression, an operator (+) means exclusive OR calculation.

In the row diffusion calculation type 2 (MixRow2) executed as the linear conversion process P3, the sixteen components $b_0$ to $b_{15}$ of the output B are calculated based on the matrixes $M_0$, $M_1$, $M_2$, and $M_3$ the sixteen components $a_0$ to $a_{15}$ of the input A through the above calculation process.

Thus, by changing the plurality of linear conversion processes executed in the encryption process sequence of once at each round, it is possible to increase the minimum difference active S-box number and the minimum linear active S-box number. Thus, it is possible to improve the resistance against a difference attack or a linear attack.

A verification result of the number of active S-boxes will be described.

The number of active S-boxes is verified between the encryption processing device according to an embodiment of the present disclosure, i.e., the encryption processing device executing the three kinds of different linear conversion processes P1 to P3, and an encryption processing device of the related art type repeatedly executing the single kind of linear conversion process.

As illustrated in FIG. 28, the encryption processing device according to an embodiment of the present disclosure has a configuration in which the three kinds of linear conversion processes are used in the encryption process sequence and these processes are changed and executed at each round.

In the diagram illustrated in FIG. 28, the exclusive OR calculation unit with the round key is omitted.

The encryption processing device illustrated in FIG. 28 has a 6-round configuration since the number of nonlinear conversion units=6. As a method of defining the number of rounds, there are several methods. Here, the number of nonlinear conversion units is referred to as the number of rounds.

In the example illustrated in FIG. 28, seven round keys, round keys $RK_1$ to $RK_7$, are applied, but there are the nonlinear conversion units in six layers. Therefore, the encryption processing device of six rounds is assumed.

As illustrated in FIG. 28, three different linear conversion processes are executed at least once in the encryption process course.

The linear conversion process P1 is the column diffusion calculation (MixColumn) to which the matrix $M_0$ is applied.

The linear conversion process P2 is the row diffusion calculation type 1 (MixRow1) to which the matrixes $M_0$, $M_1$, $M_2$, and $M_3$ are applied.

The linear conversion process P3 is the row diffusion calculation type 2 (MixRow2) to which the matrixes $M_0$, $M_1$, $M_2$, and $M_3$ are applied.

Figure 29:
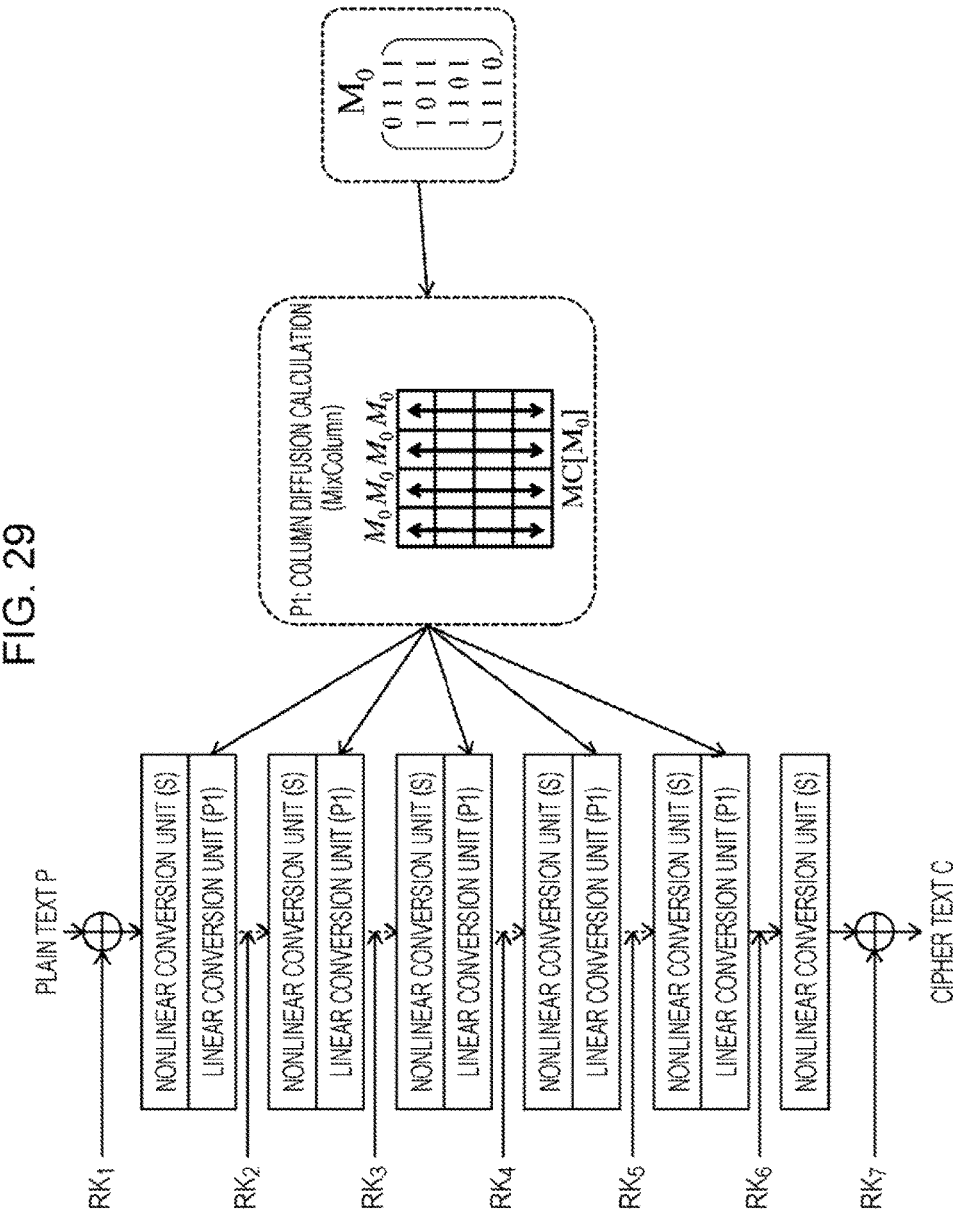
FIG. 29 is an explanatory diagram illustrating a configuration when the same linear conversion process is configured to be executed in the linear conversion units of the encryption processing unit.

Compared to the encryption processing device illustrated in FIG. 28, an example of the encryption processing device of the related art type executing the single linear conversion process is illustrated in FIG. 29.

The encryption processing device illustrated in FIG. 29 also has a 6-round configuration, but has a configuration in which the same linear conversion process is executed as the linear conversion process of each round.

All of the linear conversion processing units of the encryption processing device in FIG. 29 are set to execute the column diffusion calculation in which the linear conversion process P1 is executed using only the matrix $M_0$, which is also used in the encryption processing device in FIG. 28, i.e., the column diffusion calculation in which the matrix $M_0$ is used.

For the encryption processing device executing the plurality of different linear conversion processes illustrated in FIG. 28 and the device of the related art type executing the single linear conversion process illustrated in FIG. 29, a device of the various numbers of rounds is configured, and the minimum difference active S-box number and the minimum linear active S-box number are verified.

The configurations in FIGS. 28 and 29 are both set such that the encryption process is executed on the input plain text P 64 bits and the cipher text C of 64 bits is output.

The S-box is configured as each nonlinear conversion unit. Each S-box is configured to execute the nonlinear conversion of 4-bit input/output, as described above with reference to FIGS. 22A and 22B.

In each nonlinear conversion unit of the encryption processing devices in FIGS. 28 and 29, sixteen 4-bit input/ output S-boxes are installed to execute the nonlinear conversion of "4*16=64"-bit data.

The total number of S-boxes is "16*6=96" in that the six nonlinear conversion units are set in the encryption processing devices of the 6-round type illustrated in FIGS. 28 and 29.

The minimum difference active S-box number and the minimum linear active S-box number are verified by counting the number of active S-boxes in all of the input patterns among a total of the 96 S-boxes.

Figure 31:
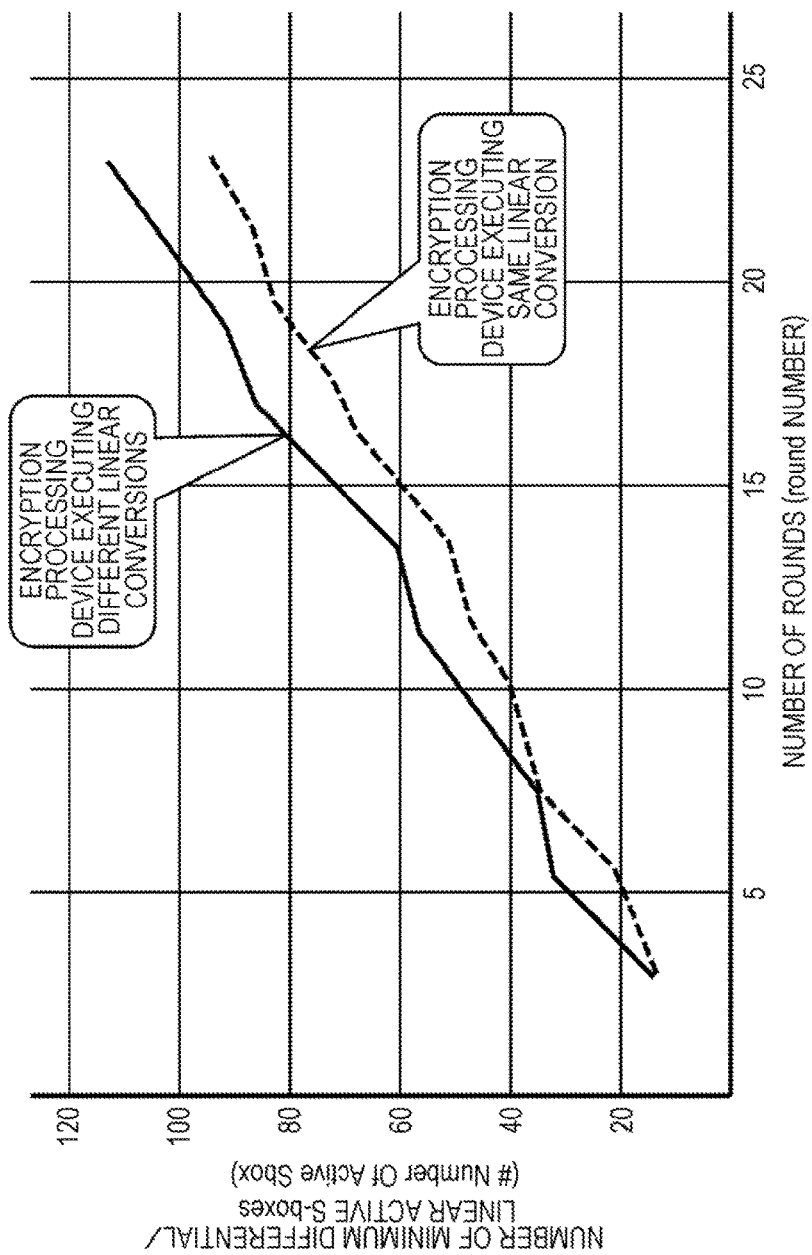
FIG. 31 is an explanatory diagram illustrating comparison data of the number of active S-boxes when different linear conversion processes are configured to be executed in the linear conversion units of the encryption processing unit and when the same linear conversion process is configured to be executed.

The verification result is illustrated in FIGS. 30 and 31.

As illustrated in FIG. 30, the result is obtained by configuring the encryption processing device of different numbers of rounds, the number of rounds of 4 to 24, and counting the number of minimum difference/linear active S-boxes.

In the case of the "number of rounds=4," the number of active S-boxes is 4 and is the same value in both of the configurations in which the same linear conversion process of the related art type is repeatedly executed and the configuration in which the different linear conversion processes of an embodiment of the present disclosure are executed. However, in the cases of the number of rounds=6 to (excluding 8), the number of active S-boxes is more in the configuration in which the different linear conversion processes of an embodiment of the present disclosure are executed in any case.

A graph showing the result is a graph illustrated in FIG. 31.

In the above-described embodiment, the configuration has been described in which the input data is set as the state formed by the 4*4 components in which each component has 4 bits and the linear conversion units execute the linear conversion processes through the matrix calculation using the four kinds of matrixes $M_0$, $M_1$, $M_2$, and $M_3$. A configuration described by generalizing the above processes is set as follows.

When input data is set to a state formed by m*n components in which each component has 1 bit or more, a linear conversion unit is configured to execute one matrix calculation in round calculation between column diffusion calculation in which linear conversion is executed applying a matrix in units of components of each column of the state and row diffusion calculation in which linear conversion is executed applying a matrix in units of components of each row of the state.

Here, the linear conversion unit is configured to execute a linear conversion process through the matrix calculation in which a plurality of kinds of matrixes $M_0$ to $M_k$ (where k is an integer of 1 or more) are used. The linear conversion unit switches and executes the column diffusion calculation, in which the linear conversion is executed applying a selection matrix selected from the matrixes $M_0$ to $M_k$ in units of components of each column of the state in a specific order, and the row diffusion calculation, in which the linear conversion is executed applying the selection matrixes selected from the matrixes $M_0$ to $M_k$ in units of components of each row of the state to each row, in a specific order according to round transition.

A configuration example of a specific linear conversion process is configured as follows, for example.

The encryption processing device switches and executes, according to round transition:

(a) column diffusion calculation, in which the linear conversion is executed applying a selection matrix selected from the matrixes $M_0$ to $M_k$ to each column in units of components of each column of the state in a specific order;

(b) row diffusion calculation type 1, in which the linear conversion is executed applying a selection matrix selected from the matrixes $M_0$ to $M_k$ to each row in units of components of each row of the state in specific order A; and (c) row diffusion calculation type 2, in which the linear conversion is executed applying a selection matrix selected from the matrixes $M_0$ to $M_k$ to each row in units of components of each row of the state in specific order B different from the specific order A.

A configuration in which the column diffusion calculation and the row diffusion calculation in the foregoing configuration are permutated may be realized.

The encryption processing device switches and executes, according to round transition:

(a) row diffusion calculation, in which the linear conversion is executed applying a selection matrix selected from the matrixes $M_0$ to $M_k$ to each row in units of components of each row of the state in a specific order;

(b) column diffusion calculation type 1, in which the linear conversion is executed applying a selection matrix selected from the matrixes $M_0$ to $M_k$ to each column in units of components of each column of the state in specific order A; and (c) column diffusion calculation type 2, in which the linear conversion is executed applying a selection matrix selected from the matrixes $M_0$ to $M_k$ to each column in units of components of each column of the state in specific order B different from the specific order A.

A specific configuration of the linear conversion process when the input data is a state formed by 4*4 components in which each component has 4 bits can be realized as the following configuration.

In the encryption processing device, the linear conversion unit is configured to execute the linear conversion process through matrix calculation in which four kinds of matrixes $M_0$, $M_1$, $M_2$, and $M_3$ are used. The linear conversion unit switches and executes three kinds of matrix calculations below according to the round transition:

(a) column diffusion calculation in which the linear conversion is executed applying the matrix $M_0$ in units of components of each column of the state;

(b) row diffusion calculation type 1 in which the linear conversion is executed applying each matrix in order of the matrixes $M_0$, $M_1$, $M_2$, and $M_3$ in units of components of each row of the state; and (c) row diffusion calculation type 2 in which the linear conversion is executed applying each matrix in order different from the order of the row diffusion calculation type 1 in units of components of each row of the state.

A combination of a matrix applied in units of components of each row of the state in the row diffusion calculation type 1 and a matrix applied in units of components of each row of the state in the row diffusion calculation type 2 is a combination of at least three kinds of matrixes among a total of four matrixes, two matrixes applied to two arbitrary rows of the state in the row diffusion calculation type 1 and two matrixes applied to the two arbitrary rows in the row diffusion calculation type 2.

For example, when matrixes applied to rows of the 4*4 state, i.e., first to fourth rows, are assumed to be $M_1$, $M_3$, $M_0$, and $M_2$ in the type 1, matrixes applied to rows of the 4*4 state, i.e., first to fourth rows, are set to be $M_0$, $M_2$, $M_3$, and $M_1$ in the type 2.

In the foregoing setting, a combination is configured by at least three kinds of matrixes among a total of four matrixes, two matrixes applied to two arbitrary rows of the 4*4 state in the type 1 and two matrixes applied to the two arbitrary rows in the type 2.

That is, in the foregoing setting, the matrixes applied to the first row of the 4*4 state are as follows:
the type 1=$M_1$; and the type 2=$M_0$. the matrixes applied to the second row of the 4*4 state are as follows:
the type 1=$M_3$; and the type 2=$M_2$.

In such a combination, the matrixes applied to the first and second rows in both of the types 1 and 2 are four kinds of matrixes $M_0$ to $M_3$.

In the foregoing setting, a combination is configured by at least three kinds of matrixes among the total of four matrixes, two matrixes applied in the type 1 and two matrixes applied in the type 2 in the other two arbitrary rows.

A configuration in which the column diffusion calculation and the row diffusion calculation in the foregoing configuration are permutated may be realized.

In the encryption processing device, the linear conversion unit is configured to execute the linear conversion process through matrix calculation in which four kinds of matrixes $M_0$, $M_1$, $M_2$, and $M_3$ are used.

The linear conversion unit switches and executes three kinds of matrix calculations below, according to the round transition;
(a) row diffusion calculation in which the linear conversion is executed applying the matrix $M_0$ in units of components of each row of the state;
(b) column diffusion calculation type 1 in which the linear conversion is executed applying each matrix in order of the matrixes $M_0$, $M_1$, $M_2$, and $M_3$ in units of components of each column of the state; and
(c) column diffusion calculation type 2 in which the linear conversion is executed applying each matrix in order different from the order of the column diffusion calculation type 1 in units of components of each column of the state.

In this configuration, a combination of a matrix applied in units of components of each column of the state in the row diffusion calculation type 1 and a matrix applied in units of components of each column of the state in the row diffusion calculation type 2 is a combination of at least three kinds of matrixes among a total of four matrixes, two matrixes applied to two arbitrary columns of the state in the row diffusion calculation type 1 and two matrixes applied to the two arbitrary columns in the row diffusion calculation type 2.

Thus, by changing the linear conversion process executed in the encryption process sequence of once at each round, it is possible to increase the minimum difference active S-box number and the minimum linear active S-box number. Thus, it is possible to improve the resistance against a difference attack or a linear attack.

<5. Configuration and Process of Key Schedule Unit>

Next, the configuration and a process of the key schedule unit in the encryption processing device according to an embodiment of the present disclosure will be described.

<5-1. Description of Configuration and Process of Key Schedule Unit>

As described above with reference to FIG. 19, the encryption processing device 100 according to an embodiment of the present disclosure includes the key schedule unit 110 and the encryption processing unit 120.

The key schedule unit 110 generates a round key to be applied to each round of the encryption processing unit 120 based on, for example, the secret key K according to a predetermined key generation algorithm and outputs the round key to the encryption processing unit 120. The encryption processing unit 120 inputs the round key from the key schedule unit 110, executes data conversion of the plain text P, and outputs the cipher text C.

The same process is executed when a decryption process is executed.

Hereinafter, the configuration and a process of the key schedule unit 110 executing processes of generating and supplying the round key will be described.

Figure 32:
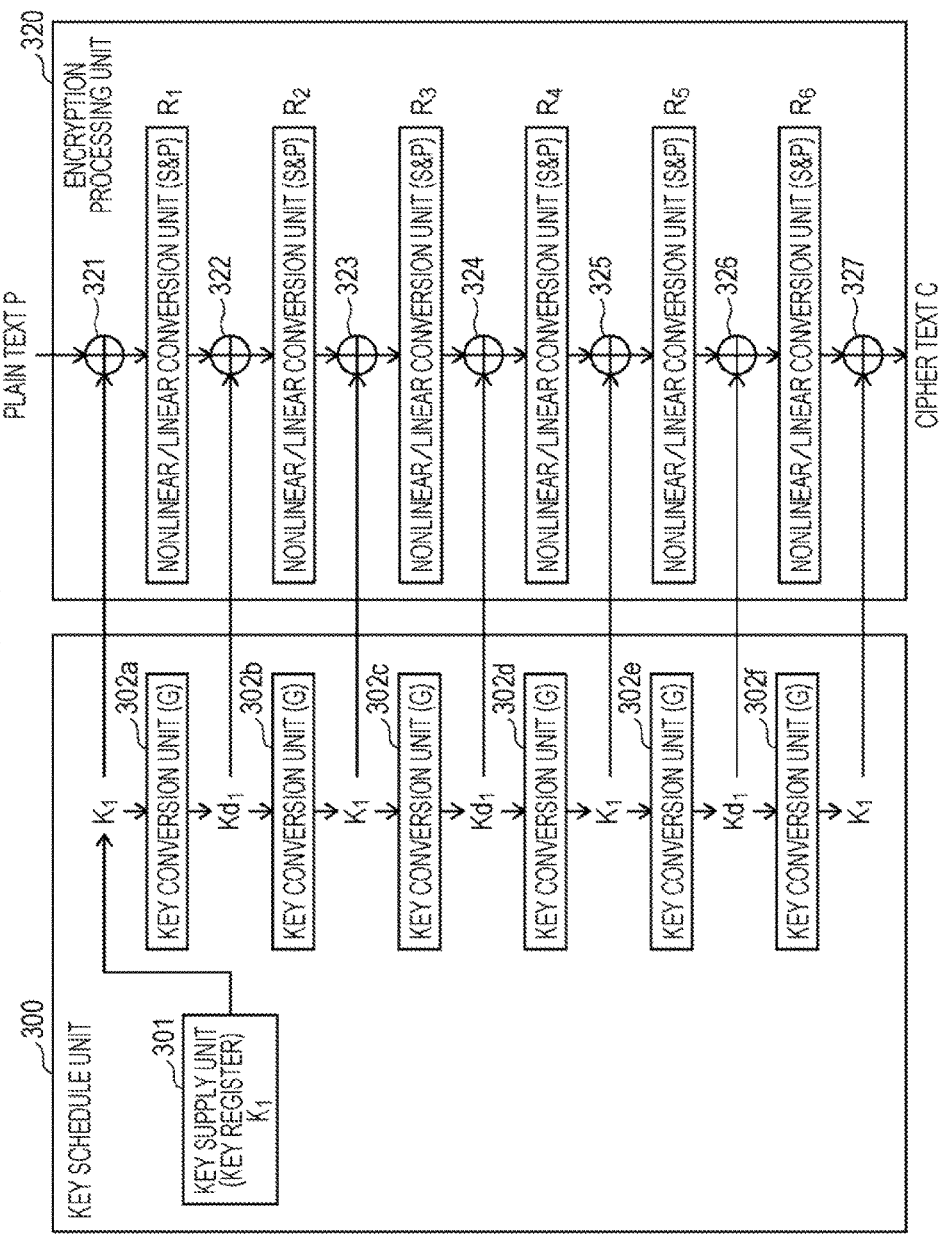
FIG. 32 is an explanatory diagram illustrating a configuration and a process of the key schedule unit.

FIG. 32 is a diagram illustrating an example of the configuration of the key schedule unit in the encryption processing device according to an embodiment of the present disclosure.

A key schedule unit 300 includes a key supply unit (key register) 301 as a storage unit that stores a secret key $K_1$.

The key schedule unit 300 outputs this key $K_1$ to an exclusive OR unit (round key calculation unit) 321 at the first round of an encryption processing unit 320. That is, the key $K_1$ is used as a round key of the first round.

The key schedule unit 300 inputs the key $K_1$ to a key conversion unit 302a. The key conversion unit 302a executes predetermined calculation on the key $K_1$ to generate a conversion key $Kd_1$.

The conversion key $Kd_1$ generated by the key conversion unit 302a is output to an exclusive OR unit (round key calculation unit) 322 of the encryption processing unit 320 at the second round. That is, the conversion key $Kd_1$ is used as a round key of the second round.

The key schedule unit 300 inputs the conversion key $Kd_1$ to a key conversion unit 302b. The key conversion unit 302b executes predetermined calculation on the conversion key $Kd_1$ to generate a key $K_1$.

The key $K_1$ is the same key as the key $K_1$ which is a generation source of the conversion key $Kd_1$.

The key schedule unit 300 outputs the key $K_1$ generated by the key conversion unit 302b to an exclusive OR unit (round key calculation unit) 323 at the third round of the encryption processing unit 320. That is, the key $K_1$ is used as a round key of the third round.

The key $K_1$ and the conversion key $Kd_1$ are alternately generated in key conversion units 302c to 302f by repeating the same processes and the generated keys are output to exclusive OR units 324 to 327 of the encryption processing unit.

All of the key conversion units 302a to 302f execute the same calculation. That is, through the same calculation process, the conversion key $Kd_1$ is generated from the key $K_1$ and the key $K_1$ is generated from the conversion key $Kd_1$.

When expressions are indicated using a conversion function G and an inverse function $G^{-1}$, the following expressions are obtained:

$Kd_1=G(K_1)$; and $K_1=G^{-1}(Kd_1)$.

Further, "$G=G^{-1}$" is satisfied.

Figure 33:
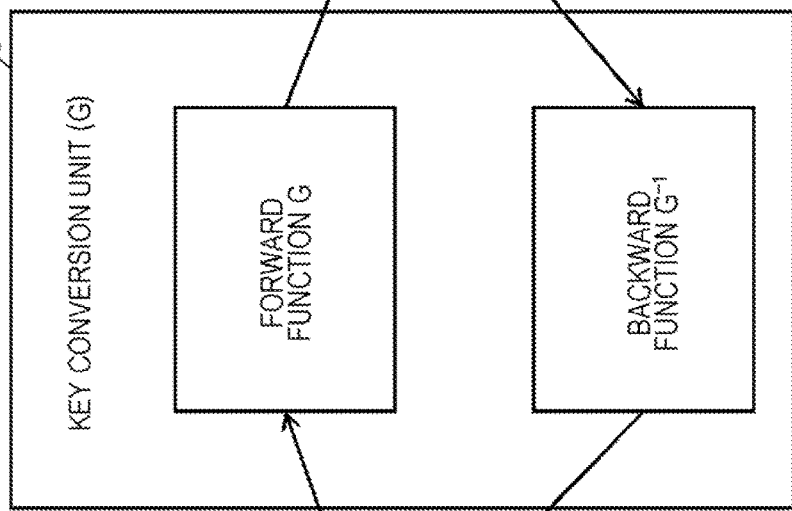
FIG. 33 is an explanatory diagram illustrating a configuration and a process of a key conversion unit of the key schedule unit.

That is, the data conversion function G applied to the key conversion in the key conversion units 302a to 302f has an involution property, i.e., a nature in which a forward function G and a backward function $G^{-1}$ are the same function, as illustrated in FIG. 33.

In FIG. 33, the key $K_1$ described in FIG. 32 is indicated as a base key K and the conversion key $Kd_1$ is indicated as a conversion key Kd. Each key illustrated in FIG. 33 is expressed as a 4*4 state of sixteen 4-bit components. That is, all of the keys are 64-bit key data.

An example of a key conversion process executed by the key conversion unit 302 will be described with reference to FIG. 34.

Figure 34:
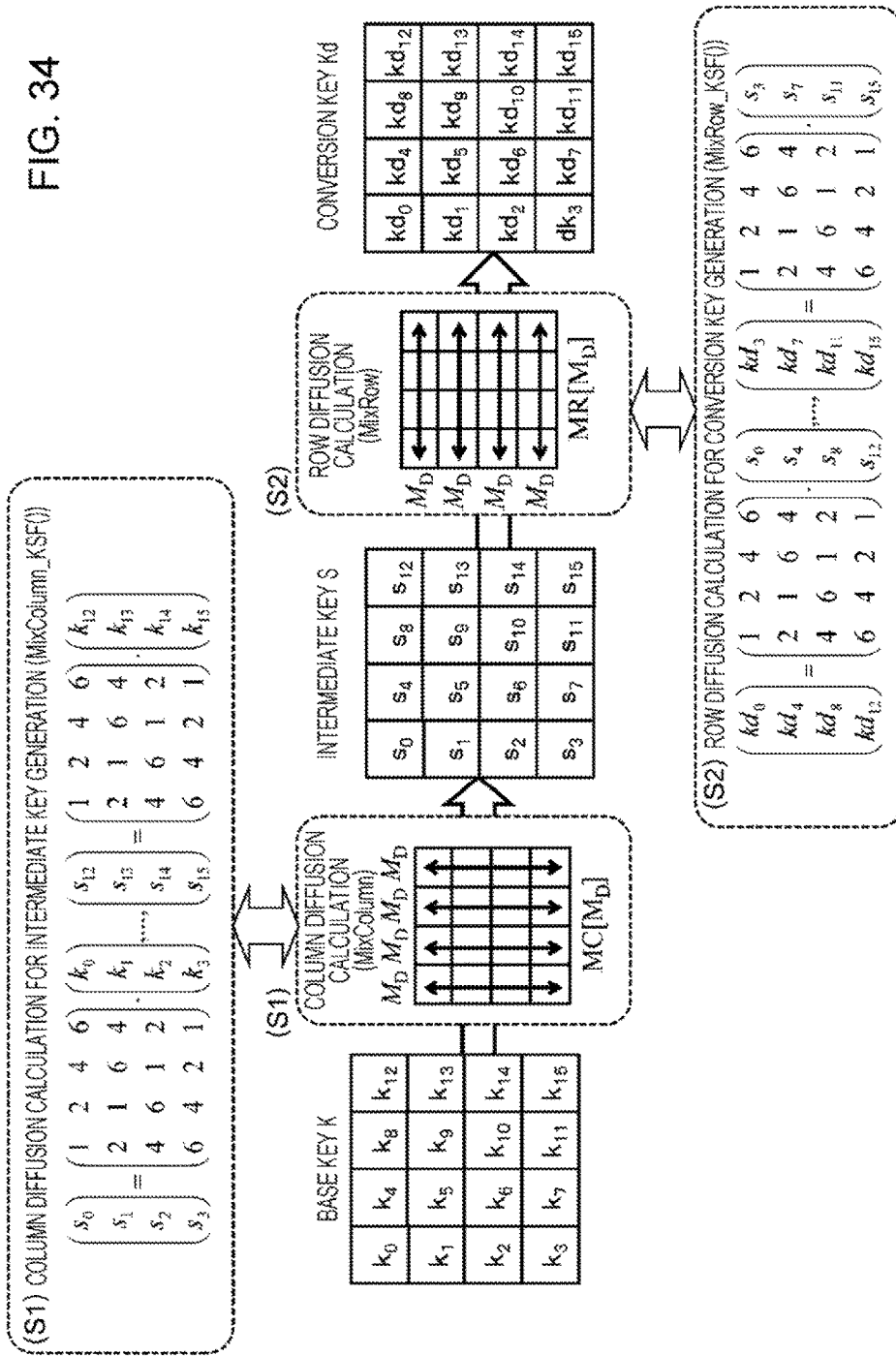
FIG. 34 is an explanatory diagram illustrating a configuration and a process of the key conversion unit of the key schedule unit.

FIG. 34 is an explanatory diagram illustrating a process of generating the conversion key Kd from the base key K.

The process of generating the conversion key Kd from the base key K includes two steps below:

(S1) a step of generating an intermediate key S by executing calculation, in which column diffusion calculation (Mix-Column_KSF( ) for intermediate key generation is applied, on the base key K; and (S2) a step of generating the conversion key Kd by executing calculation, in which row diffusion calculation (MixRow_KSF( ) for conversion key generation is applied, on the intermediate key S.

The column diffusion calculation (MixColumn) executed in step S1 and the row diffusion calculation (MixRow) executed in step S2 are the same matrix application calculation described above with reference to FIGS. 24A to 27B.

Here, a matrix $M_D$ applied in the key conversion process is a matrix shown below.

$$M_D = \begin{pmatrix} 1 & 2 & 4 & 6 \\ 2 & 1 & 6 & 4 \\ 4 & 6 & 1 & 2 \\ 6 & 4 & 2 & 1 \end{pmatrix} \quad \text{[Math. 9]}$$

The matrix $M_D$ shown above is a matrix called a Hadamard MDS matrix.

The MDS matrix is a matrix in which any small matrix forming the matrix is a regular matrix. The regular matrix is a matrix which has an inverse matrix. When A is assumed to be a matrix and $A^{-1}$ is assumed to be an inverse matrix, the matrix A which has the inverse matrix $A^{-1}$ satisfying the following expression is a regular matrix:

$$AA^{-1}=A^{-1}A=E,$$

where E is a unit matrix.

As described above, a mapping theta in which the number of branches Branch (theta) is "b+1" is referred to as optimal diffusion conversion (Optimal Diffusion Mappings) and the MDS matrix is a matrix on which optimal diffusion conversion is executed.

The column diffusion calculation of step S1 and the row diffusion calculation of step S2 illustrated in FIG. 34 are executed applying the Hadamard MDS matrix $M_D$.

The column diffusion calculation of step S1 is indicated by a calculation expression below:

$$MC[M_D]=MC[M_D, M_D, M_D, M_D].$$

The row diffusion calculation of step S2 is indicated by a calculation expression below:

$$MR[M_D]=MR[M_D, M_D, M_D, M_D].$$

That is, in the column diffusion calculation of step S1, matrix calculation of applying the same Hadamard MDS matrix $M_D$ is executed on all of the four columns of the 4*4 state expression data formed by the 4-bit components.

Further, in the row diffusion calculation of step S2, matrix calculation of applying the same Hadamard MDS matrix $M_D$ is executed on all of the four rows of the 4*4 state expression data formed by the 4-bit components.

An algorithm of the matrix calculation of applying the Hadamard MDS matrix $M_D$ can be expressed as follows.

$M_D( ):\{0,1\}^{16} \to \{0,1\}^{16}$

Input: $\{x_0, x_1, x_2, x_3\}$, $x_i$ is an element of $\{0,1\}^4$
Output: $\{y_0, y_1, y_2, y_3\}$, $y_j$ is an element of $\{0,1\}^4$
Operation
$y_0=x_0(+)2(*)x_1(+)4(*)x_3(+)6(*)x_4$
$y_1=2(*)x_0(+)x_2(+)6(*)x_3(+)4(*)x_4$
$y_2=4(*)x_0(+)6(*)x_2(+)x_3(+)2(*)x_4$
$y_3=6(*)x_0(+)4(*)x_2(+)2(*)x_3(+)x_4$ Here, (+) indicates exclusive OR operation and (*) indicates a multiplication on extension fields GF ($2^4$) regulated by an irreducible polynomial: "$x^4+x+1$."

The column diffusion calculation MC [$M_D$] of step S1 illustrated in FIG. 34 is matrix calculation according to an expression below.

$$\begin{pmatrix} s_0 \\ s_1 \\ s_2 \\ s_3 \end{pmatrix} = \begin{pmatrix} 1 & 2 & 4 & 6 \\ 2 & 1 & 6 & 4 \\ 4 & 6 & 1 & 2 \\ 6 & 4 & 2 & 1 \end{pmatrix} \cdot \begin{pmatrix} k_0 \\ k_1 \\ k_2 \\ k_3 \end{pmatrix}, \ldots, \quad \text{[Math. 10]}$$

$$\begin{pmatrix} s_{12} \\ s_{13} \\ s_{14} \\ s_{15} \end{pmatrix} = \begin{pmatrix} 1 & 2 & 4 & 6 \\ 2 & 1 & 6 & 4 \\ 4 & 6 & 1 & 2 \\ 6 & 4 & 2 & 1 \end{pmatrix} \cdot \begin{pmatrix} k_{12} \\ k_{13} \\ k_{14} \\ k_{15} \end{pmatrix}$$

The algorithm of the foregoing column diffusion calculation MC [$M_D$] can be expressed as follows.

MixColumn_KSF( ): $\{0,1\}^{64} \to \{0,1\}^{64}$

Input: $\{k_0, k_1, \ldots, k_{15}\}$, $k_i$ is an element of $\{0,1\}^4$
Output: $\{s_0, s_1, \ldots s_{15}\}$, $s_i$ is an element of $\{0,1\}^4$
Operation
$(s_0, s_1, s_2, s_3)=M_D(k_0, k_1, k_2, k_3)$
$(s_4, s_5, s_6, s_7)=M_D(k_4, k_5, k_6, k_7)$
$(s_8, s_9, s_{10}, s_{11})=M_D(k_8, k_9, k_{10}, k_{11})$
$(s_{12}, s_{13}, s_{14}, s_{15})=M_D(k_{12}, k_{13}, k_{14}, k_{15})$ The row diffusion calculation MR [$M_D$] of step S2 illustrated in FIG. 34 is matrix calculation according to an expression below.

$$\begin{pmatrix} kd_0 \\ kd_4 \\ kd_8 \\ kd_{12} \end{pmatrix} = \begin{pmatrix} 1 & 2 & 4 & 6 \\ 2 & 1 & 6 & 4 \\ 4 & 6 & 1 & 2 \\ 6 & 4 & 2 & 1 \end{pmatrix} \cdot \begin{pmatrix} s_0 \\ s_4 \\ s_8 \\ s_{12} \end{pmatrix}, \ldots, \quad \text{[Math. 11]}$$

$$\begin{pmatrix} kd_3 \\ kd_7 \\ kd_{11} \\ kd_{15} \end{pmatrix} = \begin{pmatrix} 1 & 2 & 4 & 6 \\ 2 & 1 & 6 & 4 \\ 4 & 6 & 1 & 2 \\ 6 & 4 & 2 & 1 \end{pmatrix} \cdot \begin{pmatrix} s_3 \\ s_7 \\ s_{11} \\ s_{15} \end{pmatrix}$$

The algorithm of the foregoing row diffusion calculation MR [$M_D$] can be expressed as follows.

MixRow_KSF( ):$\{0,1\}^{64} \to \{0,1\}^{64}$

Input: $\{s_0, s_1, s_{15}\}$, $s_i$ is an element of $\{0,1\}^4$
Output: $\{kd_0, kd_1, \ldots, kd_{15}\}$, $kd_i$ is an element of $\{0,1\}^4$
Operation
$(kd_0, kd_4, kd_8, kd_{12})=M_D(s_0, s_4, s_8, s_{12})$
$(kd_1, kd_5, kd_9, kd_{13})=M_D(s_1, s_5, s_9, s_{13})$
$(kd_2, kd_6, kd_{10}, kd_{14})=M_D(s_2, s_6, s_{10}, s_{14})$
$(kd_3, kd_7, kd_{11}, kd_{15})=M_D(s_3, s_7, s_{11}, s_{15})$ Thus, the key conversion unit 302 of the key schedule unit 300 illustrated in FIG. 32 executes the column diffusion calculation MC [$M_D$] of applying the matrix $M_D$ in step S1 illustrated in FIG. 34 and executes the row diffusion calculation MR [$M_D$] of applying the matrix $M_D$ in step S2.

By continuously executing the two matrix calculations, the conversion key Kd is generated from the base key K.

Even when the base key K is generated from the conversion key Kd, the same process as the process illustrated in FIG. 34 is executed.

That is, as described above with reference to FIG. 33, the function G in the continuous processes of the column diffusion calculation MC [$M_D$] and the row diffusion calculation MR [$M_D$] has the involution property and the forward function G and the inversion function $G^{-1}$ are the same. Therefore, by repeating calculation twice, the original value is calculated.

The key conversion unit 302 executes the column diffusion calculation MC [$M_D$] of applying the matrix $M_D$ and the row diffusion calculation MR [$M_D$] of applying the matrix $M_D$, so that all of the constituent components of the 4*4 state forming the input data, i.e., all of the sixteen constituent components, can have an influence on all of the sixteen constituent components of the output data.

That is, data diffusion is achieved between all of the components of the input and output states. The data conversion mode is defined as "full diffusion conversion" or diffusion with a full diffusion property.

For example, when an input and an output are states formed by sixteen n-bit components a conversion function f applied to the input is assumed, the output state B is set to be calculated according to an expression below:

$$B = f(A).$$

The input state $A=(a_0, a_1, a_2, a_{15})$.
The output state $B=(b_0, b_1, b_2, b_{15})$.

Here, $a_i$ and $b_i$ are components of the states A and B.

At this time, when any component $b_i$ of the output state B can be expressed by an expression below, the function f is assumed to be full diffusion conversion:

$$b_i = f(a_0, a_1, a_2, \ldots, a_{15}).$$

Thus, an execution function G of the key conversion unit 302 is a function which has the following two properties:
(1) a full diffusion property in which full diffusion conversion is realized; and
(2) an involution property in which the forward function G and the inversion function $G^{-1}$ are the same.

<5-2. Advantageous Effects Based on Full Diffusion Property of Key Schedule Unit>

The full diffusion property which is a nature of the key conversion unit 302 consequently ensures a full diffusion property between a conversion target data and a key in the encryption processing unit 320 illustrated in FIG. 32. The description will be made with reference to FIG. 35.

Figure 35:
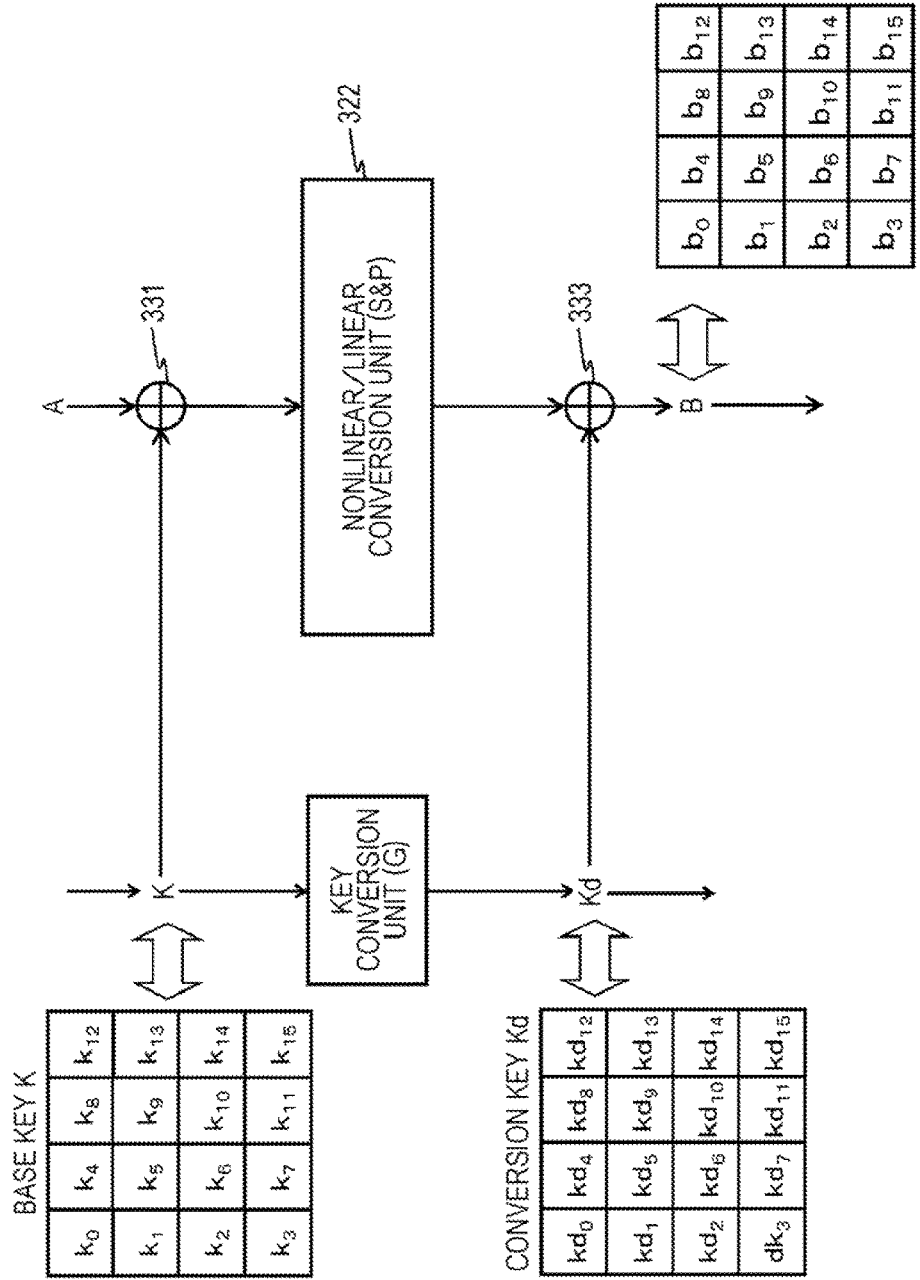
FIG. 35 is an explanatory diagram illustrating a data diffusion process by a conversion process of the key conversion unit of the key schedule unit.

In FIG. 35, the following keys are illustrated:
the base key $K=(k_0, k_1, k_2, \ldots k_{15})$; and
the conversion key $Kd=(kd_0, kd_1, kd_2, \ldots, kd_{15})$.

The base key K is input to the exclusive OR unit 331 of the encryption processing unit and exclusive OR calculation with the input state A is executed. Thereafter, a nonlinear/linear conversion unit (S&P) 332 executes a nonlinear conversion process and a linear conversion process.

An exclusive OR calculation unit 333 executes exclusive OR calculation with the conversion key Kd on the output.

An output of the exclusive OR calculation unit 333 is assumed to be a state B.

At this time, a relation between the base key K and the conversion key Kd is as follows:

$$Kd_i = f(k_0, k_1, k_2, \ldots, k_{15})$$

where, i=0 to 15.

The above relation expression is satisfied.

That is, the full diffusion property is ensured.

From the above relation expression, the following relation expression is also satisfied between the state B and the base key K, $$b_i = f(k_0, k_1, k_2, k_{15})$$

where, i=0 to 15.

That is, the full diffusion property is also ensured between the base key K and the conversion data B.

This nature can be said to be a nature that results in safety of the encryption processing device and contribution to mounting performance.

Specifically, the data diffusion property by the key is improved. Even when the number of rounds is reduced, a high diffusion performance is achieved. As a result, it is possible to improve resistance against various attacks. For example, it is possible to further improve resistance against a key analysis process based on an intermediate-value agreement attack using key dependency or the like.

As described above, by applying the configuration according to an embodiment of the present disclosure, the diffusion performance of the conversion target data in the encryption processing unit is improved. Thus, a safe encryption process is realized with a less number of rounds, i.e., an encryption process with high resistance against various attacks such as key analysis is realized.

Figure 36A:
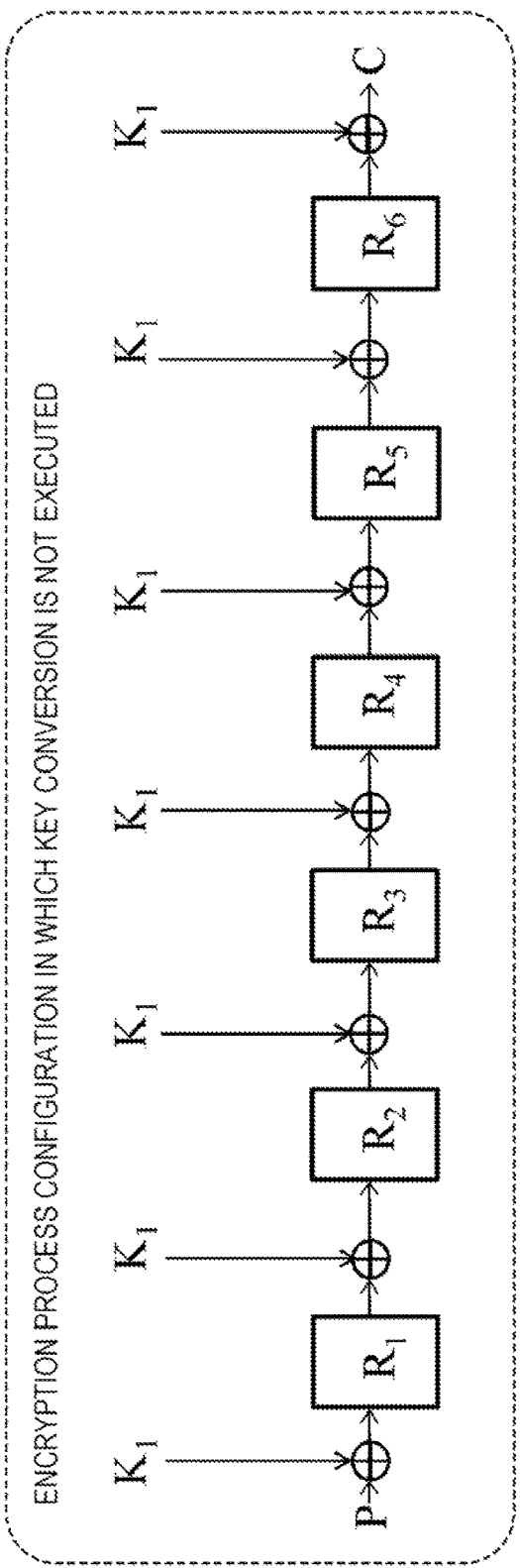
FIG. 36A is an explanatory diagram illustrating contrast between a configuration in which a key conversion process is executed and a configuration in which no key conversion process is executed.
Figure 36B:
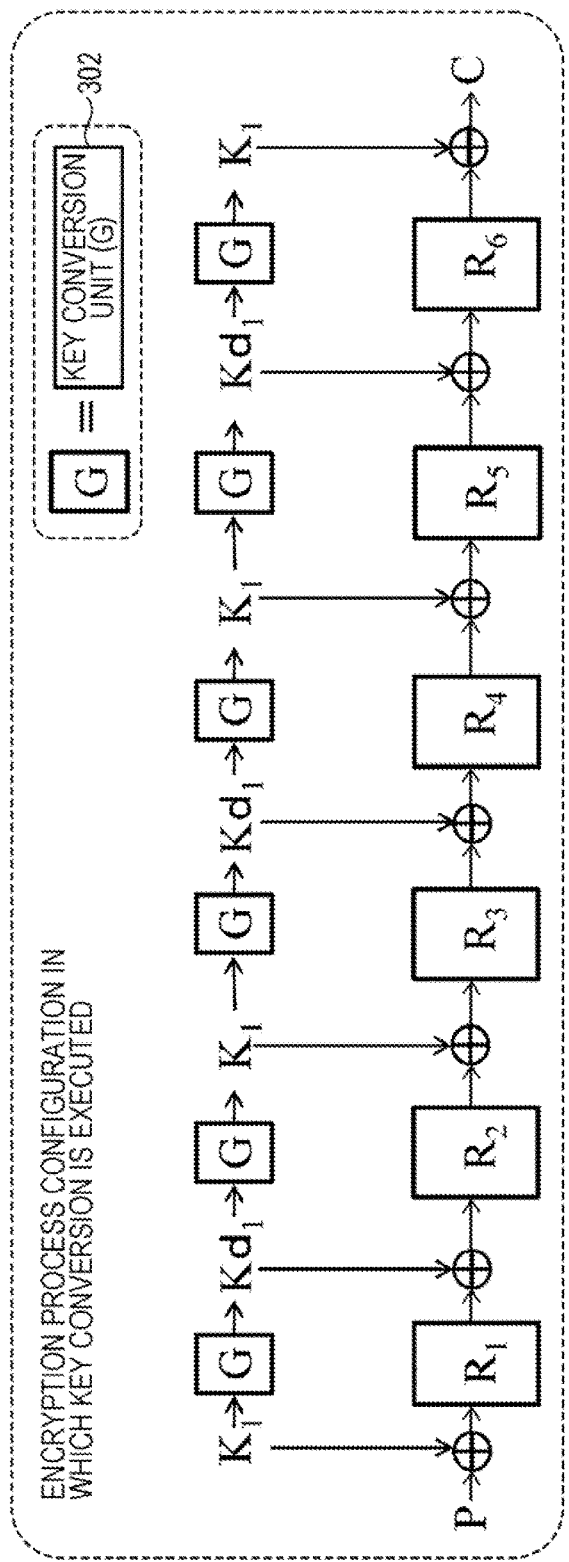
FIG. 36B is an explanatory diagram illustrating contrast between a configuration in which a key conversion process is executed and a configuration in which no key conversion process is executed.

FIGS. 36A and 36B illustrate two examples of encryption process configurations below:
(1) an encryption process configuration in which no key conversion is executed at each round and the same round key is applied; and
(2) an encryption process configuration in which the key conversion according to an embodiment of the present disclosure is executed and two kinds of round keys are alternately applied.

A box of G illustrated in FIG. 36B corresponds to the key conversion unit 302 illustrated in FIG. 32.

In the encryption process configuration in which no key conversion is executed in FIG. 36A, the number of rounds necessary for diffusion (full diffusion) to all of the bits of the input plan text P in which constituent information (bit string) of an application key is conversion target data depends on a process of the round function (R).

Accordingly, when a diffusion performance of the round function is low, a large number of rounds are necessary in order to improve a diffusion level. As a consequence, it is difficult to realize a high-speed process or weight reduction.

On the other hand, in the encryption process configuration in which the key conversion according to an embodiment of the present disclosure is executed in FIG. 36B, the number of rounds necessary for diffusion (full diffusion) to all of the bits of the input plan text P in which constituent information (bit string) of an application key is conversion target data is the number of rounds at which two of a base key $K_1$ and a conversion key $Kd_1$ are used.

The illustrated example is one round.

That is, when the process according to an embodiment of the present disclosure is applied, the diffusion of the constituent information of the key data to the conversion target data is realized by one round and the larger diffusion performance is ensured without dependence on the process of the round function (R).

That is, a safe encryption process with high resistance against an attack is realized with a less number of rounds. As a consequence, the high-speed process and the weight reduction are realized.

<5-3. Advantageous Effects Based on Involution Property of Key Conversion Unit>

As described above with reference to FIGS. 32, 33, and the like, the key conversion unit 302 of the key schedule unit 300 according to an embodiment of the present disclosure has the involution property in which the forward function G and the backward function $G^{-1}$ are realized as the same function.

Hereinafter, the advantageous effects based on the involution property will be described.

As a hardware mounting configuration of the encryption processing device repeatedly executing the round function which is the same data conversion process, there are the following two types:
(a) "unrolled mounting" in which the number of round function execution units corresponding to a regular number of rounds are configured as hardware; and
(b) "round mounting" in which one round function execution unit is configured as hardware, an output of the round function execution unit is input as feedback to the same round function execution unit, and the round functions of the regular number of rounds are repeatedly executed.

Hereinafter, the advantageous effects based on the involution property in the two types will be described sequentially.

<5-3-a. Advantageous Effects in Unrolled Mounting>

The advantageous effects resulting from the involution property of the key conversion unit according to an embodiment of the present disclosure when the encryption processing unit is mounted in the unrolled manner will be described.

In the unrolled mounting, the number of round function execution units corresponding to the regular number of rounds is configured as hardware in the encryption processing unit.

The advantageous effects resulting from the involution property of the key conversion unit according to an embodiment of the present disclosure when the encryption processing unit is mounted in the unrolled manner will be described with reference to FIGS. 37, 38A, and 38B.

Figure 37:
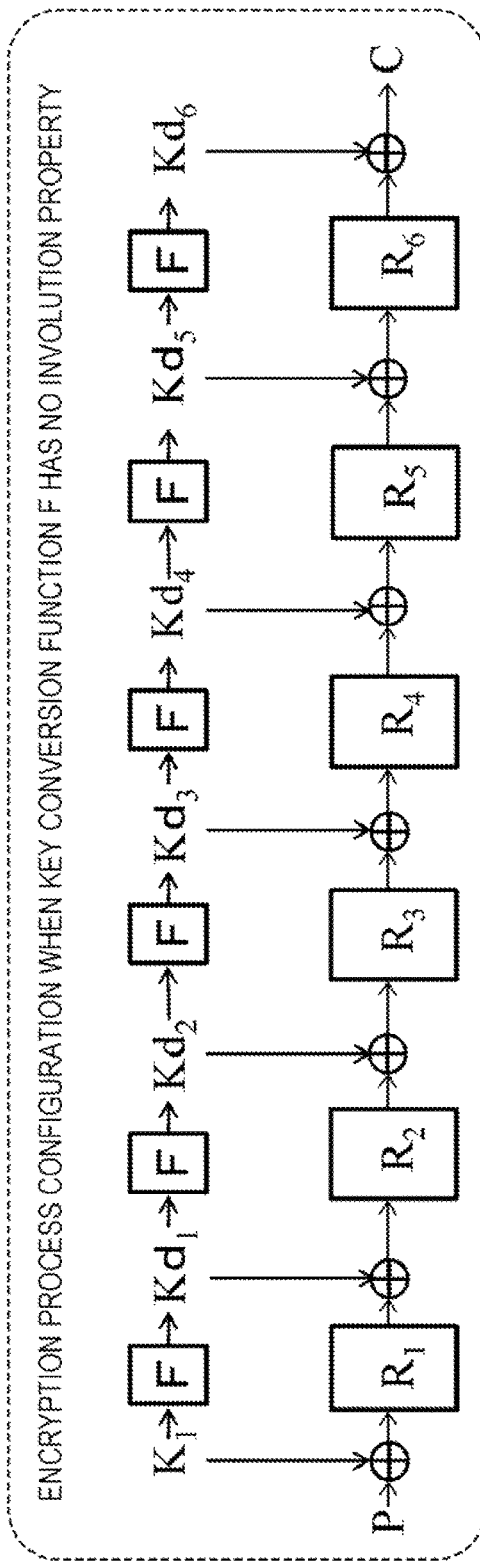
FIG. 37 is an explanatory diagram illustrating the contrast between the configuration in which the key conversion process is executed and the configuration in which no key conversion process is executed.
Figure 38:
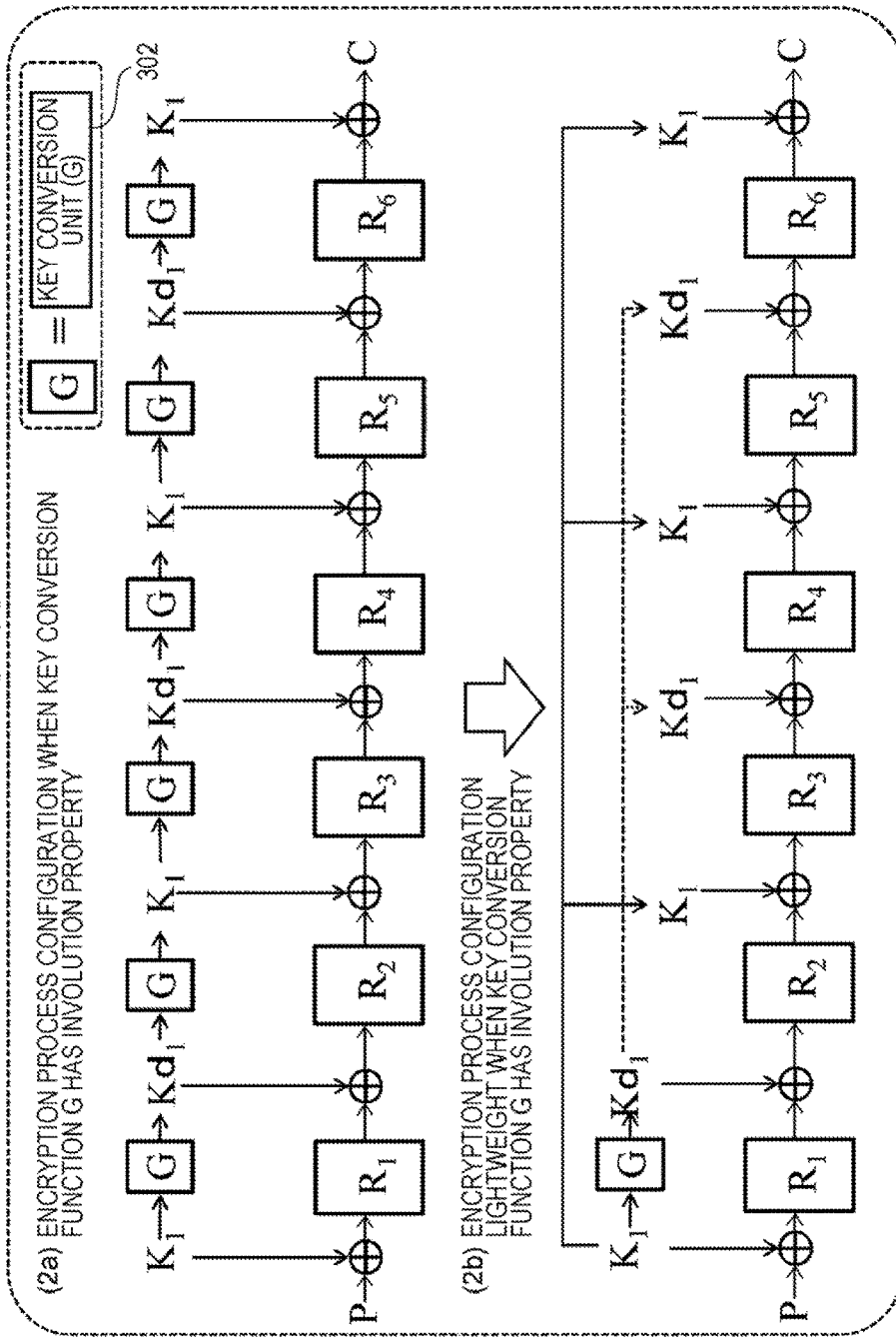
FIG. 38 is an explanatory diagram illustrating the contrast between the configuration in which the key conversion process is executed and the configuration in which no key conversion process is executed.

The following mounting examples of the encryption processing device are illustrated in FIGS. 37, 38A, and 38B:
a hardware mounting example when the key conversion unit (F) has no involution property in FIG. 37; and
a hardware mounting example when the key conversion unit (G) has the involution property in FIGS. 38A and 38B.

FIGS. 38A and 38B correspond to the mounting example of the key conversion unit according to an embodiment of the present disclosure, i.e., a case in which the key conversion unit has the involution property.

Since the key conversion unit F has no involution property in FIG. 37, keys obtained consequently as the conversion result by the key conversion unit F become different keys in order. As illustrated in FIG. 37, through the conversion process of the key conversion unit F, the keys $Kd_1$, $Kd_2$, $Kd_3$, $Kd_4$, $Kd_5$, and $Kd_6$ are sequentially generated based on the key $K_1$ and these keys are configured to be sequentially input as the round keys to the exclusive OR unit (round key calculation unit) of the encryption processing unit.

On the other hand, the example illustrated in FIGS. 38A and 38B is a hardware mounting example when the key conversion unit (G) has the involution property.

The example illustrated in FIG. 38A is a configuration in which the key conversion unit G is set to correspond to each round to generate an input key (round key) for the exclusive OR unit (round key calculation unit) of the encryption processing unit, as in the hardware configuration illustrated in FIG. 37.

On the other hand, FIG. 38B shows a configuration in which the base key $K_1$ maintained in advance and the conversion key $Kd_1$ generated by the key conversion unit G are set to be alternately input to the exclusive OR unit (round key calculation unit) of the encryption processing unit by setting only one key conversion unit G.

Since the key conversion unit G has the involution property, the keys generated through the repetition of the conversion process by the key conversion unit become repeated $K_1$, $Kd_1$, $K_1$, $Kd_1$, $K_1$, etc. As illustrated in FIG. 38B, based on this nature, the base key $K_1$ and the conversion key $Kd_1$ generated through the key conversion process executed once by the key conversion unit G can be alternately input to the exclusive OR unit (round key calculation unit) of the encryption processing unit by using one key conversion unit G.

As a result, since the number of key conversion units G can be set to be one, the lightweight (miniaturized) hardware mounting can be realized.

Figure 39:
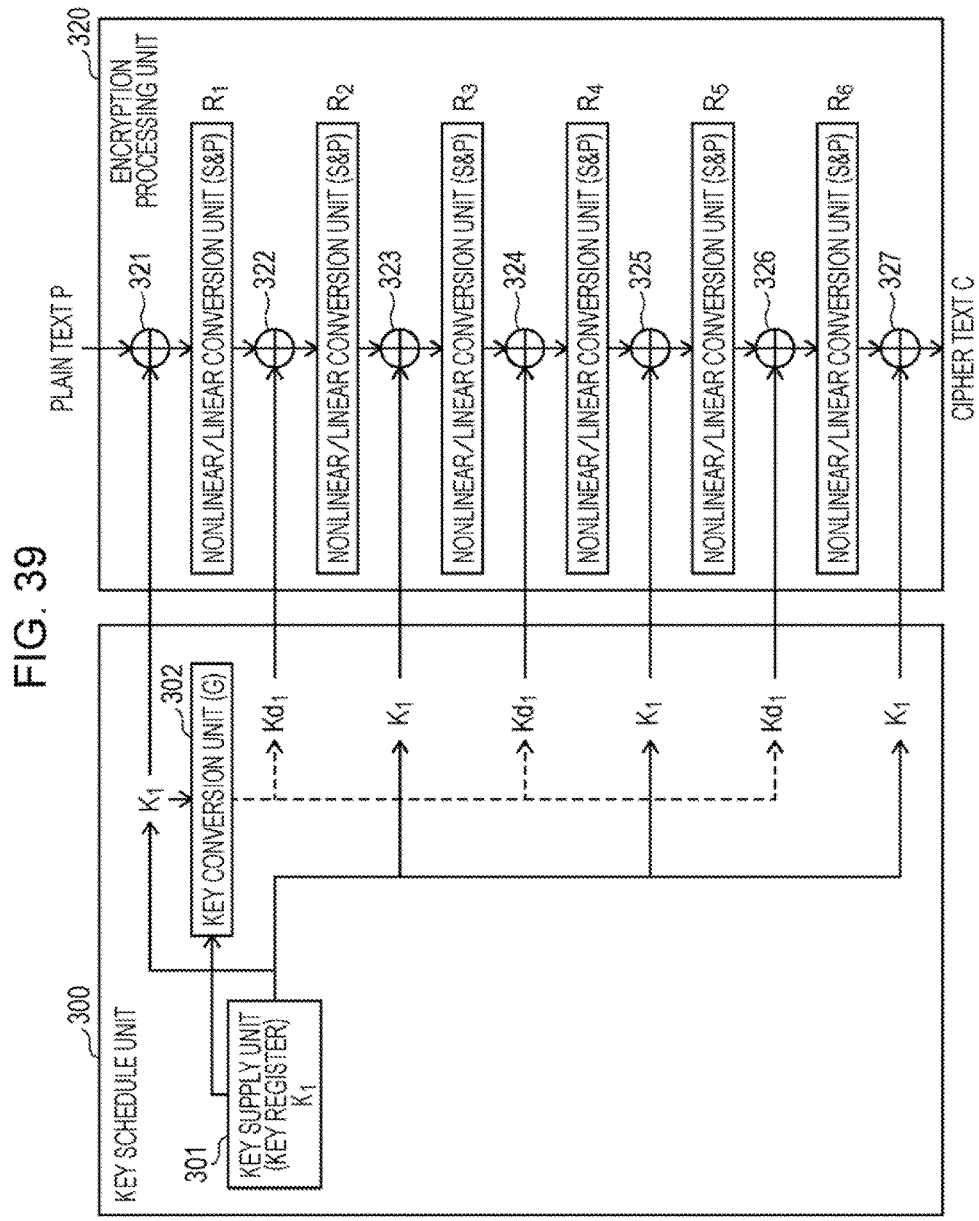
FIG. 39 is an explanatory diagram illustrating a configuration and a process of the key schedule unit.

An example of the configuration of the encryption processing device corresponding to the configuration illustrated in FIG. 38B is illustrated in FIG. 39.

As illustrated in FIG. 39, the key conversion unit (G) 302 of the key schedule unit 300 can alternately input the base key $K_1$ maintained in advance and the conversion key $Kd_1$ generated by the key conversion unit G to each exclusive OR unit (round key calculation unit) of the encryption processing unit 320 by using only one key conversion unit G.

<5-3-b. Advantageous Effects in Round Mounting>

Next, the advantageous effects resulting from the involution property of the key conversion unit according to an embodiment of the present disclosure when the encryption processing device is mounted by round mounting will be described.

In the round mounting, one round function set in the encryption processing unit is configured to be repeatedly used.

Figure 40A:
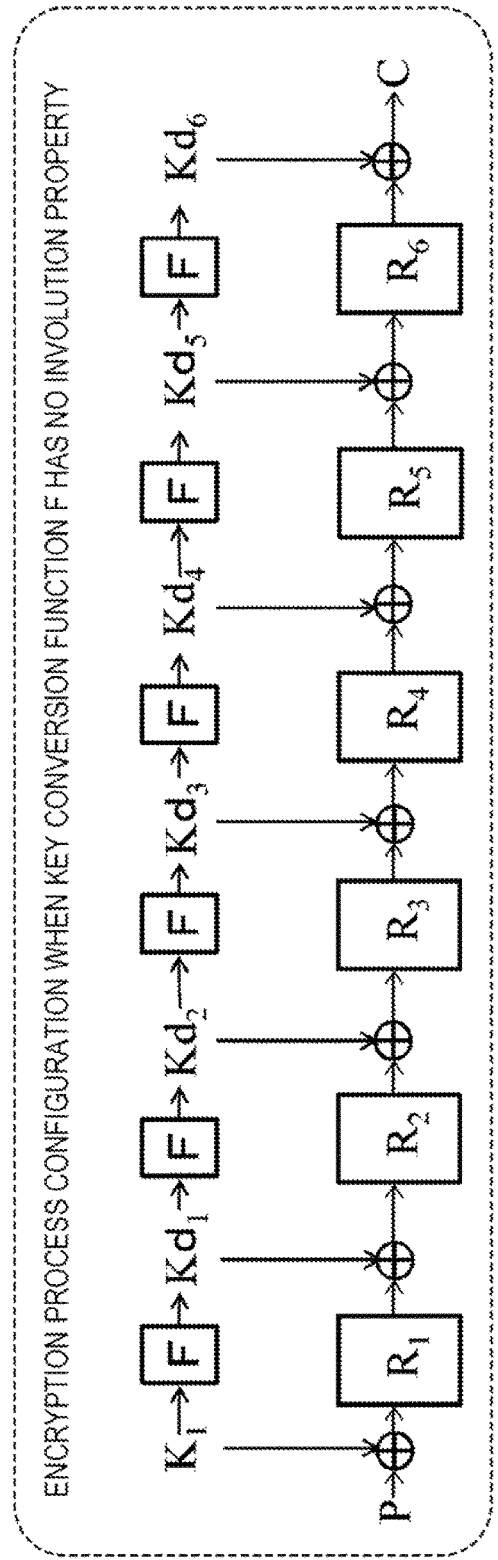
FIG. 40A is an explanatory diagram illustrating a configuration and a process of the key schedule unit when a key conversion function has no involution property.
Figure 40B:
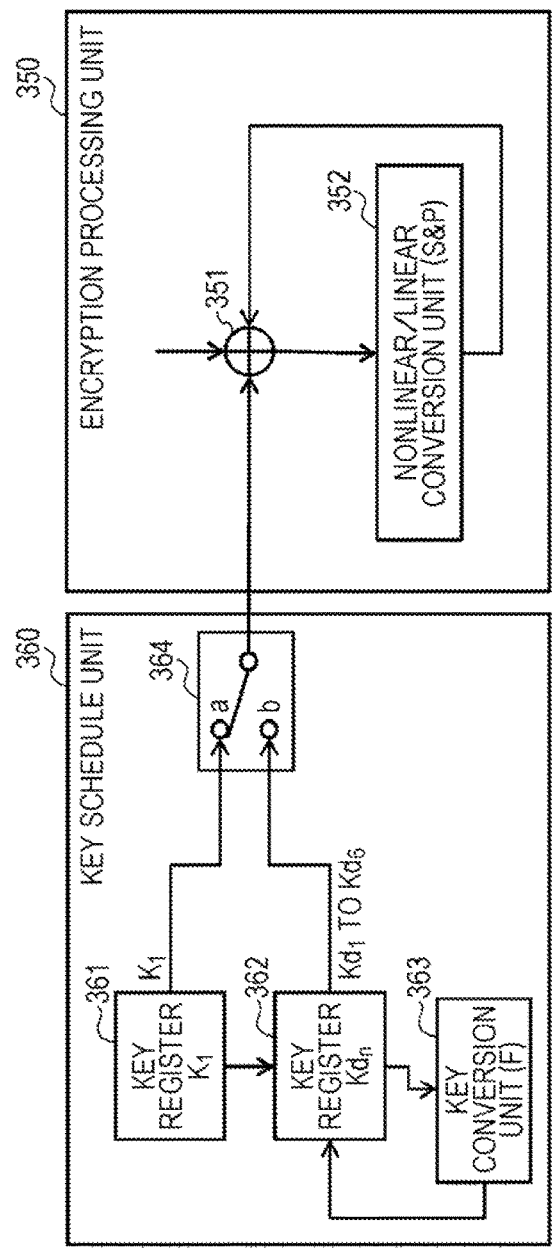

In FIGS. 40A and 40B, an encryption process configuration and a round mounting example are illustrated, respectively, when the key conversion unit has no involution property.

Figure 41A:
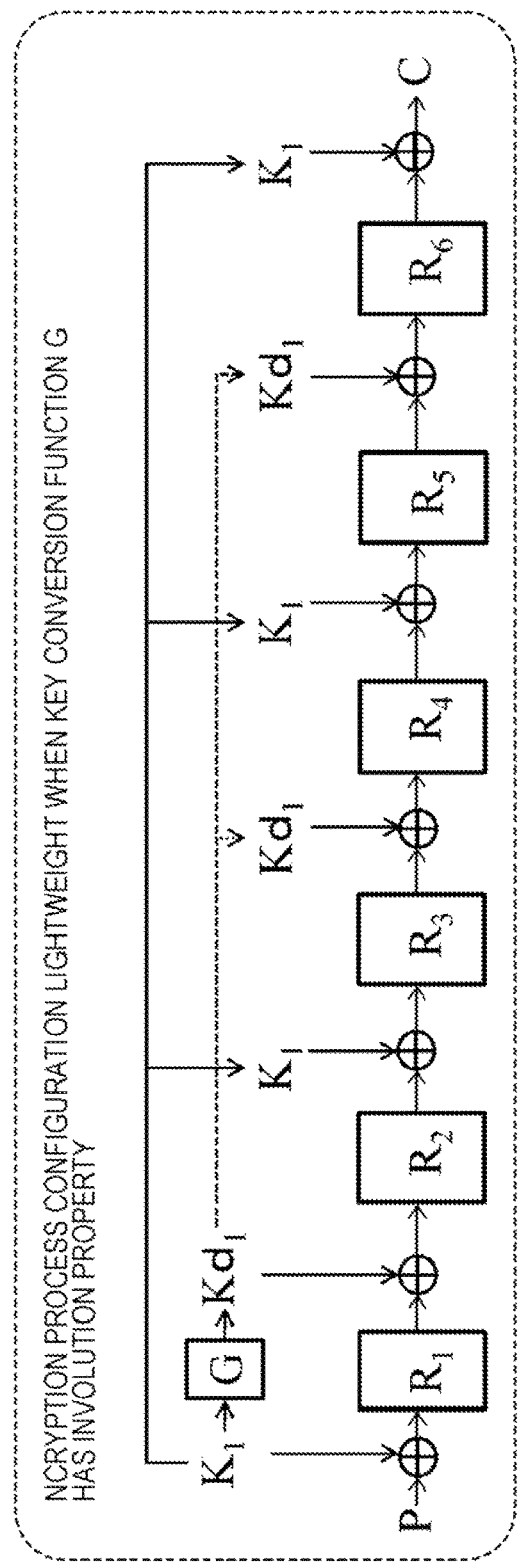
FIG. 41A is an explanatory diagram illustrating a configuration and a process of the key schedule unit when the key conversion function has the involution property.

In FIGS. 41a and 41B, an encryption process configuration and a round mounting example are illustrated, respectively, when the key conversion unit has the involution property.

The encryption process configuration illustrated in FIG. 40A is the same configuration as the configuration described above with reference to FIG. 37.

That is, since the key conversion unit F has no involution property, keys obtained consequently as the conversion result by the key conversion unit F become different keys in order. As illustrated in FIG. 40A, through the conversion process of the key conversion unit F, the keys $Kd_1$, $Kd_2$, $Kd_3$, $Kd_4$, $Kd_5$, and $Kd_6$ are sequentially generated based on the key $K_1$ and these keys are configured to be sequentially input as the round keys to the exclusive OR unit (round key calculation unit) of the encryption processing unit.

When this configuration is mounted as round type hardware, the configuration illustrated in FIG. 40B is realized. An encryption processing unit 350 can be configured to include one exclusive OR unit (round key calculation unit) 351 and one nonlinear/linear conversion unit 352.

On the other hand, the key schedule unit 360 is configured to include a key register 361 that stores and supplies the base key $K_1$, a key register 362 that stores and supplies the conversion keys $Kd_1$ to $Kd_6$, a key conversion unit (F) 363, and a switch 364 that executes output change of the key registers 361 and 362.

In contrast, the encryption process configuration illustrated in FIG. 41A is an encryption process configuration in which the key conversion unit G has the involution property, as in the configuration described above with reference to FIG. 38B.

That is, since the key conversion unit G has the involution property, the keys generated through the repetition of the conversion process by the key conversion unit become repeated $K_1$, $Kd_1$, $K_1$, $Kd_1$, $K_1$, etc. As illustrated in FIG. 41A, based on this nature, the base key $K_1$ and the conversion key $Kd_1$ generated through the key conversion process executed once by the key conversion unit G can be alternately input to the exclusive OR unit (round key calculation unit) of the encryption processing unit by using one key conversion unit G.

This configuration is a configuration illustrated in FIG. 41B when the round type hardware is mounted. An encryption processing unit 350 can be configured to include one exclusive OR unit (round key calculation unit) 351 and one nonlinear/linear conversion unit 352.

On the other hand, a key schedule unit 370 is configured to include a key register 371 that stores and supplies the base key $K_1$ and the conversion key $Kd_1$ and a key conversion unit (G) 372.

In the round mounting configuration when the key conversion unit (F) illustrated in FIG. 40B has no involution property, two key registers, one key conversion unit, and one switch are necessary in the key schedule unit 360. On the other hand, in the round mounting configuration when the key conversion unit (G) illustrated in FIG. 41B has the involution property, the key schedule unit 370 is configured to include one key register and one key conversion unit, and thus the weight reduction (miniaturization) of the hardware configuration is proved to be realized.

For example, in the round mounting configuration when the key conversion unit (F) illustrated in FIG. 40B has no involution property, key registers sequentially generating, storing, and supplying a plurality of different conversion keys are necessary. Thus, new hardware circuits corresponding to the number of gates for the key registers are necessary.

<5-4. Conclusion of Configuration of Key Schedule Unit and Advantageous Effects in Embodiment of the Present Disclosure>

As described above, the key conversion unit of the key schedule unit configured in the encryption processing device according to an embodiment of the present disclosure has the following two properties:
(1) the full diffusion property in which full diffusion conversion is realized; and
(2) the involution property in which the forward function G and the backward function $G^{-1}$ are the same.

Based on the two properties, the following advantageous effects are obtained.
(Advantageous Effect 1) for conversion target data, the full diffusion property can be realized with a less number of rounds based on the full diffusion property.

As a result, the encryption process with high safety can be executed with a small number of rounds, and thus high speed (low delay) of the process and weight reduction (miniaturization) of the device are realized.
(Advantageous Effect 2) When the hardware configuration is mounted in the unrolled manner, only one key conversion unit can be configured based on the involution property, and thus the weight reduction (miniaturization) of the device is realized.
(Advantageous Effect 3) When the hardware configuration is mounted in a round manner, the key schedule unit including one key register and one key conversion unit can be mounted based on the involution property, and thus the weight reduction (miniaturization) of the device is realized.

<5-5. Examples of Other Configuration of Key Schedule Unit>

Next, other configuration examples of the key schedule unit that includes the key conversion unit executing the key conversion process of applying the function G that has the following two properties described above will be described with reference to FIG. 42 and the subsequent drawings:
(1) the full diffusion property in which full diffusion conversion is realized; and
(2) the involution property in which the forward function G and the backward function $G^{-1}$ are the same.

Figure 42:
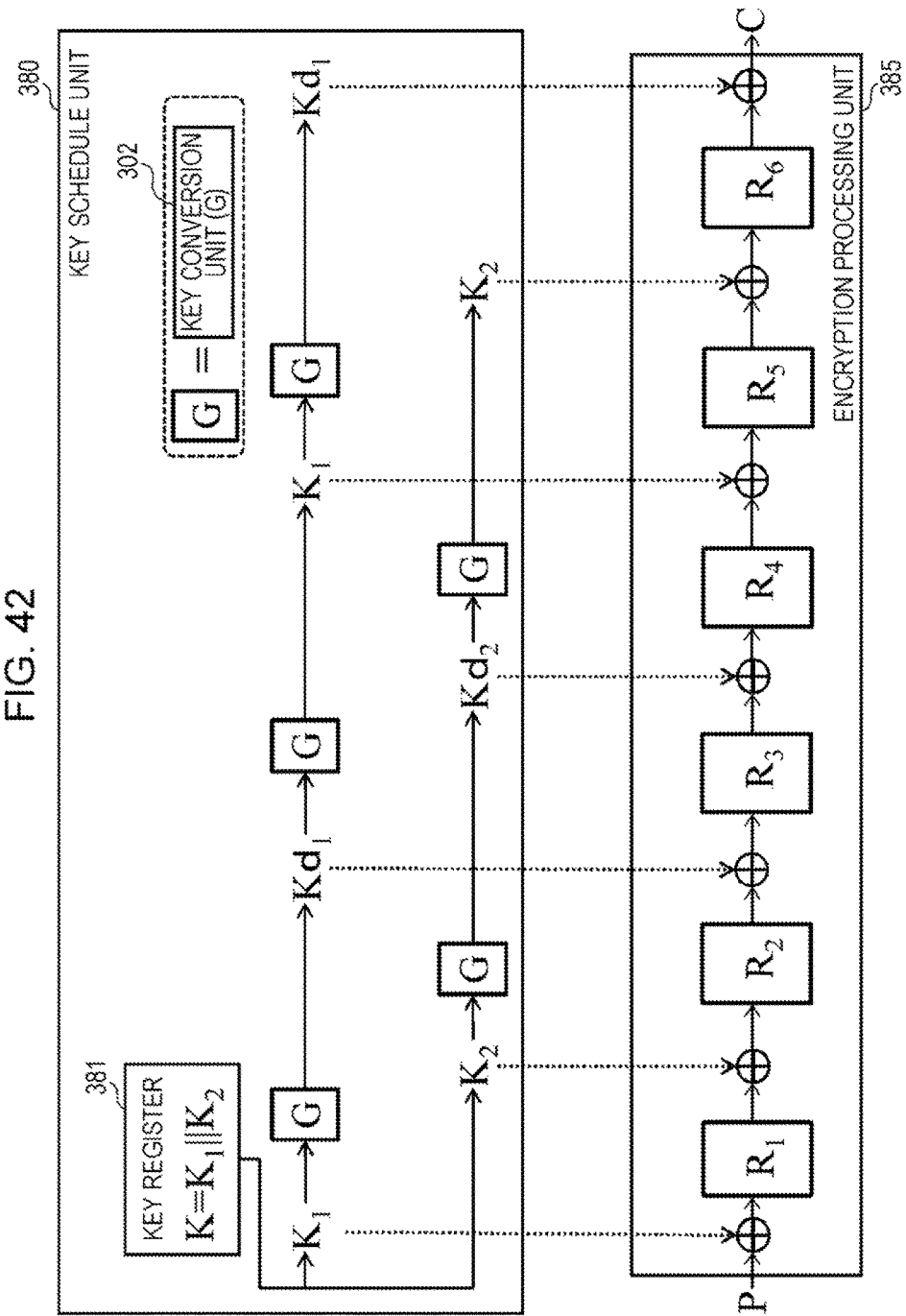
FIG. 42 is an explanatory diagram illustrating a configuration and a process of the key schedule unit.

FIG. 42 is a diagram illustrating an example of the configuration of an encryption processing device that includes a key schedule unit 380 including a key conversion unit that has the above-described two properties.

The encryption processing device illustrated in FIG. 42 includes the key schedule unit 380 and an encryption processing unit 385.

A secret key K generated in advance is stored in a key register 381 of the key schedule unit 380.

The secret key K is connection data of keys $K_1$ and $K_2$.

For example, the keys $K_1$ and $K_2$ are 64-bit keys and the secret key K which are the connection data is 128-bit data.

G illustrated in the drawing denotes a key conversion unit. As in the key conversion unit 302 described above with reference to FIG. 32 and the subsequent drawings, the key conversion unit executes the key conversion process of applying the function G that has the two properties, i.e., the full diffusion property and the involution property.

The key schedule unit 380 illustrated in FIG. 42 sequentially outputs the keys $K_1$ and $K_2$ which are data divided from the secret key K stored in the key register 381 and conversion keys $Kd_1$ and $Kd_2$ obtained by converting these keys in the key conversion unit (G) to exclusive OR units (round key calculation units) of the encryption processing unit 385.

In the illustrated example, when the keys $K_1$ and $K_2$ are 64-bit keys, plain text P which is a conversion target of the encryption processing unit 385 is also 64-bit data.

In the example illustrated in FIG. 42, an output order of the keys is as follows:
the key $K_1$,
the key $K_2$,
the conversion key $Kd_1$,
the conversion key $Kd_2$,
the key $K_1$,
the key $K_2$, and
the conversion key $Kd_1$.

The four kinds of keys are input in this order to the encryption processing unit 385.

The input order of the keys can be set in various ways.

The plurality of key conversion units (G) are illustrated in FIG. 42. However, when the round mounting described above with reference to FIGS. 41A and 41B is executed, only one key conversion unit (G) can be configured.

Another example of the configuration of the key schedule unit will be described with reference to FIGS. 43A and 43B.

Figure 43A:
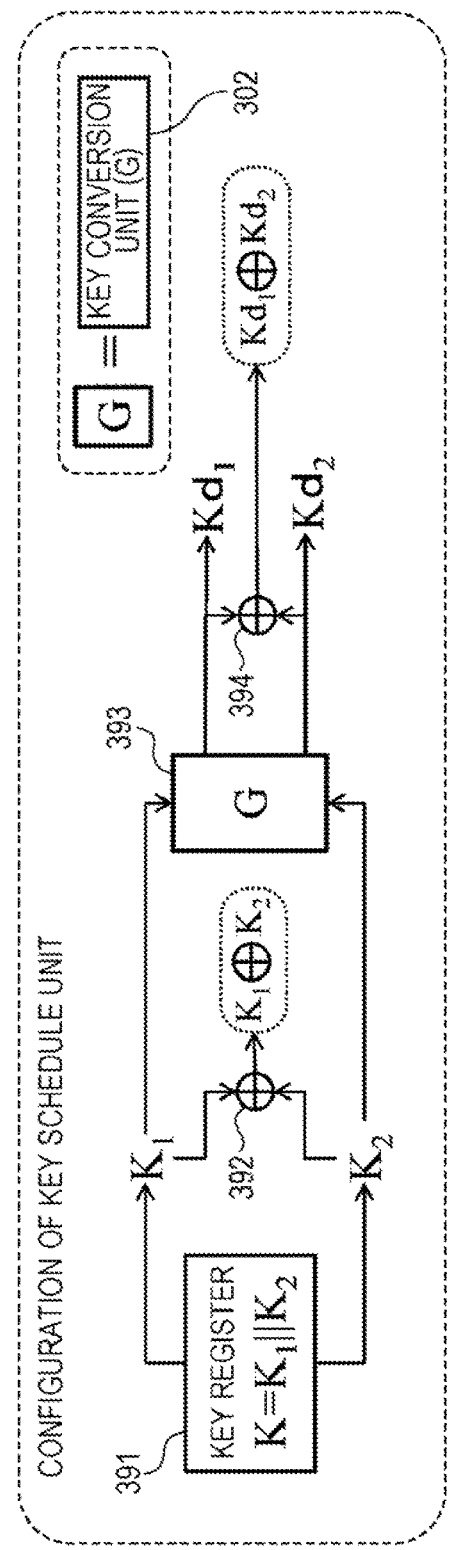
FIG. 43A is an explanatory diagram illustrating configurations and processes of the key schedule unit.
Figure 43B:
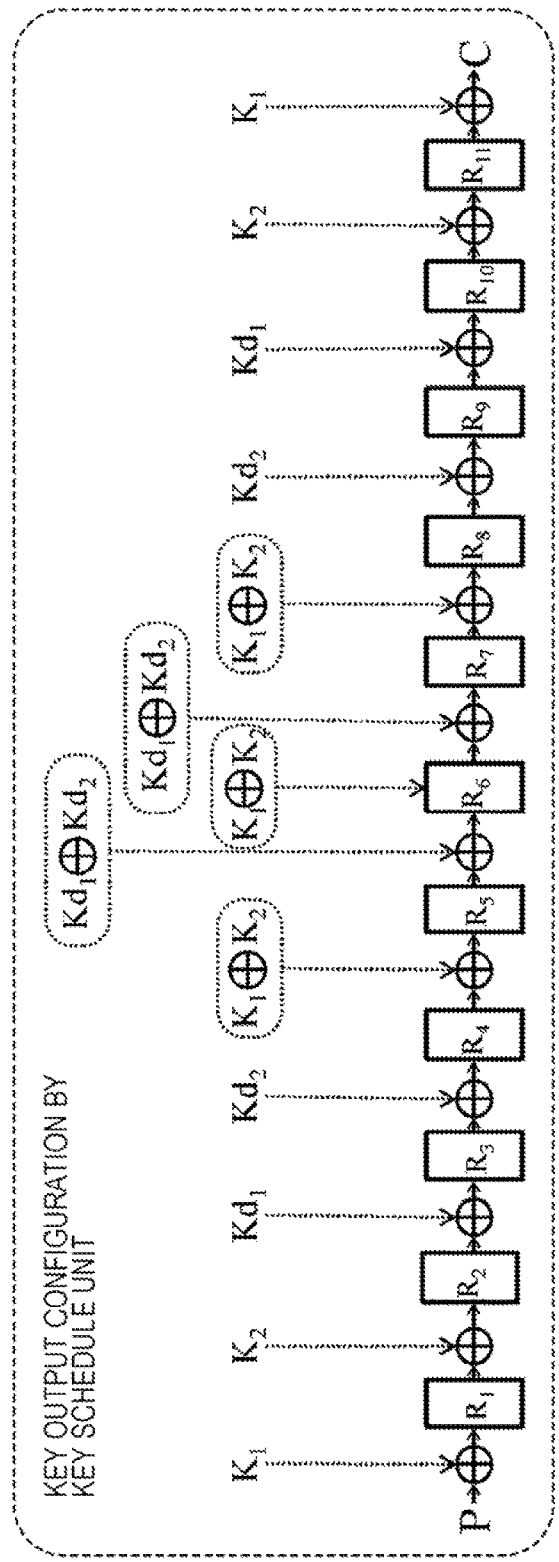
FIG. 43B is an explanatory diagram illustrating configurations and processes of the key schedule unit.

In FIGS. 43A and 43B, the following drawings are illustrated:
(a) the configuration of the key schedule unit; and
(b) a key output configuration by the key schedule unit.

As illustrated in FIG. 43A, the secret key K generated in advance is stored in a key register 391 of the key schedule unit.

The secret key K is connection data of keys $K_1$ and $K_2$.

For example, the keys $K_1$ and $K_2$ are 64-bit keys and the secret key K which are the connection data is 128-bit data.

The key schedule unit illustrated in FIG. 43A includes a key conversion unit G393 and exclusive OR units 392 and 394.

As in the key conversion unit 302 described above with reference to FIG. 32 and the subsequent drawings, the key conversion unit G393 is a key conversion unit that executes the key conversion process of applying the function G that has the two properties, i.e., the full diffusion property and the involution property.

The key schedule unit illustrated in FIG. 43A generates the following six kinds of keys based on such a configuration:
a key $K_1$;
a key $K_2$;
a conversion key $Kd_1$;
a conversion key $Kd_2$;
exclusive OR calculation keys $K_1(+)K_2$; and
exclusive OR calculation conversion keys $Kd_1(+) Kd_2$.

The key schedule unit illustrated in FIG. 43A generates the six kinds of keys and sequentially outputs the keys to the encryption processing unit.

The foregoing six kinds of keys are all 64-bit keys when the key K=128 bits. In this case, plain text P which is a conversion target of the encryption processing unit is also 64-bit data.

In the example illustrated in FIG. 43B, an output order of the keys is as follows:
the key $K_1$,
the key $K_2$,
the conversion key $Kd_1$,
the conversion key $Kd_2$,
the exclusive OR calculation keys $K_1(+)K_2$,
the exclusive OR calculation conversion keys $Kd_1(+) Kd_2$,
the exclusive OR calculation keys $K_1(+)K_2$,
the exclusive OR calculation conversion keys $Kd_1(+)Kd_2$,
the exclusive OR calculation keys $K_1(+)K_2$,
the conversion key $Kd_2$,
the conversion key $Kd_1$,
the key $K_2$, and
the key $K_1$.

The six kinds of keys are input in this order to the encryption processing unit.

An inverse order of the input sequence of the keys is also the same sequence.

This means that the input order of the keys in an encryption process of generating the cipher text C from the plain text P and the input order of the keys in a decryption process of generating the plain text P from the cipher text C are set to be the same. This means that hardware or a program applied to the encryption process and the decryption process can be commonalized and is the setting that contributes to the weight reduction (miniaturization) of the device.

A specific configuration of the encryption processing device including the key schedule unit illustrated in FIGS. 43A and 43B will be described later.

<5-6. Example of Configuration in which Key Schedule Unit with Full Diffusion Property is Included>

In the above-described embodiment, the case has been described in which the key conversion unit generating the conversion key Kd through the conversion process of applying the conversion function G to the secret key K has the two properties of the involution property and the full diffusion property. However, even when the key conversion unit that has no involution property and has the full diffusion property is applied, the diffusion performance of the input data is improved and the safe encryption process configuration with the high resistance against various attacks is realized.

Hereinafter, an embodiment of an encryption process configuration having the full diffusion property will be described.

Figure 44:
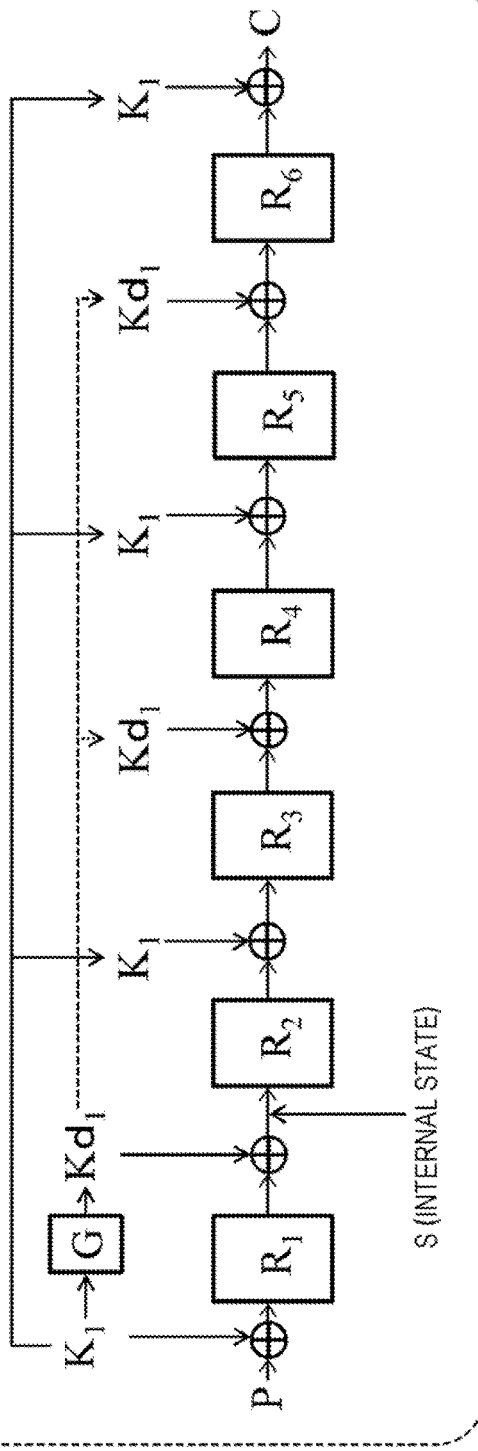
FIG. 44 is an explanatory diagram illustrating an encryption process configuration when a key conversion function G has a full diffusion property.

FIG. 44 is a diagram illustrating the fact that the full diffusion property of an internal state S of input data (P) is ensured when a key conversion function G has the full diffusion property. As described with reference to FIG. 35 and the like in the foregoing section <5-2. Advantageous Effects Based on Full Diffusion Property of Key Schedule Unit>, when the key conversion function G of the key conversion unit has the full diffusion property, the full diffusion property is also ensured between conversion target data and a key.

In the configuration illustrated in FIG. 44, a base key $K_1$ is input to an exclusive OR unit of an encryption processing unit and exclusive OR calculation with an input state is executed. Thereafter, a nonlinear conversion process and a linear conversion process are executed in a round calculation unit $R_1$.

Further, exclusive OR calculation with a conversion key $Kd_1$ is executed on the output in the exclusive OR unit.

An output (S) of the exclusive OR unit will be examined.

The full diffusion property is ensured between the base key $K_1$ and the conversion key $Kd_1$.

After the conversion target data is subjected to the nonlinear conversion process and the linear conversion process in the round calculation unit $R_1$, the conversion target data is subjected to the exclusive OR calculation with the conversion key $Kd_1$.

As a result, the full diffusion property is ensured even between the base key $K_1$ and the conversion data.

This nature can be said to be a nature that results in safety of the encryption processing device and contribution to mounting performance.

Specifically, the data diffusion property by the key is improved. Even when the number of rounds is reduced, a high diffusion performance is achieved. As a result, it is possible to improve resistance against various attacks. For example, it is possible to further improve resistance against a key analysis process based on an intermediate-value agreement attack using key dependency or the like.

Figure 45:
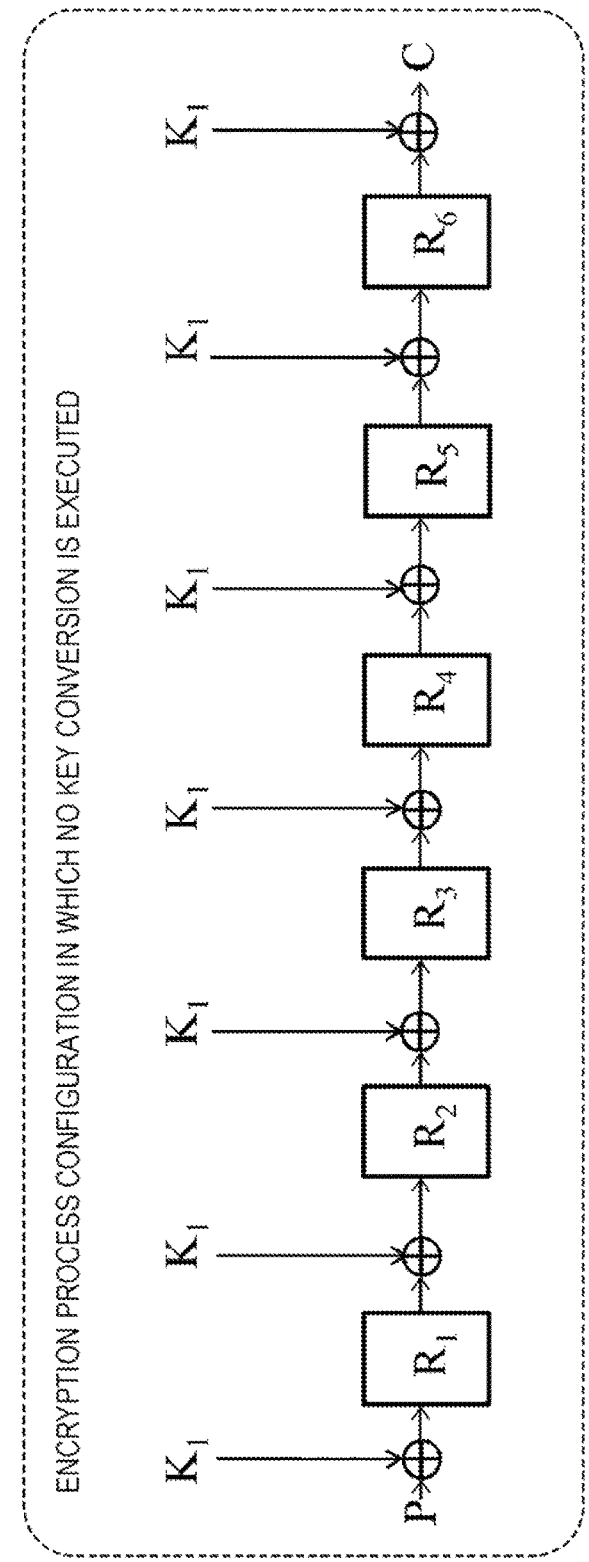
FIG. 45 is an explanatory diagram illustrating a configuration and a process when no key conversion is executed.

In the encryption process configuration in which no key conversion is executed, as in FIG. 45, the number of rounds necessary for diffusion (full diffusion) to all of the bits of the input plan text P in which constituent information (bit string) of an application key is conversion target data depends on a process of the round function (R).

In contrast, in the configuration in which the key conversion illustrated in FIG. 44 is executed, the number of rounds necessary for diffusion (full diffusion) to all of the bits of the input plan text P in which constituent information (bit string)

of an application key is conversion target data is the number of rounds at which two base key $K_1$ and conversion key $Kd_1$ are used.

The illustrated example is one round.

That is, when the process according to an embodiment of the present disclosure is applied, the diffusion of the constituent information of the key data to the conversion target data is realized by one round and the larger diffusion performance is ensured without dependence on the process of the round function (R).

That is, a safe encryption process with high resistance against an attack is realized with a less number of rounds. As a consequence, the high-speed process and the weight reduction are realized.

A specific example of a G function having the full diffusion property will be described.

The G function to be described below is configured by a combination of the two functions below:

(a) a full diffusion 4-bit function ($Df_4$); and
(b) a 16-bit substitution function ($Bp_{16}$).

The (a) full diffusion 4-bit function is a conversion function in which an input and an output are 4 bits and is a function that has the full diffusion property indicating an influence of input 4 bits on all of the bits of the output 4 bits.

The full diffusion 4-bit function is a function having the following nature:
the input: $x_0$, $x_1$, $x_2$, $x_3$ (each 1 bit); and
the output: $y_0$, $y_1$, $y_2$, $y_3$ (each 1 bit).

At this time, the function f is as follows:

$$y_i = f(x_0, x_1, x_2, x_3)$$

where $i=0, 1, 2,$ and 3.

Next, the (b) 16-bit substitution function ($Bp_{16}$) will be described with reference to FIG. 46.

Figure 46:
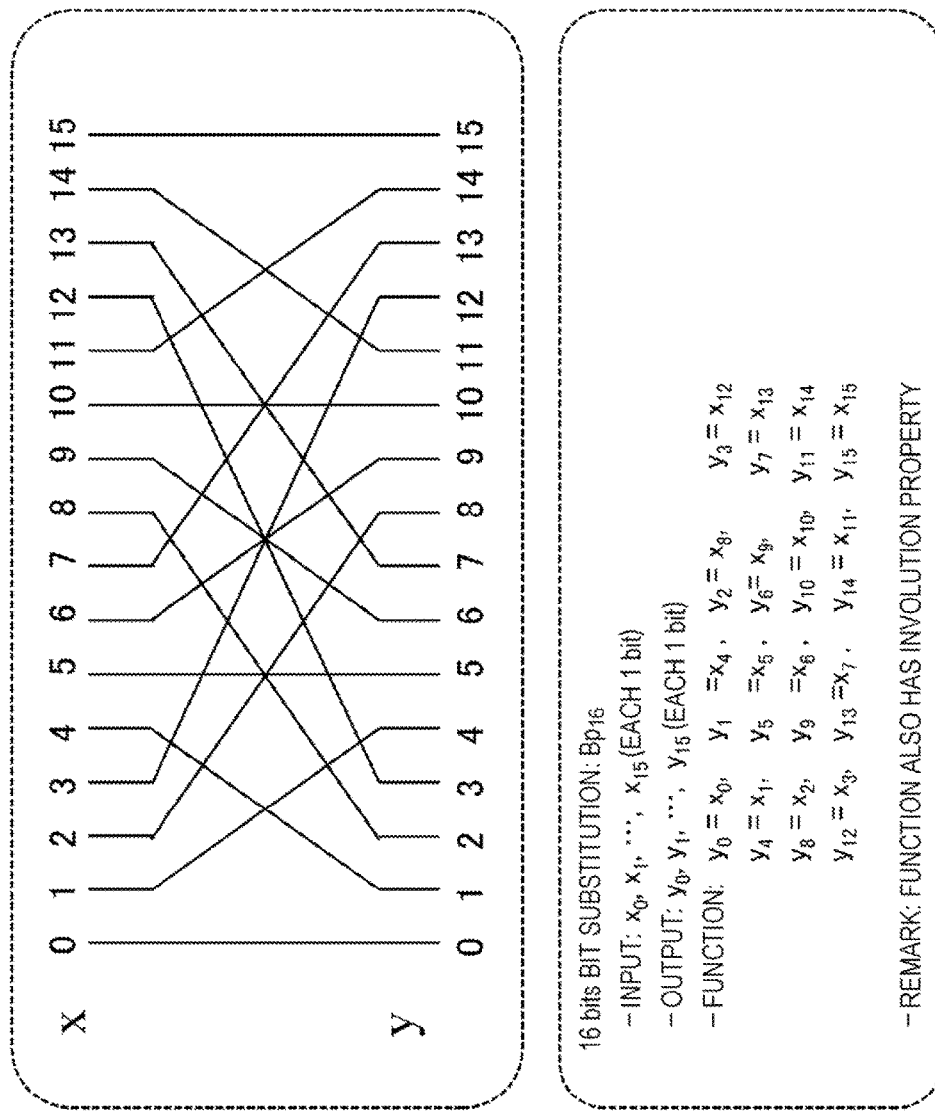
FIG. 46 is an explanatory diagram illustrating a 16-bit substitution process.

FIG. 46 illustrates an example of the 16-bit substitution function ($Bp_{16}$).

An input X is assumed to be 16-bit data of $x_0$, $x_1$, $x_2$, ..., and $x_{15}$ and an output Y converted by inputting the input X to the conversion function G is assumed to be 16-bit data of $y_0$, $y_1$, $y_2$, ..., and $y_{15}$.

Here, each of $x_i$, and $y_i$ is 1-bit data of 0 or 1.

A relation between the input and output bits by the 16-bit substitution function ($Bp_{16}$) is the following correspondence relation:
the input: $x_0, x_1, \ldots,$ and $x_{15}$ (each 1 bit);
the output: $y_0, y_1, \ldots,$ and $y_{15}$ (each 1 bit);
functions: $y_0=x_0, y_4=x_4, y_2=x_8,$ and $y_3=x_{12}$;
$y_4=x_1, y_5=x_5, y_6=x_9,$ and $y_7=x_{13}$;
$y_8=x_2, y_9=x_6, y_{10}=x_{10},$ and $y_{11}=x_{14}$; and
$y_{12}=x_3, y_{13}=x_7,$ and $y_{15}=x_{15}$.

Figure 47:
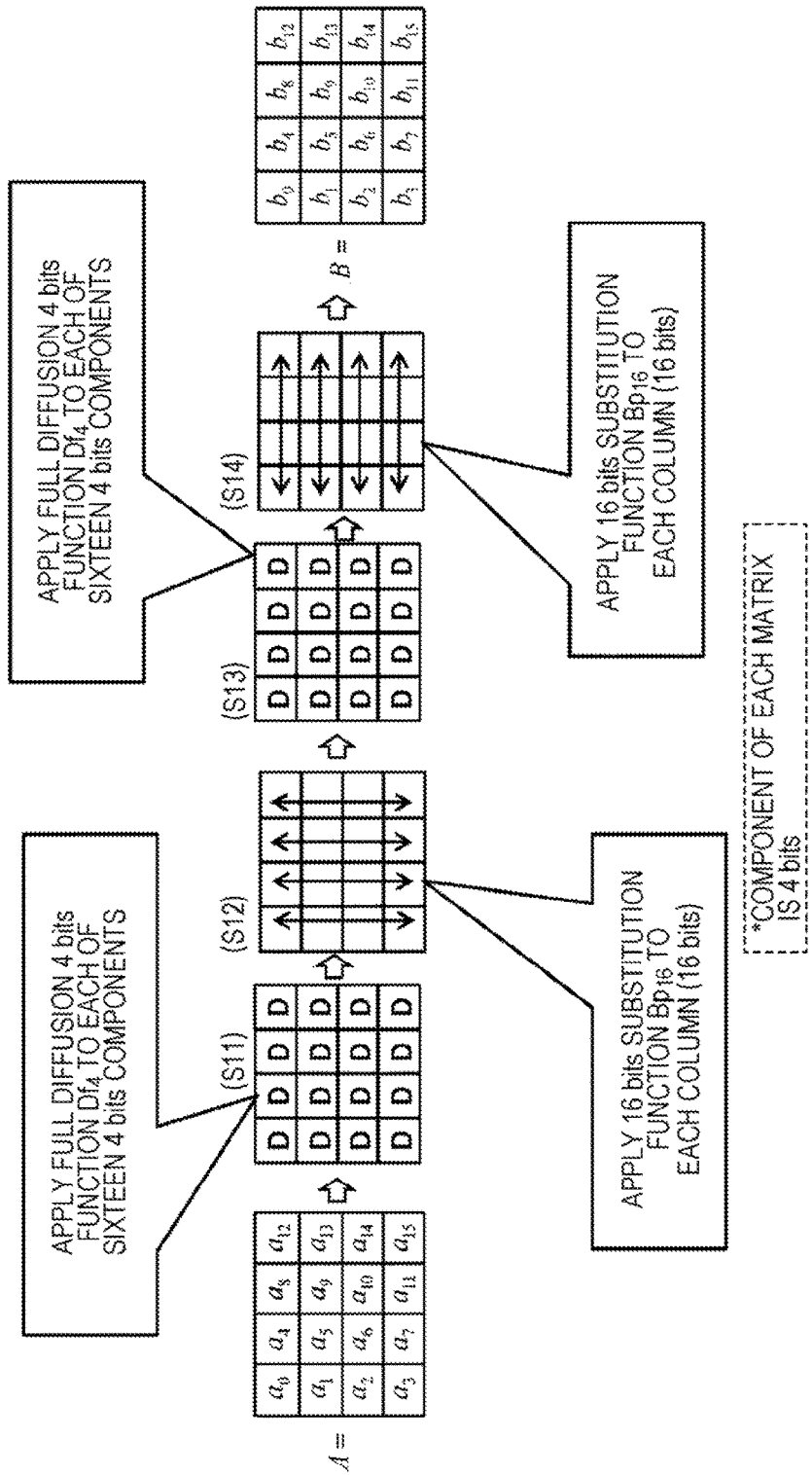
FIG. 47 is an explanatory diagram illustrating an example of a key conversion process of applying a full diffusion 4-bit function and a 16-bit substitution function.

FIG. 47 is a diagram illustrating an example (process example 1) of the key conversion process to which the G function formed by the following two functions and having the full diffusion property is applied:
(a) a full diffusion 4-bit function ($Df_4$); and
(b) a 16-bit substitution function ($Bp_{16}$).

Here, A is assumed to be a base key and B is assumed to be a conversion key. Both of the keys are 4*4 state data in which each component has 4 bits.

In the example illustrated in FIG. 47, a process of generating the conversion key B from the base key A is configured to include four steps below:

(S11) a step of applying the full diffusion 4-bit function ($Df_4$) to each of the sixteen 4-bit components of the base key A to execute the conversion;
(S12) a step of applying the 16-bit substitution function ($Bp_{16}$) to each of the 16-bit data at each column of the data (4*4 state) generated through the conversion process of step S11 to execute the conversion;
(S13) a step of applying the full diffusion 4-bit function ($Df_4$) to each of the sixteen 4-bit components of data (4*4 state) generated through the conversion process of step S12 to execute the conversion; and
(S14) a step of applying the 16-bit substitution function ($Bp_{16}$) to each of the 16-bit data at each row of the data (4*4 state) generated through the conversion process of step S13 to execute the conversion.

Through such a process, the conversion key B is generated from the base key A.

Each of the components $b_0$ to $b_{15}$ of the conversion key B is data receiving the influence of each of the components $a_0$ to $a_{15}$ of the base key A. The full diffusion property is ensured between the base key A and the conversion key B.

Figure 48:
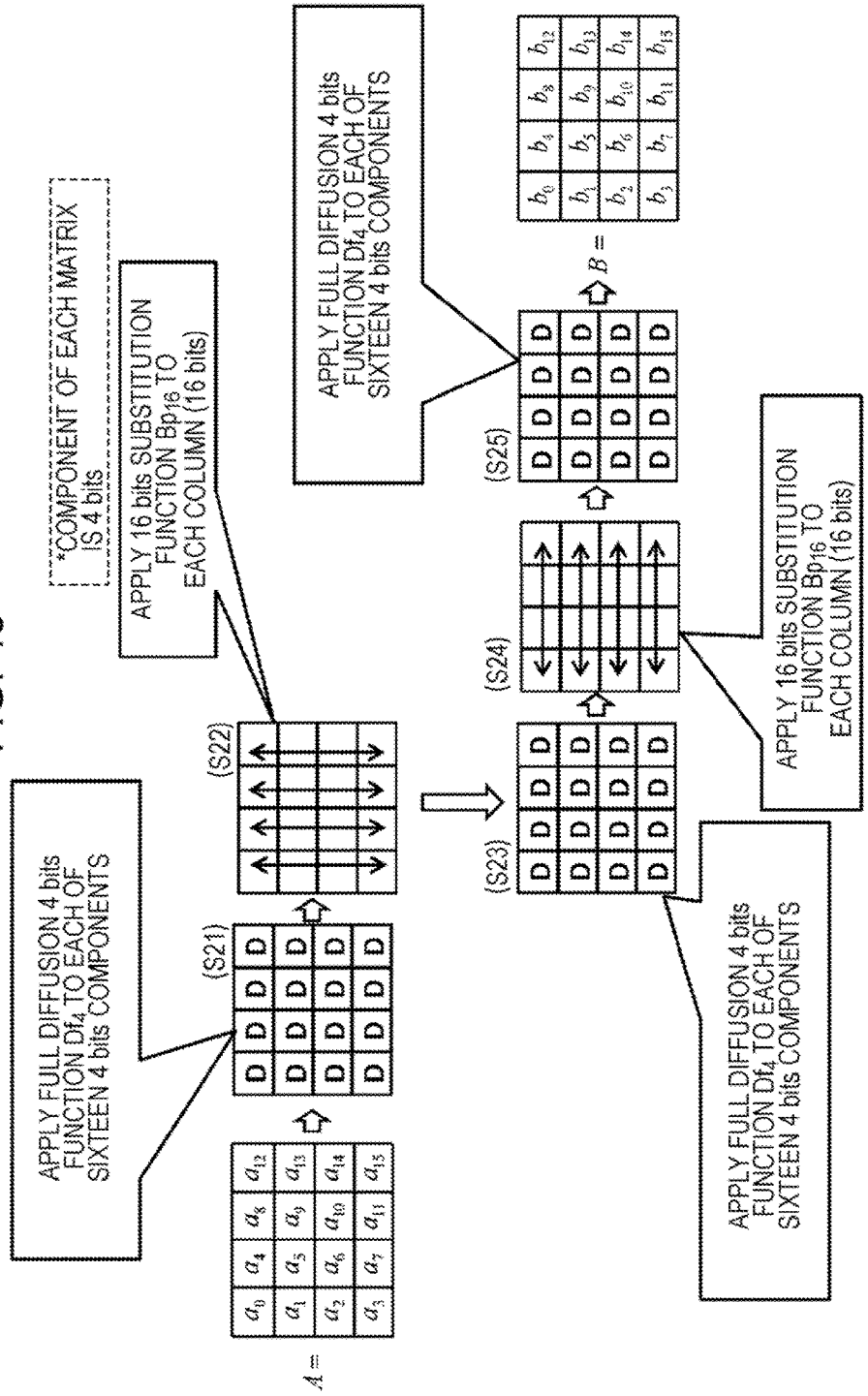
FIG. 48 is an explanatory diagram illustrating an example of the key conversion process of applying the full diffusion 4-bit function and the 16-bit substitution function.

FIG. 48 is also a diagram illustrating an example (process example 2) of the key conversion process to which the G function formed by the following two functions and having the full diffusion property is applied:
(a) a full diffusion 4-bit function ($Df_4$); and
(b) a 16-bit substitution function ($Bp_{16}$).

Here, A is assumed to be a base key and B is assumed to be a conversion key. Both of the keys are 4*4 state data in which each component has 4 bits.

In the example illustrated in FIG. 48, a process of generating the conversion key B from the base key A is configured to include five steps below:

(S21) a step of applying the full diffusion 4-bit function ($Df_4$) to each of the sixteen 4-bit components of the base key A to execute the conversion;
(S22) a step of applying the 16-bit substitution function ($Bp_{16}$) to each of the 16-bit data at each column of the data (4*4 state) generated through the conversion process of step S21 to execute the conversion;
(S23) a step of applying the full diffusion 4-bit function ($Df_4$) to each of the sixteen 4-bit components of data (4*4 state) generated through the conversion process of step S22 to execute the conversion;
(S24) a step of applying the 16-bit substitution function ($Bp_{16}$) to each of the 16-bit data at each row of the data (4*4 state) generated through the conversion process of step S23 to execute the conversion; and
(S25) a step of applying the full diffusion 4-bit function ($Df_4$) to each of the sixteen 4-bit components of data (4*4 state) generated through the conversion process of step S24 to execute the conversion.

Through such a process, the conversion key B is generated from the base key A.

Each of the components $b_0$ to $b_{15}$ of the conversion key B is data receiving the influence of each of the components $a_0$ to $a_{15}$ of the base key A. The full diffusion property is ensured between the base key A and the conversion key B.

Figure 49:
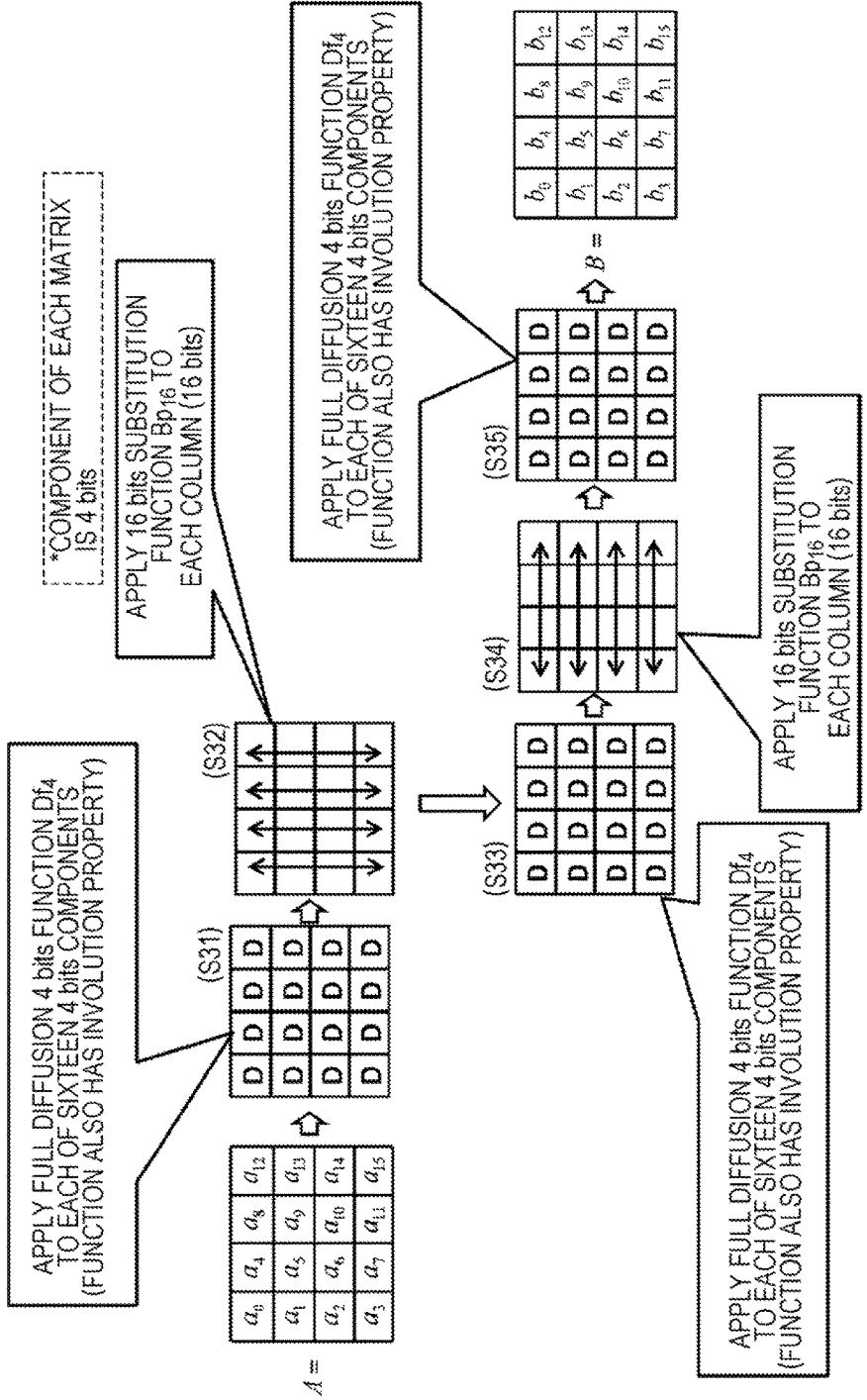
FIG. 49 is an explanatory diagram illustrating an example of the key conversion process of applying the full diffusion 4-bit function and the 16-bit substitution function.

FIG. 49 is also a diagram illustrating an example (process example 3) of the key conversion process to which the G function formed by the following two functions and having the full diffusion property is applied:
(a) a full diffusion 4-bit function ($Df_4$); and
(b) a 16-bit substitution function ($Bp_{16}$).

Here, A is assumed to be a base key and B is assumed to be a conversion key. Both of the keys are 4*4 state data in which each component has 4 bits.

The G function is applied in the process example 3.

The (a) full diffusion 4-bit function ($Df_4$) is a function that also has the involution property.

In the example illustrated in FIG. 49, a process of generating the conversion key B from the base key A is configured to include five steps below:

(S31) a step of applying the 4-bit function ($Df_4$) having the involution property and the full diffusion property to each of the sixteen 4-bit components of the base key A to execute the conversion;

(S32) a step of applying the 16-bit substitution function ($Bp_{16}$) to each of the 16-bit data at each column of the data (4*4 state) generated through the conversion process of step S31 to execute the conversion;

(S33) a step of applying the 4-bit function ($Df_4$) having the involution property and the full diffusion property to each of the sixteen 4-bit components of the data (4*4 state) generated through the conversion process of step S32 to execute the conversion;

(S34) a step of applying the 16-bit substitution function ($Bp_{16}$) to each of the 16-bit data at each row of the data (4*4 state) generated through the conversion process of step S33 to execute the conversion; and (S35) a step of applying the 4-bit function ($Df_4$) having the involution property and the full diffusion property to each of the sixteen 4-bit components of the data (4*4 state) generated through the conversion process of step S34 to execute the conversion.

Through such a process, the conversion key B is generated from the base key A.

Each of the components $b_0$ to $b_{15}$ of the conversion key B is data receiving the influence of each of the components $a_0$ to $a_{15}$ of the base key A. The full diffusion property is ensured between the base key A and the conversion key B. Further, both functions of the (a) full diffusion 4-bit function ($Df_4$) and the (b) 16-bit substitution function ($Bp_{16}$) have the involution property, and the involution property is ensured between the base key A and the conversion key B.

Figure 50:
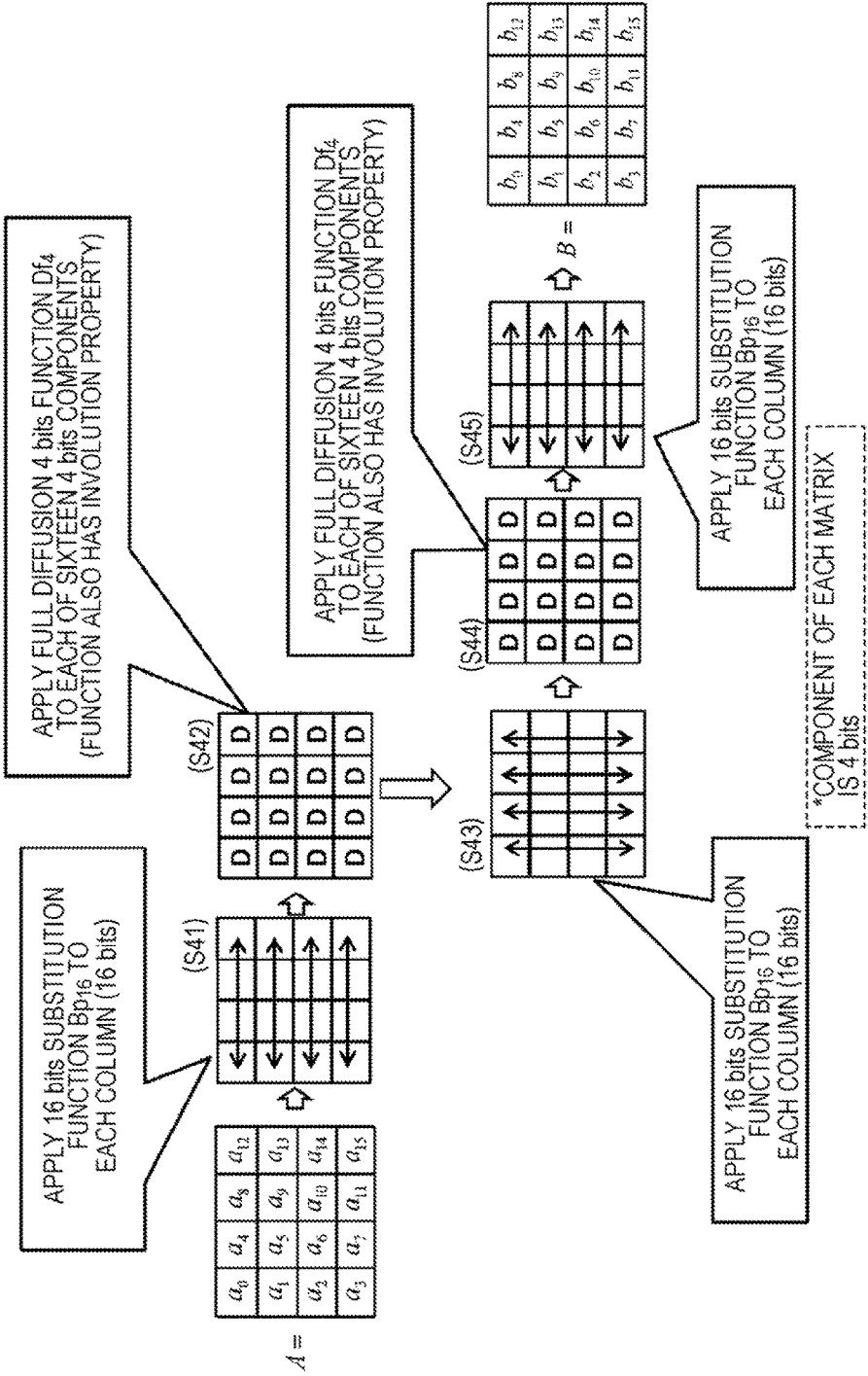
FIG. 50 is an explanatory diagram illustrating an example of the key conversion process of applying the full diffusion 4-bit function and the 16-bit substitution function.

FIG. 50 is also a diagram illustrating an example (process example 4) of the key conversion process to which the G function formed by the following two functions and having the full diffusion property is applied:

(a) a full diffusion 4-bit function ($Df_4$); and
(b) a 16-bit substitution function ($Bp_{16}$).

Here, A is assumed to be a base key and B is assumed to be a conversion key. Both of the keys are 4*4 state data in which each component has 4 bits.

The G function is applied in the process example 4.

The (a) full diffusion 4-bit function ($Df_4$) is a function that also has the involution property.

In the example illustrated in FIG. 50, a process of generating the conversion key B from the base key A is configured to include five steps below:

(S41) a step of applying the 16-bit substitution function ($Bp_{16}$) to each of the 16-bit data at each column of the base key A (4*4 state) to execute the conversion;

(S42) a step of applying the 4-bit function ($Df_4$) having the involution property and the full diffusion property to each of the sixteen 4-bit components of the data (4*4 state) generated through the conversion process of step S41 to execute the conversion;

(S43) a step of applying the 16-bit substitution function ($Bp_{16}$) to each of the 16-bit data at each column of the data (4*4 state) generated through the conversion process of step S42 to execute the conversion;

(S44) a step of applying the 4-bit function ($Df_4$) having the involution property and the full diffusion property to each of the sixteen 4-bit components of the data (4*4 state) generated through the conversion process of step S43 to execute the conversion; and (S45) a step of applying the 16-bit substitution function ($Bp_{16}$) to each of the 16-bit data at each row of the data (4*4 state) generated through the conversion process of step S44 to execute the conversion.

Through such a process, the conversion key B is generated from the base key A.

Each of the components $b_0$ to $b_{15}$ of the conversion key B is data receiving the influence of each of the components $a_0$ to $a_{15}$ of the base key A. The full diffusion property is ensured between the base key A and the conversion key B. Further, the both functions of the (a) full diffusion 4-bit function ($Df_4$) and the (b) 16-bit substitution function ($Bp_{16}$) have the involution property, the involution property is ensured between the base key A and the conversion key B.

Figure 51:
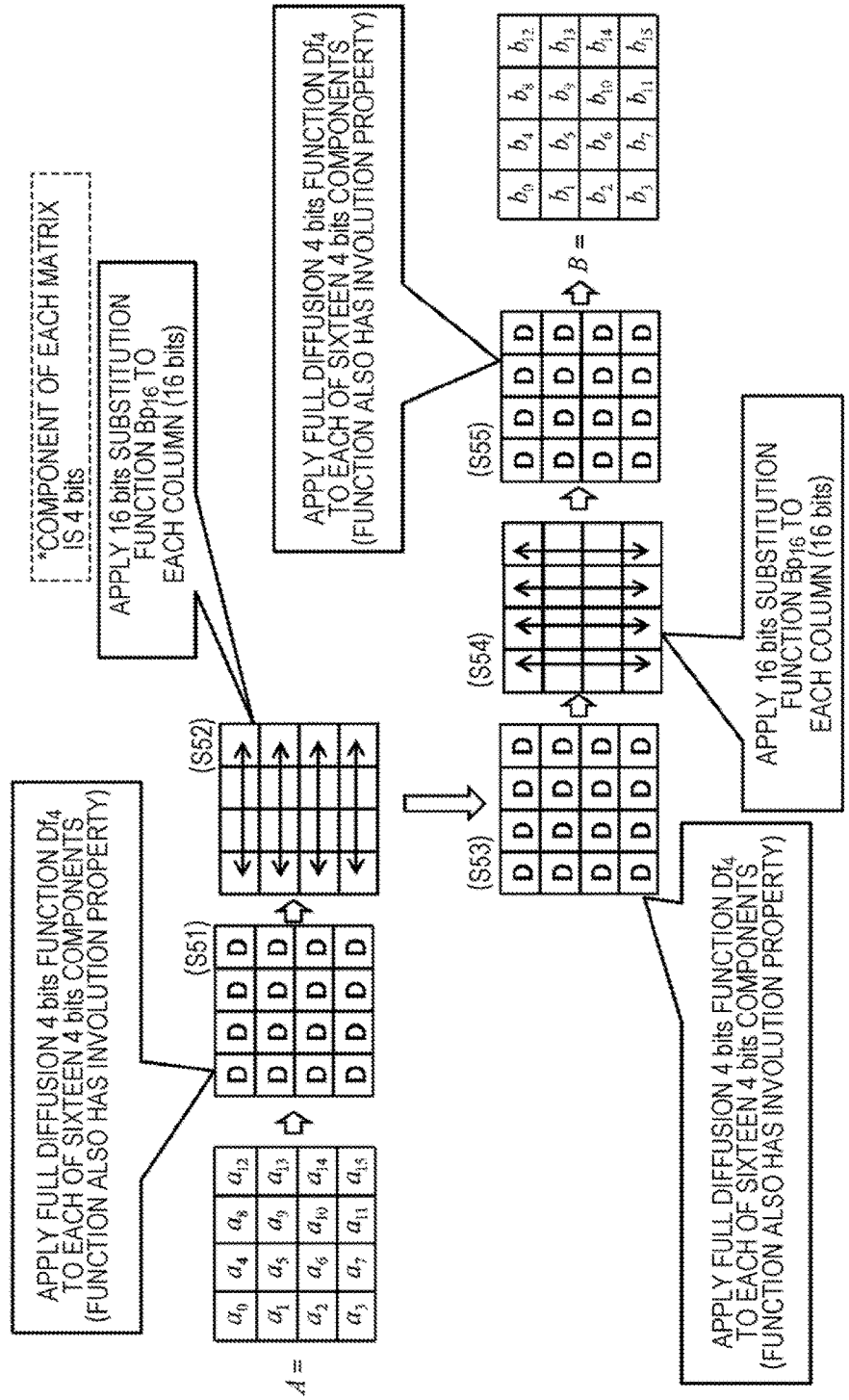
FIG. 51 is an explanatory diagram illustrating an example of the key conversion process of applying the full diffusion 4-bit function and the 16-bit substitution function.

FIG. 51 is also a diagram illustrating an example (process example 5) of the key conversion process to which the G function formed by the following two functions and having the full diffusion property is applied:

(a) a full diffusion 4-bit function ($Df_4$); and
(b) a 16-bit substitution function ($Bp_{16}$).

Here, A is assumed to be a base key and B is assumed to be a conversion key. Both of the keys are 4*4 state data in which each component has 4 bits.

The G function is applied in the process example 5.

The (a) full diffusion 4-bit function ($Df_4$) is a function that also has the involution property.

In the example illustrated in FIG. 51, a process of generating the conversion key B from the base key A is configured to include five steps below:

(S51) a step of applying the 4-bit function ($Df_4$) having the involution property and the full diffusion property to each of the sixteen 4-bit components of the base key A to execute the conversion;

(S52) a step of applying the 16-bit substitution function ($Bp_{16}$) to each of the 16-bit data at each column of the data (4*4 state) generated through the conversion process of step S51 to execute the conversion;

(S53) a step of applying the 4-bit function ($Df_4$) having the involution property and the full diffusion property to each of the sixteen 4-bit components of the data (4*4 state) generated through the conversion process of step S52 to execute the conversion;

(S54) a step of applying the 16-bit substitution function ($Bp_{16}$) to each of the 16-bit data at each row of the data (4*4 state) generated through the conversion process of step S53 to execute the conversion; and (S55) a step of applying the 4-bit function ($Df_4$) having the involution property and the full diffusion property to each of the sixteen 4-bit components of the data (4*4 state) generated through the conversion process of step S54 to execute the conversion.

Through such a process, the conversion key B is generated from the base key A.

Each of the components $b_0$ to $b_{15}$ of the conversion key B is data receiving the influence of each of the components $a_0$ to $a_{15}$ of the base key A. The full diffusion property is ensured between the base key A and the conversion key B. Further, the both functions of the (a) full diffusion 4-bit function ($Df_4$) and the (b) 16-bit substitution function ($Bp_{16}$) have the involution property, the involution property is ensured between the base key A and the conversion key B.

The five configuration examples of the key conversion function G have been described with reference to FIGS. 47 to 51.

Such a key conversion function can be applied when the conversion key is generated from the base key K. The key conversion key can also be applied to the conversion process for the division keys generated by dividing the base key K described above with reference to FIG. 42.

The key conversion function applied to the two division keys has another setting.

Figure 52:
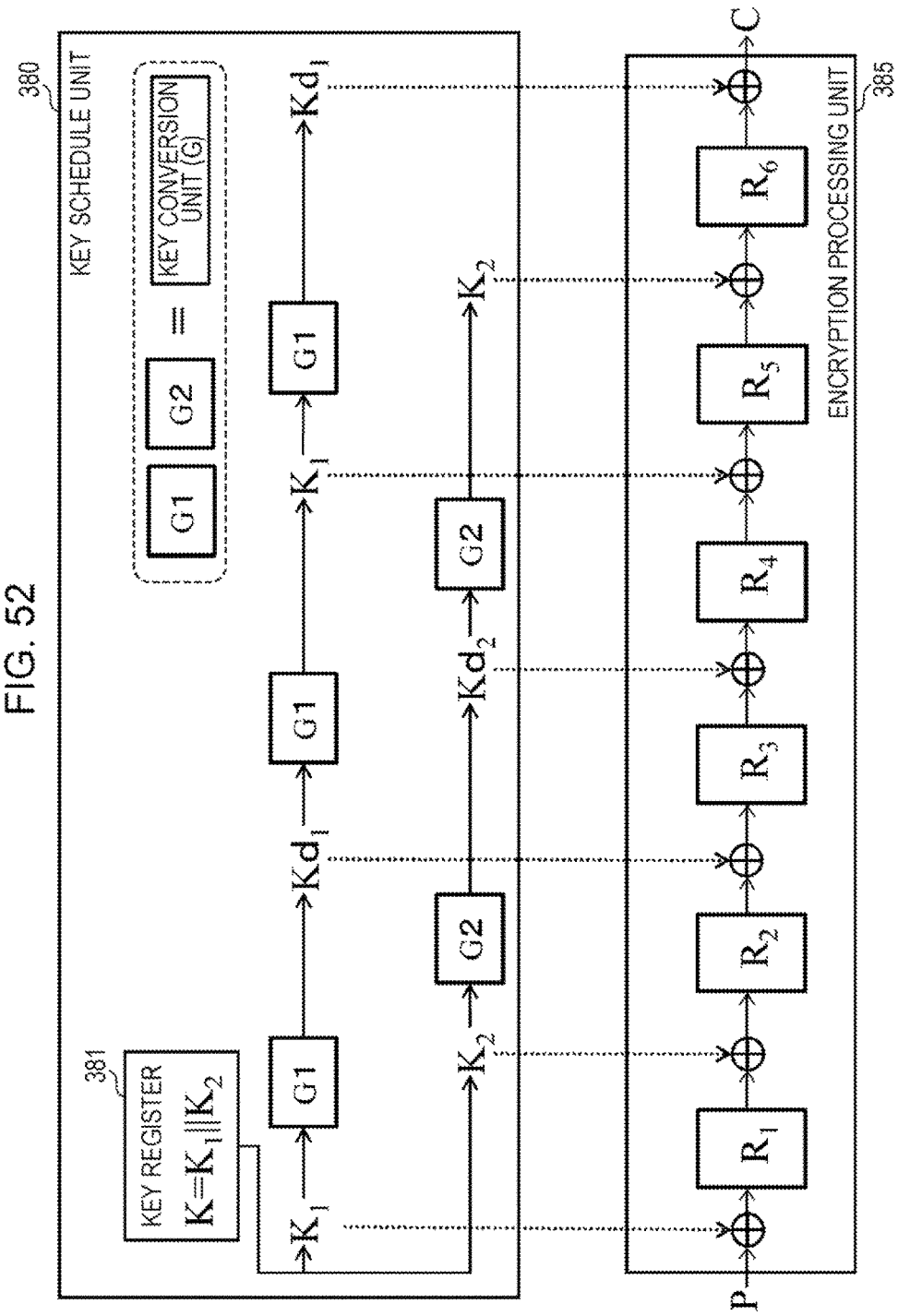
FIG. 52 is an explanatory diagram illustrating a setting example of substitution functions G1 and G2 for a division key.

An encryption processing device illustrated in FIG. 52 includes a key schedule unit 380 and an encryption processing unit 385. A secret key K generated in advance is stored in a key register 381 of the key schedule unit 380.

The secret key K is connection data of keys $K_1$ and $K_2$.

For example, the keys $K_1$ and $K_2$ are 64-bit keys and the secret key K which are the connection data is 128-bit data.

G1 and G2 illustrated in the drawing are key conversion units.

The key conversion units have at least the full diffusion property.

Alternatively, the key conversion units have the two properties, i.e., the full diffusion property and the involution property.

For example, the following setting can be realized in combinations of the key conversion functions G1 and G2.
(a) G1 and G2 have the full diffusion property, but have no involution property.
(b) G1 and G2 have the full diffusion property and the involution property.
(c) G1 and G2 have the full diffusion property and G1 and G2 have setting of an inverse function, a relation of "$G2=G1^{-1}$."

As the combinations of the key conversion functions G1 and G2, various kinds of setting can be realized, as described above.

<6. Configuration in which Improvement in Safety for Constant Input is Realized>

Next, an encryption processing device which inputs a constant to an encryption processing unit repeatedly executing round calculation and executes calculation of conversion target data or a round key and the constant so that the diffusion performance is improved will be described.

<6-1. Configuration and Problems of Related Art in which Improvement in Safety for Constant Input is Realized>

In order to exclude the sameness of a conversion process at each round in a configuration in which round calculation is repeatedly executed by a round function, configurations in which a different constant is applied at each round have been suggested in the related art.

Such a constant input process can be said to be an effective method since resistance against an attack called a slide attack or a reflection attack is improved.

First, an overview of a constant input configuration and problems of the related art type will be described.

Figure 53:
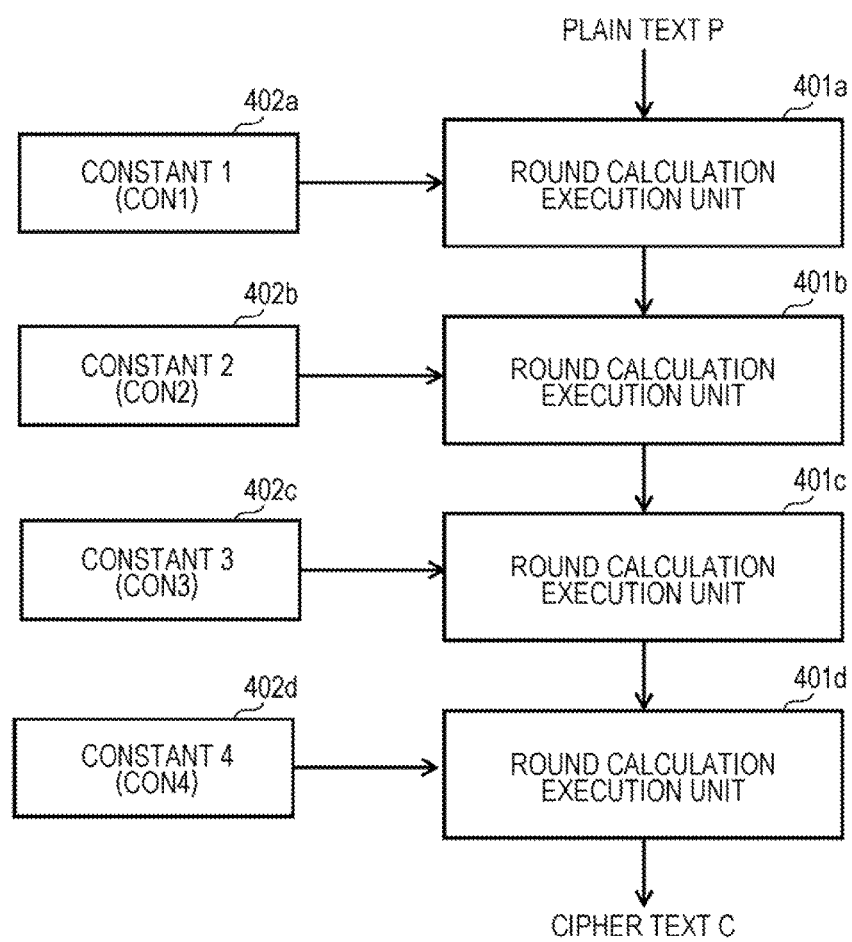
FIG. 53 is an explanatory diagram illustrating an example of a constant input configuration for the encryption processing unit.

As an example of the constant input configuration of the related art type, for example, there is a configuration illustrated in FIG. 53.

Round calculation execution units 401a to 401d illustrated in FIG. 53 are round function execution units that include an exclusive OR unit (round key calculation unit), a nonlinear conversion unit, and a linear conversion unit in the encryption processing unit.

Constant 1 (CON1) to constant 4 (CON4) are sequentially input to the round calculation execution units 401a to 401d.

The input constants CON are subjected to exclusive OR calculation with conversion data in the round calculation unit or round keys.

By executing the calculation by various constants in each round, the sameness between the round calculations is excluded and resistance against various attacks can be improved.

Next problems in the constant input configuration will be described.

In the encryption processing device, an encryption process and a decryption process can be executed by the same device by contriving setting of the round function.

Figure 54:
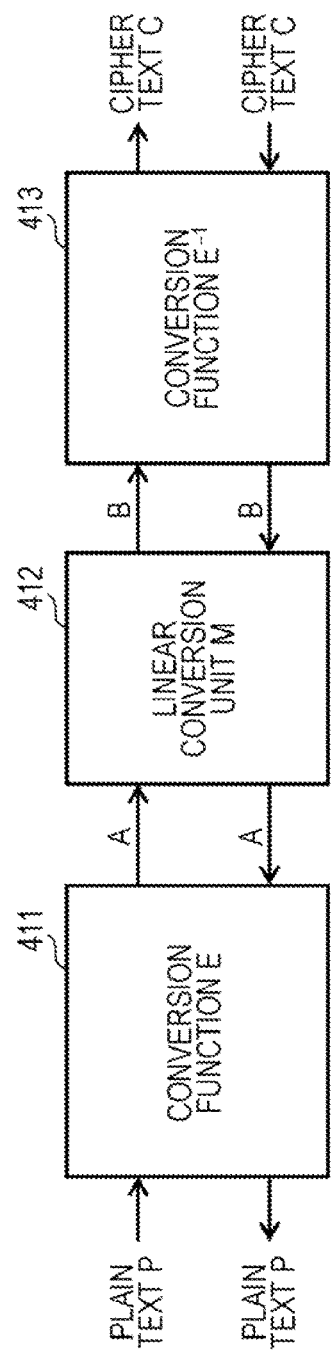
FIG. 54 is an explanatory diagram illustrating an example of the configuration of the encryption processing unit that has an involution property.

Specifically, as illustrated in FIG. 54, when the configuration of a plurality of conversion functions applied to the encryption processing unit of the encryption processing device are divided to the right and left sides from the center, the encryption process and the decryption process can be executed by the same device by forming a relation of an inverse function between the right half and the left half.

This device is referred to as an encryption processing device having the involution property.

In the example illustrated in FIG. 54, a conversion function E 411 and a conversion function $E^{-1}$ 413 have a relation of an inverse function. A linear conversion unit M at the center outputs an output B with respect to an input A and outputs an output A with respect to an input B.

The conversion function E 411, a linear conversion unit 412, and the conversion function $E^{-1}$ 413 are applied in this order to the plain text P to obtain the cipher text C.

The conversion units are applied in the same order to the cipher text C. That is, the original plain text P can be obtained by applying the conversion function E 411, the linear conversion unit 412, and the conversion function $E^{-1}$ 413 in this order.

Such an encryption processing device is referred to as an encryption processing device having the involution property. Among the encryption processing devices having the involution property, there are the encryption processing devices in which not only an execution sequence of the round functions is the same sequence in both of a forward direction and a backward direction but also an input order of the round keys applied at each round is the same in both of a forward direction and a backward direction.

For example, the key input sequence described above with reference to FIGS. 43A and 43B is one key input sequence in which the involution property of the encryption processing device is realized.

However, as one of the problems of the encryption processing device having the involution property, there is a safety problem.

This problem will be will be described with reference to FIGS. 55A and 55B.

FIG. 55A is an explanatory diagram illustrating a relation between data input and output values of the conversion units when constants are not input to the encryption processing device having the involution property.

"Constituent data=Y" of a part of the plain text P is assumed.

A conversion result of the data Y by the conversion function E 411 is assumed to be X.

The linear conversion unit 412 executes the linear conversion on the output value from the conversion function E 411, but directly outputs the value of constituent data (bits) of a part of the output value in some cases. A point at which input and output values are the same value in the linear conversion is referred to as a steady point. There are several steady points in the linear conversion process applied to many encryption processing devices.

In the example illustrated in FIG. 55A, an input value X to the linear conversion unit 412 is assumed to become an output X of the linear conversion unit 412 without conversion by an operation of the steady point of the linear conversion unit 412.

In this case, the value X is input to the conversion function $E^{-1}$ 413. Since the conversion function $E^{-1}$ 413 is an inverse function of the conversion function E 411, the input value X returns to the original value Y.

That is, the output value Y of a part of the cipher text C may become the same value as the constituent value Y of the input plain text P. That is, a steady point at which the input and output values are the same also occurs in the entire encryption processing device.

Such a nature is a nature that results in vulnerability to various attacks and is an undesirable nature in that the safety of the encryption processing device is impaired.

Figure 55B:
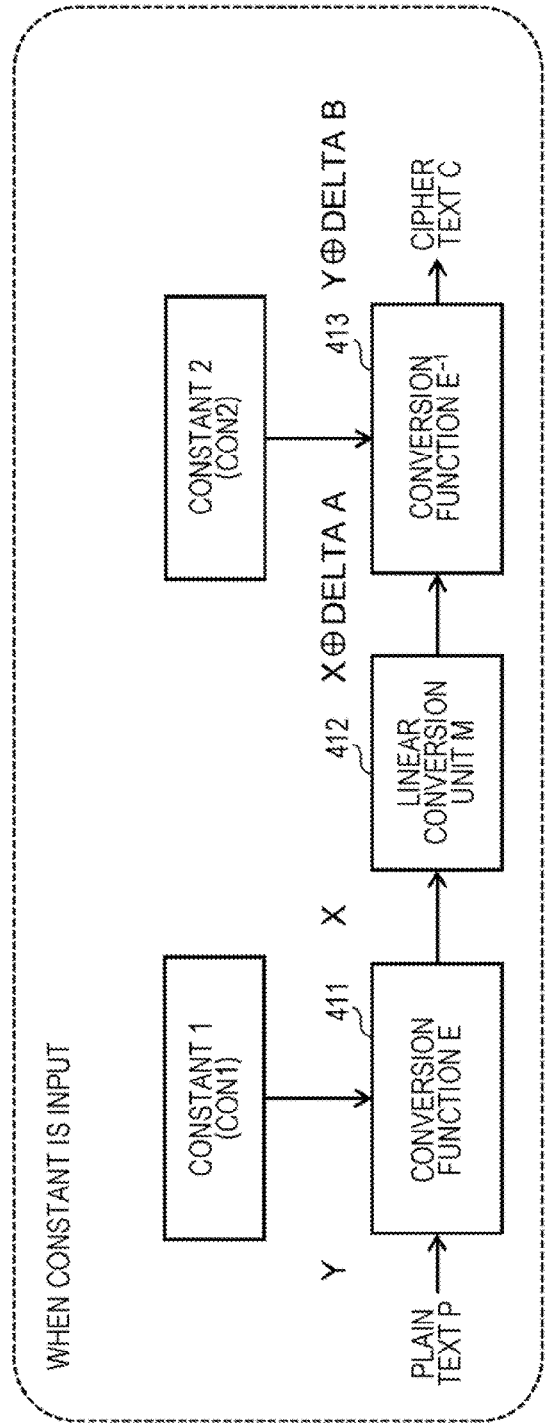
FIG. 55B is an explanatory diagram illustrating problems of the encryption processing unit that has an involution property.

FIG. 55B illustrates the encryption processing device having the involution property, as in FIG. 55A. However, the conversion function E 411 is configured to execute calculation in which constant 1 (CON1) is input and execute calculation in which constant 2 (CON2) is input to the conversion function $E^{-1}$ 413.

A relation between data input and output values of the conversion units at the time of input of such constants is illustrated.

"Constituent data=Y" of a part of the plain text P is assumed.

A conversion result of the data Y by the conversion function E 411 is assumed to be X.

In this example, an input value X to the linear conversion unit 412 is assumed to be converted into "X+deltaA" through a linear conversion process by the linear conversion unit 412.

In this case, the value "X+deltaA" is input to the conversion function $E^{-1}$ 413. The conversion function $E^{-1}$ 413 is an inverse function of the conversion function E 411, but is configured to execute calculation in which constant 2 (CON2) is input and is not a complete inverse function of the conversion function E 411 executing the calculation in which constant 1 (CON1) is input.

However, according to a method of selecting a constant, as illustrated, an output value corresponding to the input "X+deltaA" to the conversion function $E^{-1}$ 413 is set to be the same as "Y+deltaB" in some cases.

That is, a relation in which specific difference data is added to the input data occurs in some case as follows:
correspondence between input and output values of the linear conversion unit is X and "X+deltaA"; and
correspondence between input and output values of the encryption processing device is Y and "Y+deltaB."

Such a relation of the input and output data is also a nature that results in vulnerability to various attacks and is a undesirable nature in that the safety of the encryption processing device is impaired.

<6-2. Configuration of Encryption Processing Device Having Constant Input Configuration in which Safety is High>

Next, the configuration of an encryption processing device that has a constant input configuration in which safety is high and the foregoing problem of the configuration of the related art is resolved will be described.

An example of the configuration of the encryption processing device according to the embodiment will be described with reference to FIG. 56 and the subsequent drawings.

Figure 56:
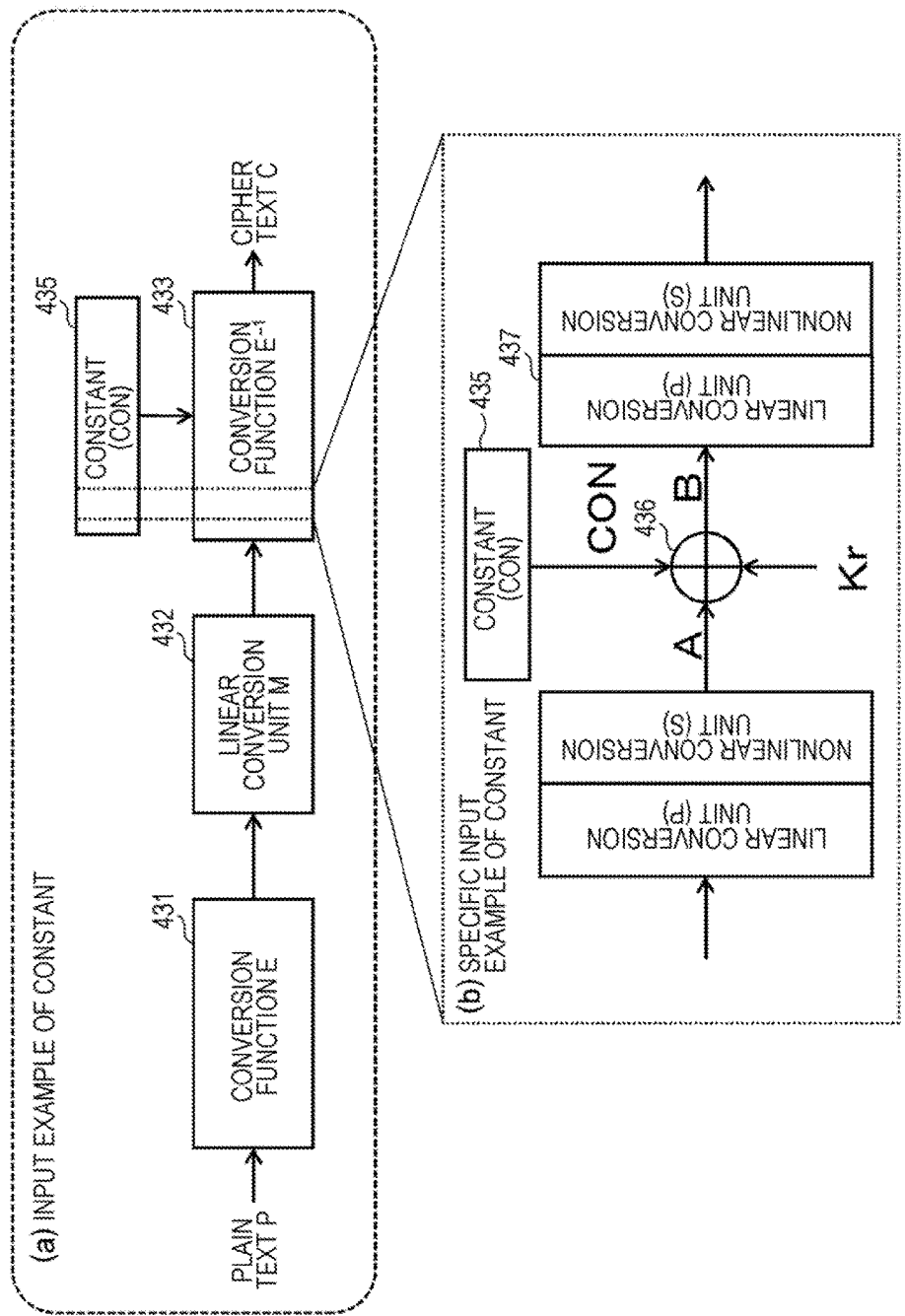
FIG. 56 is an explanatory diagram illustrating an example of the constant input configuration for the encryption processing unit.

FIG. 56 is an explanatory diagram illustrating an example of the constant input configuration in the encryption processing unit according to the embodiment.

In (a) of FIG. 56, the encryption processing unit configured to include data conversion units having the involution is illustrated, as described with reference to FIG. 54.

That is, the encryption processing unit includes the data conversion units below:
a conversion function E 431;
a linear conversion unit 432; and
a conversion function $E^{-1}$ 433.

The conversion function $E^{-1}$ 433 is an inverse function of the conversion function E 431.

In the embodiment, a constant (CON) 435 is input to the conversion function $E^{-1}$ 433.

The conversion function $E^{-1}$ 433 is configured to include a plurality of round functions and the constant (CON) is configured to be input to one or more round function units.

In the embodiment illustrated herein, the input unit of the constant (CON) is set to input the constant to the conversion function $E^{-1}$ 433, but may be set to input the constant to the side of the conversion function E 431.

That is, the encryption processing unit has the involution property in which the conversion function E 431 and the conversion function $E^{-1}$ 433 which is an inverse function of the conversion function E 431 are sequentially executed and is configured to execute round calculation in which one or more constants are applied to only one of the conversion function E and the inverse function $E^{-1}$.

(b) of FIG. 56 illustrates a specific example of the input configuration of the constant (CON) 435. The constant (CON) 435 is input to an exclusive OR unit 436 on the front stage of a linear conversion unit 437 of the encryption processing unit. Exclusive OR calculation with input data A to the exclusive OR unit 436 is executed.

The exclusive OR unit 436 is a round key calculation unit that executes exclusive OR calculation with a round key Kr. The exclusive OR unit 436 executes the exclusive OR calculation of the data A which is an output from the round calculation unit on the illustrated front stage, the round key Kr, and the constant CON.

That is, the exclusive OR unit 436 calculates B as the following calculation execution result and outputs B to the linear conversion processing unit 437 of the round calculation unit on the rear stage:

$$B = A(+)Kr(+)CON.$$

In the expression above, (+) indicates the exclusive OR calculation.

In the configuration, the following condition is set as a condition of the input constant (CON) 435.
condition: a difference between input and output values in the linear conversion process of the linear conversion unit adjacent to the exclusive OR unit 437, i.e., the linear conversion unit 437 in the illustrated example, is set as a value which does not decrease.

Specifically, the foregoing condition is a condition in which all of the components obtainable as results of matrix calculation of the constant CON and a linear conversion matrix applied in the linear conversion unit 437 are non-zero, i.e., values which are not zero.

The condition will be described with reference to FIG. 57.

Figure 57:
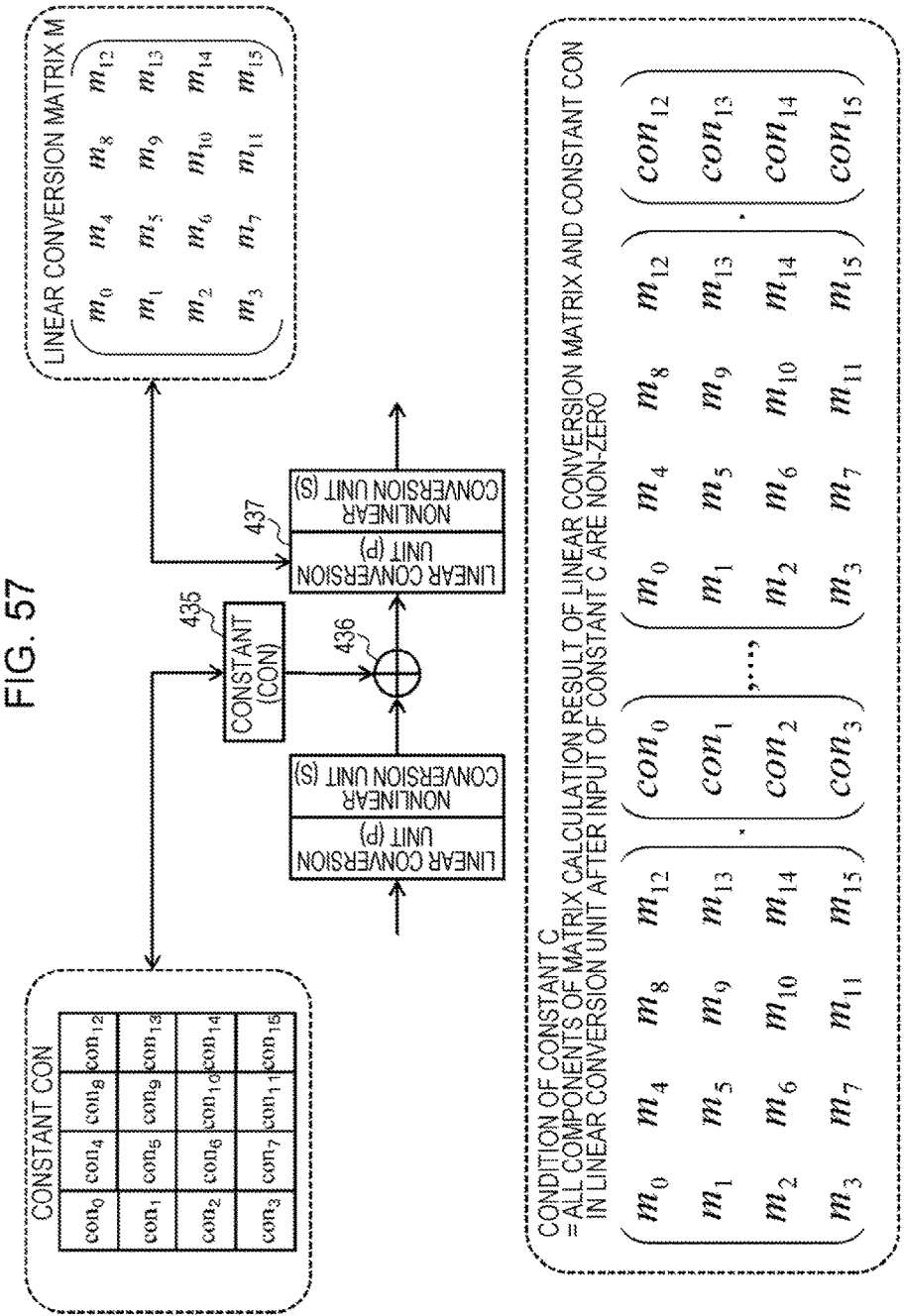
FIG. 57 is an explanatory diagram illustrating an example of the constant input configuration for the encryption processing unit.

FIG. 57 illustrates a 4*4 matrix that forms the constant CON 435 input to the exclusive OR unit 436 and a linear conversion matrix M used in the linear conversion unit 437.

The constant CON 435 is a 4*4 state in which each of the components ($con_0$ to $con_{15}$) is 4-bit data and 64-bit data.

The linear conversion matrix M is 4*4 matrix data.

That is, the linear conversion matrix M is a linear conversion matrix shown below.

$$\begin{pmatrix} m_0 & m_4 & m_8 & m_{12} \\ m_1 & m_5 & m_9 & m_{13} \\ m_2 & m_6 & m_{10} & m_{14} \\ m_3 & m_7 & m_{11} & m_{15} \end{pmatrix} \quad \text{[Math. 12]}$$

The condition of the constant CON is a condition in which all of the components obtainable as a result of matrix calculation of the constant CON and a linear conversion matrix applied in the linear conversion unit 437 are non-zero, i.e., values which are not zero.

That is, all of the values obtainable through matrix calculation below are non-zero.

$$\begin{pmatrix} m_0 & m_4 & m_8 & m_{12} \\ m_1 & m_5 & m_9 & m_{13} \\ m_2 & m_6 & m_{10} & m_{14} \\ m_3 & m_7 & m_{11} & m_{15} \end{pmatrix} \cdot \begin{pmatrix} con_0 \\ con_1 \\ con_2 \\ con_3 \end{pmatrix}, \ldots, \quad \text{[Math. 13]}$$

$$\begin{pmatrix} m_0 & m_4 & m_8 & m_{12} \\ m_1 & m_5 & m_9 & m_{13} \\ m_2 & m_6 & m_{10} & m_{14} \\ m_3 & m_7 & m_{11} & m_{15} \end{pmatrix} \cdot \begin{pmatrix} con_{12} \\ con_{13} \\ con_{14} \\ con_{15} \end{pmatrix}$$

The constant CON is set such that all of the sixteen values calculated through the matrix calculation expression above are not zero, i.e., non-zero.

In such a setting, it is possible to prevent a decrease in the difference between the input and output values of the linear conversion process in the linear conversion unit adjacent to the exclusive OR unit to which the constant CON is input, i.e., the linear conversion unit 437 in the example illustrated in FIG. 57.

Consequently, it is possible to maintain the minimum difference active S-box number by a predetermined number or more.

A specific setting example of the constant CON will be described with reference to FIG. 58.

Figure 58:
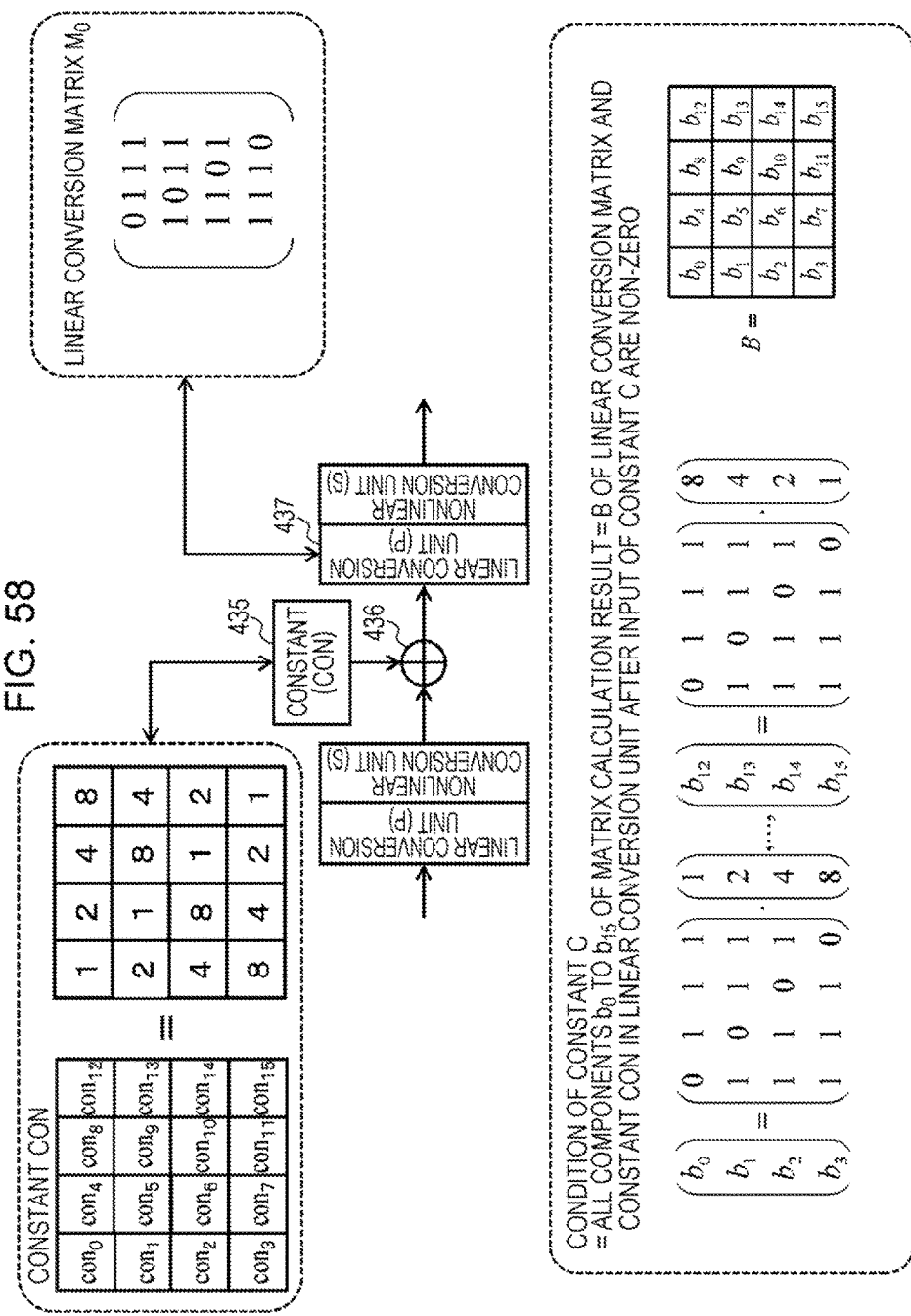
FIG. 58 is an explanatory diagram illustrating an example of the constant input configuration for the encryption processing unit.

In the example illustrated in FIG. 58, the linear conversion unit 437 adjacent to the exclusive OR unit 436 to which the constant CON 435 is input is set to a linear conversion unit P1 described above with reference to FIGS. 23 to 30. That is, this example is a setting example in which the column diffusion calculation (MixColumn) to which a matrix shown below is applied is executed.

$$M_0 = \begin{pmatrix} 0 & 1 & 1 & 1 \\ 1 & 0 & 1 & 1 \\ 1 & 1 & 0 & 1 \\ 1 & 1 & 1 & 0 \end{pmatrix} \quad \text{[Math. 14]}$$

The linear conversion unit 437 executes the column diffusion calculation (MixColumn) to which the foregoing matrix $M_0$ is applied, i.e., calculation below:

MC[$M_0$].

At this time, the condition of the constant CON is a condition in which all of the components obtainable as a result of matrix calculation of the constant CON and the linear conversion matrix $M_0$ applied in the linear conversion unit 437 are non-zero, i.e., values which are not zero.

The example of such a constant CON is the constant CON illustrated in FIG. 58 and is a 4*4 state that has a configuration of components below.

| $con_0$ | $con_4$ | $con_8$ | $con_{12}$ |   | 1 | 2 | 4 | 8 | [Math. 15] |
|---------|---------|---------|------------|---|---|---|---|---|------------|
| $con_1$ | $con_5$ | $con_9$ | $con_{13}$ | = | 2 | 1 | 8 | 4 | |
| $con_2$ | $con_6$ | $con_{10}$ | $con_{14}$ |   | 4 | 8 | 1 | 2 | |
| $con_3$ | $con_7$ | $con_{11}$ | $con_{15}$ |   | 8 | 4 | 2 | 1 | |

The constant of the 4*4 state having the foregoing setting is input to the exclusive OR unit, which is adjacent to the linear conversion unit that executes the column diffusion calculation (MixColumn): Mc [$M_0$] to which the matrix $M_0$ is applied, to execute the exclusive OR calculation. In the configuration, the decrease in the difference by the linear conversion of the linear conversion unit is prevented. As a result, it is possible to prevent the decrease in the minimum difference active S-box number, and thus the encryption process configuration in which safety is high and the resistance against various attacks is improved is realized.

Figure 59:
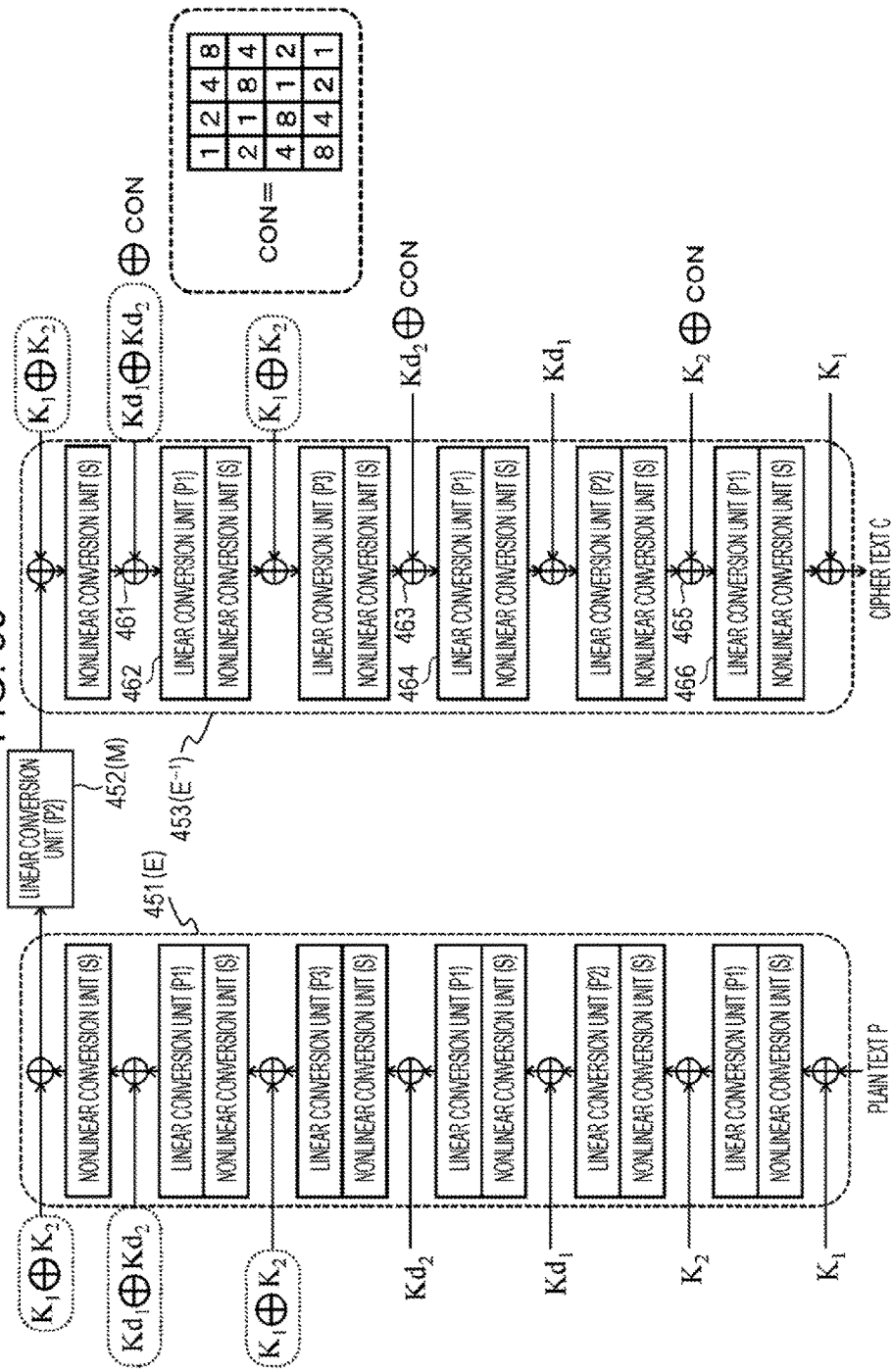
FIG. 59 is an explanatory diagram illustrating an example of the constant input configuration for the encryption processing unit.

FIG. 59 is a diagram illustrating an example of an input configuration and a calculation configuration of the round keys and the constant CON in the encryption processing unit of the encryption processing device having the input configuration of the constant CON satisfying the foregoing constant condition.

In FIG. 59, the plain text P is input from the left bottom and the cipher text C is output from the right bottom.

An encryption processing unit 451(E) of the encryption processing device illustrated in FIG. 59 corresponds to the conversion function E 431 illustrated in (a) of FIG. 56.

A linear conversion unit (P2) 452 corresponds to the linear conversion unit 432 illustrated in (a) of FIG. 56.

An encryption processing unit 453($E^{-1}$) corresponds to the conversion function $E^{-1}$ 433 illustrated in (a) of FIG. 56.

The configuration of the encryption processing device illustrated in FIG. 59 is an encryption processing device having the involution property.

An input example of the round keys illustrated in FIG. 59 corresponds to the example of the configuration described above with reference to FIGS. 43A and 43B. That is, an input order of the round keys to the exclusive OR unit configured in the encryption unit is as follows:
a key $K_1$,
a key $K_2$,
a conversion key $Kd_1$,
a conversion key $Kd_2$,
exclusive OR calculation keys $K_1(+)K_2$,
exclusive OR calculation conversion keys $Kd_1(+) Kd_2$,
the exclusive OR calculation keys $K_1(+)K_2$,
the exclusive OR calculation keys $K_1(+)K_2$,
the exclusive OR calculation conversion keys $Kd_1(+) Kd_2$,
the exclusive OR calculation keys $K_1(+)K_2$,
the conversion key $Kd_2$,
the conversion key $Kd_1$,
the key $K_2$, and
the key $K_1$.

In the setting illustrated in FIGS. 43A and 43B, the exclusive OR calculation keys $K_1(+)K_2$ are set to be input to the round calculation unit $R_6$. In the example illustrated in FIG. 59, however, the exclusive OR calculation keys $K_1(+)K_2$ are set to be repeatedly input before and after the linear conversion unit 452.

The configuration illustrated in FIG. 59 corresponds to a configuration when the round calculation unit $R_6$ illustrated in FIGS. 43A and 43B is set to a round calculation unit configured to include conversion units below:

the linear conversion unit 452;

two exclusive OR units of the exclusive OR calculation keys $K_1$ (+) $K_2$ before and after the linear conversion unit 452; and the nonlinear conversion unit.

A round key supply unit of the key schedule unit outputs six kinds of keys in the foregoing order. An inverse order of the input sequence of the keys is also the same sequence.

This means that the input order of the keys in the encryption process of generating the cipher text C from the plain text P and the input order of the keys in the decryption process of generating the plain text P from the cipher text C are set to be the same. That is, the input sequence of the keys is the input sequence of the keys having the involution property, hardware or a program applied to the encryption process and the decryption process can be commonalized, this setting contributes to the weight reduction (miniaturization) of the device.

In the configuration illustrated in FIG. 59, the constant CON is input to the exclusive OR units of the encryption processing unit 453($E^{-1}$), i.e., an exclusive OR unit 461, an exclusive OR unit 463, and an exclusive OR unit 465.

The constant CON is, for example, the constant CON of the 4*4 state described with reference to FIG. 58.

Linear conversion units 462, 464, and 466 respectively adjacent to the three exclusive OR units 461, 463, and 465 execute the column diffusion calculation (MixColumn) to which the above-described matrix $M_0$ is applied, i.e., the matrix below:

MC[$M_0$].

The encryption processing unit illustrated in FIG. 59 executes the inverse sequence of the sequence in which the cipher text C is generated from the plain text P, has the configuration of the involution in which the plain text P can also be generated from the cipher text C, and can execute the encryption process and the decryption process by applying the same hardware or the same program.

Since the input sequence of the keys is also the same sequence in the encryption process and the decryption process, a key supply process of the key schedule unit can also be executed as a process of applying the same hardware or the same program.

In the above-described constant input configuration, it is possible to prevent the decrease in the number of minimum difference active S-boxes, and thus the encryption process configuration in which safety is high and the resistance against various attacks is improved is realized.

There is a slight difference between an evaluation process based on the active S-boxes in a general encryption process and an evaluation process based on the active S-boxes in the constant input configuration according to the embodiment of the present disclosure. Thus, the difference will be described with reference to FIGS. 60 and 61.

As described above, the S-box that executes nonlinear conversion in units of s bits is used in the nonlinear conversion unit set with the common key block encryption.

As an index indicating the resistance against the difference attack, there are the minimum number of difference active S-boxes included in a difference path expressing a difference connection relation, i.e., the minimum difference active S-box number.

In general block encryption, nonlinear conversion is only a portion of a process by an S-box. As illustrated in (A) and (B) of FIG. 60, in block encryption devices executing block encryption, data P1 and data P2 having a specific difference deltaX are separately input and encryption process results C1 and C2 are obtained.

In the two encryption processes (A) and (B), the S-box to which the difference value is input is defined as an active S-box. By specifying the S-box to which the difference value is input, easiness of analysis is improved. That is, the resistance against attacks becomes weak.

Figure 60:
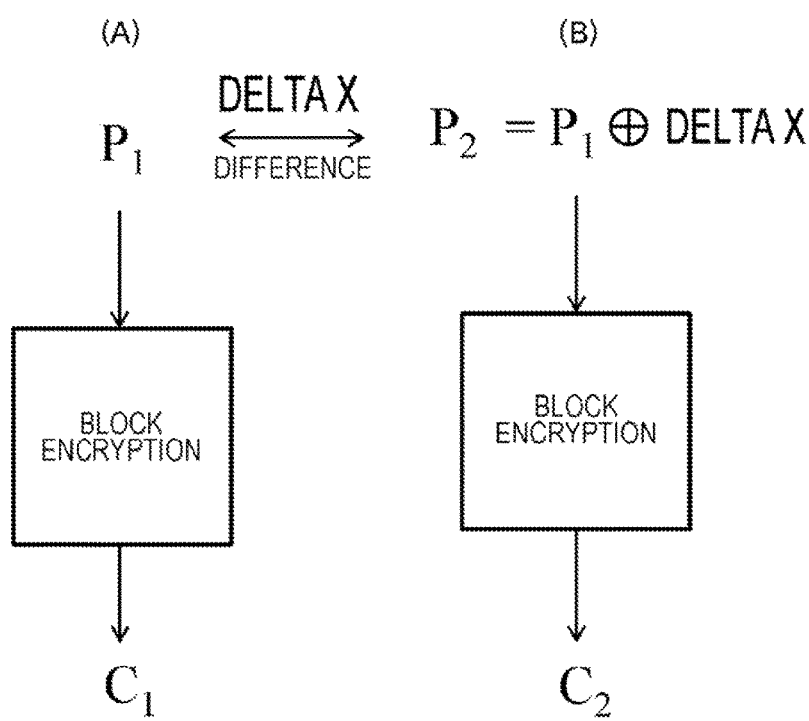
FIG. 60 is an explanatory diagram illustrating a safety evaluation process based on an active S-box.

In general, as illustrated in FIG. 60, the number of S-boxes to which the difference value occurring at the time of setting of the two inputs P1 and P2 having the predetermined difference deltaX is input is defined as the active S-boxes. By counting this number, safety evaluation is executed.

Figure 61:
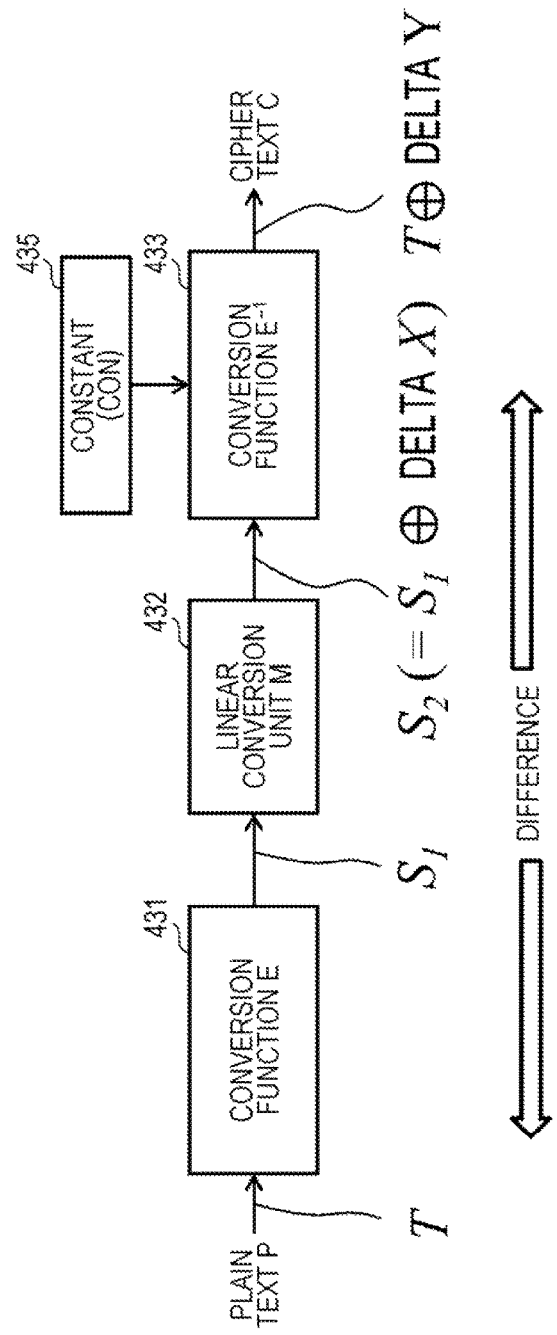
FIG. 61 is an explanatory diagram illustrating the safety evaluation process based on the active S-box.

FIG. 61 illustrates an encryption processing unit configured to include a data conversion unit having the involution property illustrated in (a) of FIG. 56 described above.

That is, the encryption processing unit includes the data conversion units below:

the conversion function E 431;

the linear conversion unit 432; and the conversion function $E^{-1}$ 433.

The conversion function $E^{-1}$ 433 is an inverse function of the conversion function E431.

The constant (CON) 435 is input to the conversion function $E^{-1}$ 433.

The conversion function $E^{-1}$ 433 is configured to include a plurality of round functions and the constant (CON) is configured to be input to one or more round function units.

The encryption processing unit has the involution property in which the conversion function E 431 and the conversion function $E^{-1}$ 433 which is an inverse function of the conversion function E 431 are sequentially executed and is configured to execute round calculation in which one or more constants are applied to only one of the conversion function E and the inverse function $E^{-1}$.

In the configuration, an input $S_1$ is input from the side of the linear conversion unit 432 to the conversion function E 431 and an output T is obtained.

On the other hand, an input $S_2$ (=$S_1$ (+) deltaX) to which a difference value deltaX is added to the foregoing input value $S_1$ is likewise input from the side of the linear conversion unit 432 to the conversion function $E^{-1}$ 433 and an output T (+) deltaY is obtained.

When the input values S1 and S2 having the difference deltaX are input in an inverse direction to the two functions, i.e., the conversion function E 431 and the conversion function $E^{-1}$433 which is an inverse function of the conversion function E 431, as illustrated in FIG. 61, the S-box to which the difference is input is set as the active S-box among the S-boxes located at corresponding positions in the functions.

Figure 62:
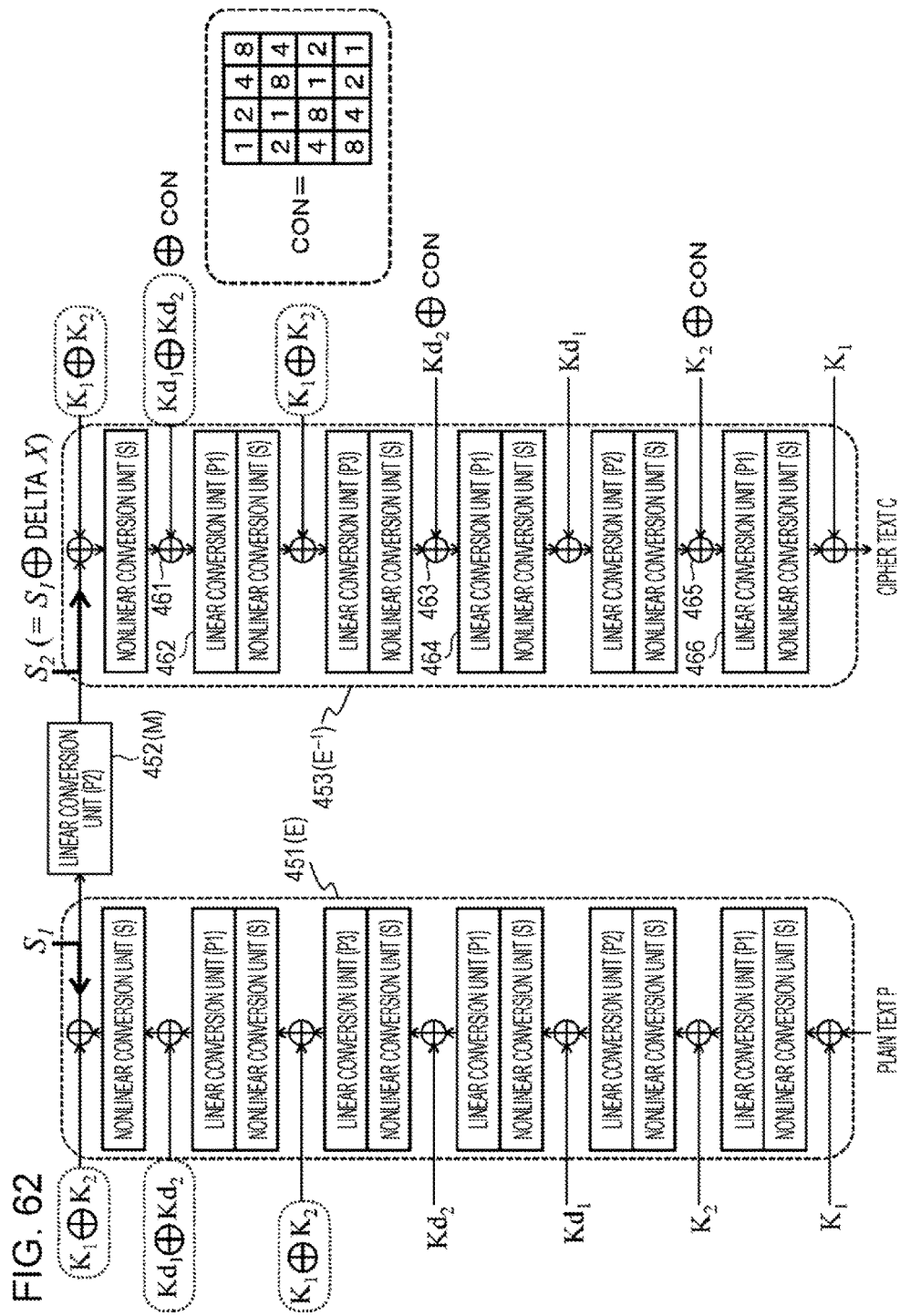
FIG. 62 is an explanatory diagram illustrating the safety evaluation process based on the active S-box.

FIG. 62 is an explanatory diagram illustrating a configuration in which the number of active S-boxes is calculated in the encryption process configuration illustrated in FIG. 59 described above.

An input value S1 is input from the side of the linear conversion unit 452 of the encryption processing unit 451(E) of the encryption processing device illustrated in FIG. 62 and an encryption process in which the encryption processing unit 451(E) is applied is executed.

On the other hand, an input value S2 in which a difference deltaX from the input value S1 is set is input from the side of the linear conversion unit 452 of the encryption processing unit 453($E^{-1}$) which is an inverse function of the encryption processing unit 451(E), and an encryption process in which the encryption processing unit 453($E^{-1}$) is applied is executed.

The S-box to which the difference is input is set as the active S-box among the S-boxes located at corresponding positions in the encryption processing units (E) and ($E^{-1}$) in the two encryption processes.

When the number of active S-boxes decreases, for example, the resistance against an attack called a slide attack or a reflection attack becomes weak. By maintaining a given number or more of active S-boxes, it is possible to improve the resistance against such an attack. Thus, it is possible to improve safety. In the above-described constant input configuration, it is possible to prevent the decrease in the number of minimum difference active S-boxes, and thus the encryption process configuration in which safety is high and the resistance against various attacks is improved is realized.

<6-3. Variation in Constant Insertion Position>

In the above-described embodiment, the configuration in which the round calculation, in which the constant CON is input to only one of the function E and the inverse function $E^{-1}$ and the constant is applied, is executed has been described in the encryption processing device having the involution property and sequentially executing the data conversion function E and the inverse function $E^{-1}$ of the data conversion function E.

In such a setting, it is possible to prevent a decrease in the difference between the input and output values of the linear conversion process in the linear conversion unit adjacent to the exclusive OR unit to which the constant CON is input, i.e., the linear conversion unit 437 in the example illustrated in FIG. 57. Consequently, it is possible to maintain the minimum difference active S-box number by a predetermined number or more.

The constant input configuration is not limited to only one of the function E and the inverse function $E^{-1}$, but may be a configuration in which round calculation in which a constant is applied to both of the function E and the inverse function $E^{-1}$ once or more times is executed. However, a constant application position is assumed to be a position (non-correspondence position) deviated from a correspondence position rather than the correspondence position of the function E and the inverse function $E^{-1}$.

Figure 63:
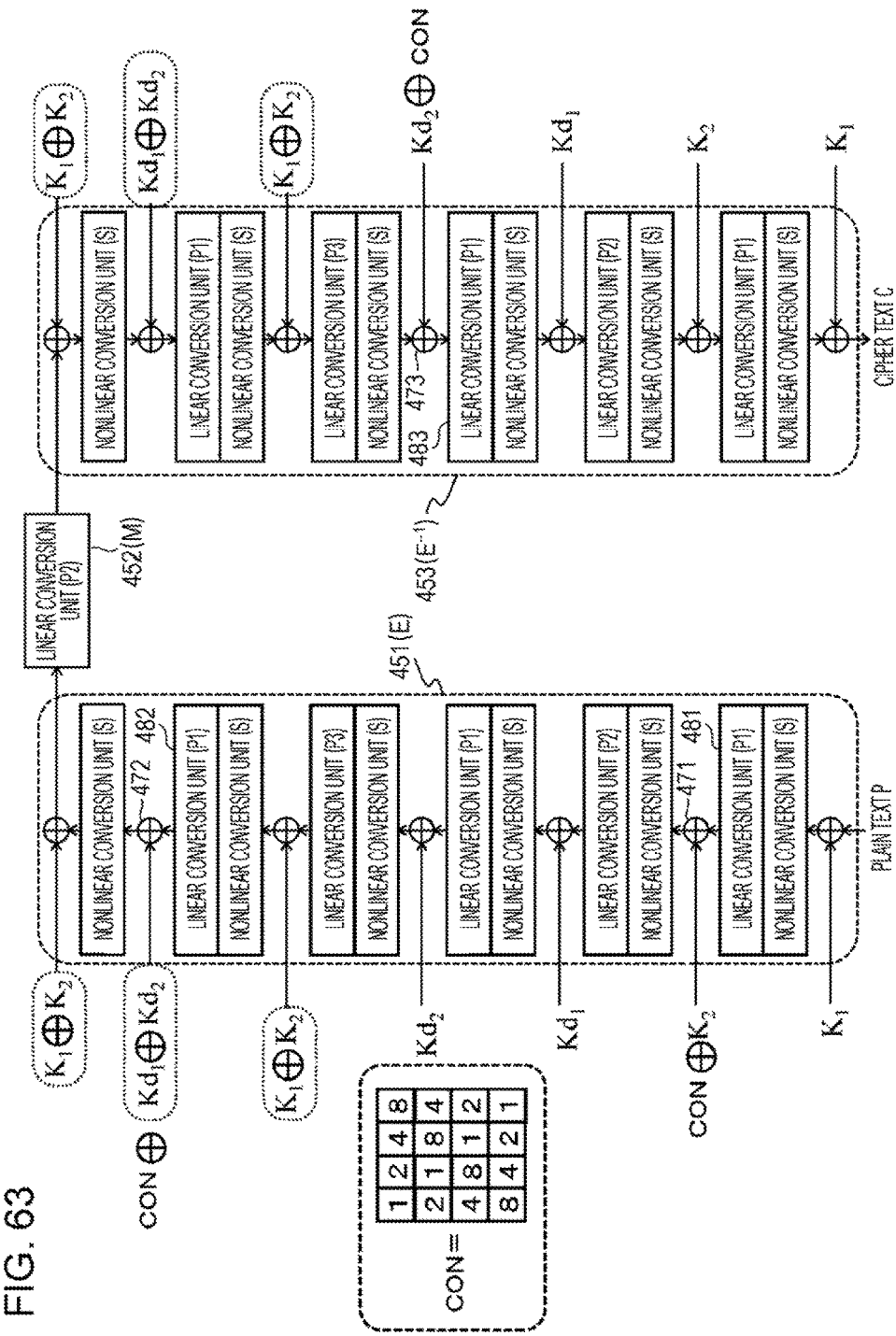
FIG. 63 is an explanatory diagram illustrating an example of the constant input configuration for the encryption processing unit.

An example of the configuration of the encryption processing device having the constant input configuration is illustrated in FIG. 63.

In FIG. 63, the plain text P is input from the left bottom and the cipher text C is output from the right bottom.

An encryption processing unit 451(E) of the encryption processing device illustrated in FIG. 63 corresponds to the conversion function E 431 illustrated in (a) of FIG. 56.

A linear conversion unit (P2) 452 corresponds to the linear conversion unit 432 illustrated in (a) of FIG. 56.

An encryption processing unit 453($E^{-1}$) corresponds to the conversion function $E^{-1}$ 433 illustrated in (a) of FIG. 56.

The configuration of the encryption processing unit illustrated in FIG. 63 is an encryption processing unit having the involution property.

An input example of the round keys illustrated in FIG. 63 corresponds to the example of the configuration described above with reference to FIGS. 43A and 43B. That is, an input order of the round keys to the exclusive OR unit configured in the encryption processing unit is as follows:

a key $K_1$,
a key $K_2$,
a conversion key $Kd_1$,
a conversion key $Kd_2$,
exclusive OR calculation keys $K_1(+)K_2$,
exclusive OR calculation conversion keys $Kd_1(+) Kd_2$,
the exclusive OR calculation keys $K_1(+)K_2$,
the exclusive OR calculation keys $K_1(+)K_2$,
the exclusive OR calculation conversion keys $Kd_1(+) Kd_2$,
the exclusive OR calculation keys $K_1(+)K_2$,
the conversion key $Kd_2$,
the conversion key $Kd_1$,
the key $K_2$,
the key $K_1$.

In the setting illustrated in FIGS. 43A and 43B, the exclusive OR calculation keys $K_1(+)K_2$ are set to be input to the round calculation unit $R_6$. In the example illustrated in FIG. 63, however, the exclusive OR calculation keys $K_1(+)K_2$ are set to be repeatedly input before and after the linear conversion unit 452.

The configuration illustrated in FIG. 63 corresponds to a configuration when the round calculation unit $R_6$ illustrated in FIGS. 43A and 43B is set to a round calculation unit configured to include conversion units below:

the linear conversion unit 452;
two exclusive OR units of the exclusive OR calculation keys $K_1 (+) K_2$ before and after the linear conversion unit 452; and the nonlinear conversion unit.

A round key supply unit of the key schedule unit outputs six kinds of keys in the foregoing order. An inverse order of the input sequence of the keys is also the same sequence.

This means that the input order of the keys in the encryption process of generating the cipher text C from the plain text P and the input order of the keys in the decryption process of generating the plain text P from the cipher text C are set to be the same. That is, the input sequence of the keys is the input sequence of the keys having the involution property, hardware or a program applied to the encryption process and the decryption process can be commonalized, this setting contributes to the weight reduction (miniaturization) of the device.

In the configuration illustrated in FIG. 63, the constant CON is input to the exclusive OR units of the encryption processing unit 451(E), i.e., an exclusive OR unit 471 and an exclusive OR unit 472.

The constant CON is also input to an exclusive OR unit 473 of the encryption processing unit 453($E^{-1}$).

The constant CON is, for example, the constant CON of the 4*4 state described with reference to FIG. 58.

Linear conversion units 481, 482, and 483 respectively adjacent to the three exclusive OR units 471, 472, and 473 execute the column diffusion calculation (MixColumn) to which the above-described matrix $M_0$ is applied, i.e., the matrix below:

$$MC[M_0].$$

The constant input configuration is not limited to only one of the function E and the inverse function $E^{-1}$, but may be a configuration in which round calculation in which a constant is applied to both of the function E and the inverse function $E^{-1}$ once or more is executed. However, a constant application position is assumed to be a deviated position (non-correspondence position) rather than the correspondence position of the function E and the inverse function $E^{-1}$.

The encryption processing unit illustrated in FIG. 63 executes the inverse sequence of the sequence in which the cipher text C is generated from the plain text P, has the configuration of the involution in which the plain text P can also be generated from the cipher text C, and can execute the encryption process and the decryption process by applying the same hardware or the same program.

Since the input sequence of the keys is also the same sequence in the encryption process and the decryption process, a key supply process of the key schedule unit can also be executed as a process of applying the same hardware or the same program.

<7. Specific Configuration Example of S-Box Applied to Nonlinear Conversion Unit>

Next, a specific configuration example of the S-box applied to the nonlinear conversion unit will be described.

For example, it is necessary for the nonlinear conversion unit 122 included in the encryption processing unit 120 to have the involution property of the encryption processing unit 120 in the encryption processing device 100 illustrated in FIG. 19, i.e., the involution in which the hardware or the program generating the cipher text C from the plain text P and outputting the cipher text C is the same as the hardware or the program generating the plain text P from the cipher text C and outputting the plain text P.

Hereinafter, an example of a configuration in which the nonlinear conversion unit 122 configured in the encryption processing unit 120 has the involution property will be described.

As described above with reference to FIGS. 22A and 22B, for example, the nonlinear conversion unit 122 in the encryption processing unit 120 of the encryption processing device 100 illustrated in FIG. 19 is configured to include the plurality of S-boxes, as illustrated in FIG. 22A.

Each S-box is, for example, a nonlinear conversion unit with the 4-bit input/output configuration. The nonlinear conversion process of "4*16=64" bits is executed as a parallel process of the sixteen S-boxes.

It is necessary for the S-box of the 4-bit input/output to have the configuration of the involution property.

That is, when a certain 4-bit output value can be obtained from a 4-bit input value and the 4-bit output value is input to the same S-box, the configuration in which the original 4-bit input value can be obtained is necessary.

A function f(x) having the involution property is a function that satisfies the following expression for all of the input values x:

$$f(f(x))=x.$$

The nonlinear conversion unit 122 included in the encryption processing unit 120 is necessarily the function f(x) having the involution property.

An example of the configuration of the S-box of the 4-bit input/output having the involution property will be described with reference to FIG. 64 and the subsequent drawings.

Figure 64:
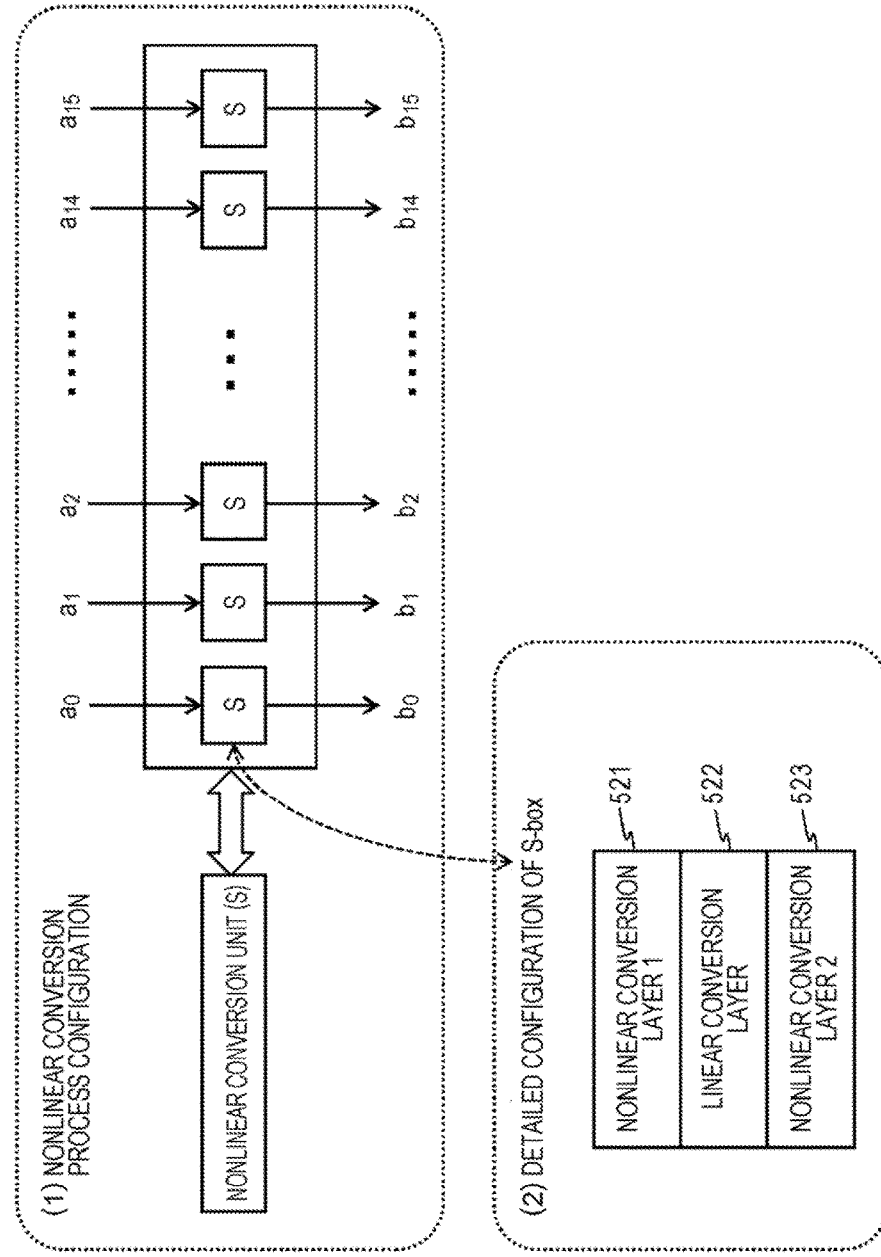
FIG. 64 is an explanatory diagram illustrating an example of the configuration of an S-box of the nonlinear conversion unit of the encryption processing unit.

(1) of FIG. 64 is a diagram illustrating an example of the configuration of the nonlinear conversion unit, as in FIG. 22A described above.

That is, the example of the configuration of the nonlinear conversion unit 122 included in the encryption processing unit 120 of the encryption processing device 100 illustrated in FIG. 19 is illustrated. The nonlinear conversion unit 122 has a configuration in which the plurality of S-boxes executing the nonlinear conversion process are arranged.

Each S-box executes the nonlinear conversion of 4-bit data.

(2) of FIG. 64 illustrates the configuration of one S-box included in the nonlinear conversion unit. The S-box is divided into three layers below:
a nonlinear conversion layer 1 521;
a linear conversion layer 522; and
a nonlinear conversion layer 2 523.

The nonlinear conversion layer 2 523 is an inverse function of the nonlinear conversion layer 1 521.

Figure 65:
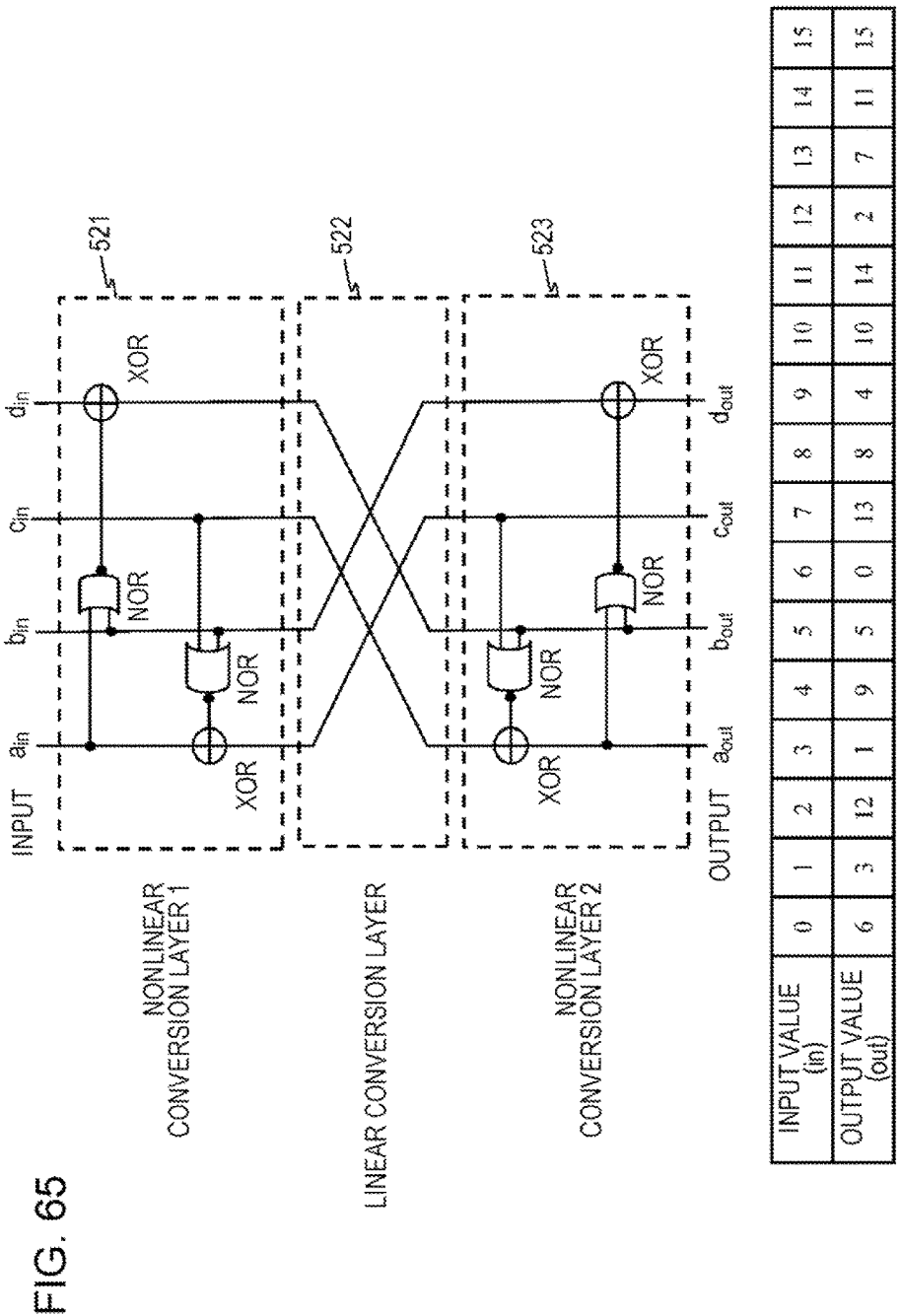
FIG. 65 is an explanatory diagram illustrating an example of the configuration of the S-box of the nonlinear conversion unit of the encryption processing unit.

FIG. 65 illustrates a specific example of a circuit configuration of the S-box.

As illustrated in FIG. 65, the nonlinear conversion layer 1 521 is configured to include two exclusive OR calculation unit (XOR) and two basic operators.

The example illustrated in FIG. 65 is an example in which NOR circuits are set as the basic operators. However, the basic operator may be substituted with basic operator that executes calculation of 2-input and 1-output of one of an AND circuit, an OR circuit, and a NAND circuit.

The two basic operators may be a combination of the same basic operators or may be a combination of different basic operators.

The linear conversion layer 522 is a linear conversion layer that executes an input 4-bit permutation process and basically has the involution property.

The nonlinear conversion layer 2 523 is configured by an inverse function of the nonlinear conversion layer 1 521.

An S-box circuit configured to include the three layers is a nonlinear conversion circuit that has the involution property.

A correspondence relation data between an input value (in) and an output value (out) of the S-box illustrated in FIG. 65 is shown in the lower part of FIG. 65.

All of the input and output values are 4-bit data and are data of 0000 to 1111. A table illustrated in FIG. 65 is indicated as a correspondence table of the input values and the output values of 0 to 15 expressed from 0000 to 1111 in the decimal number system.

As understood from this table, an output value obtained using an output value Y obtained from any input value X as an input value Y is the original input value X.

That is, the S-box of the 4-bit input/output illustrated in FIG. 65 is a nonlinear conversion circuit that has the involution property.

Figure 66:
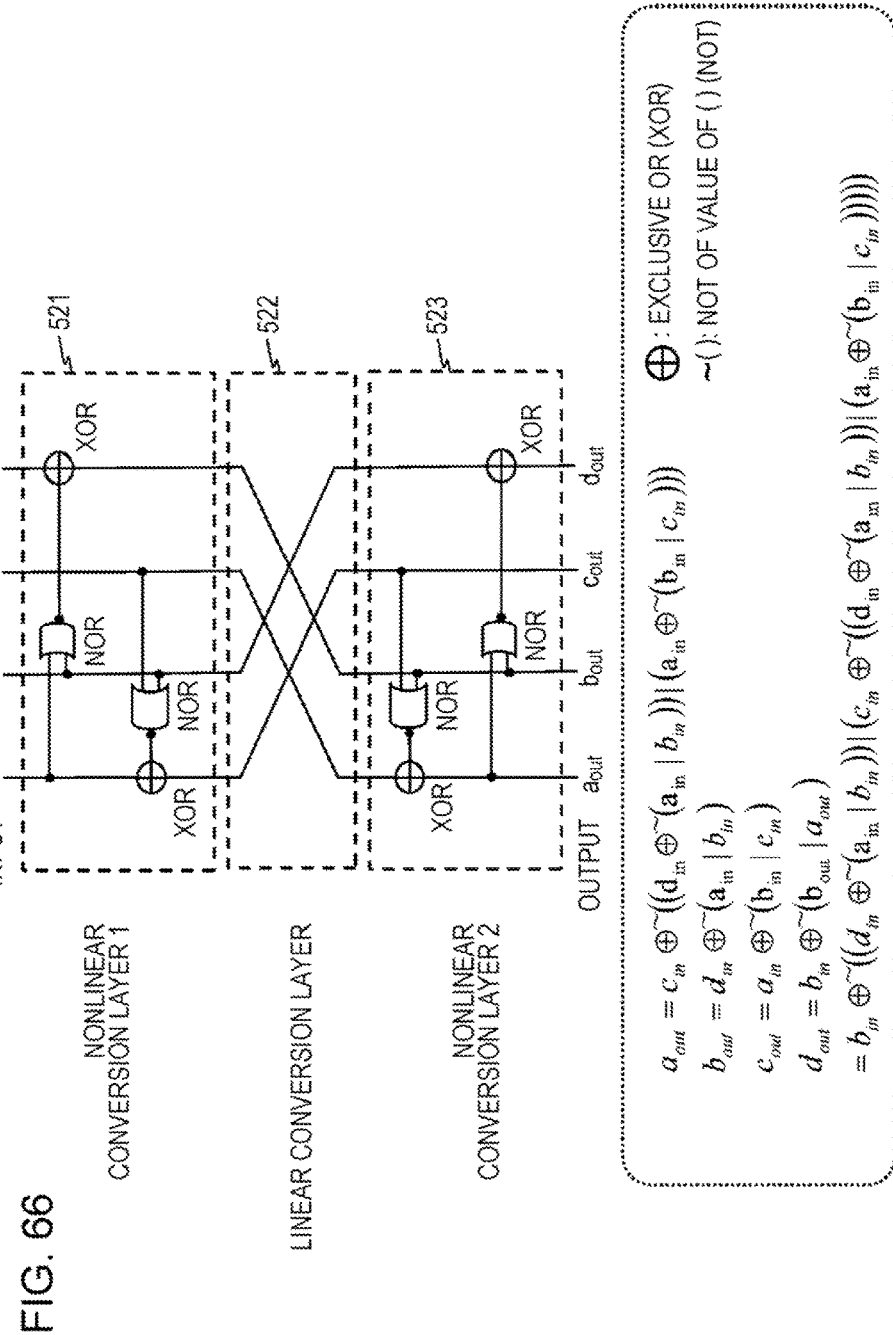
FIG. 66 is an explanatory diagram illustrating an example of the configuration of the S-box of the nonlinear conversion unit of the encryption processing unit.

FIG. 66 illustrates a data conversion expression by the S-boxes.

Here, $a_{in}$, $b_{in}$, $c_{in}$, and $d_{in}$ are assumed to be 4-bit inputs to the S-boxes and $a_{out}$, $b_{out}$, $c_{out}$, and $d_{out}$ are assumed to be 4-bit outputs from the S-boxes.

The data conversion expression by the S-boxes is as follows.

$$a_{out} = c_{in} \oplus \sim((d_{in} \oplus \sim(a_{in} | b_{in})) | (a_{in} \oplus \sim(b_{in} | c_{in}))) \quad \text{[Math. 16]}$$

$$b_{out} = d_{in} \oplus \sim(a_{in} | b_{in})$$

$$c_{out} = a_{in} \oplus \sim(b_{in} | c_{in})$$

$$d_{out} = b_{in} \oplus \sim(b_{out} | a_{out}) = b_{in} \oplus \sim((d_{in} \oplus \sim(a_{in} | b_{in})) |$$

$$(c_{in} \oplus \sim((d_{in} \oplus \sim(a_{in} | b_{in})) | (a_{in} \oplus \sim(b_{in} | c_{in})))))$$

In the expression above, ~(x|y) indicates NOT of a value in ( ). Specifically, ~(x|y) indicates an output value of the NOR circuit when input values to the NOR circuit are x and y.

The S-boxes executing the data conversion expressed by the calculation expression above have the involution property.

The S-box circuits illustrated in FIG. 66 have a difference probability of $2^{-2}$ and a linear probability of $2^{-2}$ and have a sufficient safety property.

The S-boxes illustrated in FIG. 66 are configured to include four exclusive OR operators (XOR) and four NOR circuits. The number of gates necessary on the hardware circuit is 13 gates.

The necessary number of gates are calculated as the exclusive OR operators (XOR)=2.25 gates and the NOR circuit=1 gate.

For example, the involution property of the entire encryption processing unit is realized by the configuration of the encryption processing unit described with reference to FIG. 54, i.e., the configuration in which the S-boxes illustrated in FIGS. 64 to 66 are used in the nonlinear conversion unit inside the conversion function E 411 and the conversion function $E^{-1}$ 413 of the encryption processing unit configured to include:

the conversion function E 411;
the linear conversion unit 412; and
the conversion function $E^{-1}$413.

The S-box described with reference to FIGS. 65 and 66 is configured to include the following three layers:
the nonlinear conversion layer 1;
the linear conversion layer; and
the nonlinear conversion layer 2.

Here, another example of the S-box having the three-layer configuration will be described.

As a prerequisite of the linear conversion layer of the foregoing three-layer configuration, bit substitution is necessarily configured to be executed without a substitution unit which the involution property and in which input and output bits are invariable.

The condition of the linear conversion layer will be described with reference to FIG. 67.

Figure 67:
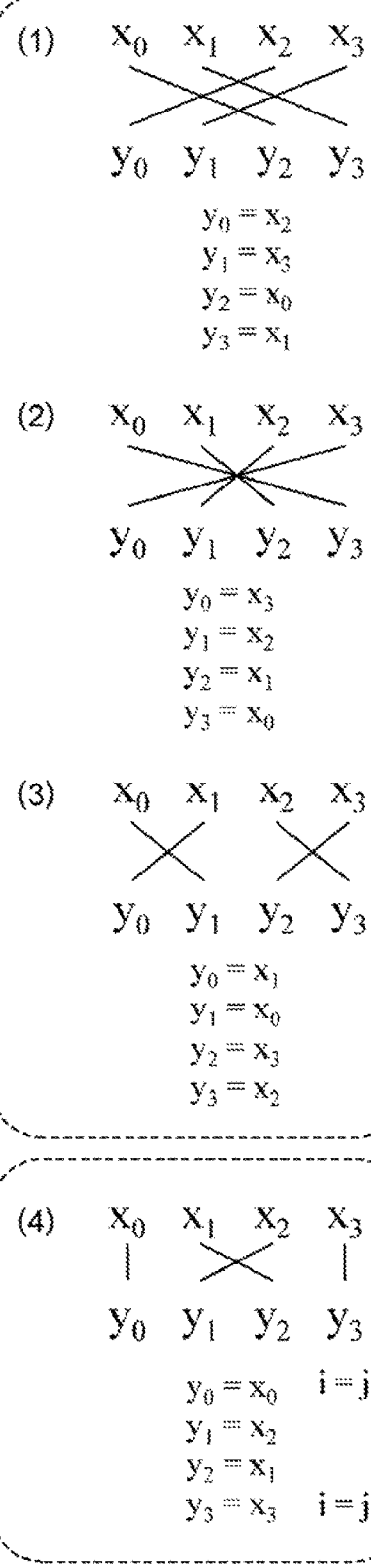
FIG. 67 is an explanatory diagram illustrating an example of the configuration of a linear conversion layer of the S-box of the nonlinear conversion unit of the encryption processing unit.

FIG. 67 illustrates a setting example of the linear conversion layer in the S-box of the 4-bit input/output.

As in the S-box described with reference to FIGS. 65 and 66, the linear conversion layer in the S-box of the 4-bit input/output having the three-layer configuration below is set to, for example, one of the setting illustrated in (1) of FIG. 67:
the nonlinear conversion layer 1;
the linear conversion layer; and
the nonlinear conversion layer 2.

When input 4 bits are $X=(x_0, x_1, x_2, x_3)$ and output 4 bits are $Y=(y_0, y_1, y_2, y_3)$ with respect to the linear conversion layer, setting which has the involution property and in which the input and output bits are not the same is as follows:
$y_i$ is unequal to $x_1$,
where i=0, 1, 2, and 3.

The condition of the linear conversion layer is that the above expression is established.

The linear conversion configuration illustrated in (2) of FIG. 67 does not satisfy the foregoing condition is unsuitable.

When the condition of a substitution function P4 of the linear conversion layer executing 4-bit substitution is expressed as an expression, an expression below can be indicated:

$$P4(P4(X))=X; \text{ and} \quad (a)$$

$$y_i \text{ is unequal to } x_1, \text{ where } i=0,1,2, \text{ and } 3. \quad (b)$$

The foregoing (a) is a condition expression indicating that the substitution function P4 has the involution property.

The foregoing (b) is a condition expression indicating the input and output bits are not the same.

The linear conversion layer is necessarily configured to execute the substitution process satisfying the foregoing condition.

As an example of the S-box executing the 4-bit substitution, an example of a configuration different from the configuration described with reference to FIGS. 65 and 66 will be described with reference to FIG. 68 and the subsequent drawings.

Figure 68:
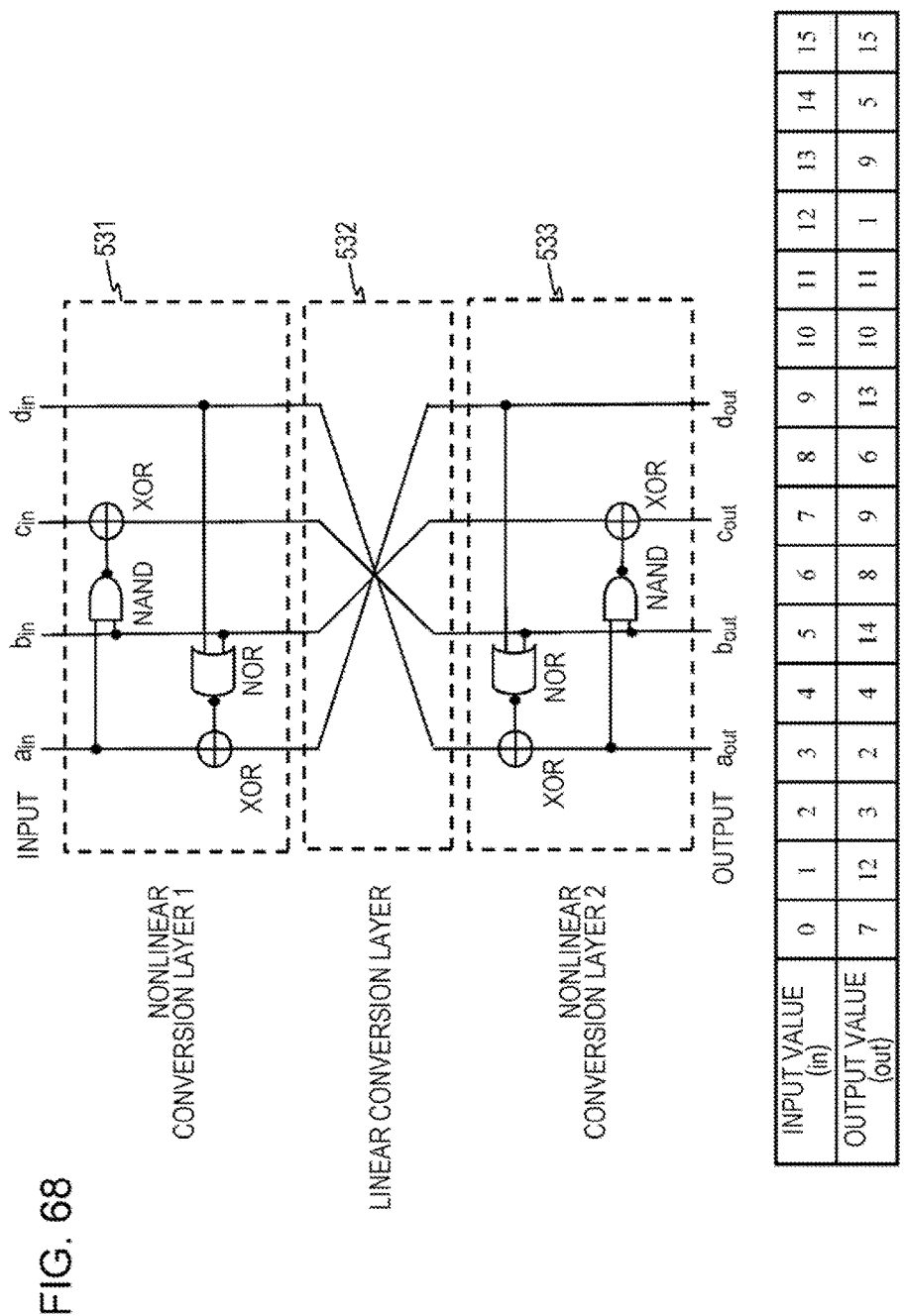
FIG. 68 is an explanatory diagram illustrating an example of the configuration of the S-box of the nonlinear conversion unit of the encryption processing unit.

The S-box illustrated in FIG. 68 is an S-box of 4-bit input/output having a three-layer configuration below:
a nonlinear conversion layer 1 531;
a linear conversion layer 532; and
a nonlinear conversion layer 2 533.

The nonlinear conversion layer 1 531 is configured to include two exclusive OR calculation unit (XOR), a NAND circuit, and a NOR circuit.

The linear conversion layer 532 is a linear conversion layer that executes an input 4-bit permutation process and has the involution property.

The nonlinear conversion layer 2 533 is configured by an inverse function of the nonlinear conversion layer 1 531.

An S-box circuit configured to include the three layers is a nonlinear conversion circuit that has the involution property.

A correspondence relation data between an input value (in) and an output value (out) of the S-box illustrated in FIG. 68 is shown in the lower part of FIG. 68.

All of the input and output values are 4-bit data and are data of 0000 to 1111. A table illustrated in FIG. 68 is indicated as a correspondence table of the input values and the output values of 0 to 15 expressed from 0000 to 1111 in the decimal number system.

As understood from this table, an output value obtained using an output value Y obtained from any input value X as an input value Y is the original input value X.

That is, the S-box of the 4-bit input/output illustrated in FIG. 68 is a nonlinear conversion circuit that has the involution property.

Figure 69:
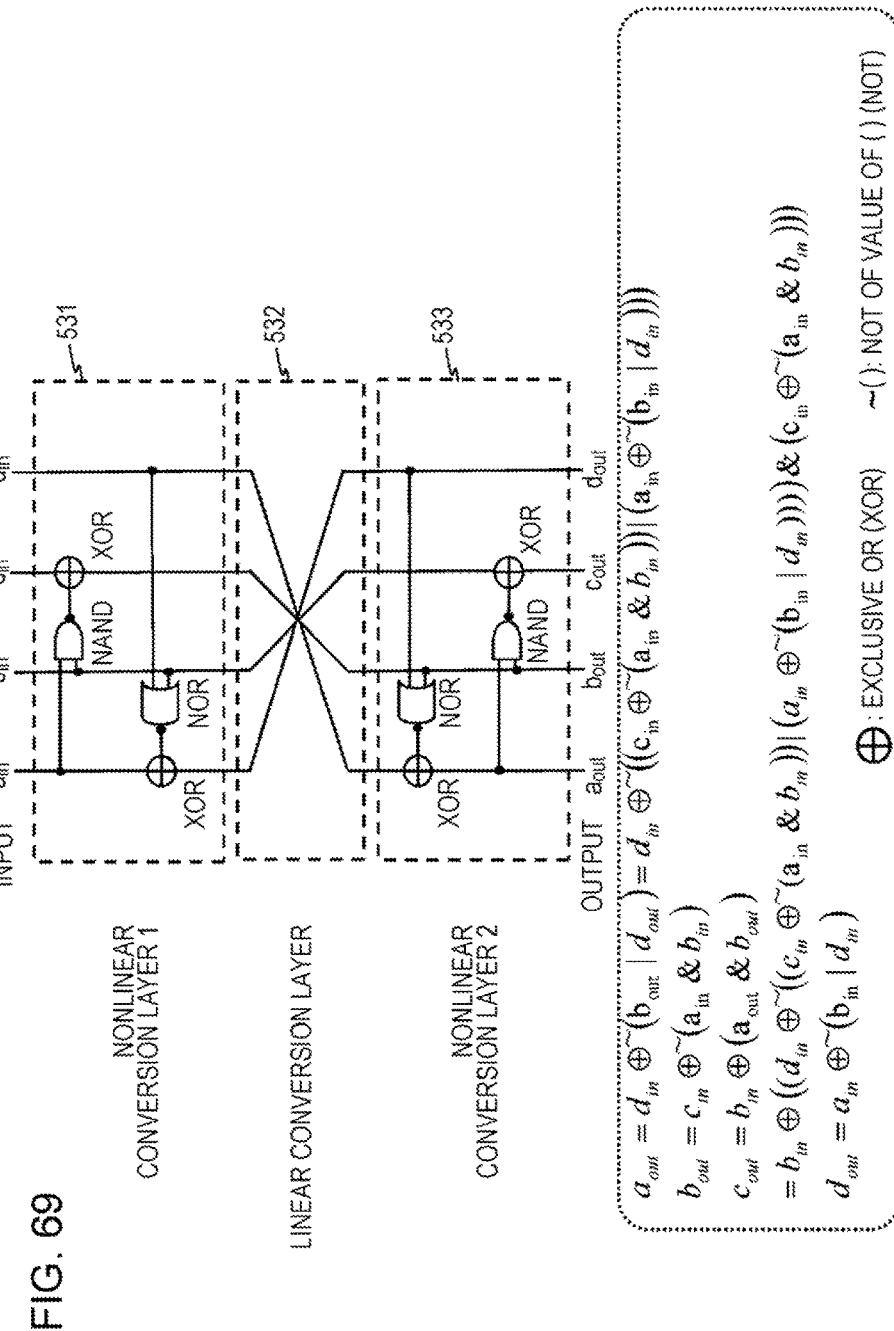
FIG. 69 is an explanatory diagram illustrating an example of the configuration of the S-box of the nonlinear conversion unit of the encryption processing unit.

FIG. 69 illustrates a data conversion expression by the S-boxes.

Here, $a_{in}$, $b_{in}$, $d_{in}$, and $d_{in}$ are assumed to be 4-bit inputs to the S-boxes and $a_{out}$, $b_{out}$, $c_{out}$, and $d_{out}$ are assumed to be 4-bit outputs from the S-boxes.

The data conversion expression by the S-boxes is as follows.

$$a_{out} = d_{in} \oplus \sim (b_{out} \mid d_{out}) = \quad \text{[Math. 17]}$$
$$d_{in} \oplus \sim ((c_{in} \oplus \sim (a_{in} \& b_{in})) \mid (a_{in} \oplus \sim (b_{in} \mid d_{in})))$$
$$b_{out} = c_{in} \oplus \sim (a_{in} \& b_{in})$$
$$c_{out} = b_{in} \oplus (a_{out} \& b_{out}) = b_{in} \oplus$$
$$((d_{in} \oplus \sim ((c_{in} \oplus \sim (a_{in} \& b_{in})) \mid (a_{in} \oplus \sim (b_{in} \mid d_{in})))) \&$$
$$(c_{in} \oplus \sim (a_{in} \& b_{in})))$$
$$d_{out} = a_{in} \oplus \sim (b_{in} \mid d_{in})$$

In the expression above, $\sim(x \sim y)$ indicates an output value of the NOR circuit when input values to the NOR circuit are x and y.

Further, $\sim(x \& y)$ indicates an output value of the NAND circuit when input values to the NAND circuit are x and y.

The S-boxes executing the data conversion expressed by the calculation expression above have the involution property.

The S-box circuits illustrated in FIG. 69 have a difference probability of $2^{-2}$ and a linear probability of $2^{-2}$ and have a sufficient safety property.

The S-boxes illustrated in FIG. 69 are configured to include four exclusive OR operators (XOR), two NOR circuits, and two NAND circuits.

For example, the involution property of the entire encryption processing unit is realized by the configuration of the encryption processing unit described with reference to FIG. 54, i.e., the configuration in which the S-boxes illustrated in FIG. 69 are used in the nonlinear conversion unit inside the conversion function E 411 and the conversion function $E^{-1}$ 413 of the encryption processing unit configured to include:
the conversion function E 411;
the linear conversion unit 412; and
the conversion function $E^{-1}$ 413.

Next, an example of an S-box of 4-bit input/output having still another configuration will be described with reference to FIG. 70.

Figure 70:
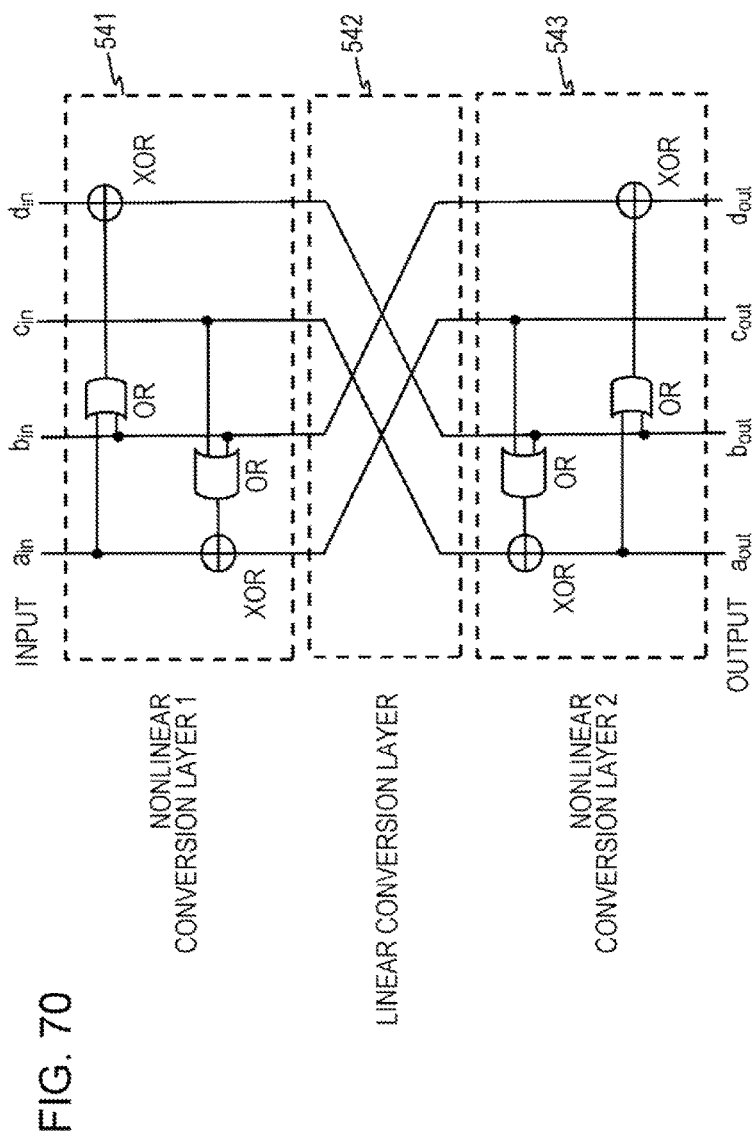
FIG. 70 is an explanatory diagram illustrating an example of the configuration of the S-box of the nonlinear conversion unit of the encryption processing unit.

The S-box illustrated in FIG. 70 is an S-box of 4-bit input/output having a three-layer configuration below:
a nonlinear conversion layer 1 541;
a linear conversion layer 542; and
a nonlinear conversion layer 2 543.

The nonlinear conversion layer 1 541 is configured to include two exclusive OR calculation unit (XOR) and two OR circuits.

The linear conversion layer 542 is a linear conversion layer that executes a 4-bit permutation process and has the involution property.

The nonlinear conversion layer 2 543 is configured by an inverse function of the nonlinear conversion layer 1 541.

An S-box circuit configured to include the three layers is a nonlinear conversion circuit that has the involution property.

A correspondence relation data between an input value (in) and an output value (out) of the S-box illustrated in FIG. 68 is shown in the lower part of FIG. 70.

All of the input and output values are 4-bit data and are data of 0000 to 1111. A table illustrated in FIG. 70 is indicated as a correspondence table of the input values and the output values of 0 to 15 expressed from 0000 to 1111 in the decimal number system.

As understood from this table, an output value obtained using an output value Y obtained from any input value X as an input value Y is the original input value X.

That is, the S-box of the 4-bit input/output illustrated in FIG. 70 is a nonlinear conversion circuit that has the involution property.

Figure 71:
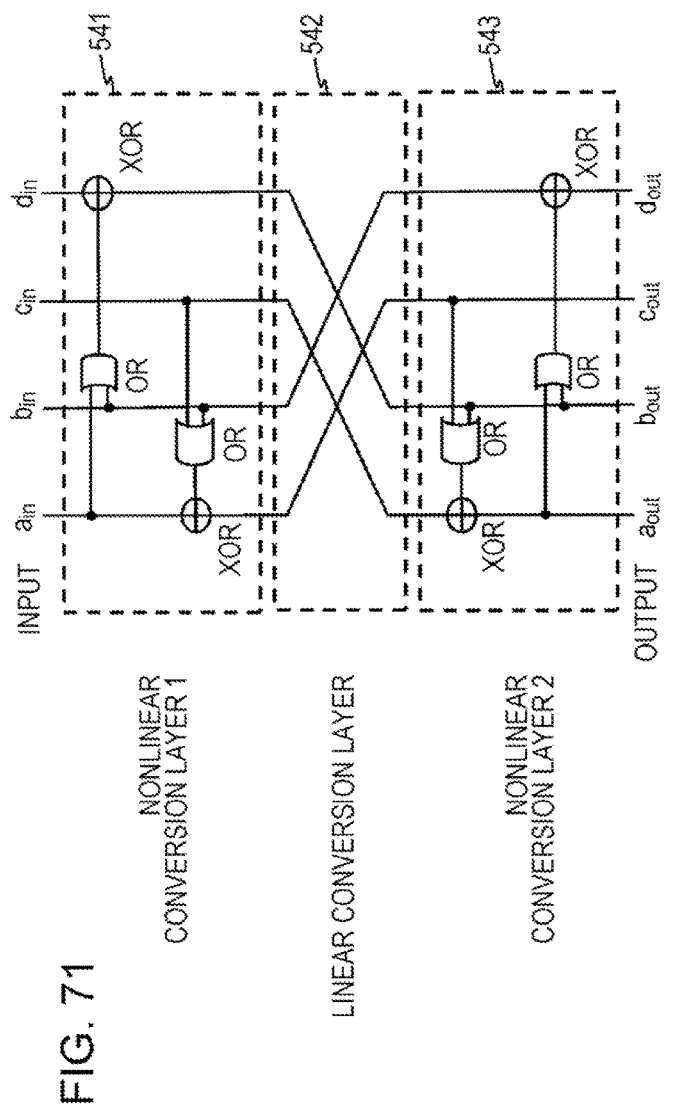
FIG. 71 is an explanatory diagram illustrating an example of the configuration of the S-box of the nonlinear conversion unit of the encryption processing unit.

FIG. 71 illustrates a data conversion expression by the S-boxes.

Here, $a_{in}$, $b_{in}$, $c_{in}$, and $d_{in}$ are assumed to be 4-bit inputs to the S-boxes and $a_{out}$, $b_{out}$, $c_{out}$, and $d_{out}$ are assumed to be 4-bit outputs from the S-boxes.

The data conversion expression by the S-boxes is as follows.

$$a_{out} = c_{in} \oplus ((d_{in} \oplus (a_{in} \mid b_{in})) \mid (a_{in} \oplus (b_{in} \mid c_{in})))$$ [Math. 18]
$$b_{out} = d_{in} \oplus (a_{in} \mid b_{in})$$
$$c_{out} = a_{in} \oplus (b_{in} \mid c_{in})$$
$$d_{out} = b_{in} \oplus (b_{out} \mid a_{out}) = b_{in} \oplus ((d_{in} \oplus (a_{in} \mid b_{in})) \mid$$
$$(c_{in} \oplus ((d_{in} \oplus (a_{in} \mid b_{in})) \mid (a_{in} \oplus (b_{in} \mid c_{in})))))$$

In the expression above, (x|y) indicates an output value of the OR circuit when input values to the OR circuit are x and y.

The S-boxes executing the data conversion expressed by the calculation expression above have the involution property.

The S-box circuits illustrated in FIG. 71 have a difference probability of $2^{-2}$ and a linear probability of $2^{-2}$ and have a sufficient safety property.

The S-boxes illustrated in FIG. 71 are configured to include four exclusive OR operators (XOR) and four OR circuits.

For example, the involution property of the entire encryption processing unit is realized by the configuration of the encryption processing unit described with reference to FIG. 54, i.e., the configuration in which the S-boxes illustrated in FIG. 71 are used in the nonlinear conversion unit inside the conversion function E 411 and the conversion function $E^{-1}$ 413 of the encryption processing unit configured to include:
the conversion function E 411;
the linear conversion unit 412; and
the conversion function $E^{-1}$ 413.

<8. Specific Example of Encryption Processing Device>

Next, an example of the configuration of the entire encryption processing device having all of the above-described configurations, i.e., configurations below, will be described:
(1) the entire configuration of the common key encryption process in which the safety is improved (FIGS. 19 to 22B);
(2) the configuration in which the linear conversion is executed applying the plurality of different linear conversion matrixes (FIGS. 23 to 31);
(3) the configuration of the key schedule unit supplying the round key generated using the base key and the conversion key and realizing the involution property and the full diffusion property (FIGS. 32 to 52);
(4) the constant input configuration (FIGS. 53 to 63); and (5) the configuration of the nonlinear conversion unit in which the S-boxes having the involution property are applied (FIGS. 64 to 71).

Figure 72:
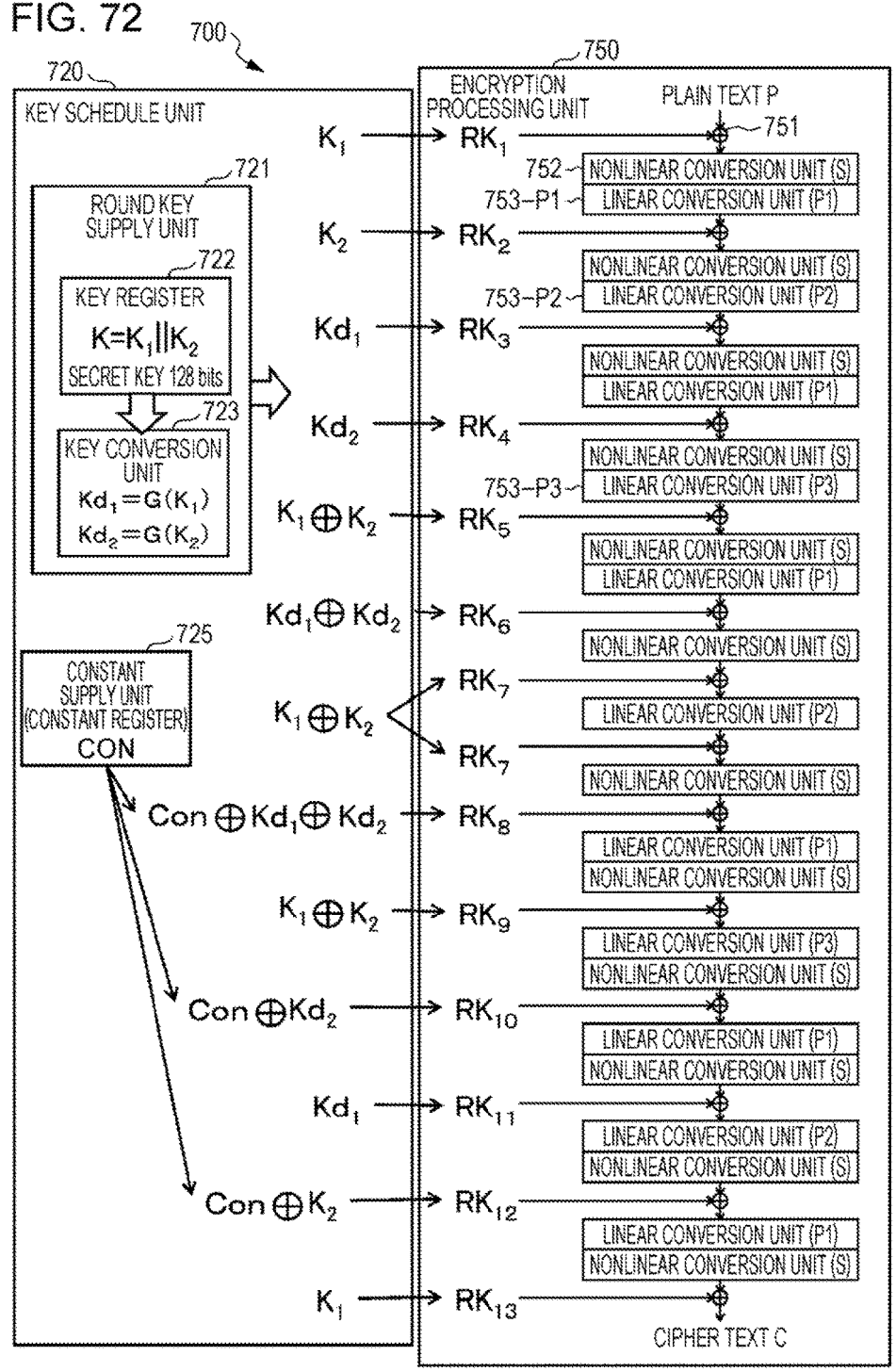
FIG. 72 is an explanatory diagram illustrating an example of the configuration of the encryption processing device.

FIG. 72 is a diagram illustrating an example of an encryption processing device including all of the foregoing configurations as an encryption processing device 700.

The encryption processing device 700 includes a key schedule unit 720 and an encryption processing unit 750.

The encryption processing unit 750 includes data conversion units, i.e., an exclusive OR unit 751, a nonlinear conversion unit 752, and a linear conversion unit 753 and has a configuration in which the processes are repeatedly executed.

On the other hand, the key schedule unit 720 outputs a round key RKn to each of the exclusive OR units included in the encryption processing unit 750 and executes exclusive OR calculation with conversion target data.

The key schedule unit 720 includes a round key supply unit 721 and a constant supply unit (constant register) 725.

The round key supply unit 721 includes a key register 722 that stores a secret key K and a key conversion unit 723.

For example, the encryption processing unit 750 of the encryption processing device 700 illustrated in FIG. 72 inputs 64-bit plain text P and outputs 64-bit cipher text C. The encryption processing unit 750 can also be applied to input the cipher text C and output the plain text P.

When conversion data is 64 bits, each round key RKn is also 64 bits.

Each piece of the 64-bit data is a 4*4 state formed by sixteen components in which each of all the components is 4 bits.

The encryption processing unit 750 has a configuration having the involution property in which the cipher text C can be output as output data by repeating the round calculation using the plain text P as input data and the plain text P can be generated as output data through the data conversion process in which the execution sequence of the round calculation is set in an inverse order using the cipher text C as input data.

When the cipher text C is generated from the plain text P, each conversion process is executed from the upper end to the lower end of the encryption processing unit 750 illustrated in the drawing.

On the other hand, when the plain text P is generated from the cipher text C, each conversion process is executed from the lower end to the upper end of the encryption processing unit 750 illustrated in the drawing.

The round key supply unit 721 of the key schedule unit 720 is configured to execute a key supply process which has the involution property in which a key supply sequence when the cipher text C is generated from the plain text P matches a key supply sequence when the plain text P is generated from the cipher text C. When the key schedule unit 720 executes the key supply process in regard to the encryption processing unit 750, the key schedule unit 720 executes calculation using a constant on a part of the supplied key and outputs key data which is a calculation result to the encryption processing unit 750.

Thus, as in the configuration described above with reference to FIG. 59, the configuration of the encryption processing unit 750 illustrated in FIG. 72 is a configuration which has the involution property in that each conversion function is set in the sequence of the conversion function E, the linear conversion function, and the conversion function $E^{-1}$.

In the encryption processing unit 750, the linear conversion processing unit executing three kinds of different linear conversion processes is set, as described above with reference to FIGS. 23 to 31 in the section <4. Configuration and Process of Linear Conversion unit of Encryption Processing Unit>.

That is, the linear conversion processing unit includes three different linear conversion units and changes the linear conversion process executed at each round in the encryption process:
a linear conversion unit P1;
a linear conversion unit P2; and
a linear conversion unit P3.

That is, the same linear conversion process is set not to be executed in continuous rounds.

The linear conversion unit P1 executes the matrix calculation in which one matrix $M_0$ is applied on the components of each column of the input data of the 4*4 state in units of columns.

This calculation is the column diffusion calculation (MixColumn) described above with reference to FIGS. 24A to 25B.

That is, the linear conversion unit P1 executes the column diffusion calculation (MC) expressed by the following expression:

$$MC[M_0].$$

MC [$M_0$] is an expression indicating matrix calculation in which the same matrix $M_0$ is applied to each column of the state and has the same meaning as the following expression, i.e., an expression separately indicating the matrixes applied to each column of the state:

$$MC[M_0, M_0, M_0, M_0].$$

As described above with reference to FIGS. 24A, 24B, 26A, 26B, and the like, the linear conversion unit P2 executes the matrix calculation in which the different matrixes are applied in units of rows on the components of each row of the input data of the 4*4 state. The matrix calculation in which the following matrixes are applied is executed at the upper first row to the fourth row:
the first row: application matrix $M_0$;
the second row: application matrix $M_1$;
the third row: application matrix $M_2$; and
the fourth row: application matrix $M_3$.

That is, the linear conversion processing unit P2 executes the row diffusion calculation (MixRow) expressed an expression below:

$$MR[M_0, M_1, M_2, M_3]$$

Like the linear conversion unit P2, as illustrated in FIG. 24B, the linear conversion unit P3 also executes matrix calculation in which the different matrixes are applied in units of rows on the components of each row of the input data of the 4*4 state. Unlike the linear conversion unit P2, the linear conversion unit P3 executes the matrix calculation in which the following matrixes are applied in the upper first row to the fourth row:
the first row: application matrix $M_2$;
the second row: application matrix $M_0$;
the third row: application matrix $M_1$; and
the fourth row: application matrix $M_3$.

This calculation is the row diffusion calculation (MixRow) described above with reference to FIGS. 27A and 27B.

That is, the linear conversion unit P3 executes the row diffusion calculation (MixRow) expressed by an expression below:

$$MR[M_2, M_0, M_1, M_3]$$

As described above with reference to FIG. 30, by combining and using the plurality of different linear conversion processes and switching the linear conversion process executed at each round, it is possible to increase the number of active S-boxes. Thus, the encryption process (the encryption process and the decryption process) in which the safety is higher is realized.

The encryption processing unit 750 illustrated in FIG. 72 executes the data conversion process in which data conversion units below are sequentially applied:
an exclusive OR unit that executes exclusive OR calculation with the round key $RK_1$;
a nonlinear conversion unit S;
a linear conversion unit P1;
an exclusive OR unit that executes exclusive OR calculation with the round key $RK_2$;
the nonlinear conversion unit S;
a linear conversion unit P2;
an exclusive OR unit that executes exclusive OR calculation with the round key $RK_3$;
the nonlinear conversion unit S;
the linear conversion unit P1;
an exclusive OR unit that executes exclusive OR calculation with the round key $RK_4$;
the nonlinear conversion unit S;
a linear conversion unit P3;
an exclusive OR unit that executes exclusive OR calculation with the round key $RK_5$;
the nonlinear conversion unit S;
the linear conversion unit P1;

an exclusive OR unit that executes exclusive OR calculation with the round key $RK_6$;
the nonlinear conversion unit S;
an exclusive OR unit that executes exclusive OR calculation with the round key $RK_7$;
the linear conversion unit P2;
the exclusive OR unit that executes exclusive OR calculation with the round key $RK_7$;
the nonlinear conversion unit S;
an exclusive OR unit that executes exclusive OR calculation with the round key $RK_8$;
the linear conversion unit P1;
the nonlinear conversion unit S;
an exclusive OR unit that executes exclusive OR calculation with the round key $RK_9$;
the linear conversion unit P3;
the nonlinear conversion unit S;
an exclusive OR unit that executes exclusive OR calculation with the round key $RK_{10}$;
the linear conversion unit P1;
the nonlinear conversion unit S;
an exclusive OR unit that executes exclusive OR calculation with the round key $RK_{11}$;
the linear conversion unit P2;
the nonlinear conversion unit S;
an exclusive OR unit that executes exclusive OR calculation with the round key $RK_{12}$;
the linear conversion unit P1;
the nonlinear conversion unit S; and
an exclusive OR unit that executes exclusive OR calculation with the round key $RK_{13}$.

The round calculation execution configuration is the same as the configuration described above with reference to FIG. 59, is set in a sequence below, and has the involution property:
the conversion function E;
the linear conversion unit; and
the conversion function $E^{-1}$.

Each nonlinear conversion unit is configured by the S-boxes having the involution property, as described above with reference to FIGS. 64 to 66.

The round key supply unit 721 of the key schedule unit 720 includes the key register 722 and the key conversion unit 723. A process executed by the round key supply unit 721 is the process described above with reference to FIGS. 32 to 43B in the section <5. Configuration and Process of Key Schedule Unit>.

That is, the round key generated using the base key and the conversion key is supplied to the encryption processing unit 750. In the round key supply configuration, the involution property and the full diffusion property are realized.

The secret key K stored in the key register is 128-bit key data which is connection data of 64-bit base keys $K_1$ and $K_2$.

The key conversion unit 723 generates the conversion key $Kd_1$ based on the base key $K_1$ and generates the conversion key $Kd_2$ through a conversion process based on the base key $K_2$.

The conversion process is expressed as an expression as follows, using a conversion function G and an inverse function $G^{-1}$:

$$Kd_1=G(K_i); \text{ and}$$

$$K_1=G^{-1}(Kd_1).$$

Further, "$G=G^{-1}$" is satisfied.

That is, the data conversion function G applied to the key conversion in the key conversion unit 723 has the involution property, i.e., the nature in which a forward function G and a backward function $G^{-1}$ are the same function, as illustrated in FIG. 33.

As described above with reference to FIG. 34 and the like, the key conversion process is executed applying the Hadamard MDS matrix $M_D$.

Specifically, the column diffusion calculation of step S1 and the row diffusion calculation of step S2 illustrated in FIG. 34 are executed.

The column diffusion calculation of step S1 is indicated by a calculation expression below:

$$MC[M_D]=MC[M_D,M_D,M_D,M_D].$$

The row diffusion calculation of step S2 is indicated by a calculation expression below:

$$MR[M_D]=MR[M_D,M_D,M_D,M_D].$$

That is, in the column diffusion calculation of step S1 in FIG. 34, the matrix calculation of applying the same Hadamard MDS matrix $M_D$ is executed on all of the four columns of the 4*4 state expression data formed by the 4-bit components.

Further, in the row diffusion calculation of step S2, the matrix calculation of applying the same Hadamard MDS matrix $M_D$ is executed on all of the four rows of the 4*4 state expression data formed by the 4-bit components.

Since the function G formed from the continuous processes of the column diffusion calculation MC [$M_D$] and the row diffusion calculation MR [$M_D$] has the involution property and the forward function G and the backward function $G^{-1}$ are the same, the original value is calculated by repeating the calculation twice.

Through the column diffusion calculation MC [$M_D$] in which the matrix $M_D$ is applied and which is executed by the key conversion unit 723 and the row diffusion calculation MR [$M_D$] in which the matrix $M_D$ is applied, data diffusion between all of the components of the input and output states, i.e., the "full diffusion conversion," is executed.

By inputting the round key having the full diffusion property to the encryption processing unit and executing the exclusive OR with conversion target data, the diffusion performance of the conversion data is improved and the encryption process in which the safety is higher is realized.

The round key supply configuration executed in the round key supply unit 721 has two natures below:
(1) the full diffusion property in which full diffusion conversion is realized; and
(2) the involution property in which the forward function G and the inversion function $G^{-1}$ are the same.

The following advantageous effects can be obtained by the two characteristics, as described above.

Diffusion of configuration information of the key data in regard to the conversion target data is realized with a less number of rounds based on the full diffusion property realizing the full diffusion conversion, and thus greater diffusion performance is ensured without dependency on the process of the round function (R).

That is, the safe encryption process in which the resistance against an attack is high is realized with the less number of rounds. As a result, the high-speed process and the weight reduction are realized.

As an advantageous effect based on the involution property, one key conversion unit can be configured to be repeatedly used and hardware miniaturization is also realized in either the unrolled mounting or the round mounting.

In the example illustrated in FIG. 72, the round key supply unit 721 outputs the keys in the following order:

the key $K_1$;
the key $K_2$;
the conversion key $Kd_1$;
the conversion key $Kd_2$;
the exclusive OR calculation keys $K_1(+)K_2$;
the exclusive OR calculation conversion keys $Kd_1(+) Kd_2$
the exclusive OR calculation keys $K_1(+)K_2$;
the exclusive OR calculation conversion keys $Kd_1(+) Kd_2$
the exclusive OR calculation keys $K_1(+)K_2$;
the conversion key $Kd_2$;
the conversion key $Kd_1$;
the key $K_2$; and
the key $K_1$.

The six kinds of keys are output in this order.

The round keys $K_1$ to $K_{13}$ input to the encryption processing unit 750 are generated using the foregoing keys without any application of the constant CON or with application of the constant CON.

Before and after the linear conversion unit P2 located at the center position of the encryption processing unit 750, the exclusive OR calculation keys $K_1(+)K_2$ are repeatedly used as the round key $K_7$.

The round keys $RK_8$, $RK_{10}$, and $RK_{12}$ are generated by executing the exclusive OR of the constant CON supplied from the constant supply unit 725 to the keys supplied from the round key supply unit 721.

An input sequence of the foregoing keys is the same as the sequence described above with reference to FIG. 59 and is the same as the inverse order.

This means that the round key supply unit 721 executes generation and output of the keys in the same sequence as the input order of the keys in the encryption process of generating the cipher text C from the plain text P, in the decryption process of generating the plain text P from the cipher text C. This means that hardware or a program applied to the encryption process and the decryption process can be commonalized and is the setting that contributes to the weight reduction (miniaturization) of the device.

The constant supply unit 725 set in the key schedule unit 720 executes a constant supply process according to the process described above with reference to FIGS. 53 to 59 in the section <6. Configuration in Which Improvement in Safety for Constant Input Is Realized>.

In the example illustrated in the drawing, the constant (CON) is subjected to the exclusive OR calculation in regard to the key data generated in the round key supply unit when the round keys below are generated:
the round key $RK_8$;
the round key $RK_{10}$; and
the round key $RK_{12}$.

That is, the round keys below are generated:
the round key $RK_8=Kd_1(+) Kd_2(+)CON$;
the round key $RK_{10}=Kd_2(+)CON$; and
the round key $RK_{12}=K_2(+)CON$.

Here, (+) means the exclusive OR calculation.

As a result of the process of inputting such a constant (CON), the setting of the round keys $RK_1$ to $RK_{13}$ input to the encryption processing unit 750 is as follows:

$RK_1=K_1$;

$RK_2=K_2$;

$RK_3=Kd_1$;

$RK_4=Kd_2$;

$RK_5=K_1(+)K_2$;

$RK_5=Kd_1(+)Kd_2$;

$RK_6=K_1(+)K_2$;

$RK_7=K_1(+)K_2$;

$RK_8=Kd_1(+)Kd_2(+)CON$;

$RK_9=K_1(+)K_2$;

$RK_{10}=Kd_2(+)CON$;

$RK_{11}=Kd_1$;

$RK_{12}=K_2(+)CON$; and $RK_{13}=K_1$.

Here, (+) means the exclusive OR calculation.

$RK_7$ is set such that the same round key is input twice before and after the linear conversion unit (P2).

Thus, the constant (CON) is subjected to the exclusive OR process in regard to the keys generated in the round key supply unit when the round keys are generated.

The constant may be input to the exclusive OR unit of the encryption processing unit separated from the round keys and the exclusive OR process with the conversion data may be executed. In this case, the result is the same.

As the constant (CON), the constant (CON) for which all of the components of the matrix calculation between the constant CON and the linear conversion matrix applied in the linear conversion unit adjacent to the exclusive OR unit of the encryption processing unit to which the constant CON is input are non-zero, i.e., values which are not zero, is used.

In the configuration, the decrease in the difference by the linear conversion of the linear conversion unit is prevented. As a result, it is possible to prevent the decrease in the minimum difference active S-box number, and thus the encryption process configuration in which safety is high and the resistance against various attacks is improved is realized.

The nonlinear conversion unit set in the encryption processing unit 750 has a configuration in which the plurality of 4-bit input and outputs k and boxes (S-boxes) having the involution property described above with reference to FIGS. 64 to 66 in the section <7. Specific Configuration Example of S-Box Applied to Nonlinear Conversion Unit> are set.

As described above, the encryption processing unit 750 is configured to include the conversion function E, the linear conversion unit, and the conversion function $E^{-1}$ and is configured such that the S-boxes illustrated in FIGS. 64 to 66 are used in the nonlinear conversion units of the conversion function E and the conversion function $E^{-1}$, and thus the involution property of the entire encryption processing unit is realized.

<9. Mounting Example of Encryption Processing Device>

Finally, a mounting example of the encryption processing device executing the encryption process according to the above-described embodiments will be described.

The encryption processing device executing the encryption process according to the above-described embodiments can be mounted in various information processing devices executing an encryption process. Specifically, the encryption processing device can be used in various devices executing, for example, encryption processes with data processing or communication processing, such as PCs, TVs, recorders, players, communication devices, RFIDs, smart cards, sensor network devices, cell/battery authentication modules, health and medical devices, independent-type network devices.

Figure 73:
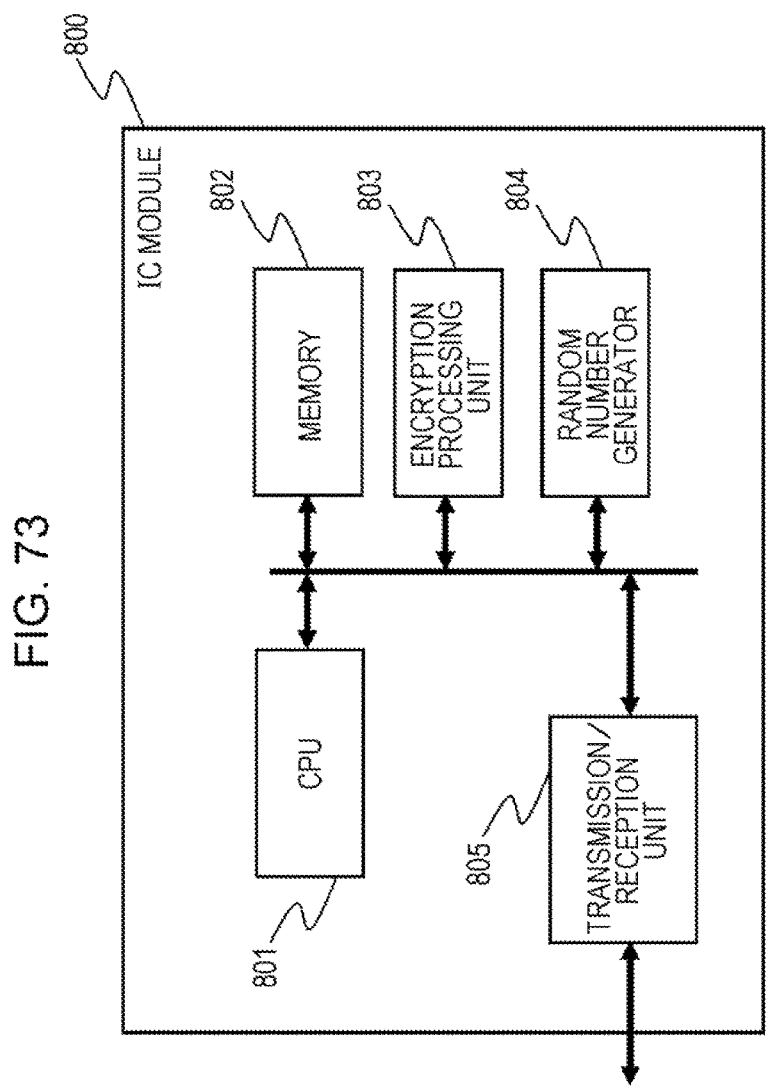
FIG. 73 is an explanatory diagram illustrating an example of the configuration of an IC module 700 serving as the encryption processing device.

An example of the configuration of an IC module 800 which is an example of a device executing the encryption process according to an embodiment of the present disclosure is illustrated in FIG. 73. The above-described processes can be executed in various information processing devices such as PCs, IC cards, reader/writers, smartphones, wearable devices. The IC module 800 illustrated in FIG. 73 can be configured in such various devices.

A central processing unit (CPU) 801 illustrated in FIG. 73 is a processor that executes start or end of the encryption process, control of transmission and reception of data, data transmission control between constituent units, and various programs. A memory 802 is configured as, for example, a read-only memory (ROM) that stores a program executed by the CPU 801 or fixed data such as arithmetic parameters or, a random access memory (RAM) that is used as a storage area or a work area of a program executed in a process of the CPU 801 and parameters appropriately changed in a program process. The memory 802 can be used as a storage area of key data necessary for the encryption process, a conversion table (substitution table) applied in the encryption process, data applied to a conversion matrix, and the like. A data storage area is preferably configured as a memory that has a tamper-resistant structure.

An encryption processing unit 803 has the encryption processing configuration described above and executes the encryption process and the decryption process according to a common key block encryption processing algorithm.

Here, the example in which the encryption processing unit is a separate module has been described. However, an independent encryption processing module may not be provided and, for example, an encryption processing program may be stored in a ROM so that the CPU 801 reads the program stored in the ROM and executes the program.

A random number generator 804 executes a process of generating a random number, for example, in generation of a key necessary for the encryption process.

A transmission/reception unit 805 is a data communication processing unit that executes data communication with the outside and executes the data communication with, for example, an IC module such as a reader/writer to output cipher text generated in the IC module or input data from a device such as an external reader/writer.

The encryption processing device described in the above-described embodiments can be applied not only to an encryption process of encrypting plain text which is input data but also to a decryption process of decrypting cipher text which is input data to obtain plain text.

The configurations described in the above-described embodiments can be applied to the encryption process, the decryption process, or both of the encryption and decryption processes.

Figure 74:
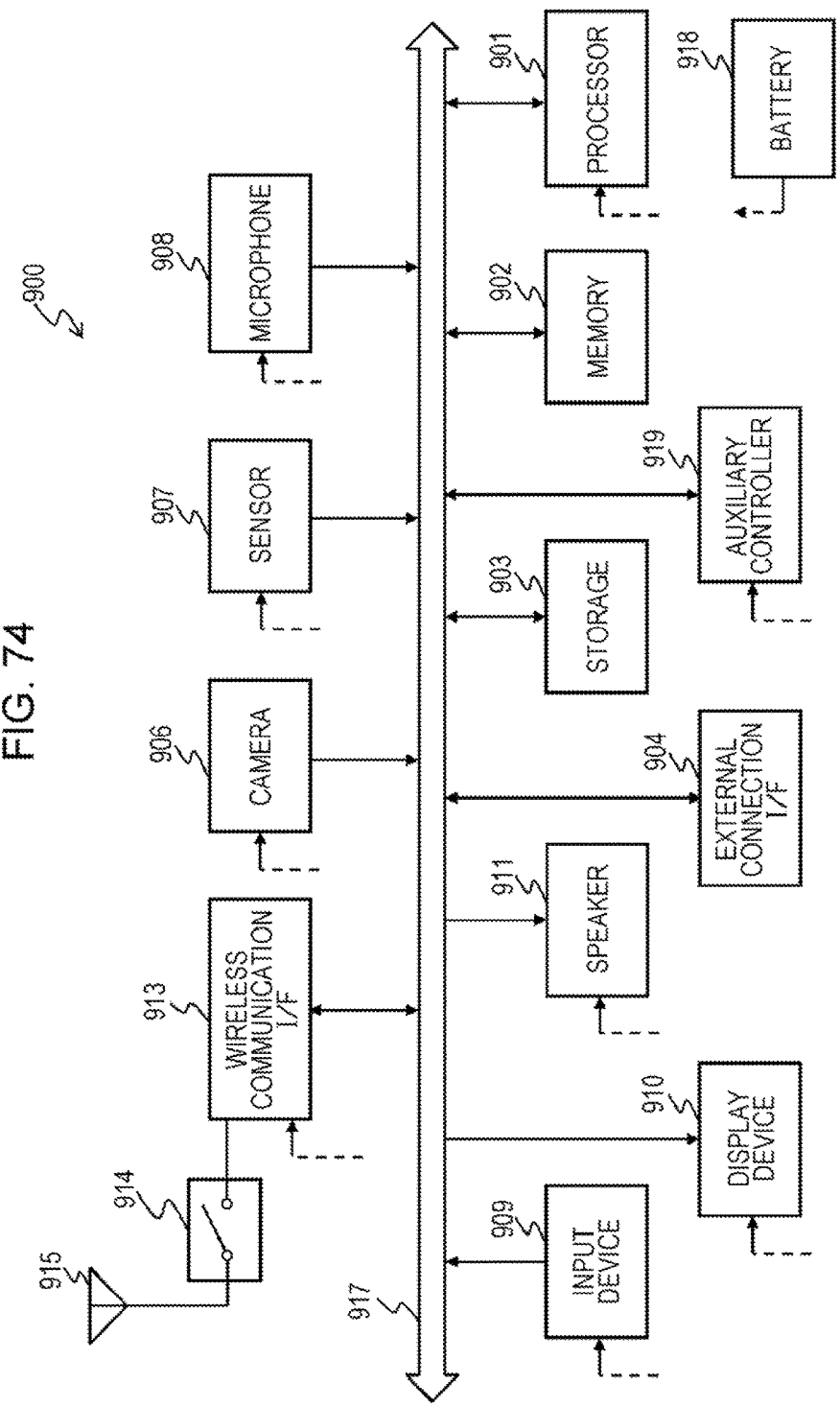
FIG. 74 is a diagram illustrating an example of the configuration of a smartphone having an encryption process execution function.

FIG. 74 is a block diagram illustrating an example of a schematic configuration of a smartphone 900 that executes the encryption process according to an embodiment of the present disclosure. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls the functions of an application layer and other layers of the smartphone 900 and controls the encryption process. The memory 902 includes a random access memory (RAM) and a read-only memory (ROM) and stores data and a program executed by the processor 901. The memory 902 can be used as a storage area of key data necessary for the encryption process, a conversion table (substitution table) applied in the encryption process, data applied to a conversion matrix, and the like. A data storage area is preferably configured as a memory that has a tamper-resistant structure. The storage 903 can include a storage medium such as a semiconductor memory or a hard disk. The external connection interface 904 is an interface that connects an externally attached device such as a memory card or universal serial bus (USB) device to the smartphone 900.

The camera 906 includes, for example, an image sensor such as charge coupled device (CCD) or a complementary metal oxide semiconductor (CMOS) and generates a captured image. The sensor 907 can include, for example, a sensor group of a positioning sensor, a gyro sensor, a geomagnetic sensor, an acceleration sensor, and the like. The microphone 908 converts audio input to the smartphone 900 into an audio signal. An image generated by the camera 906, sensor data acquired by the sensor 907, an audio signal acquired by the microphone 908, and the like may be encrypted by the processor 901 and may be transmitted to another device via the wireless communication interface 913. The input device 909 includes, for example, a touch sensor, a keypad, a keyboard, a button, or a switch detecting a touch on a screen of the display device 910 and receives an operation or an information input from a user. The display device 910 has a screen of a liquid crystal display (LCD) or an organic light-emitting diode (OLED) display and displays an output image of the smartphone 900. The speaker 911 converts an audio signal output from the smartphone 900 into audio.

The wireless communication interface 913 executes wireless communication and can generally include a baseband processor, a radio frequency (RF) circuit, and a power amplifier. The wireless communication interface 913 may be a one-chip module in which a memory that stores a communication control program, a processor executing the program, and relevant circuits are integrated. The wireless communication interface 913 may support not only a wireless LAN scheme but also other kinds of wireless communication schemes such as a short-range wireless communication scheme, a proximity wireless communication scheme, and a cellular communication scheme.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to each block of the smartphone 900 illustrated in FIG. 74 via power-feeding lines partially indicated by dotted lines in the drawing. The auxiliary controller 919 operates minimum necessary functions of the smartphone 900 in, for example, a sleep mode.

The encryption process in the smartphone described in the above-described embodiments can be applied not only to an encryption process of encrypting plain text which is input data but also to a decryption process of decrypting cipher text which is input data to obtain plain text.

The configurations described in the above-described embodiments can be applied to the encryption process, the decryption process, or both of the encryption and decryption processes.

The IC module 800 illustrated in FIG. 73 may be mounted on the smartphone 900 illustrated in FIG. 74 so that the encryption process according to the above-described embodiments is configured to be executed in the IC module 800.

<10. Conclusion of Configuration in Embodiment of the Present Disclosure>

The embodiments of the present disclosure have been described above in details with reference to the specific embodiments. However, it should be apparent to those skilled in the art that corrections and substitutions of the embodiments can be made within the scope of the present disclosure without departing from the gist of the present disclosure. That is, since the present disclosure has been described as exemplary forms, the present disclosure has not to be construed as limiting. In order to determine the gist of the present disclosure, the claims have to be referred to.

The technologies disclosed in the present specification can have the following configurations.

(1) An encryption processing system comprising:
an encryption processing circuit configured to execute a round calculation on input data and generate output data; and a key schedule circuit configured to output key data used in the encryption processing circuit to the encryption processing circuit, wherein each round calculation executed by the encryption processing circuit includes a linear conversion process executed by a linear conversion circuit, and
the linear conversion circuit changes a linear conversion mode of
the linear conversion process according to a round transition.

(2) The encryption processing system according to (1), wherein the linear conversion circuit switches a matrix used in the linear conversion process according to the round transition.

(3) The encryption processing system according to (1) or (2), wherein the linear conversion circuit switches between and executes three linear conversion processes according to the round transition.

(4) The encryption processing system according to any one of (1) to (3),
wherein the input data is a state formed by m*n components in which each component includes at least one bit, and
wherein the linear conversion circuit is configured to execute a matrix calculation in which a linear conversion matrix is applied to the state and is configured to switch the linear conversion matrix to be applied according to the round transition.

(5) The encryption processing system according to any one of (1) to (4),
wherein the input data is a state formed by m*n components in which each component includes at least one bit, and
wherein the linear conversion circuit is configured to execute one matrix calculation in the round calculation that is at least one of a column diffusion calculation in which the linear conversion is executed by applying a matrix in units of components of each column of the state and a row diffusion calculation in which the linear conversion is executed by applying a matrix in units of components of each row of the state.

(6) The encryption processing system according to (5), wherein the linear conversion circuit is configured to execute the linear conversion process through matrix calculation in which a plurality of matrices M0 to Mk are used, and
the linear conversion circuit switches and executes a column diffusion calculation, in which the linear conversion is executed applying a selected matrix selected from the matrices M0 to Mk to each column in units of components of each column of the state in a specific order, and a row diffusion calculation, in which the linear conversion is executed applying a selected matrix selected from the matrices M0 to Mk to each row in units of components of each row of the state in a specific order, according to the round transition.

(7) The encryption processing system according to (5), wherein the linear conversion circuit is configured to execute the linear conversion process through matrix calculation in which a plurality of kinds of matrices M0 to Mk are used, the linear conversion circuit switches and executes column diffusion calculation, first row diffusion calculation, and second row diffusion calculation according to the round transition, in the column diffusion calculation the linear conversion is executed by applying a selected matrix selected from the matrices M0 to Mk to each column in units of components of each column of the state in a specific order,
in the first row diffusion calculation the linear conversion is executed by applying a selected matrix selected from the matrices M0 to Mk to each row in units of components of each row of the state in specific order A, and
in the second row diffusion calculation the linear conversion is executed by applying a selected matrix selected from the matrices M0 to Mk to each row in units of components of each row of the state in specific order B different from the specific order A.

(8) The encryption processing system according to (5), wherein the linear conversion circuit is configured to execute the linear conversion process through matrix calculation in which a plurality of matrices M0 to Mk are used,
the linear conversion unit switches and executes row diffusion calculation, first column diffusion calculation and second column diffusion calculation according to the round transition,
in the column diffusion calculation the linear conversion is executed by applying a selected matrix selected from the matrices M0 to Mk to each row in units of components of each row of the state in a specific order,
in the first column diffusion calculation the linear conversion is executed by applying a selected matrix selected from the matrices M0 to Mk to each column in units of components of each column of the state in specific order A, and
in the second column diffusion calculation the linear conversion is executed by applying a selected matrix selected from the matrices M0 to Mk to each column in units of components of each column of the state in specific order B different from the specific order A.

(9) The encryption processing system according to any one of (1) to (8), wherein the input data is a state formed by 4*4 components in which each component has 4 bits, and
the linear conversion circuit is configured to execute a matrix calculation in which a linear conversion matrix is applied to the state and switches the linear conversion matrix to be applied according to the round transition.

(10) The encryption processing system according to (9), wherein the linear conversion circuit is configured to execute the linear conversion process through matrix calculation in which four matrices M0, M1, M2, and M3 are used, and
the linear conversion circuit switches and executes among three matrix calculations according to the round transition, the matrix calculations including
column diffusion calculation in which the linear conversion is executed by applying the matrix M0 in units of components of each column of the state, first row diffusion calculation in which the linear conversion is executed by applying each matrix in order of the matrices M0, M1, M2, and M3 in units of components of each row of the state, and second row diffusion calculation in which the linear conversion is executed by applying each matrix in order different from the order of the first row diffusion calculation in units of components of each row of the state.

(11) The encryption processing system according to (10), wherein a combination of a matrix applied in units of components of each row of the state in the first row diffusion calculation and a matrix applied in units of components of each row of the state in the second row diffusion calculation is a combination of at least three matrices among a total of four matrices, two matrices applied to two arbitrary rows of the state in the first row diffusion calculation and two matrices applied to the two arbitrary rows in the second row diffusion calculation.

(12) The encryption processing system according to (9), wherein the linear conversion circuit is configured to execute the linear conversion process through matrix calculation in which four matrices M0, M1, M2, and M3 are used, and the linear conversion circuit switches and executes among three matrix calculations according to the round transition, the three matrix calculations including row diffusion calculation in which the linear conversion is executed by applying the matrix M0 in units of components of each row of the state, first column diffusion calculation in which the linear conversion is executed by applying each matrix in order of the matrices M0, M1, M2, and M3 in units of components of each column of the state, and second column diffusion calculation in which the linear conversion is executed by applying each matrix in order different from the order of the first column diffusion calculation in units of components of each column of the state.

(13) The encryption processing system according to (12), wherein a combination of a matrix applied in units of components of each column of the state in the first column diffusion calculation and a matrix applied in units of components of each column of the state in the second column diffusion calculation is a combination of at least three matrices among a total of four matrices, two matrices applied to two arbitrary columns of the state in the first column diffusion calculation and two matrices applied to the two arbitrary columns in the second column diffusion calculation.

(14) The encryption processing system according to any one of (1) to (13),
wherein the encryption processing circuit outputs cipher text C as output data by repeating the round calculation using plain text P as input data, and
the encryption processing circuit is configured to have an involution property in which the plain text P is generated as the output data using the cipher text C as the input data through a data conversion process in which an execution sequence of the round calculation is set in inverse order.

(15) The encryption processing system according to any one of (1) to (14), wherein the linear conversion circuit is configured to have an involution property in which a transition sequence of the linear conversion process mode in an execution sequence when cipher text C is generated from plain text P matches a transition sequence of the linear conversion process mode in an execution sequence when the plain text P is generated from the cipher text C.

(16) The encryption processing system according to any one of (1) to (15), wherein the key schedule circuit is configured to execute a key supply process having an involution property in which a key supply sequence when cipher text C is generated from plain text P matches a key supply sequence when the plain text P is generated from the cipher text C.

(17) The encryption processing system according to any one of (1) to (16), wherein when a key supply process that supplies a key to the encryption processing circuit is executed, the key schedule circuit executes a calculation by a constant on a part of a supply key and outputs key data which is a result of the calculation to the encryption processing circuit.

(18) The encryption processing circuit according to any one of (1) to (17),
wherein the round calculation includes a nonlinear conversion process, and
an S-box executing the nonlinear conversion process is configured to have an involution property in which an input value is obtainable by re-inputting an output value obtainable from the input value.

(19) An encryption processing method executed in an encryption processing system, the processing method comprising:
executing, with an encryption processing circuit, round calculation on input data and generating output data;
outputting, with a key schedule circuit, key data used in the encryption processing circuit to the encryption processing circuit in the executing step, causing the encryption processing circuit to execute a linear conversion process by a linear conversion circuit in the round calculation; and
in the executing step, causing the linear conversion circuit to execute a linear conversion mode according to round transition.

(20) A non-transitory computer-readable medium encoded with computer-readable instructions that, when executed by a processor, cause the processor to perform a method comprising:
executing, in an encryption processing circuit, round calculation on input data and generating output data;
outputting, in a key schedule circuit, key data used in the encryption processing circuit to the encryption processing circuit;
in the executing step, causing the encryption processing circuit to execute a linear conversion process by a linear conversion circuit in the round calculation; and
in the executing step, causing the linear conversion circuit to execute a linear conversion mode according to round transition.

The series of processes described in the present specification can be executed by hardware, software, or a combination configuration of both the hardware and the software. When the processes are executed by software, a program recording a process sequence can be installed and executed in a memory in a computer embedded in dedicated hardware or a program can be installed and executed in a general computer capable of executing various processes. For example, the program can be recorded in advance in a recording medium. The program can be installed in a computer from a recording medium and the program can also be received via a network such as a LAN (Local Area Network) or the Internet and can be installed in a recording medium such as an internal hard disk.

The various processes described in the present specification may be executed chronologically according to the description and may also be executed in parallel or individually according to the processing capability of a device executing the processes or as necessary. A system in the present specification refers to a logical collection of a plurality of devices and is not limited to a configuration in which constituent devices are present in the same casing.

It should be understood by those skilled in the art that various modifications, combinations, sub-combinations and alterations may occur depending on design requirements and other factors insofar as they are within the scope of the appended claims or the equivalents thereof.

INDUSTRIAL APPLICABILITY

As described above, in the configuration according to an embodiment of the present disclosure, the encryption process configuration is realized in which and resistance against various attacks is improved and safety is high.

Specifically, the encryption processing unit configured to repeatedly execute the round calculation on the input data and generate the output data is included. The key schedule unit configured to output the key data used in the encryption processing unit to the encryption processing unit is included. The linear conversion process by a linear conversion unit in the round calculation executed by the encryption processing unit is changed according to the round transition. For example, column diffusion calculation in which linear conversion is executed applying a matrix to each column in units of components of each column of a state and row diffusion calculation in which linear conversion is executed applying a matrix in units of components of each row of the state are switched to be executed according to round transition.

The diffusion property is improved by this configuration, and thus the encryption process configuration is realized in which and resistance against various attacks is improved and safety is high.

REFERENCE SIGNS LIST

100 Encryption processing device
110 Key schedule unit
120 Encryption processing unit
121 Exclusive OR unit
122 Nonlinear conversion unit
123 Linear conversion unit
201 Linear conversion unit P1
202 Linear conversion unit P2
203 Linear conversion unit P3
300 Key schedule unit
301 Key supply unit (key register)
302 Key conversion unit
320 Encryption processing unit
321 to 327 Exclusive OR unit
331, 333 Exclusive OR unit
332 Nonlinear/linear conversion unit (S&P)
350 Encryption processing unit
351 Exclusive OR unit
352 Nonlinear/linear conversion unit (S&P)
360 Key schedule unit
361, 362 Key register
363 Key conversion unit
371 Key register
372 Key conversion unit
381 Key register
391 Key register
392, 394 Exclusive OR unit
393 Key conversion unit
401 Round calculation execution unit
402 Constant input unit
411 Conversion function E
412 Linear conversion unit
413 Conversion function $E^{-1}$
431 Conversion function E
432 Linear conversion unit
433 Conversion function $E^{-1}$
435 Constant input unit
436 Exclusive OR unit
437 Linear conversion unit
451 Conversion function E
452 Linear conversion unit
453 Conversion function $E^{-1}$
521 Nonlinear conversion layer 1
522 Linear conversion layer
523 Nonlinear conversion layer
700 Encryption processing device
720 Key schedule unit
721 Round key supply unit
722 Key register
723 Key conversion unit
725 Constant supply unit
750 Encryption processing unit
751 Exclusive OR unit
752 Nonlinear conversion unit
753 Linear conversion unit
800 IC module
801 CPU (Central Processing Unit)
802 Memory
803 Encryption processing unit
804 Random number generator
805 Transmission/reception unit
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller

The invention claimed is:

1. An encryption processing system, comprising:
an encryption processing;
a key schedule circuit configured to output key data to the encryption processing circuit,
wherein the encryption processing circuit is configured to:
execute a plurality of round calculations on input data based on the key data; and
generate output data based on the plurality of round calculations; and
a linear conversion circuit configured to:
execute a linear conversion process in each of the plurality of round calculations; and
change a mode of the linear conversion process based on a round transition for each of the plurality of round calculations,
wherein the linear conversion process includes a matrix calculation that includes one of a column diffusion calculation or a row diffusion calculation, wherein the column diffusion calculation includes application of a matrix in units of components of each column of the input data, and the row diffusion calculation includes application of the matrix in units of components of each row of the input data, and wherein the change of the mode of the linear conversion process corresponds to a switch from a first one of the column diffusion calculation or the row diffusion calculation to a second one of the column diffusion calculation or the row diffusion calculation.

2. The encryption processing system according to claim 1, wherein the linear conversion circuit is further configured to change the matrix in the linear conversion process based on the round transition.

3. The encryption processing system according to claim 1, wherein the linear conversion circuit is further configured to:
   switch based on the round transition, from a first process of three linear conversion processes to a second process of the three linear conversion processes, and
   execute the second process of the three linear conversion processes,
   wherein each of the three linear conversion processes corresponds to a different one of the column diffusion calculation, a first row diffusion calculation, or a second row diffusion calculation.

4. The encryption processing system according to claim 1, wherein
   the input data is a state of m*n components,
   each component of the m*n components includes at least one bit,
   each of m and n is a number that is one of greater than or equal to 1, and
   the linear conversion circuit is further configured to:
      execute the matrix calculation based on application of a linear conversion matrix to the state; and
      switch the linear conversion matrix based on the round transition.

5. The encryption processing system according to claim 1, wherein the input data is a state of m*n components, wherein each component of the m*n components includes at least one bit, and wherein each of m and n is a number that is one of greater than or equal to 1, and
   wherein the column diffusion calculation includes application of the matrix in units of components of each column of the state, and the row diffusion calculation includes application of the matrix in units of components of each row of the state.

6. The encryption processing system according to claim 5, wherein the linear conversion circuit is further configured to:
   execute the linear conversion process based on the matrix calculation, wherein the matrix calculation is based on a plurality of matrices $M_o$ to $M_k$, and wherein k is a number that is one of greater than or equal to 1; and
   execute the second one of the column diffusion calculation or the row diffusion calculation,
   wherein the column diffusion calculation includes application of a first matrix from the plurality of matrices $M_o$ to $M_k$ to each column in units of components of each column of the state in a first order, and
   wherein the row diffusion calculation includes application of a second matrix from the plurality of matrices $M_o$ to $M_k$ to each row in units of components of each row of the state in a second order.

7. The encryption processing system according to claim 5, wherein the linear conversion circuit is further configured to:
   execute the linear conversion process based on the matrix calculation, wherein the matrix calculation is based on a plurality of matrices $M_o$ to $M_k$, and wherein k is a number that is one of greater than or equal to 1;
   switch, based on the round transition, from a first one of the column diffusion calculation, a first row diffusion calculation, or a second row diffusion calculation to a second one of the column diffusion calculation, the first row diffusion calculation, or the second row diffusion calculation; and
   execute the second one of the column diffusion calculation, the first row diffusion calculation, or the second row diffusion calculation,
   wherein the column diffusion calculation includes application of a first matrix from the matrices $M_o$ to $M_k$ to each column in units of components of each column of the state in a first order,
   wherein the first row diffusion calculation includes application of a second matrix from the plurality of matrices $M_o$ to $M_k$ to each row in units of components of each row of the state in an order A, and
   wherein the second row diffusion calculation includes application of a third matrix from the plurality of matrices $M_o$ to $M_k$ to each row in units of components of each row of the state in an order B different from the order A.

8. The encryption processing system according to claim 5, wherein the linear conversion circuit is further configured to:
   execute the linear conversion process based on the matrix calculation, wherein the matrix calculation is based on a plurality of matrices Mo to $M_k$;
   switch, based on the round transition, from a first one of the row diffusion calculation, a first column diffusion calculation, or a second column diffusion calculation to a second one of the row diffusion calculation, the first column diffusion calculation, or the second column diffusion calculation; and
   execute one of the second one of the row diffusion calculation, the first column diffusion calculation, or the second column diffusion calculation,
   wherein the first column diffusion calculation includes application of a first matrix from the plurality of matrices $M_o$ to $M_k$ to each column in units of components of each column of the state in an order A, and
   wherein the second column diffusion calculation includes application of a second matrix from the plurality of matrices $M_o$ to $M_k$ to each column in units of components of each column of the state in an order B different from the order A.

9. The encryption processing system according to claim 1, wherein
   the input data is a state of 4*4 components, wherein each of the 4*4 components includes 4 bits, and
   the linear conversion circuit is further configured to:
      execute the matrix calculation based on application of a linear conversion matrix to the state; and
      switch the linear conversion matrix based on the round transition.

10. The encryption processing system according to claim 9, wherein the linear conversion circuit is further configured to:
   execute the linear conversion process based on the matrix calculation, wherein the matrix calculation is based on at least four matrices $M_o$, $M_1$, $M_2$, and $M_3$;
   switch, based on the round transition, from a first one of three matrix calculations to a second one of the three matrix calculations; and
   execute the second one of the three matrix calculations, wherein each of the three matrix calculations corresponds to a different one of the column diffusion calculation, a first row diffusion calculation, or a second row diffusion calculation, wherein the column diffusion calculation includes application of the matrix $M_o$ in units of components of each column of the state, wherein the first row diffusion calculation includes application of each of the at least four matrices in an order of $M_o$, $M_1$, $M_2$, and $M_3$ in units of components of each row of the state, and wherein the second row diffusion calculation includes application of each of the at least four matrices, in an order different from the order of the first row diffusion calculation, in units of components of each row of the state.

11. The encryption processing system according to claim 10, wherein a combination of a first matrix of the at least four matrices applied in the first row diffusion calculation, and a second matrix of the at least four matrices applied in the second row diffusion calculation is a combination of at least three matrices of the at least four matrices, wherein first two matrices of the at least four matrices are applied to two rows of the state in the first row diffusion calculation, and wherein two matrices other than the first two matrices of the at least four matrices are applied to the two rows in the second row diffusion calculation.

12. The encryption processing system according to claim 9, wherein the linear conversion circuit is further configured to:

execute the linear conversion process based on the matrix calculation, wherein the matrix calculation is based on at least four matrices $M_o$, $M_1$, $M_2$, and $M_3$;

switch, based on the round transition, from a first one of three matrix calculations to a second one of the three matrix calculations; and execute the second one of the three matrix calculations, wherein each of the three matrix calculations corresponds to a different one of the row diffusion calculation, a first column diffusion calculation, or a second column diffusion calculation, wherein the row diffusion calculation includes application of the matrix $M_o$ in units of components of each row of the state, wherein the first column diffusion calculation includes application of each of the at least four matrices in an order of $M_o$, $M_1$, $M_2$, and $M_3$ in units of components of each column of the state, and wherein the second column diffusion calculation includes application of each of the at least four matrices, in an order different from the order of the first column diffusion calculation, in units of components of each column of the state.

13. The encryption processing system according to claim 12, wherein a combination of a first matrix of the at least four matrices applied in the first column diffusion calculation, and a second matrix of the at least four matrices applied in the second column diffusion calculation is a combination of at least three matrices of the at least four matrices, wherein first two matrices of the at least four matrices are applied to two columns of the state in the first column diffusion calculation, and wherein two matrices other than the first two matrices are applied to the two columns in the second column diffusion calculation.

14. The encryption processing system according to claim 1, wherein the encryption processing circuit is further configured to:

output cipher text C as output data based on a repetitive round calculation of plain text P as input data, wherein the repetitive round calculation of the plain text P corresponds to a first order of round calculation; and generate the plain text P as the output data based on cipher text C as the input data, and a data conversion process that includes an execution sequence of the plurality of round calculations in inverse order, wherein the inverse order corresponds to execution of the first order in inverse.

15. The encryption processing system according to claim 1, wherein the linear conversion circuit is further configured to:

generate cipher text C from plain text P; and generate the plain text P from the cipher text C, wherein, in an involution property associated with the linear conversion circuit, a first transition sequence of the mode of the linear conversion process in a first execution sequence matches a second transition sequence of the mode of the linear conversion process in a second execution sequence, wherein the first execution sequence corresponds to the generation of the cipher text C from plain text P, and wherein the second execution sequence corresponds to the generation of the plain text P from the cipher text C.

16. The encryption processing system according to claim 1, wherein the key schedule circuit is further configured to execute a key supply process having an involution property, wherein, in the involution property, a key supply sequence that corresponds to generation of cipher text C from plain text P matches a key supply sequence that corresponds to generation of the plain text P from the cipher text C.

17. The encryption processing system according to claim 1, wherein the key schedule circuit is further configured to:

execute, based on an execution of a key supply process, a calculation, wherein the key supply process corresponds to supply of a key to the encryption processing circuit, and wherein the calculation is by a constant on a part of a supply key; and output the key data to the encryption processing circuit, wherein the key data is a result of the calculation.

18. The encryption processing system according to claim 1, wherein the encryption processing circuit comprises an S-box, the each of the plurality of round calculations includes a nonlinear conversion process, and the S-box is configured to:

execute the nonlinear conversion process, wherein, in an involution property associated with the S-box, an input value is obtainable by re-input of an output value, and wherein the output value is obtainable from the input value.

19. An encryption processing method, comprising:

in an encryption processing system comprising an encryption processing circuit, a key schedule circuit, and a linear conversion circuit, outputting, by the key schedule circuit, key data to the encryption processing circuit, executing, by the encryption processing circuit, a plurality of round calculations on input data based on the key data;

generating output data based on the plurality of round calculations;

executing, by the linear conversion circuit, a linear conversion process in each of the plurality of round calculations; and changing a mode of the linear conversion process based on a round transition for each of the plurality of round calculations, wherein the linear conversion process includes a matrix calculation that includes one of a column diffusion calculation or a row diffusion calculation, wherein the column diffusion calculation includes application of a matrix in units of components of each column of the input data, and the row diffusion calculation includes application of the matrix in units of components of each row of the input data, and wherein the change of the mode of the linear conversion process corresponds to a switch from a first one of the column diffusion calculation or the row diffusion calculation to a second one of the column diffusion calculation or the row diffusion calculation.

20. A non-transitory computer-readable medium having stored thereon, computer-executable instructions that, when executed by a processor, cause the processor to execute operations, the operations comprising:

outputting, by a key schedule circuit, key data to an encryption processing circuit;

executing, by the encryption processing circuit, a plurality of round calculations on input data based on the key data; and generating output data based on the plurality of round calculations;

executing, by a linear conversion circuit, a linear conversion process in each of the plurality of round calculations; and changing a mode of the linear conversion process based on a round transition for each of the plurality of round calculations, wherein the linear conversion process includes a matrix calculation that includes one of a column diffusion calculation or a row diffusion calculation, wherein the column diffusion calculation includes application of a matrix in units of components of each column of the input data, and the row diffusion calculation includes application of the matrix in units of components of each row of the input data, and wherein the change of the mode of the linear conversion process corresponds to a switch from a first one of the column diffusion calculation or the row diffusion calculation to a second one of the column diffusion calculation or the row diffusion calculation.

\* \* \* \* \*